(12) United States Patent
Barnard et al.

(10) Patent No.: US 9,054,832 B2
(45) Date of Patent: Jun. 9, 2015

(54) MANAGEMENT, MONITORING AND PERFORMANCE OPTIMIZATION OF OPTICAL NETWORKS

(75) Inventors: Chris Wilhelm Barnard, Sunnyvale, CA (US); Piotr Myslinski, Fremont, CA (US); Colin John Wright, Santa Clara, CA (US)

(73) Assignee: TREQ LABS, INC., Sunnyvale, CA (US)

( * ) Notice: Subject to any disclaimer, the term of this patent is extended or adjusted under 35 U.S.C. 154(b) by 930 days.

(21) Appl. No.: 12/961,439

(22) Filed: Dec. 6, 2010

(65) Prior Publication Data

US 2011/0158642 A1    Jun. 30, 2011

Related U.S. Application Data

(60) Provisional application No. 61/267,786, filed on Dec. 8, 2009.

(51) Int. Cl.
| | |
|---|---|
| *H04B 10/079* | (2013.01) |
| *H04J 14/02* | (2006.01) |
| *H04B 10/572* | (2013.01) |

(52) U.S. Cl.
CPC .......... *H04J 14/0287* (2013.01); *H04B 10/572* (2013.01); *H04J 14/02* (2013.01); *H04J 14/0201* (2013.01)

(58) Field of Classification Search
CPC ..................................... H04B 10/07–10/0799
USPC ................................ 398/16, 25–29
See application file for complete search history.

(56) References Cited

U.S. PATENT DOCUMENTS

| | | |
|---|---|---|
| 3,435,229 A | 3/1969 | Buhrer |
| 4,164,787 A | 8/1979 | Aranguren |

(Continued)

FOREIGN PATENT DOCUMENTS

| | | |
|---|---|---|
| DE | 19828614 | 12/1999 |
| EP | 0113379 | 7/1984 |

(Continued)

OTHER PUBLICATIONS

Gonzalez and Woods, Digital Image Processing, Section 7.3, pp. 443-458, 1992.

(Continued)

*Primary Examiner* — Shi K Li
(74) *Attorney, Agent, or Firm* — Michael K. Bosworth; IPxLaw Group LLP

(57) ABSTRACT

The present invention includes novel techniques, apparatus, and systems for optical WDM communications. Tunable lasers are employed to generate respective subcarrier frequencies which represent subchannels of an ITU channel to which client signals can be mapped. In one embodiment, subchannels are polarization interleaved to reduce crosstalk. In another embodiment, polarization multiplexing is used to increase the spectral density. Client circuits can be divided and combined with one another before being mapped, independent of one another, to individual subchannels within and across ITU channels. A crosspoint switch can be used to control the client to subchannel mapping, thereby enabling subchannel protection switching and hitless wavelength switching. Network architectures and subchannel transponders, muxponders and crossponders are disclosed, and techniques are employed (at the subchannel level/layer), to facilitate the desired optical routing, switching, concatenation and protection of the client circuits mapped to these subchannels across the nodes of a WDM network.

11 Claims, 117 Drawing Sheets

(56) References Cited

U.S. PATENT DOCUMENTS

| | | | |
|---|---|---|---|
| 4,823,194 A | 4/1989 | Mishima et al. |
| 4,904,042 A | 2/1990 | Dragone |
| 5,062,684 A | 11/1991 | Clyaton et al. |
| 5,101,450 A | 3/1992 | Olshansky |
| 5,138,671 A | 8/1992 | Yokoyama |
| 5,184,213 A | 2/1993 | Ishida |
| 5,200,841 A | 4/1993 | Kotaki et al. |
| 5,201,012 A | 4/1993 | Hisano et al. |
| 5,239,401 A | 8/1993 | Olshansky |
| 5,268,773 A | 12/1993 | Park et al. |
| 5,301,058 A | 4/1994 | Olshansky |
| 5,333,000 A | 7/1994 | Hietala et al. |
| 5,390,188 A | 2/1995 | Dawson et al. |
| 5,442,623 A | 8/1995 | Wu |
| 5,452,107 A | 9/1995 | Koike |
| 5,479,082 A | 12/1995 | Calvani et al. |
| 5,509,093 A | 4/1996 | Miller et al. |
| 5,513,209 A | 4/1996 | Holm |
| 5,539,559 A | 7/1996 | Cisneros et al. |
| 5,546,210 A | 8/1996 | Chraplyvy et al. |
| 5,596,436 A | 1/1997 | Sargis et al. |
| 5,600,466 A | 2/1997 | Tsushima et al. |
| 5,600,742 A | 2/1997 | Zirngibl |
| 5,608,825 A | 3/1997 | Ip |
| 5,617,233 A | 4/1997 | Boncek |
| 5,621,815 A | 4/1997 | Talukdar et al. |
| 5,625,478 A | 4/1997 | Doerr et al. |
| 5,663,820 A | 9/1997 | Shiragaki |
| 5,663,968 A | 9/1997 | Heuer |
| 5,680,235 A | 10/1997 | Johansson |
| 5,696,614 A | 12/1997 | Ishikawa et al. |
| 5,710,650 A | 1/1998 | Dugan |
| 5,712,716 A | 1/1998 | Vanoli et al. |
| 5,717,795 A | 2/1998 | Sharma et al. |
| 5,734,493 A | 3/1998 | Jopson |
| 5,742,416 A | 4/1998 | Mizrahi |
| 5,745,273 A | 4/1998 | Jopson |
| 5,764,821 A | 6/1998 | Glance |
| 5,778,118 A | 7/1998 | Sridhar |
| 5,781,327 A | 7/1998 | Brock et al. |
| 5,784,184 A | 7/1998 | Alexander et al. |
| 5,784,500 A | 7/1998 | Homma et al. |
| 5,786,913 A | 7/1998 | Pfeiffer |
| 5,796,501 A | 8/1998 | Sotom et al. |
| 5,822,095 A | 10/1998 | Taga et al. |
| 5,838,463 A | 11/1998 | Gahang |
| 5,838,475 A | 11/1998 | Takeyari et al. |
| 5,870,212 A | 2/1999 | Nathan et al. |
| 5,880,870 A | 3/1999 | Sieben et al. |
| 5,896,212 A | 4/1999 | Sotom et al. |
| 5,915,049 A | 6/1999 | Kaji et al. |
| 5,917,638 A | 6/1999 | Franck et al. |
| 5,923,449 A | 7/1999 | Doerr et al. |
| 5,938,309 A | 8/1999 | Taylor |
| 5,940,197 A | 8/1999 | Ryu |
| 5,949,273 A | 9/1999 | Mourick et al. |
| 5,949,560 A | 9/1999 | Roberts et al. |
| 5,949,901 A | 9/1999 | Nichani et al. |
| 5,953,141 A | 9/1999 | Liu et al. |
| 5,963,567 A | 10/1999 | Veselka et al. |
| 5,982,518 A | 11/1999 | Mizarahi |
| 5,982,963 A | 11/1999 | Feng et al. |
| 6,008,931 A | 12/1999 | Von Helmolt et al. |
| 6,023,359 A | 2/2000 | Asahi |
| 6,035,080 A | 3/2000 | Henry et al. |
| 6,055,336 A | 4/2000 | Niki |
| 6,061,476 A | 5/2000 | Nichani |
| 6,069,732 A | 5/2000 | Koch et al. |
| 6,072,907 A | 6/2000 | taylor et al. |
| 6,084,694 A | 7/2000 | Milton et al. |
| 6,088,141 A | 7/2000 | Merli et al. |
| 6,118,566 A | 9/2000 | Price et al. |
| 6,130,766 A | 10/2000 | Cao |
| 6,163,553 A | 12/2000 | Pfeiffer |
| 6,191,854 B1 | 2/2001 | Grasso et al. |
| 6,192,163 B1 | 2/2001 | Murayama |
| 6,192,173 B1 | 2/2001 | Solheim et al. |
| 6,195,186 B1 | 2/2001 | Asahi |
| 6,195,351 B1 | 2/2001 | Hiscock et al. |
| 6,195,467 B1 | 2/2001 | Asimopoulos et al. |
| 6,201,909 B1 | 3/2001 | Kewitsch et al. |
| 6,208,441 B1 | 3/2001 | Jones et al. |
| 6,211,980 B1 | 4/2001 | Terahara |
| 6,222,654 B1 | 4/2001 | Frigo |
| 6,233,077 B1 | 5/2001 | Alexander |
| 6,259,836 B1 | 7/2001 | Dodds |
| 6,271,946 B1 | 8/2001 | Chang et al. |
| 6,282,215 B1 | 8/2001 | Zorabedian et al. |
| 6,285,479 B1 | 9/2001 | Okazaki et al. |
| 6,339,663 B1 | 1/2002 | Leng et al. |
| 6,351,323 B1 | 2/2002 | Onaka et al. |
| 6,369,923 B1 | 4/2002 | Kuo et al. |
| 6,385,204 B1 | 5/2002 | Hoefelmeyer et al. |
| 6,404,535 B1 | 6/2002 | Leight |
| 6,414,765 B1 | 7/2002 | Li et al. |
| 6,433,904 B1 | 8/2002 | Swanson et al. |
| 6,466,342 B1 | 10/2002 | Frigo et al. |
| 6,487,334 B2 | 11/2002 | Ducellier et al. |
| 6,493,118 B1 | 12/2002 | Kartalopoulos |
| 6,498,660 B2 | 12/2002 | Haltmaier |
| 6,525,852 B1 | 2/2003 | Egnell |
| 6,525,857 B1 | 2/2003 | Way et al. |
| 6,529,301 B1 * | 3/2003 | Wang ............................... 398/82 |
| 6,556,744 B1 | 4/2003 | Brimacombe et al. |
| 6,560,252 B1 | 5/2003 | Colbourne et al. |
| 6,567,198 B1 | 5/2003 | Kang |
| 6,574,386 B1 | 6/2003 | Sufleta |
| 6,580,537 B1 | 6/2003 | Chang et al. |
| 6,590,681 B1 | 7/2003 | Egnell et al. |
| 6,594,049 B1 | 7/2003 | Brinkman et al. |
| 6,657,952 B1 | 12/2003 | Shiragaki et al. |
| 6,661,976 B1 | 12/2003 | Gnauck et al. |
| 6,701,085 B1 | 3/2004 | Muller |
| 6,714,537 B1 | 3/2004 | Adam et al. |
| 6,788,716 B2 | 9/2004 | Ahmadvand et al. |
| 6,788,899 B2 | 9/2004 | Way |
| 6,845,109 B2 | 1/2005 | Lee et al. |
| 6,868,200 B2 | 3/2005 | Kimotsuki et al. |
| 6,891,981 B2 | 5/2005 | Price et al. |
| 6,895,184 B2 | 5/2005 | Way |
| 6,970,655 B2 | 11/2005 | Ono et al. |
| 6,999,680 B2 * | 2/2006 | Yamakawa ............... 398/34 |
| 7,002,697 B2 | 2/2006 | Domash et al. |
| 7,003,231 B2 | 2/2006 | Way et al. |
| 7,024,112 B2 | 4/2006 | Way |
| 7,039,319 B1 | 5/2006 | Moulton et al. |
| 7,046,619 B2 | 5/2006 | Alagar et al. |
| 7,068,949 B2 | 6/2006 | Jung et al. |
| 7,103,239 B2 | 9/2006 | Kish et al. |
| 7,120,359 B2 | 10/2006 | Way |
| 7,120,360 B2 | 10/2006 | Tian et al. |
| 7,197,053 B1 | 3/2007 | Liu et al. |
| 7,206,520 B2 | 4/2007 | Way et al. |
| 7,209,660 B1 | 4/2007 | Yee et al. |
| 7,257,287 B2 | 8/2007 | Amin et al. |
| 7,257,325 B1 | 8/2007 | Barbarossa |
| 7,307,558 B1 | 12/2007 | Karim et al. |
| 7,327,961 B2 | 2/2008 | Griffin |
| 7,492,986 B1 | 2/2009 | Kelly |
| 7,499,647 B2 | 3/2009 | Way et al. |
| 7,773,883 B1 | 8/2010 | Weng et al. |
| 2002/0012148 A1 | 1/2002 | Oksanen |
| 2002/0015553 A1 | 2/2002 | Claringburn et al. |
| 2002/0023170 A1 | 2/2002 | Seaman et al. |
| 2002/0030877 A1 | 3/2002 | Way et al. |
| 2002/0063928 A1 | 5/2002 | Hansen et al. |
| 2002/0067523 A1 | 6/2002 | Way |
| 2002/0075981 A1 | 6/2002 | Tang et al. |
| 2002/0080440 A1 | 6/2002 | Li et al. |
| 2002/0114034 A1 | 8/2002 | Way |
| 2002/0126350 A1 | 9/2002 | Sato et al. |
| 2002/0135838 A1 | 9/2002 | Way |
| 2003/0025957 A1 | 2/2003 | Jayakumar |
| 2003/0025961 A1 | 2/2003 | Way |

(56) References Cited

U.S. PATENT DOCUMENTS

| | | | |
|---|---|---|---|
| 2003/0067643 | A1 | 4/2003 | Lee et al. |
| 2003/0090767 | A1 | 5/2003 | Yap et al. |
| 2003/0165119 | A1 | 9/2003 | Hsu |
| 2003/0169470 | A1 | 9/2003 | Alagar et al. |
| 2003/0180047 | A1 | 9/2003 | Way |
| 2003/0185248 | A1 | 10/2003 | Klipper et al. |
| 2003/0215232 | A1 | 11/2003 | Jahn et al. |
| 2003/0223751 | A1 | 12/2003 | Shimizu et al. |
| 2004/0004949 | A1 | 1/2004 | Cayla et al. |
| 2004/0052276 | A1 | 3/2004 | Lou et al. |
| 2004/0096215 | A1* | 5/2004 | Evangelides et al. ............ 398/33 |
| 2004/0114926 | A1 | 6/2004 | Kim et al. |
| 2004/0208561 | A1 | 10/2004 | Kinoshita et al. |
| 2004/0208586 | A1 | 10/2004 | Kinoshita |
| 2004/0208614 | A1 | 10/2004 | Price |
| 2004/0218526 | A1 | 11/2004 | Kim et al. |
| 2005/0018600 | A1 | 1/2005 | Tornar et al. |
| 2005/0025490 | A1 | 2/2005 | Aoki et al. |
| 2005/0078965 | A1 | 4/2005 | Kim et al. |
| 2005/0084262 | A1 | 4/2005 | Oberg et al. |
| 2005/0111495 | A1 | 5/2005 | Gumaste et al. |
| 2005/0141894 | A1 | 6/2005 | Kim et al. |
| 2005/0158047 | A1 | 7/2005 | Way et al. |
| 2005/0185969 | A1 | 8/2005 | Muller et al. |
| 2005/0201762 | A1 | 9/2005 | Muller et al. |
| 2005/0213968 | A1 | 9/2005 | Uda et al. |
| 2005/0232627 | A1* | 10/2005 | Sun et al. ......................... 398/26 |
| 2005/0265725 | A1 | 12/2005 | Okano et al. |
| 2005/0286908 | A1 | 12/2005 | Way |
| 2006/0051092 | A1 | 3/2006 | Way |
| 2006/0140643 | A1 | 6/2006 | Way et al. |
| 2006/0171720 | A1* | 8/2006 | Agarwal et al. ............... 398/186 |
| 2006/0269294 | A1 | 11/2006 | Kikuchi |
| 2006/0269295 | A1 | 11/2006 | Way |
| 2006/0275035 | A1 | 12/2006 | Way |
| 2007/0014571 | A1* | 1/2007 | Roberts et al. .................. 398/25 |
| 2007/0025729 | A1 | 2/2007 | Barnard |
| 2007/0030556 | A1 | 2/2007 | Kawanishi |
| 2007/0086332 | A1 | 4/2007 | Way et al. |
| 2007/0258716 | A1 | 11/2007 | Barbieri |
| 2008/0080857 | A1* | 4/2008 | Goto .............................. 398/26 |
| 2009/0022492 | A1 | 1/2009 | Brownlee et al. |
| 2009/0067843 | A1 | 3/2009 | Way et al. |
| 2009/0103924 | A1 | 4/2009 | Kawanishi et al. |
| 2010/0221004 | A1 | 9/2010 | Haslam et al. |
| 2010/0272431 | A1* | 10/2010 | Chen ............................... 398/16 |
| 2012/0230673 | A1* | 9/2012 | Striegler et al. ................. 398/16 |

FOREIGN PATENT DOCUMENTS

| | | |
|---|---|---|
| EP | 0141247 | 5/1985 |
| EP | 0187518 | 7/1986 |
| EP | 0984580 | 3/2000 |
| WO | WO 96-32787 | 10/1996 |
| WO | WO 99-03230 | 1/1999 |
| WO | WO 01-67647 | 9/2001 |
| WO | WO 01-67648 | 9/2001 |
| WO | WO 02-23772 | 3/2002 |
| WO | WO 02-058301 | 7/2002 |
| WO | WO 2004-002024 | 12/2003 |
| WO | WO 2004-064259 | 7/2004 |
| WO | WO 2006-002080 | 1/2006 |
| WO | WO 2006-119375 | 11/2006 |
| WO | WO 2007-014055 | 2/2007 |
| WO | WO 2007-044939 | 4/2007 |
| WO | WO 2009-105281 | 8/2009 |

OTHER PUBLICATIONS

Academic Press Limited, Machine Vision, Section 4.3, pp. 79-99, 1990.

Adamzyk, et al., "All-optical output-port contention resilution using subcarrier-Multiplexing," Optical Fiber Communications Cofnerence 2000, Mar. 7-10, 20000, pp. 332-334.

Bannister et al. "How many wavelengths do we really need? A study of the performance limits of packet over wavelengths," APIE Optical Network Magazine, Apr. 2000, pp. 1-12.

Blumenthal et al., "All-optical label swapping with wavelength conversion for WDM-IP networks with subcarrier multiplexed addressing," IEEE Photonics technology letters, vol. 11, No. 11, Nov. 1999, pp. 1497-1499.

Bosco G. et al., "On the use of NRZ, RZ, and CSRZ modulation at 40 Gb-s with narrow DWDM channel spacing," Journal of Lightwave technology, p. 1694-1704, Sep. 2002.

Bosco, G. et al, "Modulation formats suitable for ultrahigh spectral efficient WDM systems," IEEE J. Selected Topics in quantum electron. 10(22): 321-328 (Mar.-Apr. 2004).

Bryav et al., "Wavelength conversion in WDM networking," IEEE Journal on Selected Areas in Communication, vol. 16, Sep. 1998, pp. 1061.

Chao et al., "A photonic front-end processor in a WDM ATM multicase switch," journal of Lightwave Technology, vol. 18, No. 3, Mar. 2000, pp. 273-285.

Daikoku M. et al., "Performance comparison of modulation formats for 40Gb-s DWDM transmission systems," paper OFN2, Optical Fiber Communications (OFC) Conference, 2005, 3 pages.

Derr et al., "An Optical infrastructure for future telecommunications networks," IEEE Communications Magazine, vol. 33, No. 11, Nov. 1995 pp. 84-88.

Frankel et al. "Optical single-sideband suppressed-carrier modulator for wide-band signal processing," Journal of Lightwave Technology, vol. 16, No. 5, May 5, 1998, pp. 859-863.

Gerstel, O. and R. Ramaswami, "Optical layer survivability: a service perspective," IEEE Communications Magazine, pp. 104-113, Mar. 2000.

Ghani, "lamda-labeling: A framework for IP-over-WDM using MPLS," Optical Networks Magazine, vol. 1, No. 2, Apr. 2000, pp. 45-58.

Gnauck, A.H. and P.J. Winzer, 'Optical phase shifter keyed transmission, Journal of Lightwave Technology 23 (1): 115-130 Jan. 9, 2005).

Goldstein et al., "Performance implications of component crosstalk in transparent lighwave networks," IEEE Photonics Technology Letters 6(5): 657-660 May 9, 1994).

Gonzales and Woods, "Digital Image Processing," Section 7.3, pp. 443-458, 1992.

Heismann,"Polarization mode dispersion: Fundamentals and Impact on Optical Communication System," European conference on Optical Communications (ECOC '98), Sep. 20-24, 1998, Madrid, Spain, vol. 2, pp. 51-79 (1998).

Hill, P.M. and Olshansky, R. "Multigigabit subcarrier multiplexed coherent lightwave system," J. Lightwave Technology, vol. 10, No. 11, pp. 1656-1664, Nov. 1992.

Hui et al., "10 Gb-s SCM system using optical single side-band modulation," optical fiber Communication Conference and Exhibit, 2001. OFC 2001, vol. 1, Issue, 2001 pp. MM4-1-MM4-4.

Hui, R., "Multitributary OFDM optical transmitter using carrier-suppressed optical single-sideband modulation," Optical Fiber Communications Conference, 2003, OFC 2003, Mar. 23-28, 2003, pp. 92-93.

ITU-T Recommendation G.692, "Optical Interfaces for Multichannel systems with Optical Amplifiers," Oct. 1998, pp. 14-23.

Izutsu et al., "Integrated optical SSB modulation-frequency shifter," IEEE journal of quantum electronics, vol. QE-17, No. 11, Nov. 1981, pp. 2225-2227.

Jiang et al., Multi-Lane PMD reliability and Partial fault protection (PFP),' IEEE 802.3ba, Jan. 2008, 25 pages, http:--www.ieee802.org-ba-public-jan08-jiang_01_0108.pdf [accessed on Apr. 8, 2008.

Johansson, B.S. et al. "Flexible bus: a self-restoring optical ADM ring architecture," Electronic Letters, vol. 32, No. 25, pp. 2338-2339, Dec. 1996.

Joo, Y. et al., "1-fiber WDM self-healing ring with bidirectional optical add-drop multiplexers," IEEE Photon. Technol. Lett. 16(2): 683-685 (Feb. 2004).

Kaminow, I. and t. Li, (Eds.), "Optical Fiver telecommunications IVB; systems and Impairments," San Diego: Academic press, Chapter 16, pp. 868-876 (2002).

(56) References Cited

OTHER PUBLICATIONS

Khrais et al., "Effects of cascaded misaligned optical (de)multiplexers on multiwavelength iotical network performance," OFC, paper ThD-4, Feb. 1996.
Kinoshita et al., "Metro WDM network with photonic domains," Optical Fiber Communication Conference OFC 2004, vol. 1, Feb. 23-27, 2004, 3 pages.
Kitayama, "Highly spectrum efficient OFDM-PDM wireless networks by using iptical SSB modulation," journal of Lighwave Technology, vol. 16, No. 6, Jun. 1998, pp. 969-976.
Lee et al., "A wavelength-convertible optical network," Journal of Lightwave Technology, Nol. 11, May.Jun. 1993, p. 962.
Lyubomirsky, L. and C. Chien, "Tailoring the duobinary pulse shape for optimum performance," J. Lightwave Technology 23911): 3732-3736 (Nov. 2005).
Masetti, et al., "High speed, high capacity STM optical switches for future telecommunication transport networks," IEE journal on Selected Areas in Communications, vol. 14, No. 5, Jun. 1996, pp. 979-998.
Ohn et al., "Dispersion variable fibre Bragg grating using a piezoelectric stack," Electronic Letters, vol. 32, No. 21, Oct. 10, 1996, pp. 2000-2001.
Okamoto et al., "Optical path Cross-connect systems for photonic networks," Global telecommunications Conference, Nov. 1993, vol. 1, pp. 474-480.
Ono, T. et al., Characteristics of optical duobinary signals in terabit-s capacity, high spectral efficiency WDM systems, J. Lightwave technology 16(5): 778-797, May 1998.
Ramamurthy, Byrav, et al. "Wavelength Conversion in WDM networking," IEEE journal on Selected Areas in Communication, vol. 16, Sep. 1998, pp. 1061-1073.
Ramos, et al., "Comparison of optical single-sideband modulation and chirped fiber gratings as dispersion mitigating techniques in optical millimeter-wave multichannel systems," IEEE Photonics technology Letters, vol. 11, No. 11, Nov. 1999, pp. 1479-1481.
Sano et al., "30×100 gbs-all-optical OFDM transmission over 1300 km SMF with 10 ROADM nodes," Technical Digest of ECOC 2007, paper PDS1.7 (2007), 2 pages.
Sargis, P.D. et al., "10-Gb-s subcarrier multiplexed transmission over 490 km of ordinary single-mode fiver without dispersion compensation," IEE Photon. Tech. Lett. 9(12):: 1658-1160 (Dec. 1997).
Shankar, "Duobinary modulation for optical systems," Dec. 5, 2002, retrieved from internet http:--www.inphi-corpi.com-products-whitepapers-Duobinary-ModulationForOpticalSystems.pdf on Oct. 14, 2005, 10 pages.
Shi et al., "High-speed electrooptic modulator characterization using optical spectrum analysis," J. Lightwave Technol. 21(10): 2358-2367, (Oct. 2003).
Shtaif, M. and A.H.Gnauck, The relation between optical duobinary modulation and spectral efficiency in WDM systems, IEEE Photon. Techno. Lett. 11(6):712-714 (Jun. 1999).

Sieben et al., "Optical single sideband transmissiona t 10Gb-s using only electrical dispersion compensation," Journal of Lighwave Technology, vol. 17, No. 10, Oct. 1999, pp. 1742-1748.
Smith et al., "Broad-band millimeter-wave (38 Ghz) Fiber-wireless transmission system using electrial and optical SSB modulation to overcome dispersion effects," IEEE Photonics Techonolgy Letters, vol. 10, No. 1, Jan. 1998, pp. 141-143.
Smith et al., "OVercoming chromatic-dispersion effects in fiber-wireless systems incorporating external modulators," IEEE transactions on Microwave theory and techniques 45(8): 1419-1415 (Aug. 1997).
Spring et al., "Photonic header replacement for packer switching," Electronic Letters, vol. 29, No. 17, Aug. 19, 1993, pp. 1523-1525.
Sun et al., "Tunable compensation of dispersion-induced RF power degradation in multiple-channel SCM transmission by nonlinearly-chirped FBG's," CLEO '99, 1999, pp. 316-317.
Van den Borne, D. et al., "Coherent equalization versus direct detection for 111-Gb-s ethernet transport," IEEE LEOS Summer tropical Meetings, pp. 12-13, Jul. 23-25, 2007.
Van Deventer et al., "Power penalties due to Brillouin and Rayleigh scattering in a bi-directional coherent transmission system," IEE Photon. Lett. 6(2): 291-294 (Feb. 1994).
Walkin, "Multilevel signaling for increasing the reach of 10 Gb-s lightwave systems," Journal of Lightwave Technology, vol. 17, No. 11, Nov. 1999, pp. 2235-2248.
Way, "Broadband hybrid fiber coax access system technologies," New York Academic Press, 1998, pp. 253-300.
Way, W.I., "RF modem design for HFC Systems," Broadband Hybrid Fiber-Coax Access Technologies, 1998, pp. 253-300.
Way, "Spectral efficient parallel PHY for 100 GbE Man and Wan," IEEE Applications and Practice (distributed with IEEE Communications magazine), pp. 20-23, (Dec. 2007).
Way, "Subcarrier multiplexed lightwave system design considerations for subcarrier loop applications," Journal of Lightwave Technology, vol. 7, No. 11, Nov. 1989, pp. 1806-1818.
Weng, c. and W.I. Way,"A single-fiber optical unidirectional-path switched-ring network using double-sideband-supressed carrier modulation technique," Photonics Technology Letters, IEEE 18(21): 2236-2238 (Nov. 2006).
Winzer, P. and G. Raybon, "100G Ethernet-a review of serial transport options," IEEE LEOS Summer Tropical Meetings, Jul. 23-25, 2007, pp. 708.
Wree, C. et al., Coherent receivers for phase-shift keyed transmission, OFC-NFOEC, paper OMP6, 2007, 3 pages.
Wu et al., CSO distortions due to the combined effects of self- and external-phase modulations in Long-distance 1550nm AM-CATV systems,' IEEE Photonics technology Letters, vol. 11, No. 6, Jun. 1999, pp. 718-720.
Xie, C. et al., "Improvement of optical NRZ- and RZ-duobinary transmission systems with narrow bandwidth optical filters," IEEE Photon. Tech. Lett. 16(9): 2162-2164 (Sep. 2004).
Yonenaga et al., "Optical duobinary transmission system with no receiver sensitivity degradation," Electron Letters. vol. 21, No. 4, pp. 201-203 (Feb. 4, 1995).
Yonenaga, et al., "Dispersion-tolerant optical transmission system using duobinary transmitter and binary receiver," Jouranl of Lightwave Technology, vol. 15, No. 8, Aug. 1997, pp. 1530-1537.

* cited by examiner

| 5495 5410 | 5420 | 5430 | 5440 | 5450 | 5460 | 5470 | 5480 |
|---|---|---|---|---|---|---|---|
| Update Register # | Address | Name | Type | Expected | Actual | Diff | Description |
| 81 | 0800_0102 | XFP_CTLS | RW | 0000 | 0000 | | XFP Control Register for Ports 1-4 |
| 82 | 0800_0104 | MISC_CTLS | RW | 00f3 | 00f3 | | Misc Control Register |
| 83 | 0800_0106 | LED_CTLS | RW | 0000 | 0000 | | Client LED Control Register |
| 84 | 0800_0108 | MODULE_CTLS | RW | 0039 | 0039 | | Module Control Register |
| 85 | 0800_010A | MODULE_SERIF_CTLS | RW | 00f0 | 00f0 | | Module Serial IF Control Register |
| 88 | 0800_0110 | P1_TXCVR_CTLS | RW | 0505 | 0505 | | Port #1 TXCVR Controls |
| 89 | 0800_0112 | P1_FEC_CTLS | RW | 0205 | 0205 | | Port #1 FEC (Rubicon) Controls |
| 8A | 0800_0114 | P1_ING_CLK_CTLS | RW | 0f69 | 0f69 | | Port #1 Ingress Clocking Controls |
| 8B | 0800_0116 | P1_EGR_CLK_CTLS | RW | 0fb1 | 0f31 | 80 | Port #1 Egress Clocking Controls |

| Node 1 Inputs | | Node 1 Outputs | | | |
|---|---|---|---|---|---|
| | | 5 | 6 | 7 | 8 |
| | 1 | 0 | 0 | 1 | 0 |
| | 2 | 0 | 0 | 0 | 1 |
| | 3 | 1 | 0 | 0 | 1 |
| | 4 | 0 | 1 | 1 | 0 |

| Node | Port | Action |
|---|---|---|
| 1 | 4 | PI |
| 1 | 6 | D |
| 1 | 1 | A |
| 1 | 7 | PO |
| 4 | 4 | PI |
| 4 | 6 | D |
| 4 | 1 | A |
| 4 | 7 | PO |
| 3 | 4 | PI |
| 3 | 6 | D |
| 3 | 1 | A |
| 3 | 7 | PO |
| 2 | 4 | PI |
| 2 | 6 | D |
| 2 | 1 | A |
| 2 | 7 | PO |

6210

| Node | Port | Action |
|---|---|---|
| 1 | 3 | PI |
| 1 | 5 | D |
| 1 | 2 | A |
| 1 | 8 | PO |
| 2 | 3 | PI |
| 2 | 5 | D |
| 2 | 2 | A |
| 2 | 8 | PO |
| 3 | 3 | PI |
| 3 | 5 | D |
| 3 | 2 | A |
| 3 | 8 | PO |
| 4 | 3 | PI |
| 4 | 5 | D |
| 4 | 2 | A |
| 4 | 8 | PO |

| Node | Port | | VLAN (within the subchannel) | | | | | | | | | | 7110 |
|---|---|---|---|---|---|---|---|---|---|---|---|---|---|
| | | | 1 | 2 | 3 | 4 | 5 | 6 | 7 | 8 | 9 | 10 | |
| 1 | 4 PI | | IS-P | IS-P | IS-P | IS-P | IS-P | IS-P | IS-P | UAS-P | UAS-P | UAS-P | I-200,SC4 |
| 1 | 6 D | | IS-D | IS-D | IS-D | IS-D | IS-D | IS-D | IS-D | UAS-D | UAS-D | UAS-D | |
| 1 | 1 A | | IS-A | IS-A | IS-A | IS-A | IS-A | UAS-A | IS-A | IS-A | IS-A | IS-A | |
| 1 | 7 PO | | IS-P | IS-P | IS-P | IS-P | IS-P | UAS-P | IS-P | IS-P | IS-P | IS-P | |
| 3 | 4 PI | | IS-P | IS-P | IS-P | IS-P | IS-P | UAS-P | IS-P | IS-P | IS-P | IS-P | I-220,SC-1 |
| 3 | 6 D | | IS-D | IS-D | IS-D | IS-D | IS-D | UAS-D | IS-D | IS-DP | IS-DP | IS-DP | |
| 3 | 1 A | | IS-A | IS-A | IS-A | IS-A | IS-A | IS-A | IS-DA | IS-DA | IS-DA | IS-DA | |
| 3 | 7 PO | | IS-P | IS-P | IS-P | IS-P | IS-P | IS-P | IS-P | IS-P | IS-P | IS-P | |
| 2 | 4 PI | | IS-A | IS-A | IS-A | IS-A | IS-A | IS-A | IS-A | UAS-A | UAS-A | UAS-A | I-210,SC-4 |
| 2 | 6 D | | IS-P | IS-P | IS-P | IS-P | IS-P | IS-P | IS-P | UAS-P | UAS-P | UAS-P | |
| 2 | 1 A | | IS-P | IS-P | IS-P | IS-P | IS-P | IS-P | IS-P | IS-P | IS-P | IS-P | I-200,SC4 |
| 2 | 7 PO | | IS-D | IS-D | IS-D | IS-D | IS-D | IS-D | IS-D | IS-D | IS-D | IS-D | |
| 1 | 3 PI | | IS-P | IS-P | IS-P | IS-P | IS-P | UAS-P | IS-P | IS-P | IS-P | IS-P | I-200,SC4 |
| 1 | 5 D | | IS-D | IS-D | IS-D | IS-D | IS-D | UAS-D | IS-D | IS-D | IS-D | IS-D | |
| 1 | 2 A | | IS-A | IS-A | IS-A | IS-A | IS-A | IS-A | UAS-A | UAS-A | UAS-A | UAS-A | |
| 1 | 8 PO | | IS-P | IS-P | IS-P | IS-P | IS-P | IS-P | UAS-P | UAS-P | UAS-P | UAS-P | |
| 2 | 3 PI | | IS-P | IS-P | IS-P | IS-P | IS-P | IS-P | IS-P | IS-P | IS-P | IS-P | I-210,SC-4 |
| 2 | 5 D | | IS-D | IS-D | IS-D | IS-DP | IS-DP | IS-DP | IS-DP | IS-DP | IS-DP | IS-DP | |
| 2 | 2 A | | IS-A | IS-A | IS-A | IS-AP | IS-AP | IS-AP | IS-AP | IS-AP | IS-AP | IS-AP | |
| 2 | 8 PO | | IS-P | IS-P | IS-P | IS-P | IS-P | IS-P | IS-P | IS-P | IS-P | IS-P | |
| 3 | 3 PI | | IS-A | IS-A | IS-A | IS-A | IS-A | UAS-A | UAS-A | IS-A | IS-A | IS-A | I-220,SC1 |
| 3 | 5 D | | IS-P | IS-P | IS-P | IS-P | IS-P | UAS-P | UAS-P | IS-P | IS-P | IS-P | |
| 3 | 2 A | | IS-P | IS-P | IS-P | IS-P | IS-P | IS-P | IS-P | IS-DP | IS-DP | IS-AP | |
| 3 | 8 PO | | IS-P | IS-P | IS-P | IS-P | IS-P | IS-P | IS-P | IS-P | IS-P | IS-P | I-200,SC4 |

FIG. 71

MANAGEMENT, MONITORING AND PERFORMANCE OPTIMIZATION OF OPTICAL NETWORKS

CROSS REFERENCE TO RELATED APPLICATIONS

This application claims the benefit, pursuant to 35 U.S.C. §119(e), of U.S. Provisional Patent Application No. 61/267,786, filed Dec. 8, 2009, entitled "Subchannel Photonic Routing, Switching and Protection with Simplified Upgrades of WDM Optical Networks," which is hereby incorporated by reference in its entirety.

I. BACKGROUND

A. Field of Art

This application relates generally to optical communications based on optical wavelength-division multiplexing (WDM), and in particular to subchannel routing, switching, and protection, along with related techniques that facilitate network upgrades and reuse of legacy equipment.

B. Description of Related Art

1. Overview

Optical WDM communication systems transmit multiple optical channels at different WDM carrier wavelengths through a single fiber. The infrastructures of many deployed optical fiber networks today are based on 10 Gb/s per channel. As the demand for higher transmission speeds increases, there is a need for optical networks at 40 Gb/s, 100 Gb/s or higher speeds per channel.

Moreover, there is a need to leverage this higher bandwidth to realize greater flexibility in routing client signals among network nodes. For example, increasing the bandwidth of a fiber channel from 10 Gb/s to 40 Gb/s might enable 4×10 Gb/s client circuits to occupy a channel between two network nodes previously dedicated to a single 10 Gb/s client circuit. Yet, unless an entire channel is free to enable all four client circuits to continue propagating together to a subsequent node on the network, the desired routing of these four client circuits may not be achievable without some mechanism for dynamically rerouting individual client circuits, independent of one another, across different fiber channels.

As will become apparent below, there is a need not only for increased bandwidth, but for sufficient flexibility to divide and/or combine individual client circuits to achieve desired routing, switching, concatenation and protection capabilities. Such flexibility is needed to fully realize the benefit of increasing the number of available optical circuits in a single fiber.

2. Single-Wavelength Optical Networks

Optical fiber has been used as a communication means since about 1977. Over time, deployed baud rates on a single laser have increased from 45 MB/s to over 40 Gb/s. Various protocols have been transmitted across optical fiber, including SONET [GR-253] and Gigabit Ethernet [IEEE Standard 802.3ae].

FIG. 1A shows a deployed network 100 that uses OC-48 SONET add-drop multiplexers 120 at each node, interconnected by a first fiber optic cable 125 for signals traveling in a clockwise direction, and a second fiber optic cable 135 for signals travelling in a counterclockwise direction. At each node (or network add/drop site) lower-rate client traffic 110 can be added or dropped, or passed through that node. SONET mappers are used to map the traffic to the STS-1 virtual containers [described in Telcordia Standard GR-253], and SONET multiplexers are used to direct the traffic to the add, drop, or passthrough ports. A pair of multiplexers can be used on two separate line cards as shown to provide support for a Unidirectional Path Switched Ring (UPSR), or a 2-fiber or 4-fiber Bidirectional Line-Switched Ring (BLSR). [GR-1230 Telcordia Standard describes the SONET BLSR]. The traffic from a SONET ADM can also be combined with other traffic using wave-division multiplexing (WDM) to increase the network capacity.

FIG. 1B shows a deployed network 150 that uses Gigabit Ethernet switches 170 at each node, interconnected by a first fiber optic cable 175 for signals traveling in a clockwise direction, and a second fiber optic cable 185 for signals travelling in a counterclockwise direction. At each node incoming Gigabit Ethernet traffic 160 is mapped to VLANs that are transmitted on the 10 GE line side. At each node traffic in each VLAN is selected to be added or dropped, or passed through that node. When GE networks are deployed in a ring, the standard protocols of STP (Spanning-Tree Protocol) and RPR (Resilient Packet Ring) can be used to provide protection. The traffic from a 10GE switch can also be combined with other traffic using WDM.

3. WDM Networks with Muxponders and Transponders

Later generations of optical fiber communication systems use optical amplifiers to increase span and repeater distances and wavelength-division multiplexing to increase the link capacity or aggregate bandwidth. WDM networks transmit client traffic from multiple sources over an optical fiber network. The traffic is multiplexed on the fiber by transmitting each signal with a laser set at a different channel on the International Telecommunication Union (ITU) channel plan defined in Standard G.692. Optical filters designed to function according to the ITU channel plan are used to demultiplex the signals and thereby direct each signal to its designated receiver. These standard ITU channels are hereinafter referred to simply as "channels."

Optical signals are transmitted using transponders or muxponders, and are demultiplexed with fixed optical add-drop multiplexers (FOADMs), reconfigurable optical add-drop multiplexers (ROADMs), and/or wavelength selective switches (WSS).

FIG. 2 shows a currently deployed WDM transponder 200. Client traffic 210 is connected via a short-reach fiber interface to client transceivers 215. These are typically pluggable devices such as an XFP [MSA standard http://www.xfpm-sa.org/cgi-bin/msa.cgi]. After the optical signal is converted to an equivalent electrical signal (utilizing clock recovery circuitry 218), it can be processed digitally to optionally (1) extract performance monitoring information 220, (2) add channel overhead for remote network management 225, and (3) encode the data for forward error correction 227. The signal is then used to modulate light from a fixed or tunable laser on the WDM grid. The output 230 from the transmitter 229 is then launched onto the transmission fiber. The transmitted light signal can be combined with light signals from other WDM transponders on a single fiber with an optical multiplexer.

At the receive side of the link, an optical demultiplexer is used to separate the WDM signals 235 (on the incoming fiber), which are then converted back into equivalent electrical signals by the receive circuitry 237 in the transponder. Note that this transponder requires external means to select the particular wavelength that is being dropped, though this filter function can be integrated onto the transponder line card [see, eg, U.S. Pat. No. 6,525,857]. The electrical signal from the line receiver (utilizing clock recovery circuitry 239) can be processed digitally to optionally (1) extract performance monitoring information 241, (2) drop the channel overhead for remote network management 225, and (3) correct errors according to the Forward Error Correction (FEC) algorithm 243. The signal 240 is then returned to the client equipment via the client-side transceivers 215. As alluded to above, transponders may utilize clock recovery circuitry 239 to support different data rates and protocols.

Typically, the line side optics are designed to operate at 2.7 Gb/s, 10.7-11 Gb/s, or 43 Gb/s with the cost of the components increasing with bit rate. The line receiver 237 is either a PIN photodiode or avalanche photodiode. In either case the receiver is not wavelength specific, so that an optical demultiplexer, or ITU channel filter, must be placed in front of the receiver to filter out the designated channel.

It should also be noted that control plane circuitry and software 250 is employed to facilitate various transmit and receive functions of DWDM transponder 200, such as remote network management 225 (e.g., via the addition or removal of channel overhead) and the extraction of performance monitoring information 245. In addition, control plane 250 is employed for configuration of transmission protocols 255 (in concert with clock recovery circuitry 218) and laser wavelengths 265 (to tune channels via transmitter 229). Finally, it can detect and handle faults involving the reception of both client-side (267a) and line-side (267b) signals.

FIG. 3 shows a currently deployed WDM muxponder 300. This module maps lower-rate traffic 310 using a SONET multiplexer [GR-253], OTN (Optical Transport Network) multiplexer [based on ITU standard G.709], Ethernet switch, or proprietary digital mapping and multiplexing 320. The multiplexing may be done with a commercially available or custom-designed ASIC, or a custom-designed FPGA. The muxponder 300 has line-side WDM optics similar to the transponder 200 with a laser (in transmitter 329) set to a designated channel on the ITU grid and a receiver 337 that can detect any signal within the ITU channel plan.

Although the transponder 200 and muxponder 300 can be designed to transmit signals from different sources and with different bit rates, the hardware limitations and costs typically limit the implementation to a specific set of protocols. For example, a 10 Gb/s transponder may transmit OC-192 or STM-64 signals at 9.95 Gb/s, 10 GbE signals at 10.3125 Gb/s, FC-10 signals at 10.5 Gb/s, and OTU signals at 10.7 Gb/s. But it may not transmit data at significantly different data rates such as 2.5 Gb/s or 1.25 Gb/s. This may be a limit of the clock-recovery circuits used, SERDES (serializer-deserializer) circuits, or the ASIC or FPGA used to perform the performance monitoring and FEC functions. Similarly, a muxponder typically supports a subset of data rates and protocols that are determined by the capabilities of the digital and analog electronic circuits. The maximum data rate supported by the transponder and muxponder is typically limited by the analog circuits on the line side, such as the optical modulator (or bandwidth of the laser if direct modulation is being used), the bandwidth of the optical receiver, and the bandwidth of the transimpedance amplifier used at the receiver.

WDM network installations have been a compromise between price and functionality. The cost of the high-speed optics increases with the line bit rate so that vendors typically partition their products into different data rates such as 2.5 Gb/s, 10 Gb/s, 40 Gb/s, and 100 Gb/s. The price of WDM ports dictates that networks be deployed with as much bandwidth per port as possible. However, this has been offset by transponder prices increasing with bandwidth (e.g. 40G) so that most WDM lambdas have bandwidth assignments that are "right sized."

4. WDM Channel Plans

WDM network channel plans usually use a subset of the wavelengths on the International Telecommunication Union, Telecommunication Sector (ITU-T) grid. Reference Standard G.692, which specifies a frequency grid anchored at 192.1 THz with interchannel spacings at integer multiples of 50 GHz and 100 GHz, is specified as the basis for selecting channel central frequencies. For purposes of illustration, the ITU channels will be referenced as I-210 for 192.1 THz, I-215 for 192.15 THz, etc.

The number of channels on the ITU grid is limited in most applications to the gain range available from erbium-doped fiber amplifiers (EDFAs). Gain-flattened EDFAs are now commercially available for either the C band (~191.8 THz to 196.3 GHz) and L band (~186.9 to 191.4 GHz). Currently a fully-loaded WDM network can transmit approximately 160 channels-80 channels in the C band spaced at 50 GHz and 80 channels in the L band spaced at 50 GHz.

5. Point-to-Point WDM Links

FIG. 4 shows a simplified diagram of a point-to-point WDM network 400 interconnecting two nodes—East Node 410 and West Node 420. Typically two fibers are used—one to transmit from east to west 402 and one to transmit from west to east 404—but a single fiber can also be used. Signals from different WDM lasers are combined via WDM Combiner 415 that can be wavelength-dependent (using ITU channel filters) or wavelength-independent (using a 1:N optical splitter).

A 1:N optical splitter can be based on fused fiber couplers. It has N input ports and one output port so that optical signals connected to the input ports are combined in the output fiber with a nominal power loss of 10*log 10(N) dB for each signal. At the receive side the signals are demultiplexed via WDM Demultiplexer 417 using optical filters such as thin-film filters.

6. WDM Ring Networks

WDM signals can be transmitted over other topologies, such as a ring 500 shown in FIG. 5. In this example, and several of the examples to follow, a single wavelength at each node has been used to simplify the example. This does not preclude the generalized case of an arbitrary number of wavelengths at each node. The ring topology offers the advantage of having two diverse routes between any nodes on a ring so that any failure on one side of the ring can be protected with redundant traffic on the other side of the ring. WDM equipment networks also support channel passthrough at a node—if an optical filter is not used to drop a particular signal at that node, then the signal continues around the ring to the next node.

Optical filters may be configured to selectively drop channels at a node. In this case the dropped wavelengths can be reused for other signals on the next ring segment. This filter configuration is shown in FIG. 5 where all signals on ring 500 are directed to a filter (or plurality of filters 515, 525, 535 and 545) to select the dropped channels. Currently deployed WDM networks route signals using fixed or reconfigurable optical add-drop multiplexers. In this example, Node 1 510 is configured to drop I-200, Node 2 520 is configured to drop I-210, Node 3 530 is configured to drop I-220, and Node 4 540 is configured to drop I-230.

WDM signals may also be transmitted on a ring in a broadcast and select configuration [see, eg, U.S. Pat. No. 7,120,359]. In this configuration shown in FIG. 6, a portion of the powers of all signals is tapped off at a node and directed to a filter (or plurality of filters 615, 625, 635 and 645), to select the dropped channels. This implementation uses a wideband tap coupler (616, 626, 636 and 646) that directs a fixed fraction of all signals to a drop port. In this case all signals continue around the ring 600 so that the dropped wavelength cannot be reused since it would have interference from the passthrough portion of the signal entering the node. Furthermore, the return path of the signal on the protected side of the ring requires a separate wavelength to avoid interference.

Although the broadcast and select configuration does not support channel re-use, it has the advantage that it supports drop and continue traffic, i.e. traffic that is dropped at more than one node. It also has the advantage that once the tap coupler is in place, adding a filter to drop more channels does not interrupt the passthrough channels. To date, broadcast and select architectures have been limited by the number of channels supported by the optical demultiplexers.

Note that in either configuration of FIG. 5 or FIG. 6, the drop filter may not provide enough isolation on the passthrough path. In that case, the drop filters can be cascaded to improve the isolation. Further note that the diagrams only show one channel dropped at each node. Typical installations cascade filters at each node, or use a parallel filter, to drop more than one channel at each node.

Another advantage of the broadcast and select architecture is that it does not reduce the bandwidth available on the line fiber. All optical filters have a useable passband less than ideal because of the finite slope of the filter passband. The useable bandwidth of cascaded filters decreases as more filters are inserted in the signal path. The graph 700 in FIG. 7 shows the bandwidth narrowing effect for the case where commercially available WSS filters are cascaded in a network. Even though this WSS is designed for 100 GHz ITU channels, it has a useable passband of 68 GHz. Architectures that minimize the filter insertion in the optical path therefore have a higher available cumulative bandwidth.

WDM equipment is typically deployed in an equipment shelf that separates the add/drop functionality from the transponders or muxponders. This offers the service provider the benefits of paying as they grow, especially since the major expense can be the transponders and muxponders. This partitioning of WDM equipment 800 is shown in FIG. 8. A practical implementation would use optical fiber patchcords (802a and 802b, and 804a and 804b) to connect the discrete modules (add/drop modules 810 and 820, and transponders/muxponders 830 and 840), but optical backplanes have also been deployed.

Note that in FIG. 8 filters 815 and 825 are installed with larger channel counts than are being used. Over time channels can be added to the unused filter ports without interrupting the live services. Because of human error in manually adding the fiber patchcords (802a and 802b, and 804a and 804b) between the modules (add/drop modules 810 and 820, and transponders/muxponders 830 and 840), this partitioning can lead to misconnections of the fiber patchcords. Instead of properly connecting module 810 to transponder 830 (via fiber patchcords 802a and 802b), as shown in FIG. 8, these fiber patchcords could mistakenly be misconnected as shown in WDM equipment 900 in FIG. 9—e.g., connecting corresponding module 910 to transponder 940 (instead of transponder 930) via corresponding fiber patchcords 902a and 902b. Similarly, module 920 is mistakenly connected to transponder 930 (instead of transponder 940) via fiber patchcords 904a and 904b. These mistaken connections may be difficult to detect, especially if there are two redundant paths between the terminals.

Tracing optical connections can be difficult in this scenario because the multiplexers, amplifiers, and other equipment may not have means to independently detect each incident channel. U.S. Pat. No. 5,513,029, however, discloses a method whereby an optical signal is modulated with a low frequency dither signal to provide a modulated optical signal having a known modulation depth. A portion of the optical signal is tapped, and both a total power and a dither amplitude of the tapped portion of the optical signal can be measured within the network to provide power levels of the signals. But this method requires dedicated hardware at all monitoring points and it cannot detect third-party signals (i.e., "alien" signals that are generated by other equipment vendors, but which may be inserted into a WDM network as long as they are on the same ITU channel plan and do not interfere with other signals).

Another method that can be used to monitor signals in the network is to deploy optical spectrum analyzers at various points in a network. These can be accessed through the network management software. However, getting a full view of the network may require many of these and thus add considerable cost [see, eg, U.S. Pat. No. 7,002,697]. So there remains a need to improve the end-to-end visibility of signals in a multichannel optical network.

7. Link Budget Rules

To maintain signal integrity and guarantee a high quality of service, optical networks transmitting digital signals must maintain a minimum bit error rate (BER). Well-known factors affecting the WDM signal BER are received power levels, optical signal-noise ratio (OSNR), chromatic dispersion (CD), polarization-mode dispersion (PMD), and nonlinear fiber penalties such as cross-phase modulation and four-wave mixing. Network design rules determine the link budget (maximum distance and loss per fiber span) based on these penalties.

Guaranteeing the performance and determining the link budget for an installed network can be costly because determining the factors listed above may require expensive test equipment. Furthermore, the tests may have to be run while the network is out of service so that changes over time after a network is installed cannot be detected. There is therefore a need to measure the optical parameters for an installed network, with minimal service disruption, and minimal extra cost.

8. Optical Protection

Optical networks often require protection against equipment failures or fiber cuts. One good way of protecting traffic is to provide two or more redundant paths between the end points with a protection algorithm that selects traffic from one of the redundant paths. Standard protection algorithms are the SONET Unidirectional Path Switched Ring (UPSR) and Bidirectional Line-Switched Ring (BLSR). The UPSR provides dedicated protection (each working circuit has a protection circuit of equal bandwidth) and the BLSR provides shared protection (the protection bandwidth equals the total working bandwidth in a single fiber).

Dedicated and shared protection both require means to (1) bridge traffic at the transmit end onto the redundant paths, and (2) select traffic at the receiver from one of the redundant paths.

Shared protection also requires a means to manage the passthrough traffic at the intermediate nodes. Examples of shared protection schemes can be found in U.S. Pat. Nos. 7,046,619 and 7,499,647, and U.S. Pat. App. No. 2007/0025729.

Various forms of optical protection have been proposed and implemented, with the most common being a dedicated 1+1 protection with a 1×2 optical switch in front of the receiver. Although shared optical protection offers significant bandwidth savings, its practicality is limited by the requirement of maintaining link budget rules for all possible protection paths.

9. Larger WDM Networks and WSS

FIG. 10 shows a typical network layout 1000 of a service provider. The ring topology is commonly used in WDM networks because it provides the lowest-cost means of offering protected services. A ring network requires that all nodes have at least two connections to separate neighboring nodes. Ring networks may have spurs hanging off them to serve a small number of isolated nodes that have only a single fiber span connected to another node. Ring networks may be interconnected as shown in FIG. 10 with traffic passing between the rings at one or more intersecting nodes (nodes A and B). Many deployed networks with similar layouts need to pass traffic from a spur to a node on the same ring (node C to D), from a spur to a node on a different ring (node C to E), and between nodes on different rings (node D to E). A 1×N Wavelength-Selective Switch (WSS) can be used to direct traffic between N nodes with direct optical connections [see, eg, U.S. Pat. No. 7,492,986].

WSS-based filters are currently much more expensive than fixed filters. Ring interconnections can also be done with fixed optical filters, but those connections cannot be reconfigured remotely, so that network upgrades require technicians to go to the interconnecting sites and manually reconfigure the connections on the fixed filters.

Furthermore, many deployed optical networks have difficulty managing WDM traffic through on these paths so that the traffic may be segmented by electro-optical conversions at the intersecting nodes (A, B, F). These electro-optical conversions add cost and complexity to the network while reducing reliability. However, all-optical routing between rings and from spurs to rings requires that the network be engineered so that the link budget rules are met by the intra-ring signals, and that individual powers be managed at the intersecting nodes.

10. Subchannel Multiplexing

Various forms of subchannel modulation have been proposed as a means to reduce the dispersion penalties associated with high bit rate transmission in optical fibers (see, eg, WO 2009/105281) and increase spectral efficiency (see, eg, U.S. Pat. No. 6,525,857). These "subchannels" (eg, subchannels of ITU channels) are typically generated by microwave modulators or comb generators with a single laser. Examples of optical comb generators are described in U.S. patent application Ser. No. 12/175,439, entitled "Optical Wavelength-Division-Multiplexed (WDM) Comb Generator Using a Single Laser" and filed on Jul. 17, 2008, which is incorporated by reference herein. These subchannels are closely spaced relative to the source laser and are not independently tunable across a wide wavelength range, i.e. they are tuned in parallel as the source laser is tuned. Although an embodiment of one of the previously referenced patent applications (WO 2009/105281) proposes the use of more than one laser to generate the subchannels, such lasers are constrained to operate in parallel within a single ITU G.692 window.

Lower-rate subcarriers support a simplified upgrade of an installed DWDM network. For example, a legacy 2.5 Gb/s network may have transmitters with a reach of 600 km. When that network is upgraded to 10 Gb/s, dispersion compensators may have to be installed, since the reach of the 10 Gb/s transmitter may be only 80 km. Installing dispersion compensation and amplifiers to compensate for their loss can be very disruptive since operators may have to break the traffic multiple times and at multiple sites. If four subcarriers are used instead, with each subcarrier transmitting at 2.5 Gb/s to get 10 Gb/s composite bandwidth, they can have comparable dispersion-limited reach to the installed 2.5 Gb/s channels. The use of subcarriers therefore provides system operators with a means of upgrading an installed WDM network to increase the network capacity without having to change the dispersion map.

There is thus a need for an improved implementation of subchannels (eg, using independently tunable lasers to generate independent subcarrier frequencies) that will not only increase bandwidth and spectral efficiency by enabling multiple client circuits to be assigned to respective subchannels of a single ITU channel, but will also allow those client circuits to be divided and/or combined with one another and assigned independently to subchannels within and across ITU channels. Such flexibility is needed, as noted above, to achieve desired routing, switching, concatenation and protection capabilities, and thus fully realize the benefit of increasing the number of available optical circuits in a single fiber.

11. Network Upgrades

Even with the ability to upgrade the capacity without installing additional dispersion compensators, adding or removing channels from a DWDM network can be disruptive to the live traffic because the channels can propagate through shared components such as amplifiers and attenuators that act upon the total power. For example, if an attenuator output is being controlled to a certain output power, doubling the channel count will cause the power per channel to be cut in half. This drop in power could cause bit errors. System operators have a need therefore for control (eg, via software) over channel changes in a WDM network in a manner that is minimally disruptive to the live channels.

12. Management Cards

WDM network equipment (e.g., equipment 1100 shown in FIG. 11) is typically installed in a shelf 1110 with one or two management cards 1120 (MGT) and various line cards 1125. The equipment 1100 is typically managed with a client-server element management system (EMS) consisting of one or more clients, such as client 1130, and EMS Server 1140. The EMS connects through a private or public IP network (via Router 1150) to the management cards 1120.

FIG. 12 illustrates how two management cards 1220a and 1220b in equipment shelf 1200 can be deployed in an active/standby configuration to improve network robustness. The standby MGT 1220b takes over the management function if there is any hardware or software failure on the active MGT 1220a. This configuration typically uses two ethernet planes (1235 and 1245) on the backplane so that any line card can communicate with either management card. A handshaking protocol between the management cards is used to determine which is the active MGT at any given time. On each line card there is a switch to select which ethernet bus is used for communications.

This configuration requires control of the software versions running on the MGT microprocessors. They run the same version to ensure compatibility in the event of a switchover from active to standby. The configuration and status databases on the operative MGT are constantly backed up on the backup MGT so that when a failure occurs the backup MGT can take over the management as quickly as possible, and without any service interruptions.

13. OSC Options and Routing Protocols

WDM equipment typically requires that the EMS have a management connection to all remote nodes for functions such as provisioning equipment, reporting faults, downloading software upgrades, and retrieving and reporting performance metrics. The MGT also employs a management connection to remote nodes for end-to-end provisioning, controlling protection switching, and reporting remote performance and faults. For these functions, current WDM equipment deploys an optical service channel (OSC) that is outside of the ITU-T G.692 spectral window, i.e. at 1510 nm or 1620 nm.

Control messages and status can be transmitted from the MGT card to the OSC card over the backplane, and then transmitted optically by the OSC to the remote node where it is routed to the remote MGT card over the remote backplane.

Adding the filters to add and drop the OSC channel add loss and cost to the network. The OSC can be eliminated if channel overhead is inserted into the signals, but the typical channel overhead bandwidth (500 kb/s) is much lower than the typical OSC channel bandwidth (100 Mb/s). There is therefore a need for improved in-band communications channels that provide the necessary bandwidth without adding cost.

14. Optical Switches Interconnected with WDM Links

Switching matrices are used in a telecommunications network to direct traffic from multiple inputs to multiple outputs. An electrical crossbar switch has a matrix of switches between the inputs and the outputs. If the switch has M inputs and N outputs, then a crossbar has a matrix with M×N crosspoints or places where the "bars" cross. A given crossbar is a single layer, non-blocking switch. Collections of crossbars can be used to implement multiple layer switches. A Clos network is a kind of multistage switching network, first formalized by Charles Clos in 1953 [see, eg, Charles Clos (March 1953), "A study of non-blocking switching networks," 'Bell System Technical Journal' 32 (5): 406-424]. The Clos network provides a practical multi-stage switching system that is not limited by the size of the largest feasible single crossbar switch. The key advantage of Clos networks is that the number of crosspoints (which make up each crossbar switch) required can be much fewer than if the entire switching system were implemented with one large crossbar switch. Although VLSI technology has enabled very large switching matrices in electronics [see, eg, U.S. Pat. No. 6,714,537], the switch size is still limited at very high bandwidths.

WDM links can be used to interconnect large electro-optic switches, as illustrated in FIG. 13. Optical crossconnect switches based on MEMS [see, eg, U.S. Pat. No. 6,574,386] have also provided a means of switching at the optical layer, but these switches may need wavelength demultiplexers to switch individual wavelengths. Large crossconnect switches 1310 provide the connectivity required to support large traffic demands and WDM links 1320 provide the bandwidth between the switches.

Note that this architecture shown in ring 1300 can be costly because O-E-O conversions may be required at each switch and bandwidth is being used to send traffic to and from the centralized switches. Also, the cost of such switches increases with the number of ports and bandwidth per port so that a network based on switches that support traffic bandwidth >1 Tb/s combined with high bandwidth WDM links can have a very high cost. Furthermore, an all-optical switch can have high loss, so that it requires expensive optical amplifiers to compensate for the loss. There is therefore a need for an optical network architecture that supports many high-bandwidth inputs and outputs (>500) with non-blocking switching and minimal O-E-O conversion for the switching.

15. Network Management and Management Sublayers

Network functionality can be described by the 7-layer OSI model. Optical networking equipment resides mainly at the lowest layer, the Physical Layer. For the purposes of describing WDM networks in general and the current invention in particular, the Physical Layer can be divided into sublayers 1400 as shown in FIG. 14.

Except for the wavelength assignment and detection 1431, all of the sublayers shown are optional. For example, transponders do not necessarily provide electrical mapping, multiplexing, or protection switching.

The electrical sublayers 1420 include:
The mapping sublayer, where client data is received and mapped to available bandwidth according to the mapping protocol used.
The multiplexing sublayer, where electrical data is selectively added, dropped, or passed through.
The protection switching sublayer, which can provide protocol-based protection, e.g. UPSR or BLSR protection for SONET-mapped signals, or STP or RPR protection for ethernet-mapped signals.
The next 2 sublayers are typically implemented according to the ITU G.709 standard that defines OTN frame formats. Path trace and CRC checks can be inserted into the OTN frame for receive side monitoring of the signal source and signal quality respectively.
The lowest electrical sublayer provides forward-error correction encoding and correction.

Of the optical sublayers 1430, the highest sublayer 1431, maps the signal from the client onto a specific wavelength that is routed over the network by fixed or tunable optical filters. The optical protection layer provides redundant optical paths from the source to destination and a means for bridging the traffic onto the redundant paths and selecting the received signal from one of the redundant paths according to alarms and signaling in the network. The lowest optical sublayer provides multiple point-to-point connection between two points according to the provisions in the higher layers.

Managing a WDM network requires that the network management system (NMS) have a management link 1440 from the NMS server to all of the optical network elements. The network connections can be provided by an external IP network, or with dedicated overhead channels that are provisioned on the optical network. The overhead channel may be mapped directly to one of the deployed wavelengths, or it may be transmitted over the OTN overhead channel, e.g. GCC0 in G.709, or in an unused section of the higher-layer protocol's overhead channel.

Software on the WDM equipment is required to configure, monitor, maintain, and report on all of the functions shown in FIG. 14. Adding new optical functionality requires adding new management software at the appropriate sublayer.

16. Ensuring Wavelength Accuracy in WDM Networks

In WDM networks, the laser wavelength (or frequency) must be maintained within a certain accuracy so that there is no interference between neighboring channels, and there are no penalties from laser-filter misalignment.

As is the case with all electronic and optical components, the performance characteristics of the lasers employed in DWDM systems change with temperature and with time. In particular, the frequency of emitted laser light changes due to ambient temperature variations (typically from −5 deg C. to 65 deg C.) and due to aging.

WDM laser frequencies are maintained to a first order by controlling the temperature of the laser by mounting the laser on a thermoelectric cooler (TEC). Etalons may also be integrated into the laser cavity to provide a second-order correction. Currently deployed WDM lasers have an accuracy that is adequate for 50 GHz spacing. There is currently a need for more accurate means of controlling laser frequencies to space the WDM channels as close together as possible.

II. SUMMARY

Various embodiments of the current invention are disclosed herein, including techniques, apparatus, and systems for optical WDM communications that employ tunable lasers to generate respective subcarrier frequencies which represent subchannels of an ITU channel to which client signals can be mapped. Client circuits can be divided and combined with one another before being mapped, independent of one another, to individual subchannels within and across ITU channels.

Novel techniques are employed (at the subchannel level/layer) to facilitate the desired optical routing, switching, concatenation and protection of the client circuits mapped to these subchannels across the nodes of a WDM network, resulting in a significant increase in the number of optical circuits in a fiber, and thus in the overall bandwidth and spectral efficiency of the WDM network.

Network architectures and subchannel transponders, muxponders and crossponders are disclosed that map client signals to a set of subchannel frequencies. In one embodiment, these architectures employ two levels of frequency mapping and two cascaded optical filters (one for filtering WDM channels and one for filtering subchannels). Additional methods of multiplexing channels and subchannels by means of polarization multiplexing and related feedback control electronic systems are also disclosed. Selectively mapping client signals to a subset of the subchannels facilitates network functions such as broadcast and select transmission, arbitrary concatenation, optical source routing, shared optical protection, and simplified network reconfiguration at a significantly lower cost than is required for currently deployed WDM networks.

Subchannel muxponders are disclosed that measure network characteristics such as optical signal to noise ratio, chromatic and polarization mode dispersion, power levels, and bit error rates. Highly accurate wavelocker circuits are also disclosed that enable the equipment to provide very dense subchannels with accurate control.

Embodiments of the current invention extend existing WDM network designs by adding a new sublayer to the WDM network architecture between the FEC encode layer and the wavelength assignment layer. Novel means of mapping, multiplexing, switching, and managing sublayer services are described in a common format that scales from small 1GE and 2.5G access networks to large regional networks and long-haul networks with capacity scalable to 17 Tb/s. Novel means of connecting spur traffic to a ring, and interconnecting optical rings without O-E-O conversion, are also disclosed. Moreover, these techniques are designed so as to enable standard ITU-T G.692 based (and other legacy) hardware to be reused.

Designs for subchannel transponders, muxponders and crossponders are disclosed, where client services are mapped to several subchannels within an ITU channel (as well as across ITU channels, and combined with other client services employing different signal protocols). These subchannel devices support subchannel routing, restoration and protection, and direct measurement of the most significant optical parameters, such as power, OSNR, chromatic dispersion, and polarization-mode dispersion.

Embodiments of line cards that support these novel architectures are also described.

Multilayer routing protocols are disclosed that enable network operators to easily map services to available bandwidth, while maintaining full visibility of the deployed channels and available bandwidth. Means for adiabatically adjusting the network capacity are described to ensure minimal planned or indeliberate service interruption. A novel OSC routing protocol is described to manage such a network with minimal cost overhead. Other embodiments are disclosed that enable networks to be upgraded from being ITU-channel based to subchannel based.

Because subchannel lasers require a higher degree of accuracy than ITU channel lasers, methods are disclosed for more accurately controlling lasers, based on a heterodyne measurement against a reference tunable laser that can be continuously calibrated with a reference gas cell.

III. BRIEF DESCRIPTION OF THE DRAWINGS

Figure 47:
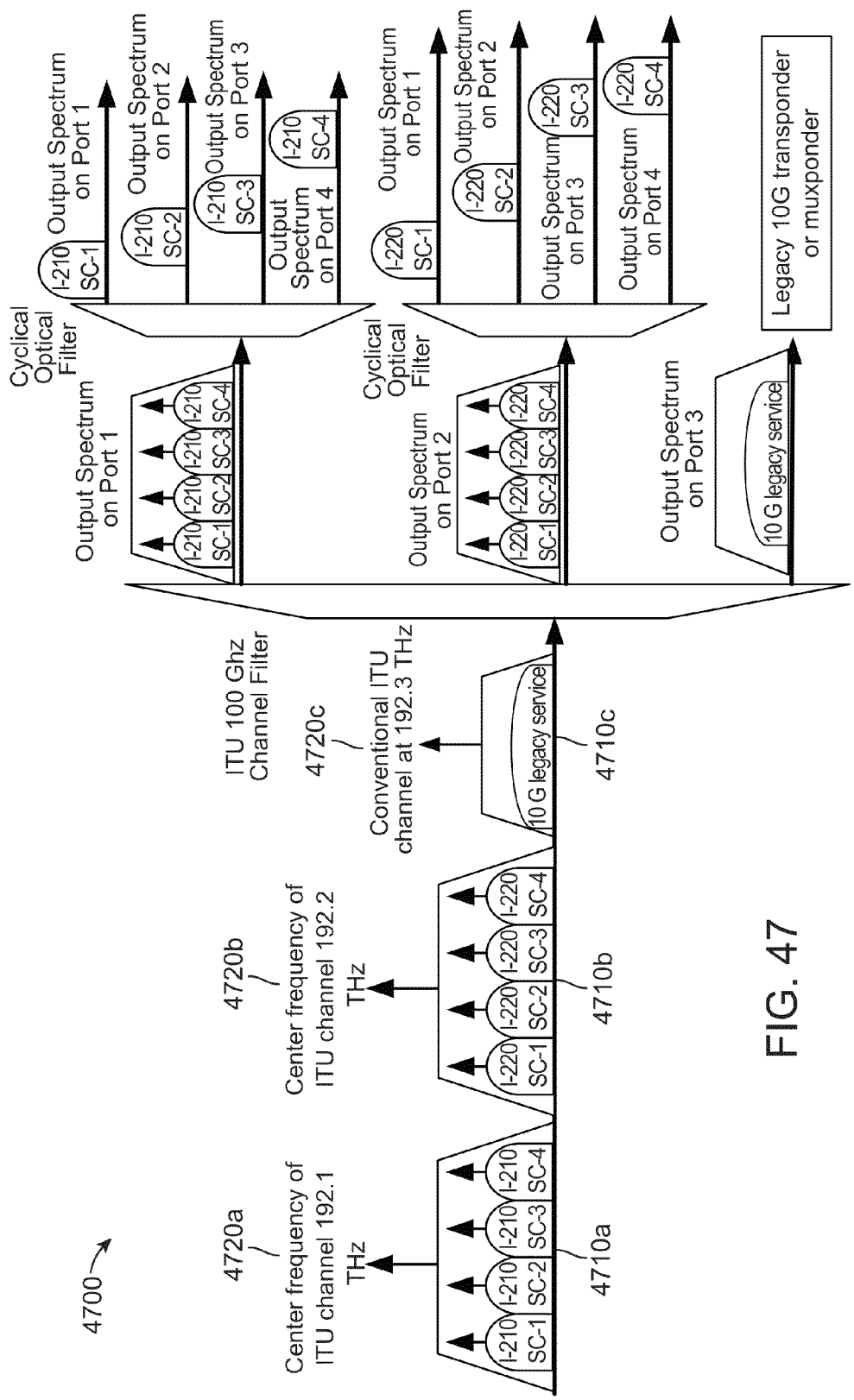

FIG. 47 is a block diagram illustrating the upgrading of a 10 Gb/s legacy ITU-channel network to employ subchannels of the present invention on ITU channels 192.1 THz and 192.2 THz, while maintaining the legacy 10 Gb/s service on ITU channel 192.3 GHz.

Figure 48:
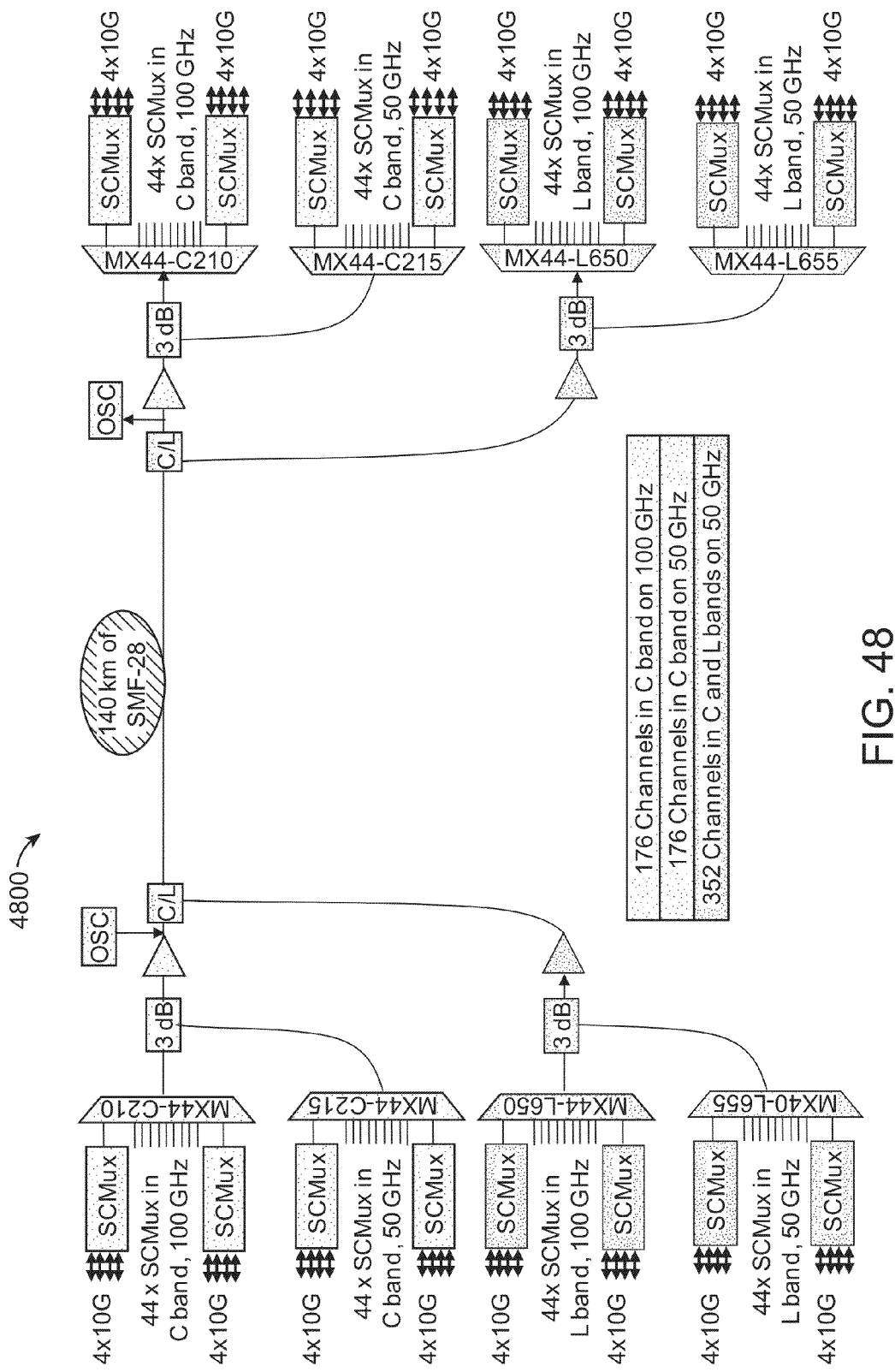

FIG. 48 is a block diagram illustrating the high-capacity transmission resulting from one embodiment of 10G subchannel muxponders of the present invention.

Figure 49:
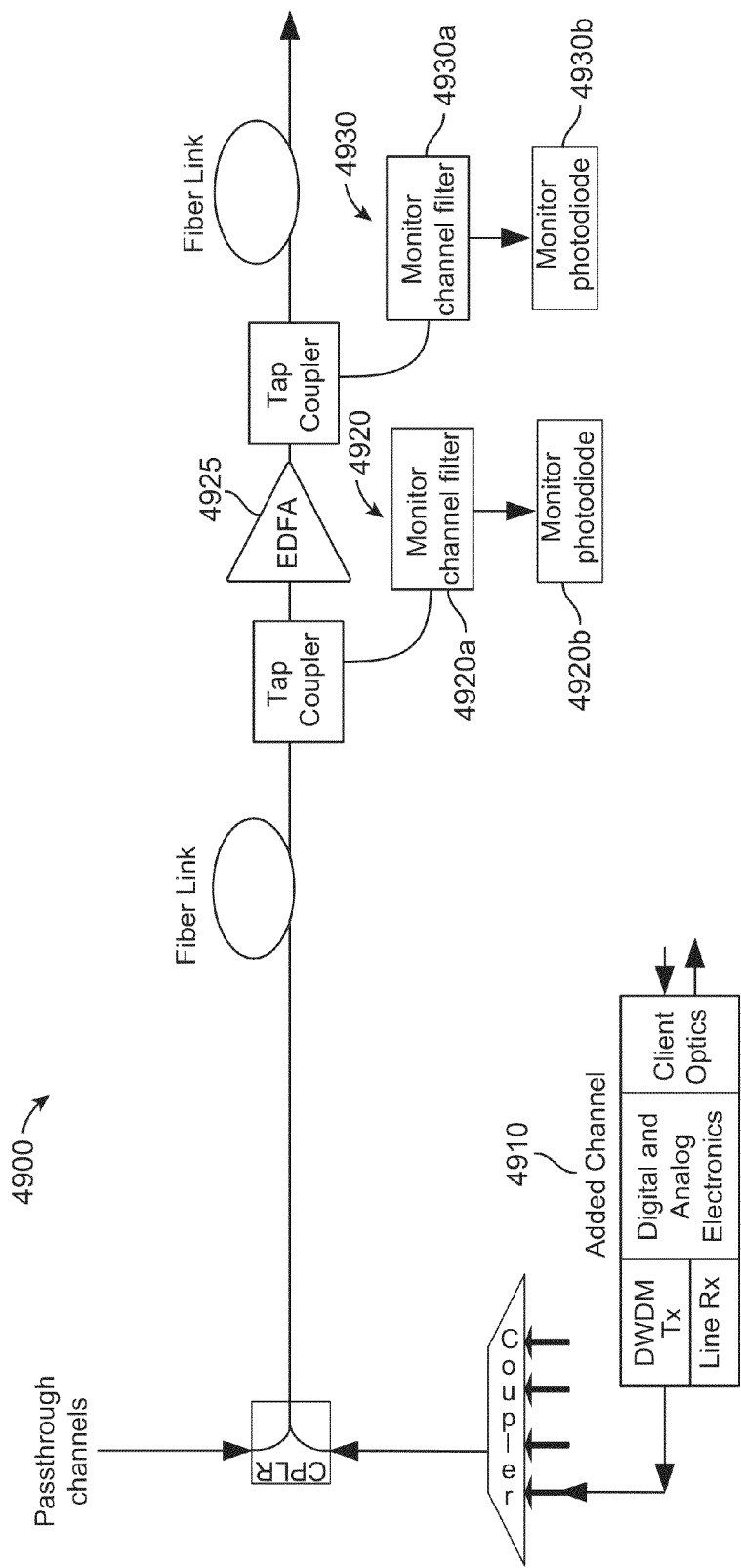

FIG. 49 is a block diagram of one embodiment of a monitor channel filter of the present invention in an optical network.

Figure 50:
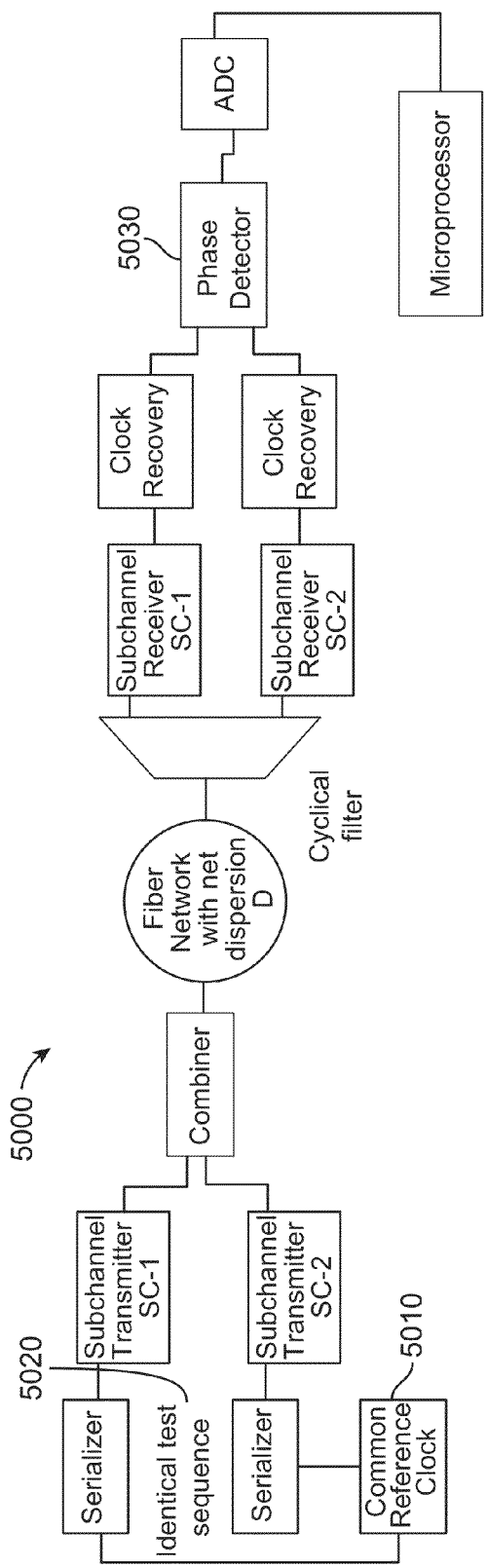

FIG. 50 is a block diagram of one embodiment of a circuit of the present invention to measure net dispersion of a fiber link due to subchannel delay times.

Figure 51:
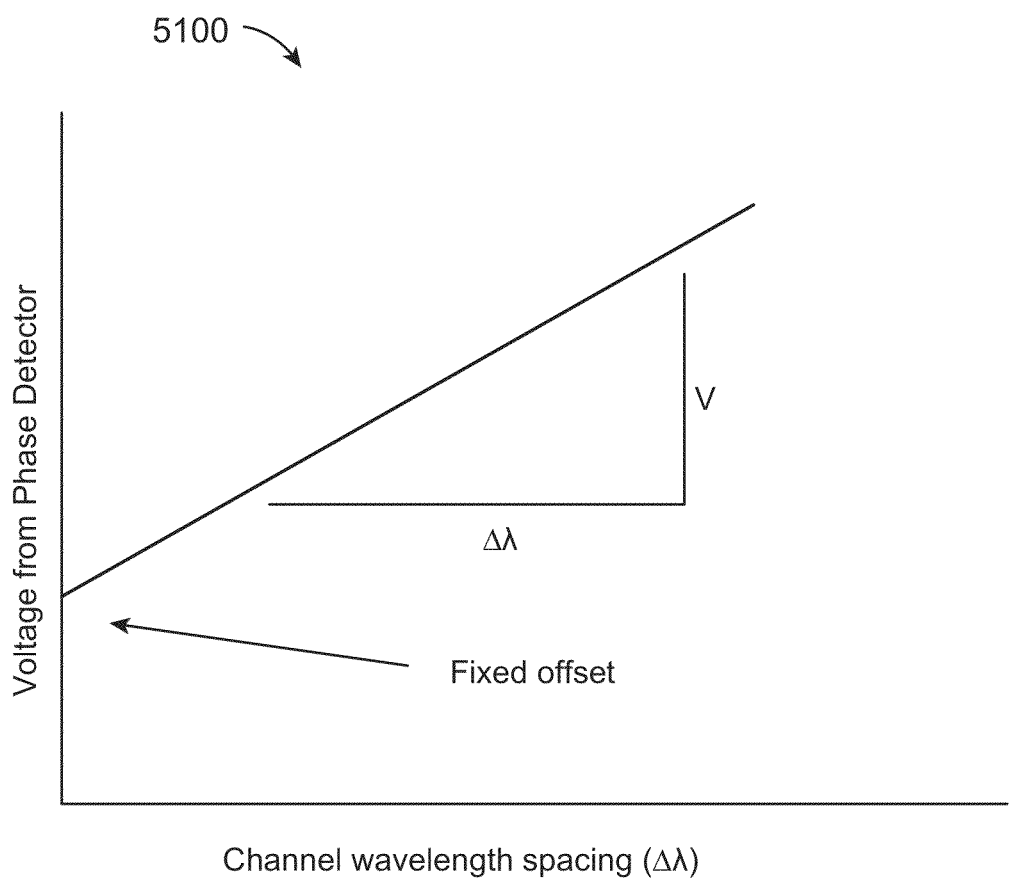

FIG. 51 is a graph illustrating the effect of subchannel spacing in the present invention on phase detector voltage.

Figure 52:
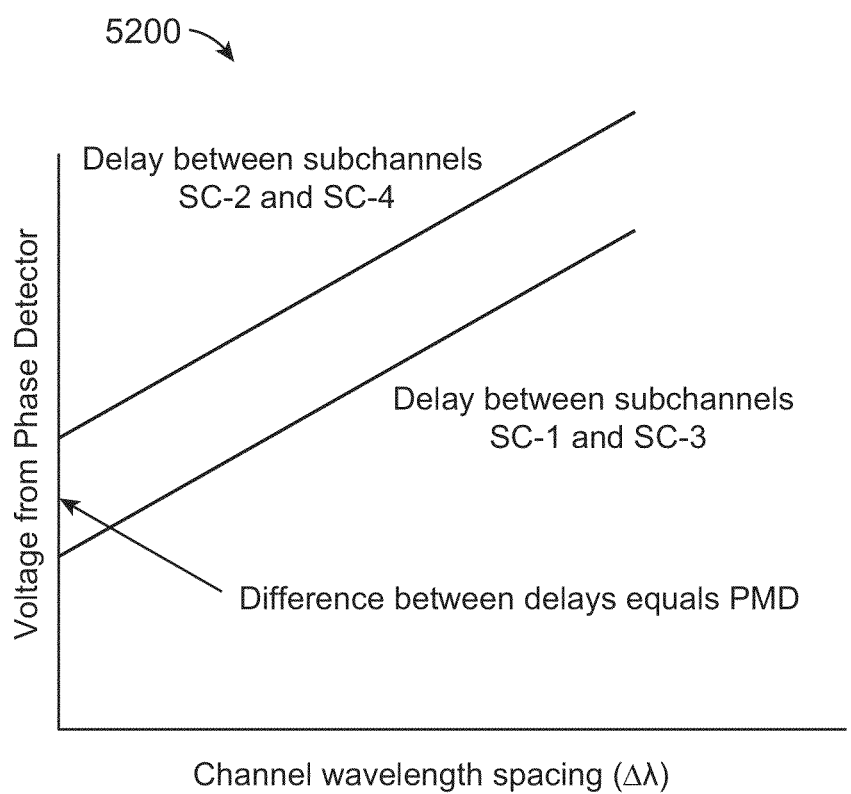

FIG. 52 is a graph illustrating the measurement of polarization-mode dispersion based upon the delays between orthogonal subchannels of the present invention.

Figure 53:
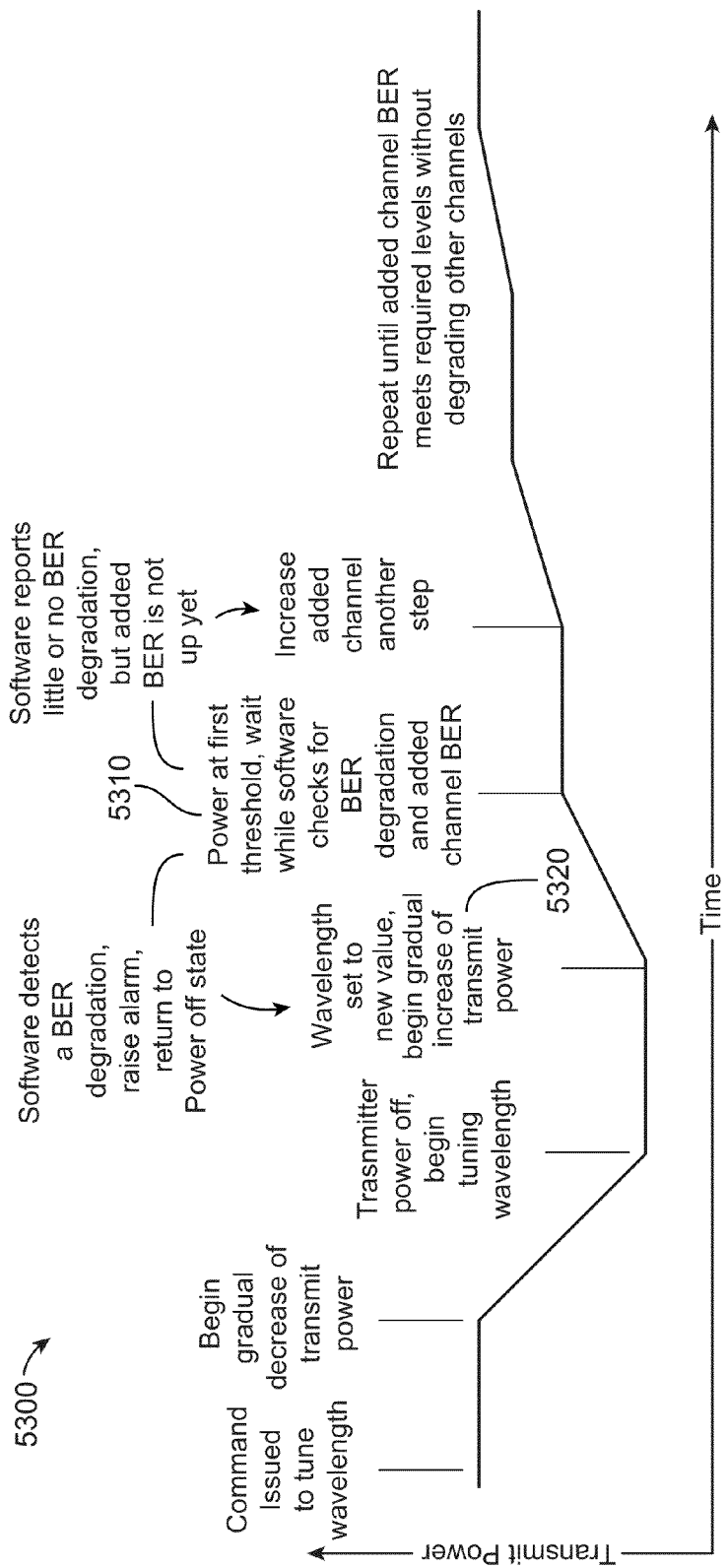

FIG. 53 is a graph illustrating the result of a software-controlled circuit of the present invention used to monitor the bit error rate (BER) in an optical network as a channel frequency is tuned.

FIG. 54 is a data structure of one embodiment of a diagnostic spreadsheet employed by the present invention that lists device registers as well as expected and actual values.

Figure 55:
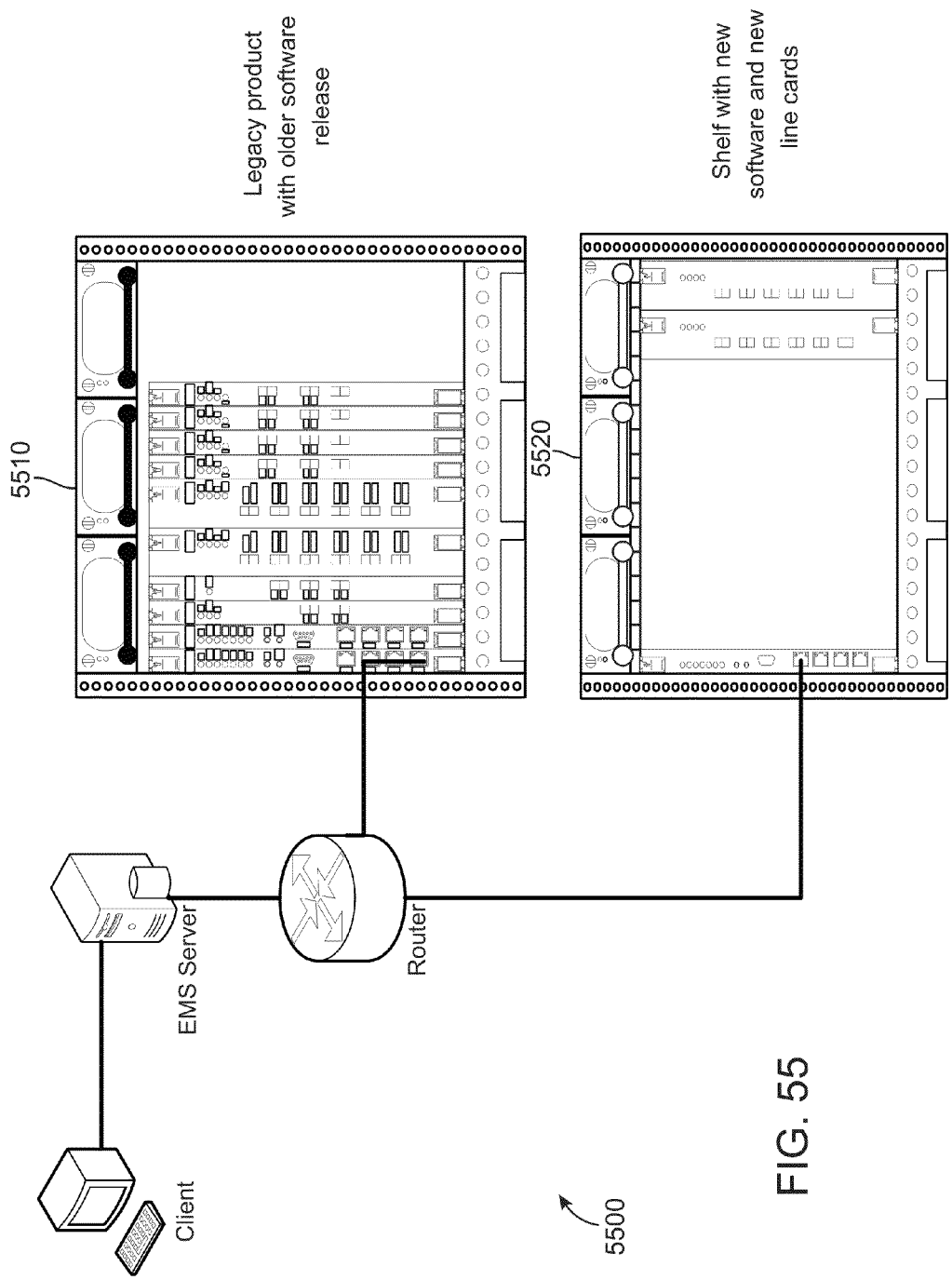

FIG. 55 is a block diagram of one embodiment of an element management system (EMS) of the present invention with distinct shelves for legacy and new products.

Figure 56:
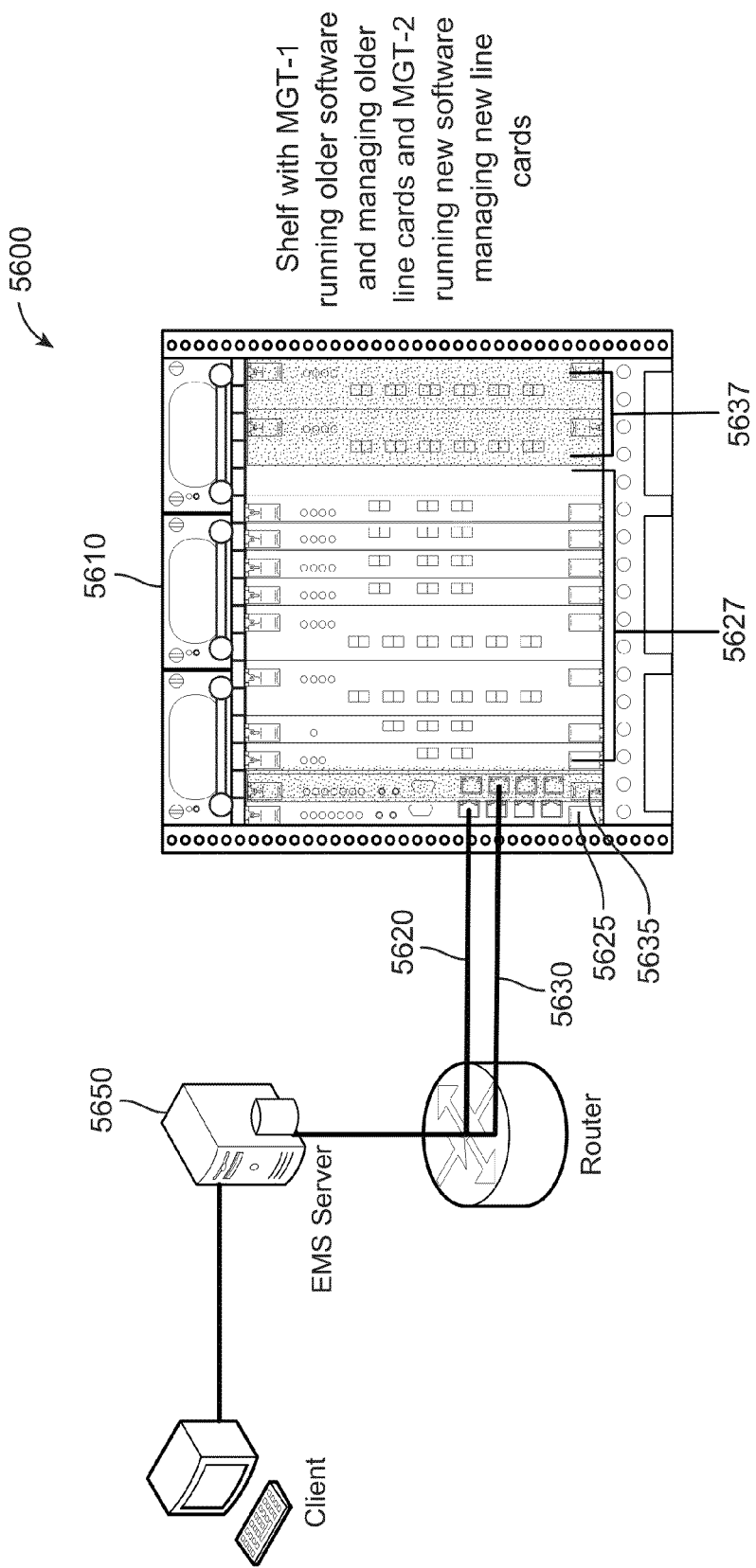

FIG. 56 is a block diagram of one embodiment of an element management system (EMS) of the present invention managing a shelf running two software versions in parallel.

Figure 57:
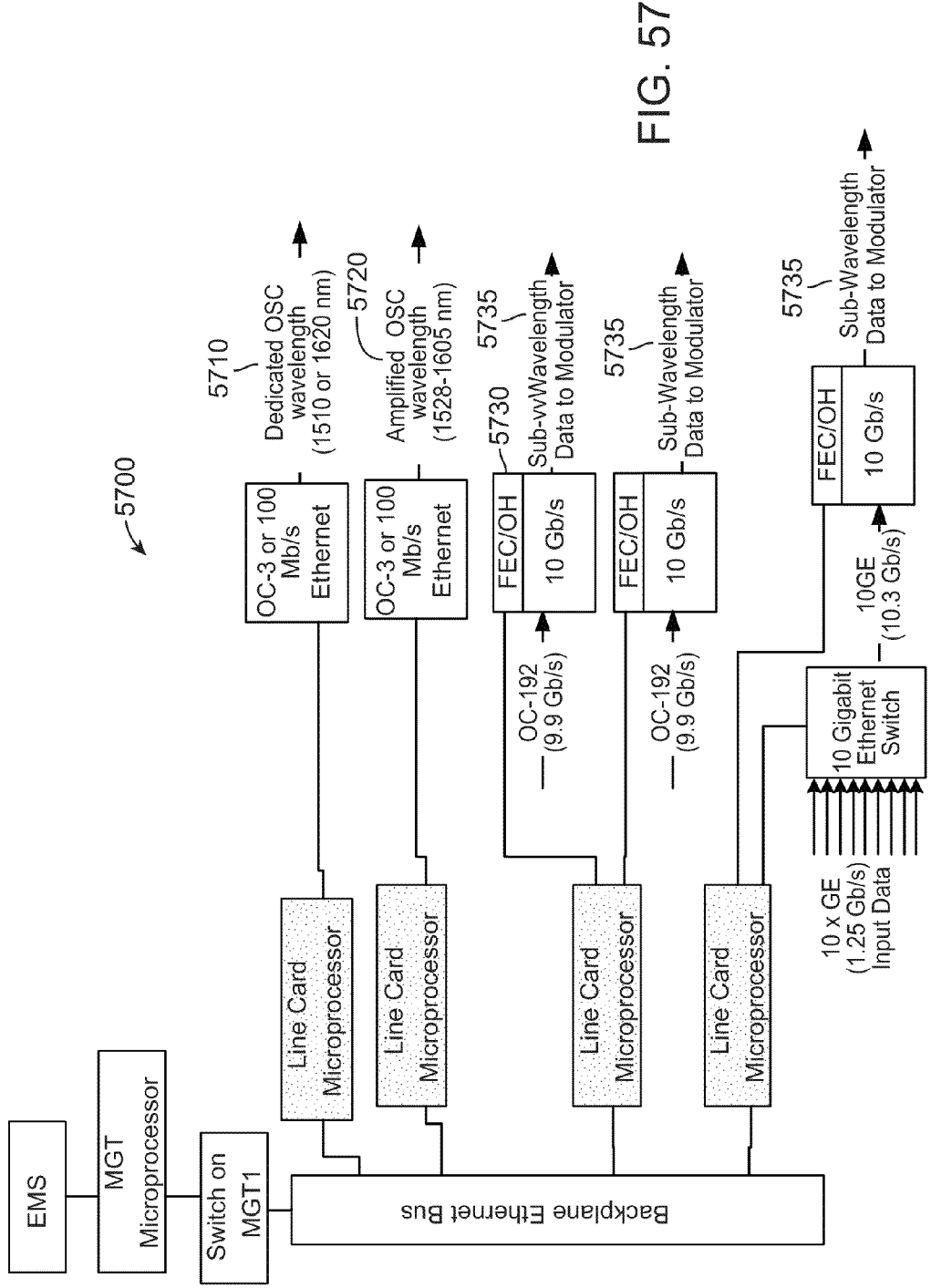

FIG. 57 is a block diagram illustrating an embodiment of the present invention in which management data is optionally routed throughout an optical network.

Figure 58:
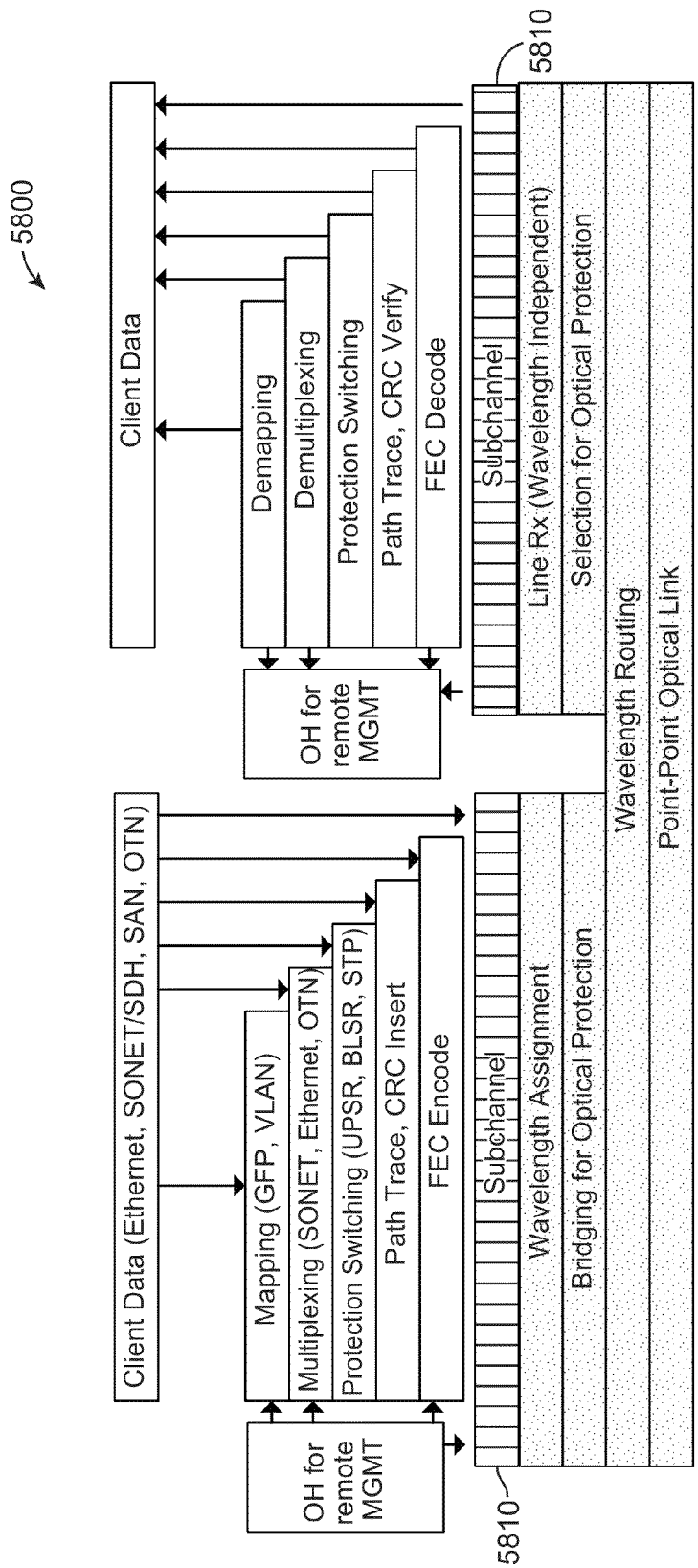

FIG. 58 is a block diagram illustrating the addition of a subchannel management layer of the present invention to existing WDM management layers.

Figure 59:
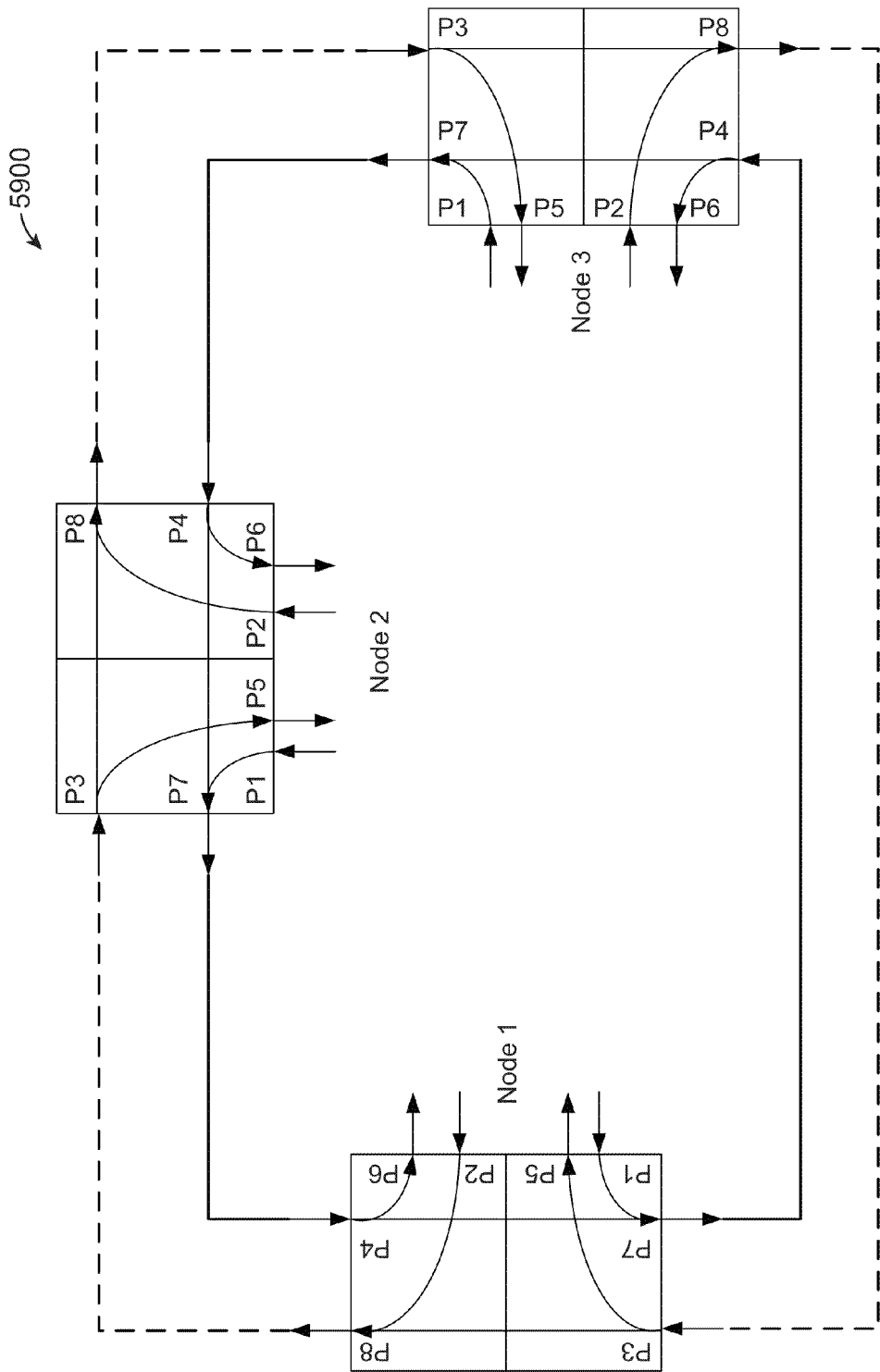

FIG. 59 is a block diagram illustrating the fiber interconnections in one embodiment of a 3-node optical ring network of the present invention with degree-2 nodes (i.e., which connect to 2 other nodes).

FIG. 60 illustrates one embodiment of a simple routing table of the present invention for intra-node connections for a degree-2 optical node.

Figure 61:
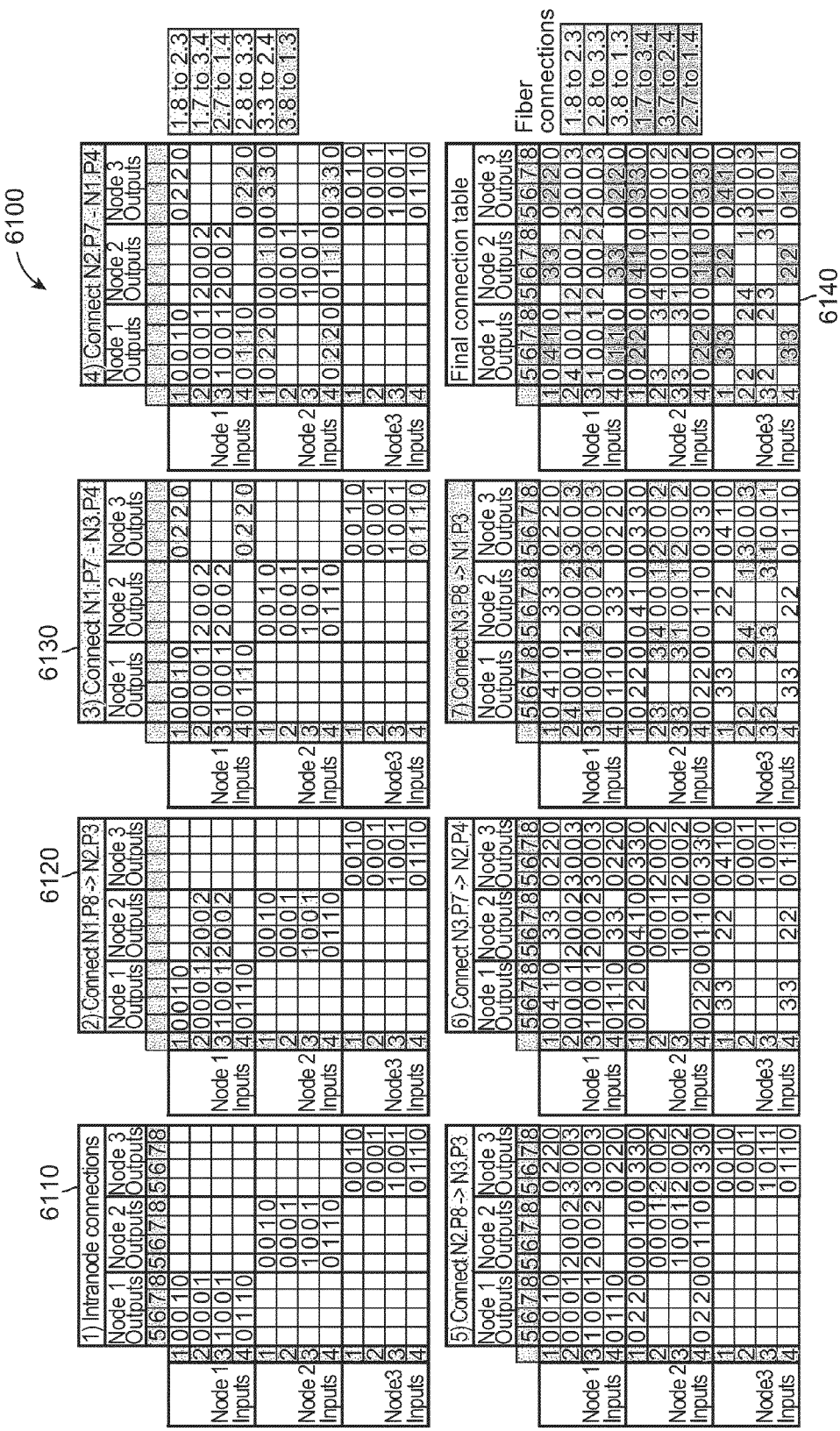

FIG. 61 illustrates one embodiment of an interconnect routing table of the present invention for the 3-node optical network illustrated in FIG. 59.

FIG. 62 illustrates a linear representation of the fiber connections of the 3-node optical network illustrated in FIG. 59.

Figure 63:
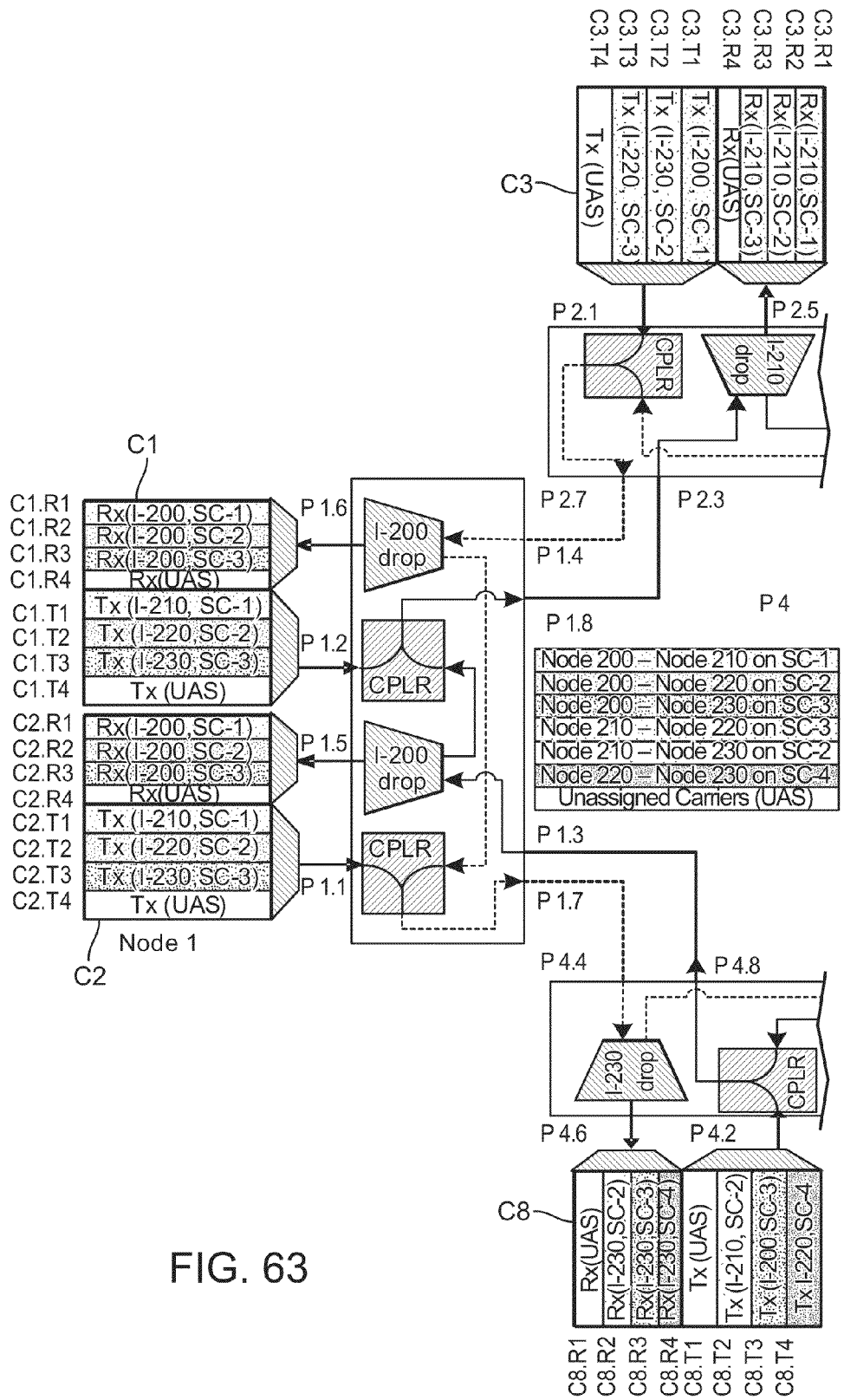
Figure 63:
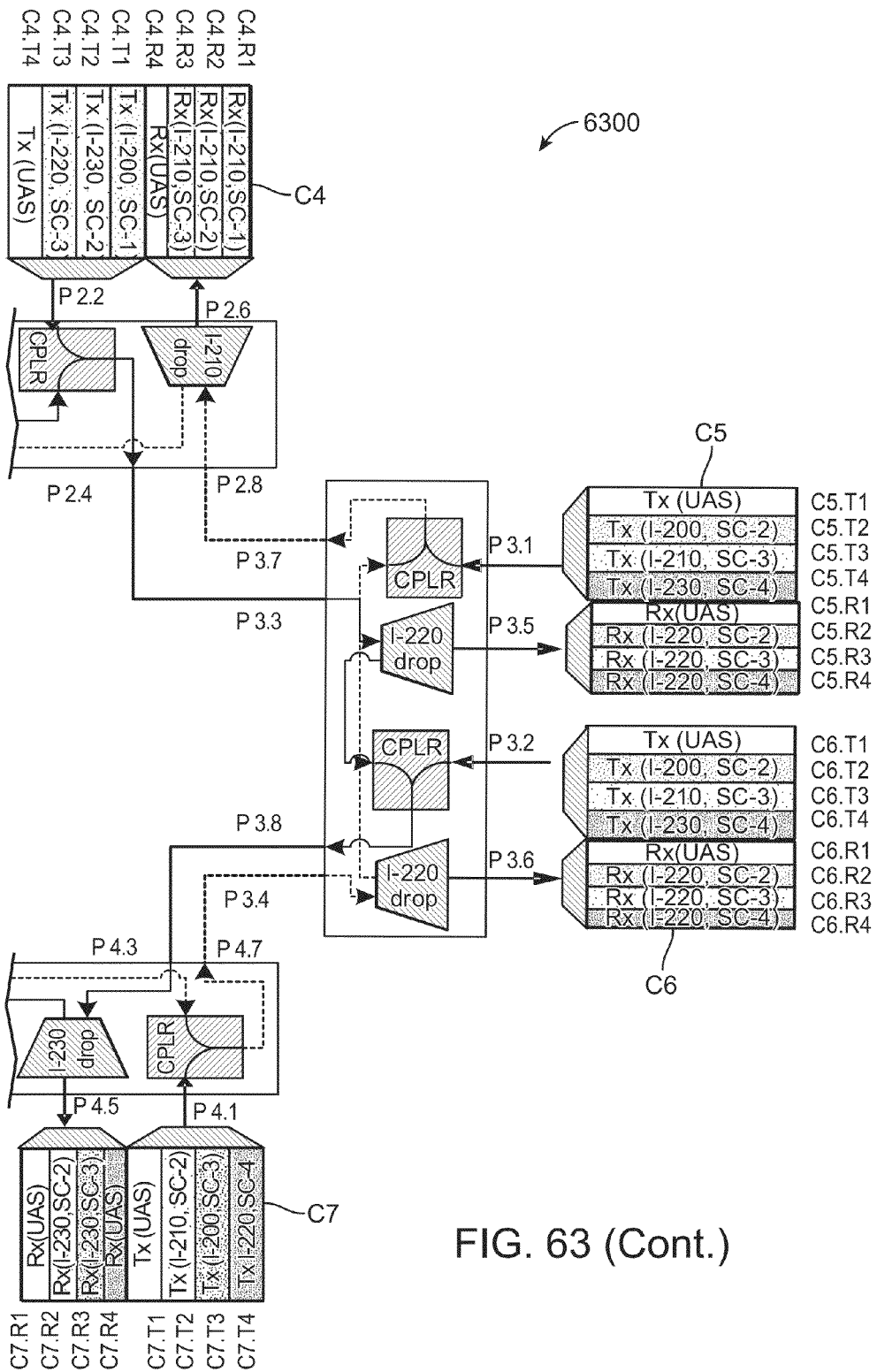

FIG. 63 is a block diagram of a subchannel ring network of the present invention with subchannel routing.

Figure 64:
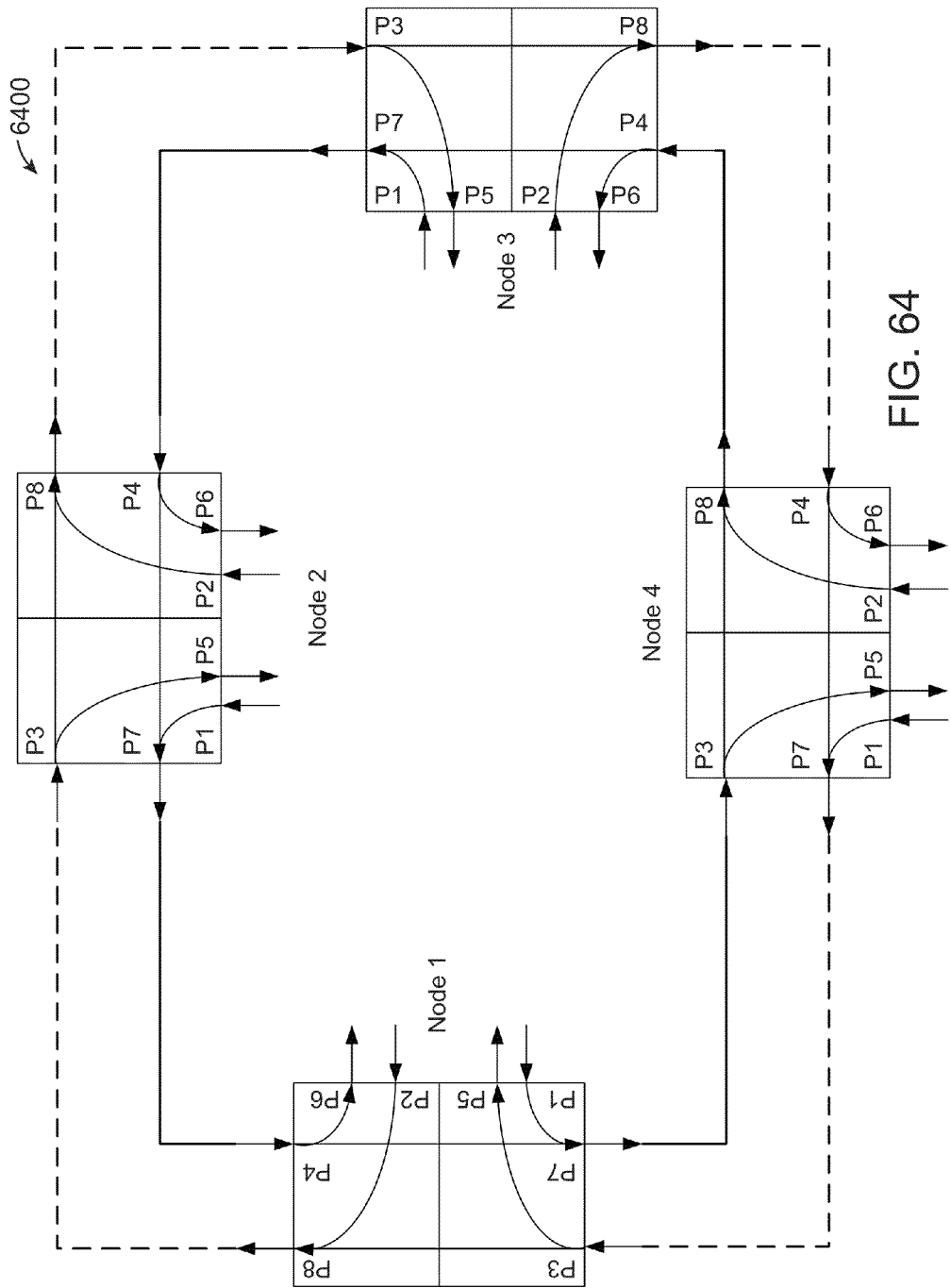

FIG. 64 is a block diagram illustrating the fiber interconnections in one embodiment of a 4-node optical ring network of the present invention with degree-2 nodes (i.e., which connect to 2 other nodes).

Figure 65:
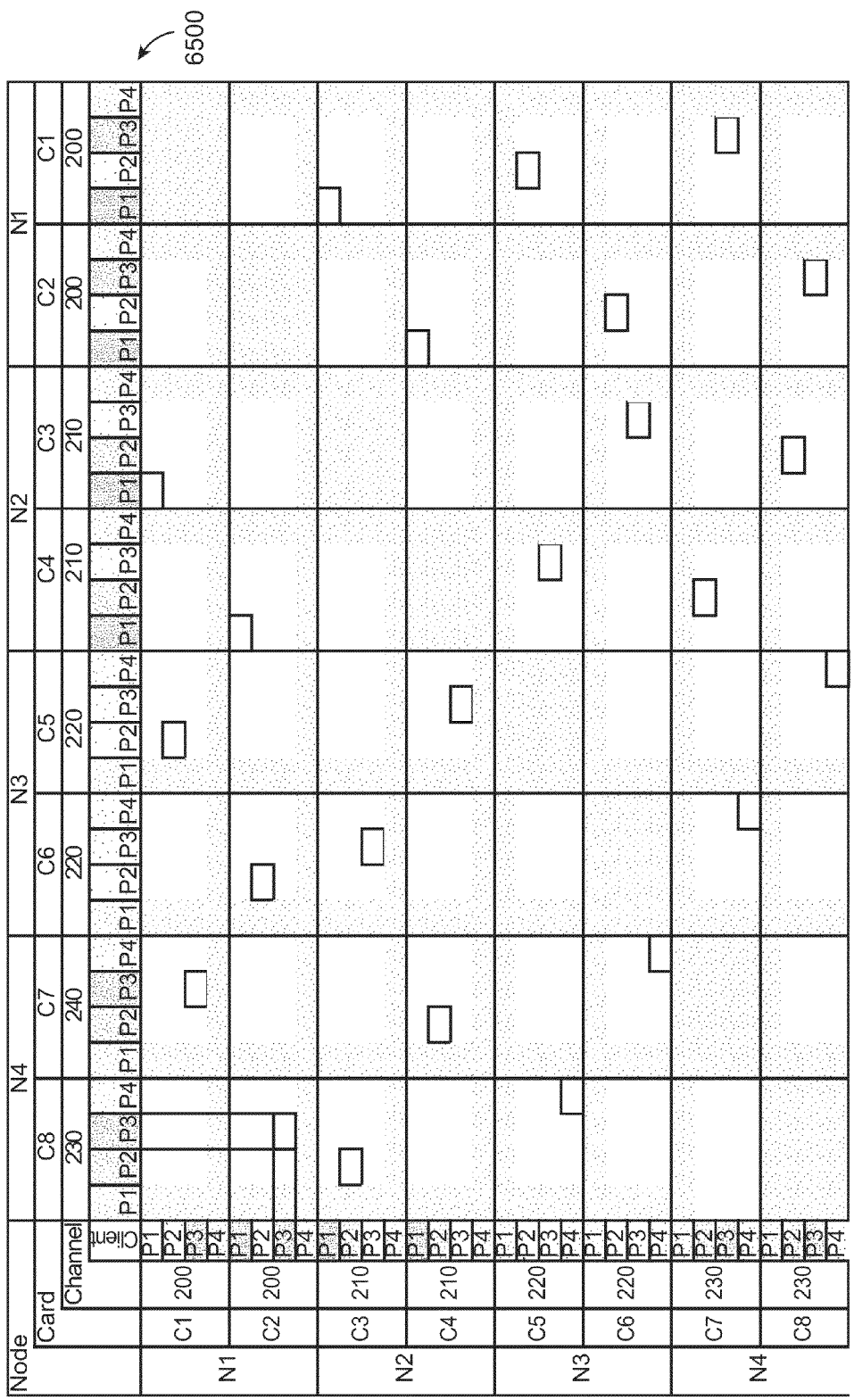

FIG. 65 illustrates one embodiment of a subchannel interconnect map of the present invention for the 4-node optical network illustrated in FIG. 64 with subchannel routing.

Figure 66:
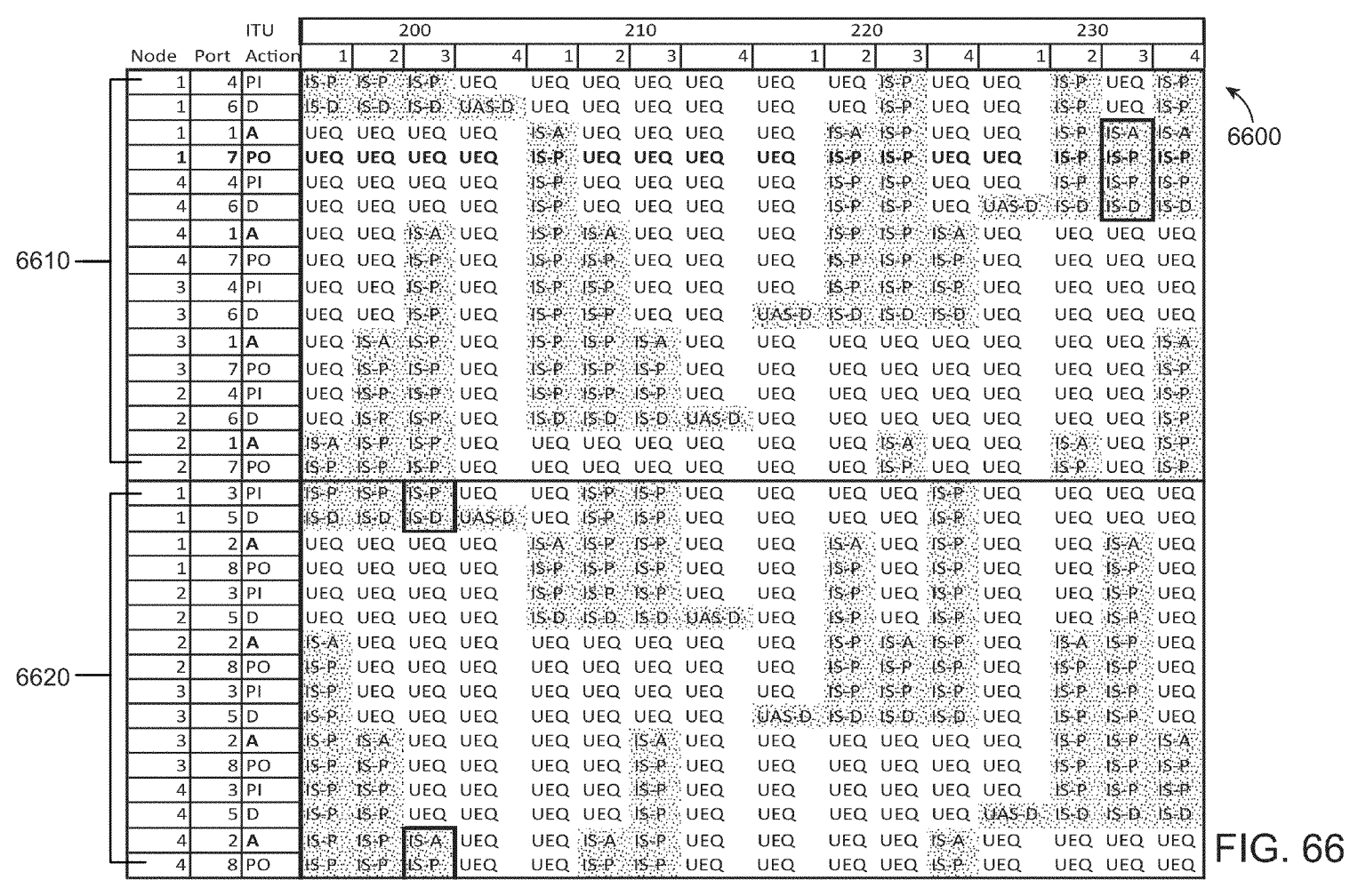

FIG. 66 illustrates one embodiment of a subchannel bandwidth map of the present invention for the 4-node optical network illustrated in FIG. 64 with subchannel routing.

Figure 67:
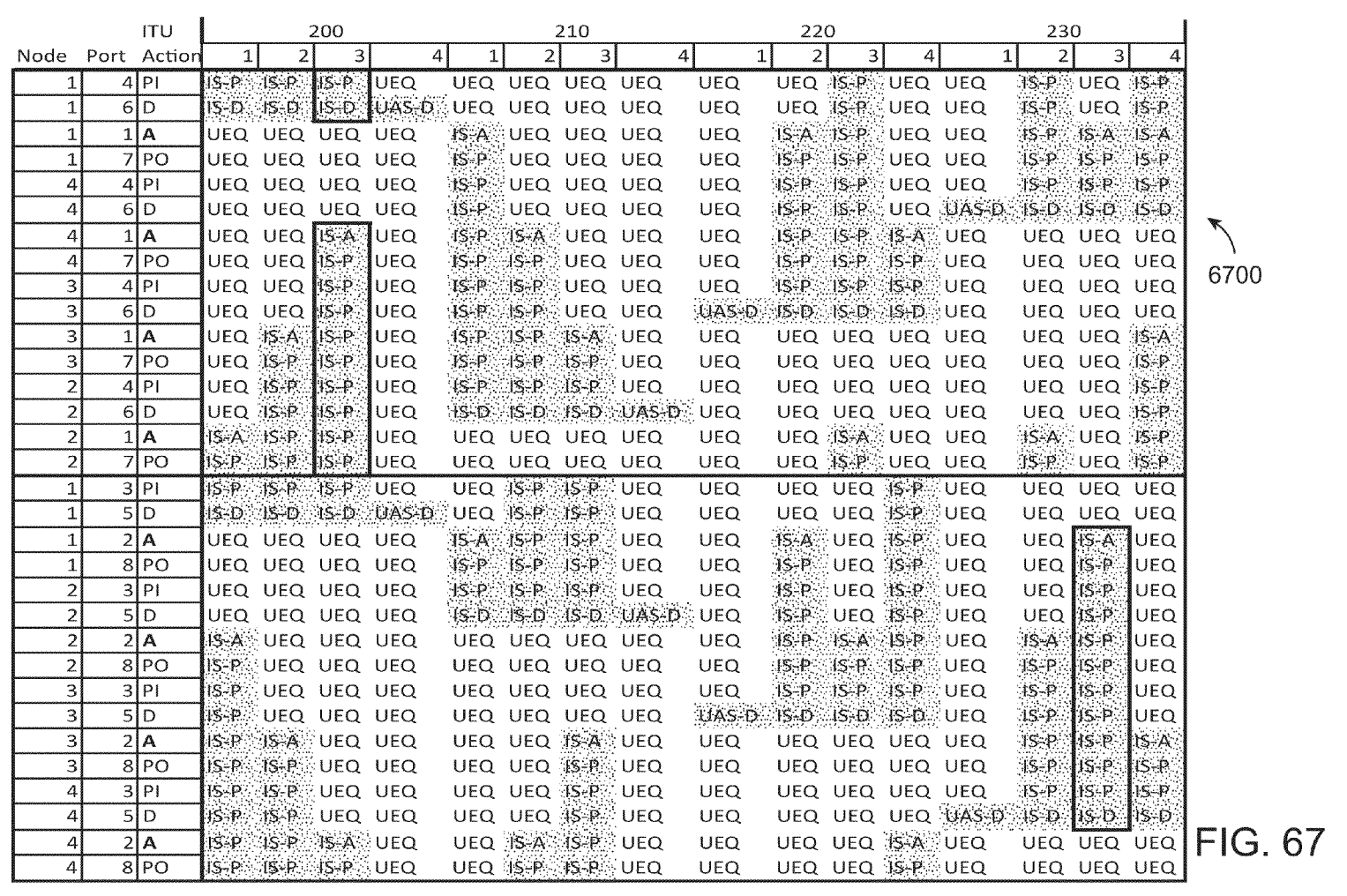

FIG. 67 illustrates the highlighted protected connection in the subchannel bandwidth map illustrated in FIG. 66.

Figure 68:
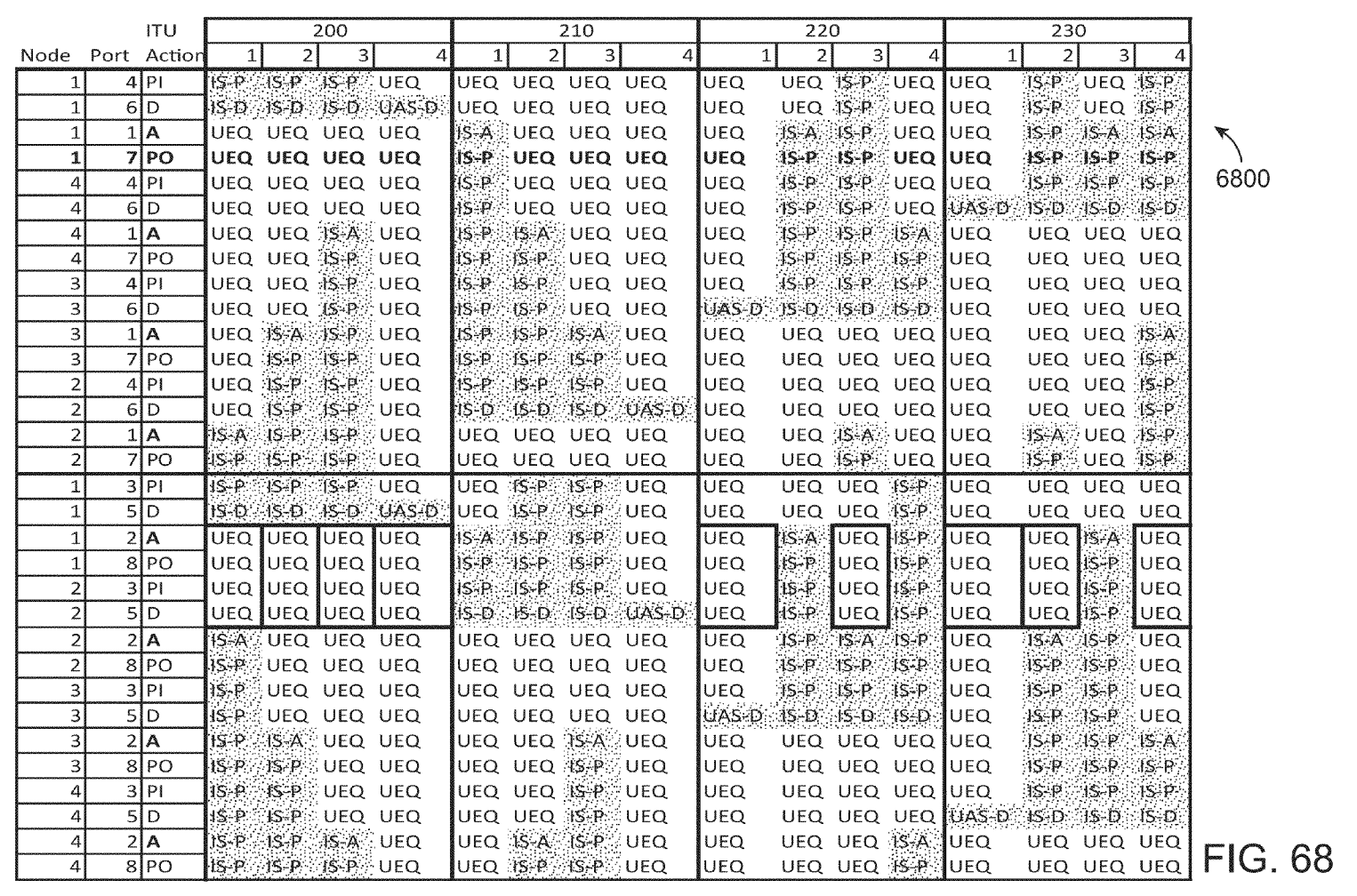

FIG. 68 illustrates 9 available subchannels (between Node 1, Port 2 and Node 2, Port 5) in the subchannel bandwidth map illustrated in FIG. 66.

Figure 69:
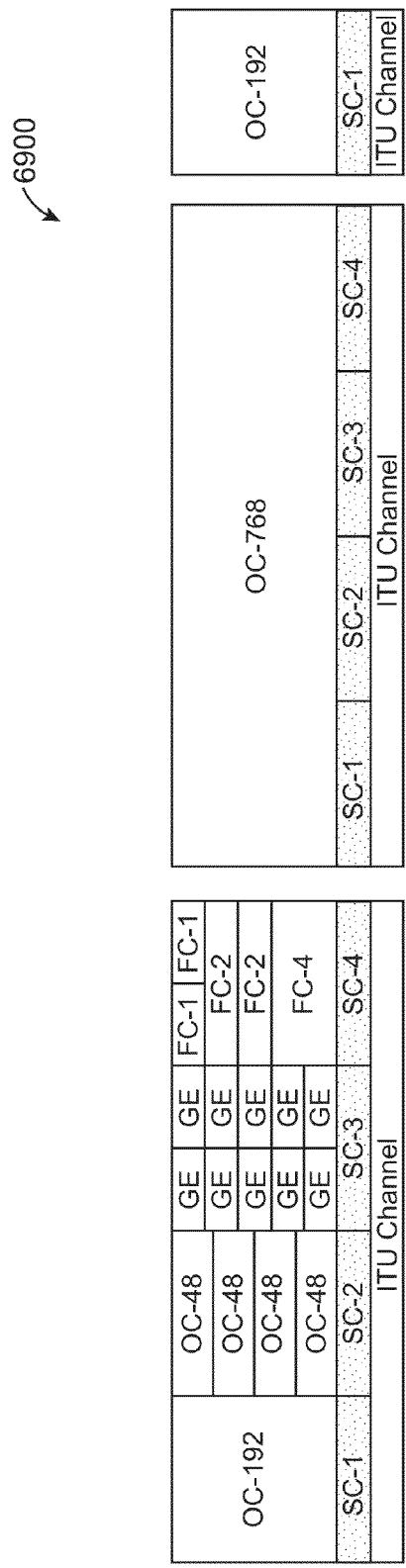

FIG. 69 illustrates various embodiments of subchannel payloads of the present invention resulting from the mapping of client services to subchannels.

Figure 70:
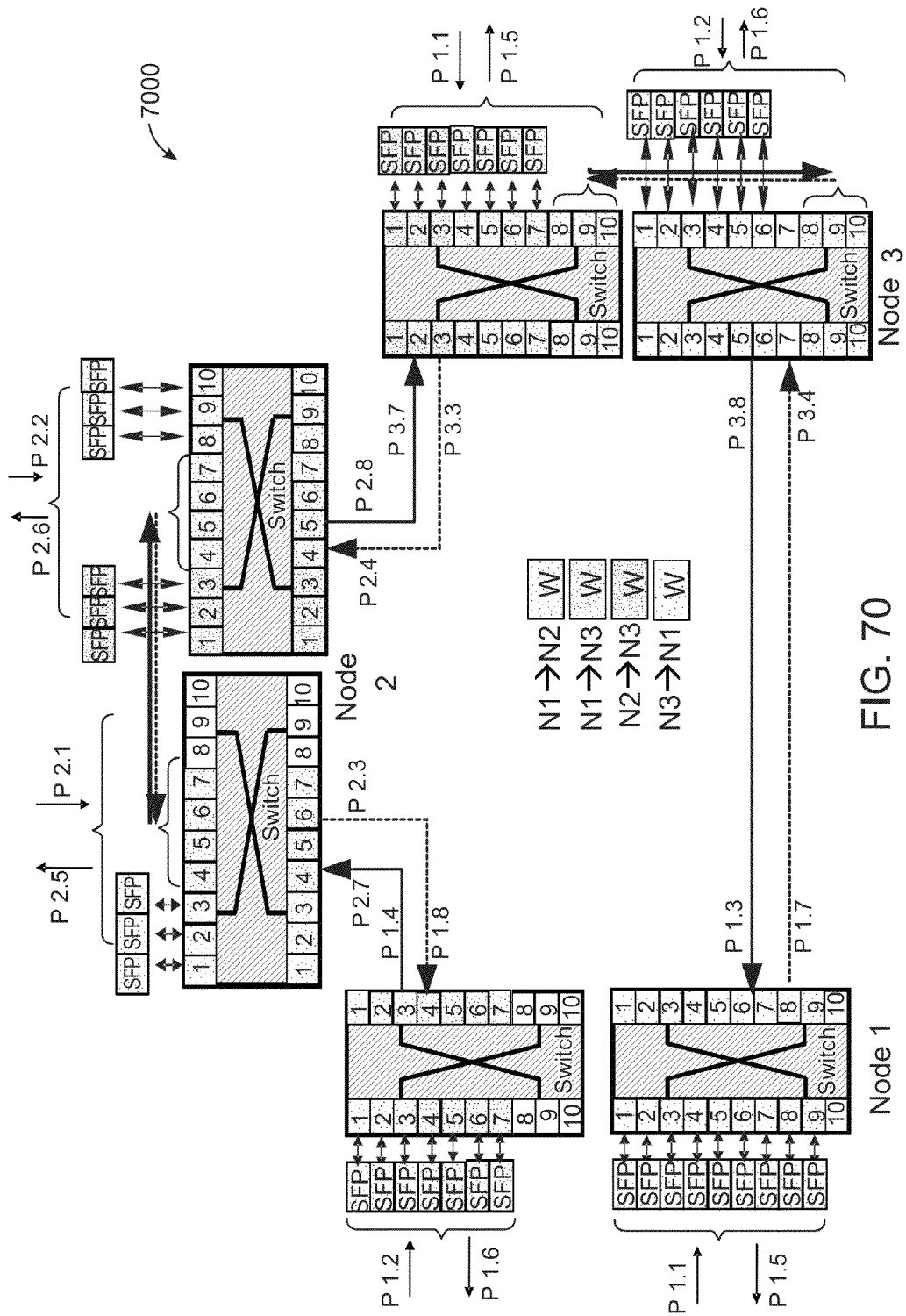

FIG. 70 is a block diagram illustrating the mapping of client services (10×1G Ethernet switch cards) to a subchannel of the present invention.

FIG. 71 illustrates one embodiment of a bandwidth map for the subchannel services illustrated in FIG. 70.

Figure 72:
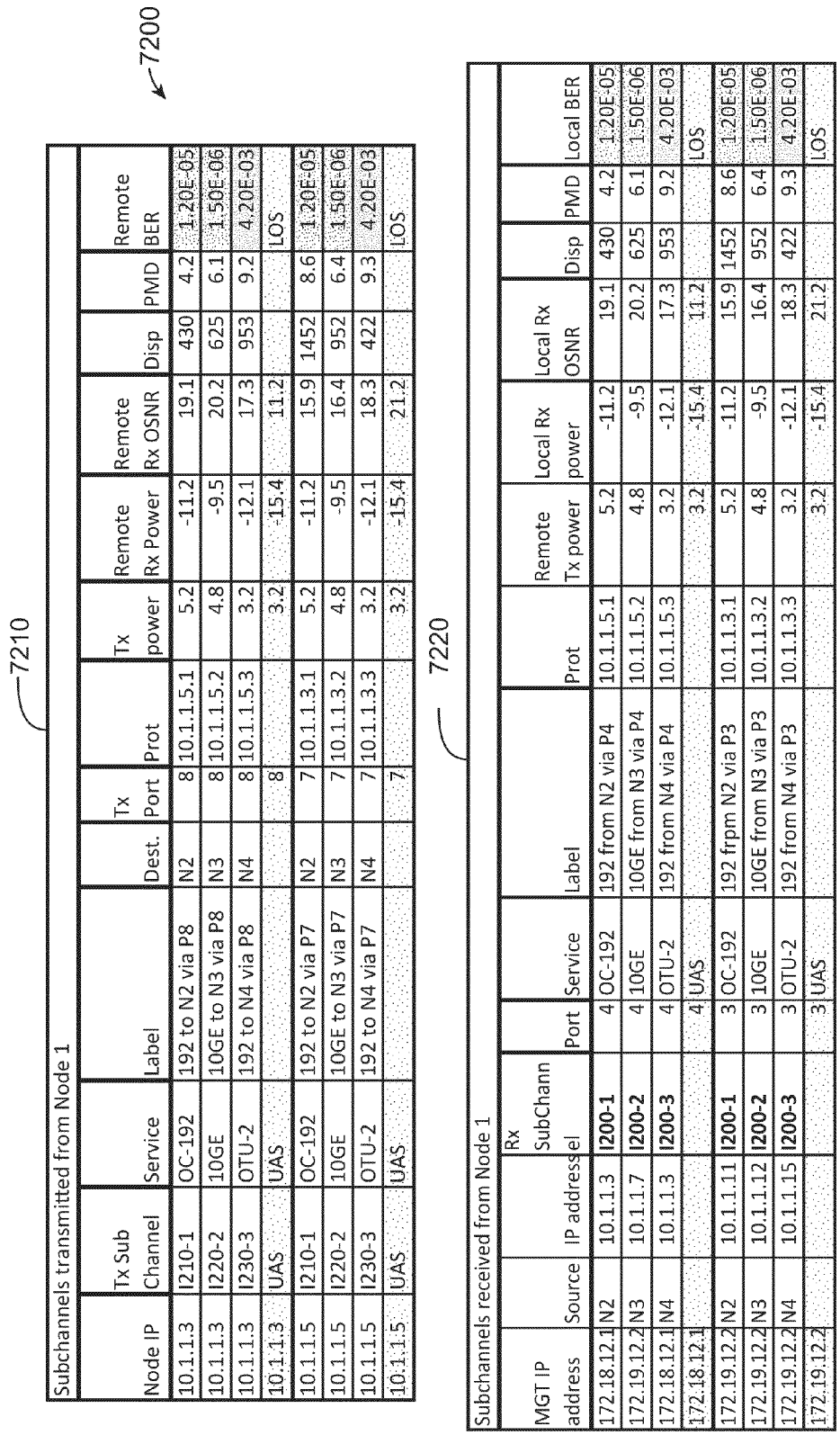

FIG. 72 illustrates one embodiment of a portion of a service status table of the present invention (listing performance metrics for the traffic at Node 1) for the subchannel services illustrated in FIG. 70.

Figure 73:
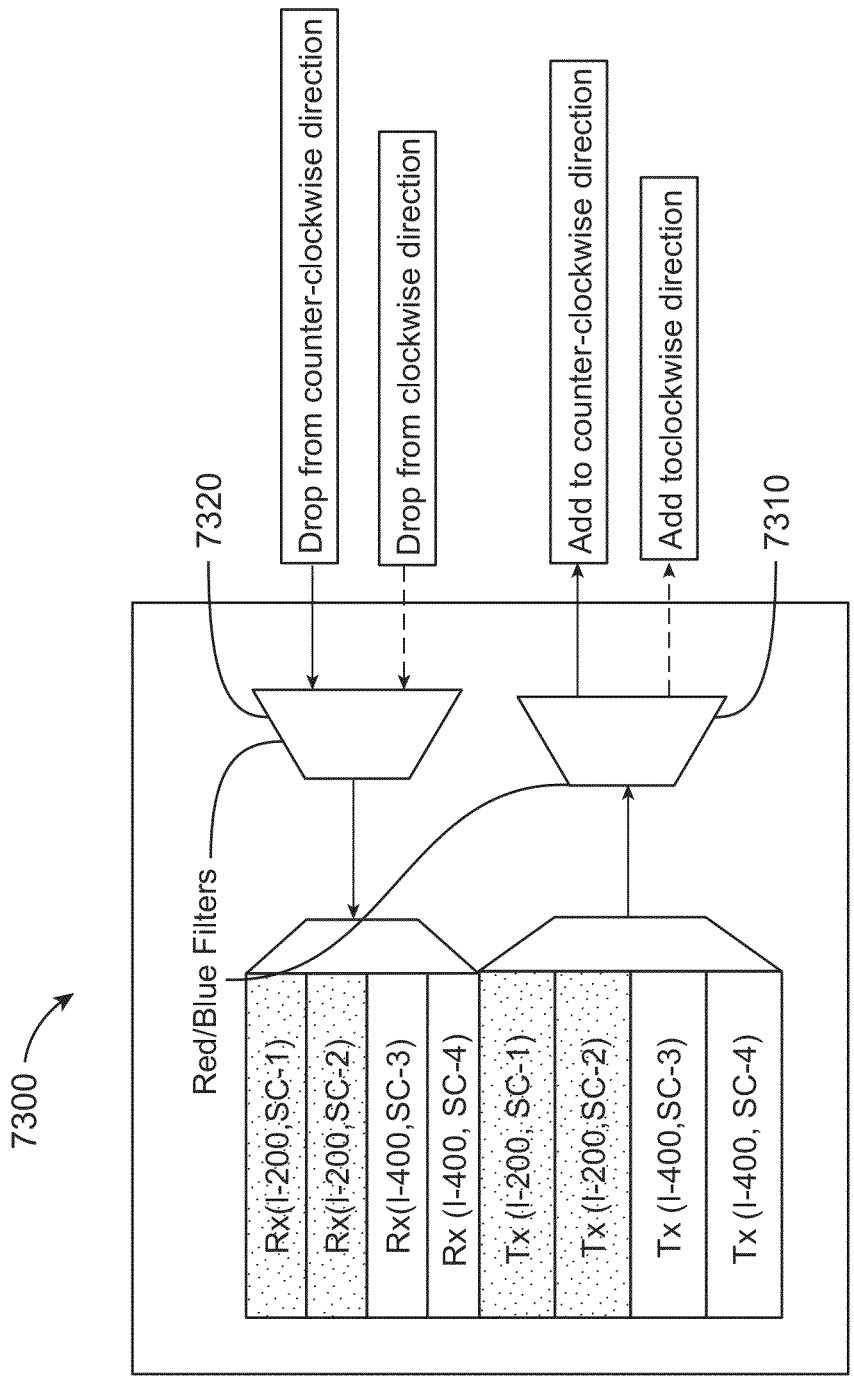

FIG. 73 illustrates one embodiment of the configuration of a subchannel muxponder of the present invention with red/blue filters that direct the traffic to one of two add ports and one of two drop ports.

Figure 74:
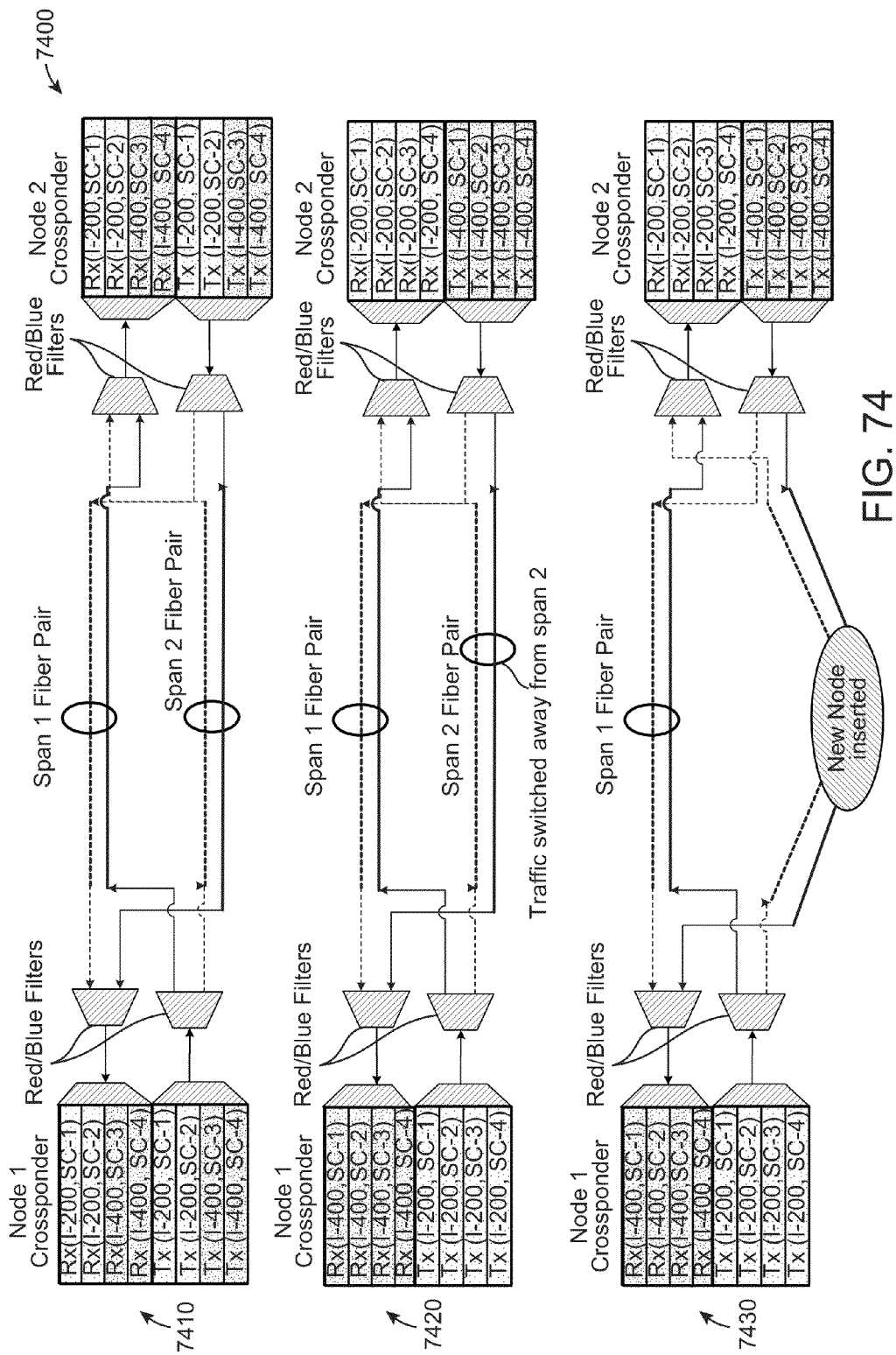

FIG. 74 illustrates how the subchannel muxponder of FIG. 73 can be deployed as a switchable subchannel crossponder of the present invention such that traffic can be redirected away from a span for node insertion.

Figure 75:
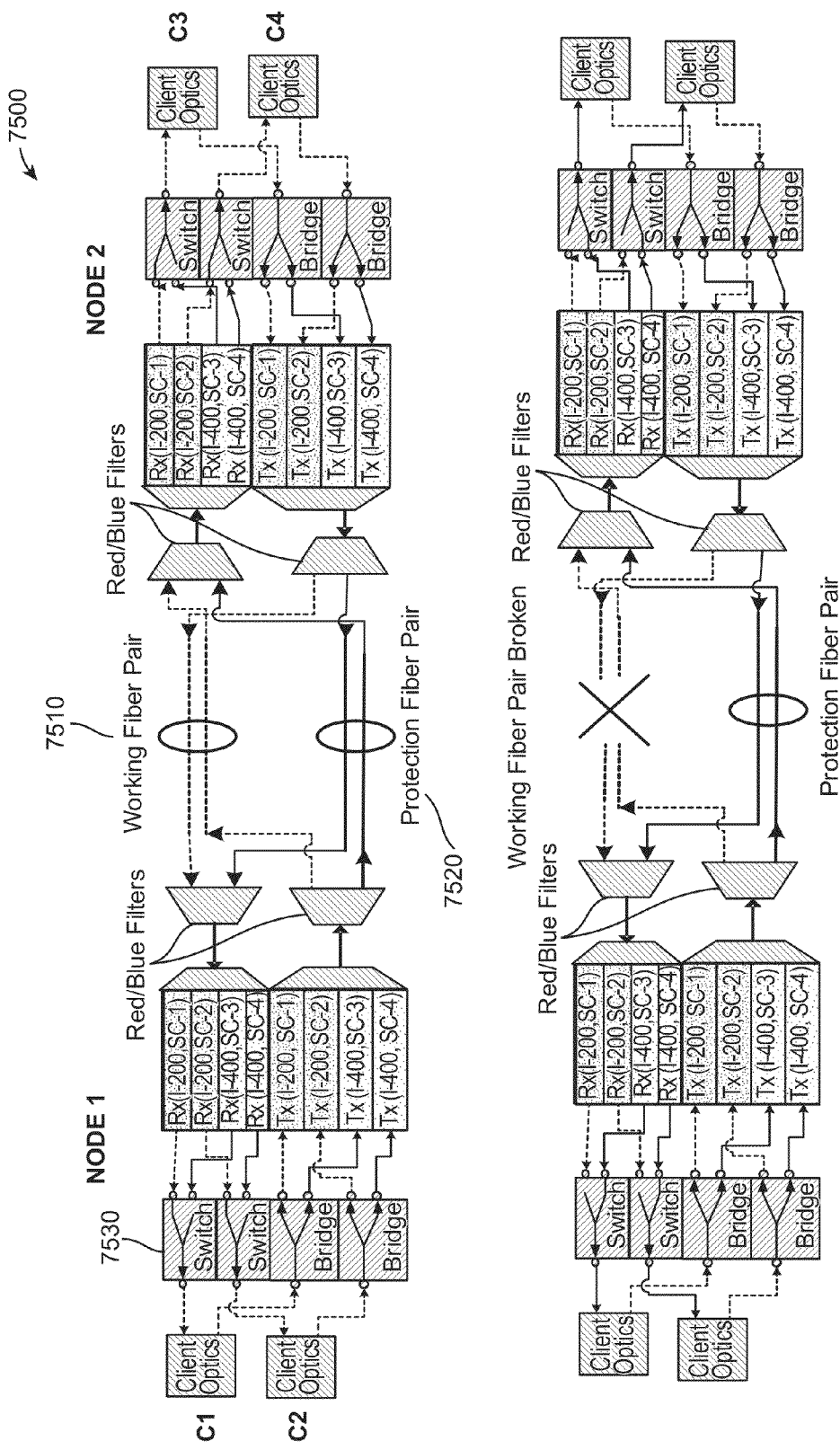

FIG. 75 illustrates how the subchannel crossponder of FIG. 74 can be used to bridge traffic on two diverse spans to implement protection switching in one embodiment of the present invention.

Figure 76:
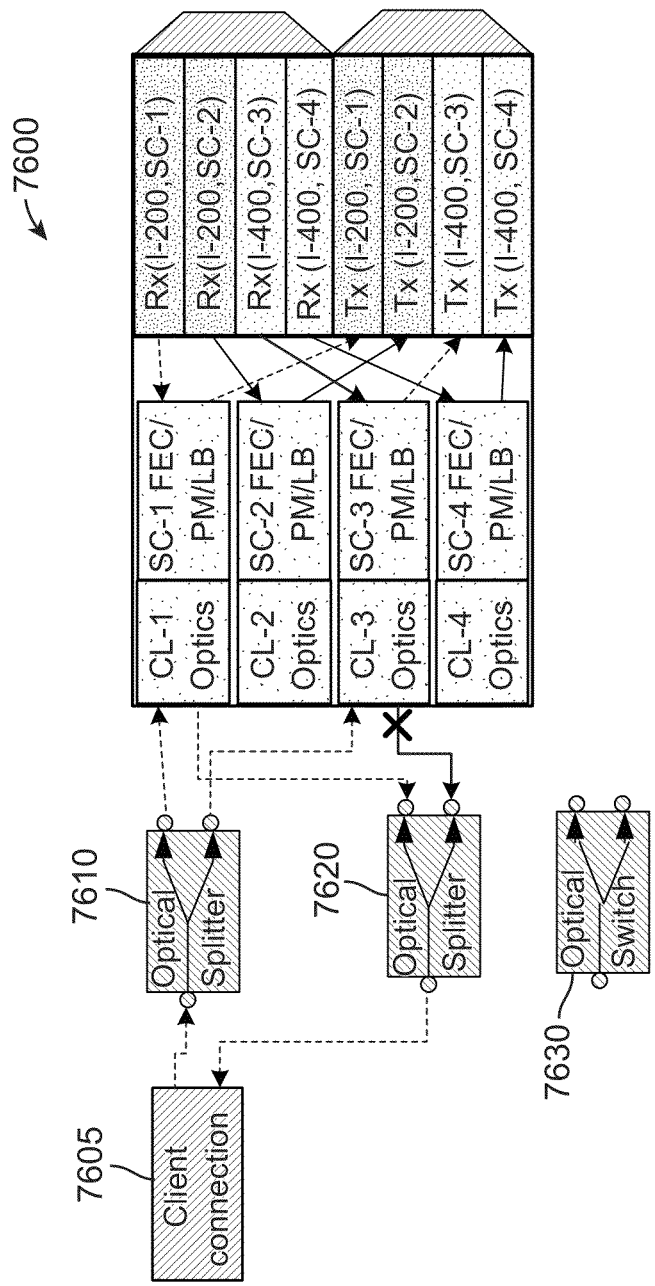

FIG. 76 illustrates an alternative implementation of protection switching in the present invention.

Figure 77:
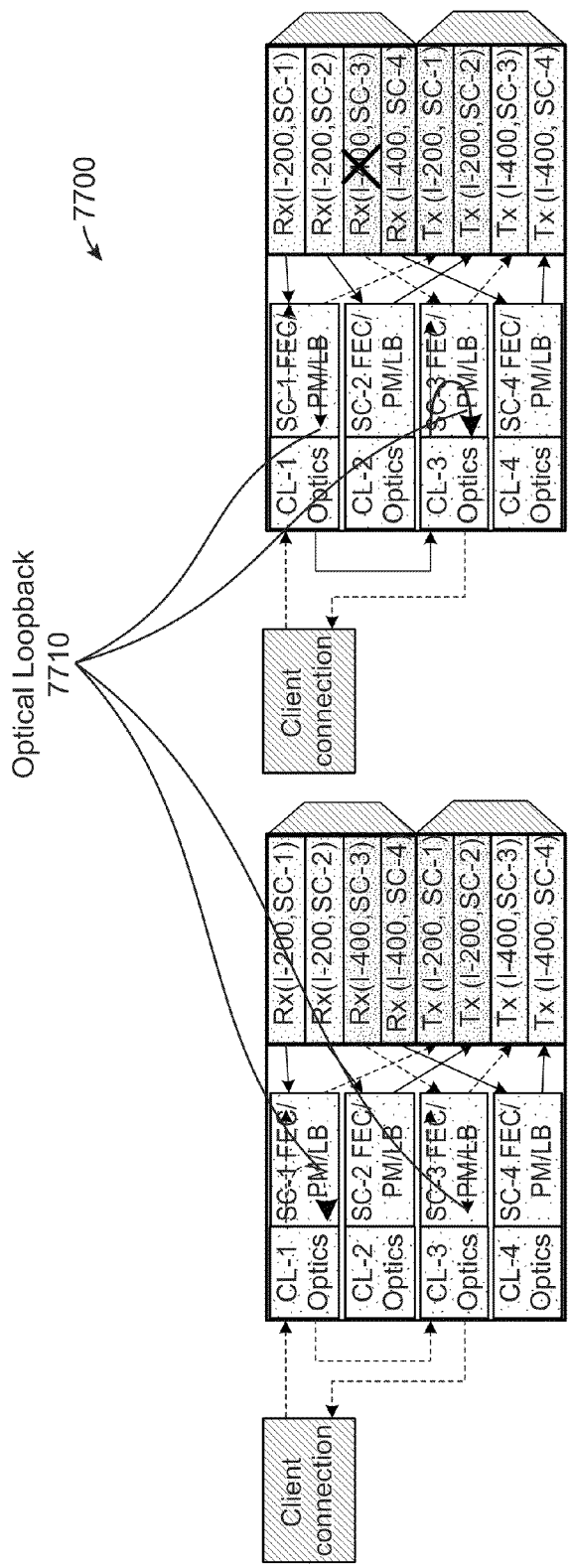

FIG. 77 illustrates an alternative implementation of the bridge and switch functions that implement protection switching in the present invention.

Figure 78:
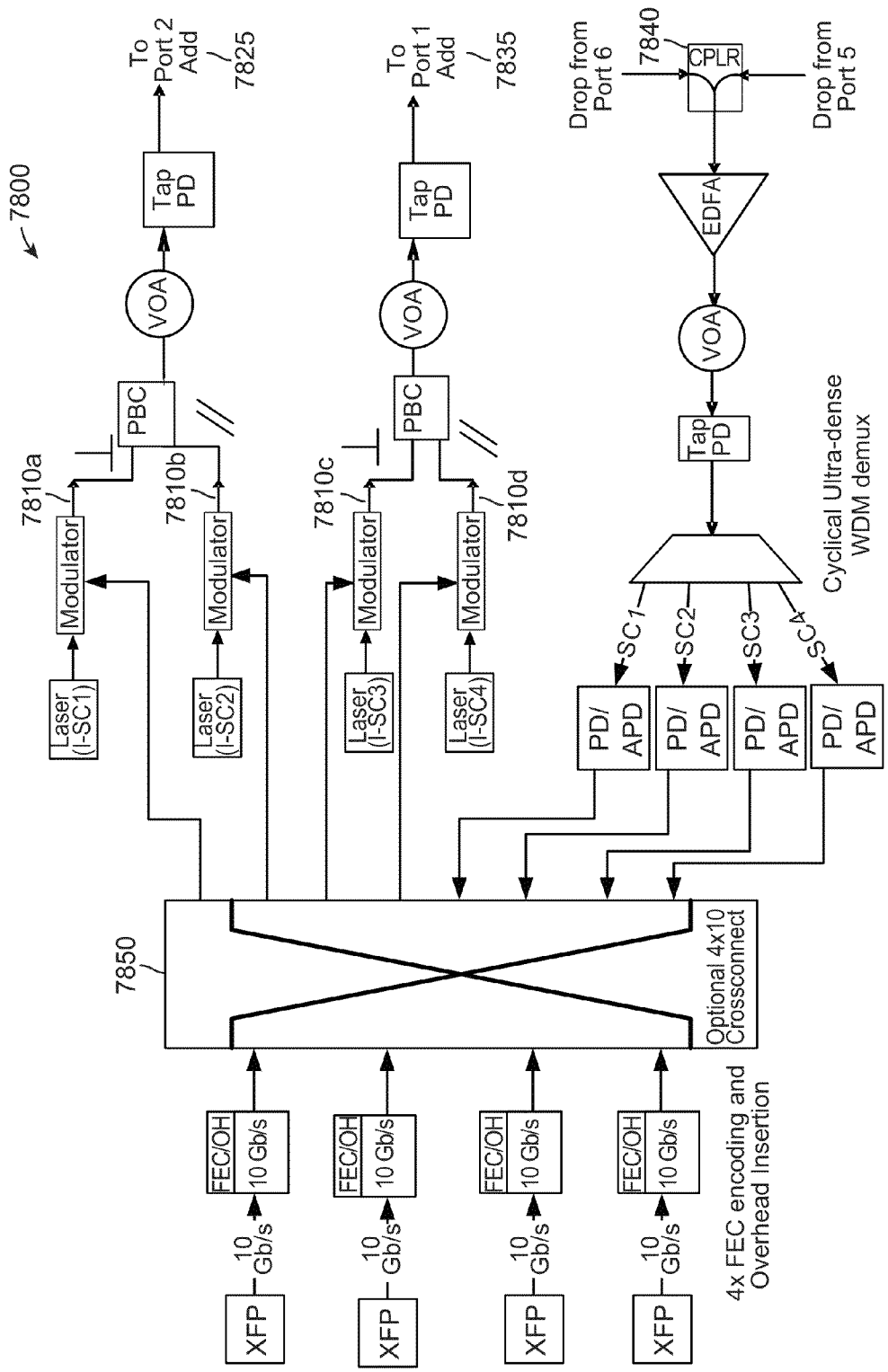

FIG. 78 is a block diagram of one embodiment of a subchannel crossponder of the present invention.

Figure 79:
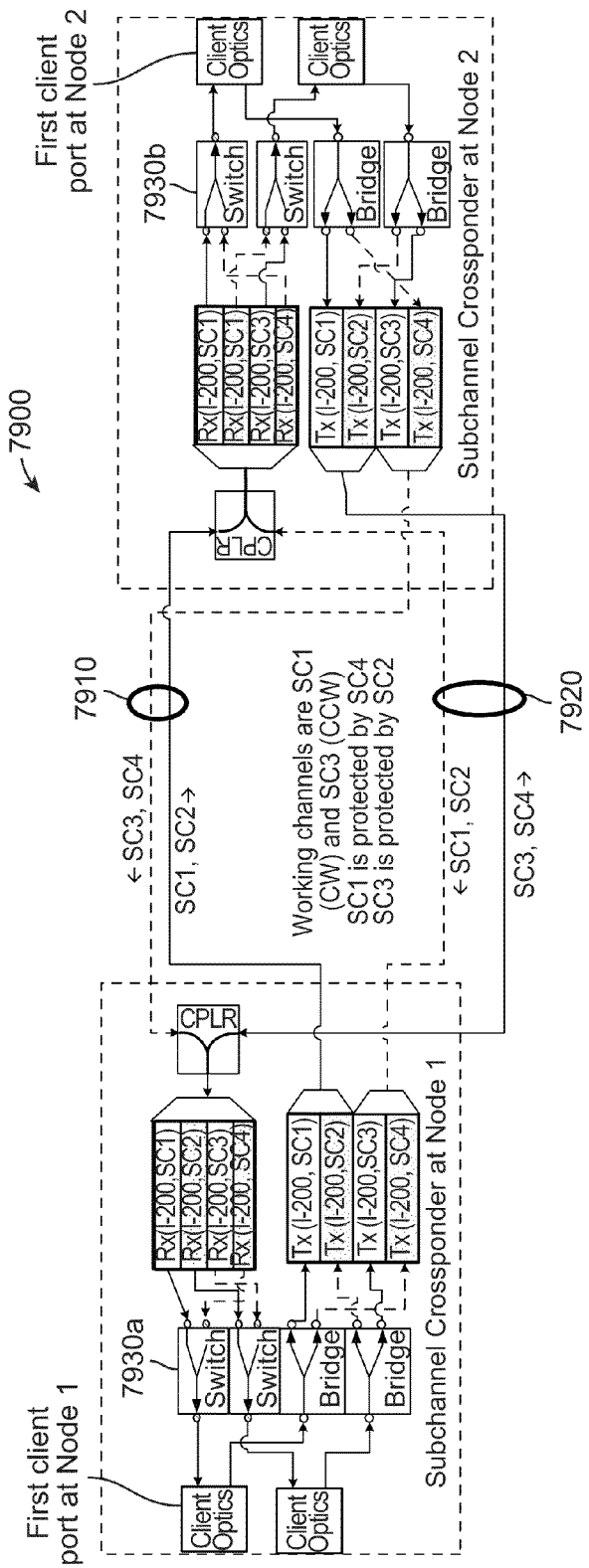

FIG. 79 is a block diagram illustrating the deployment of a subchannel muxponder of the present invention in a dedicated protection mode.

Figure 80:
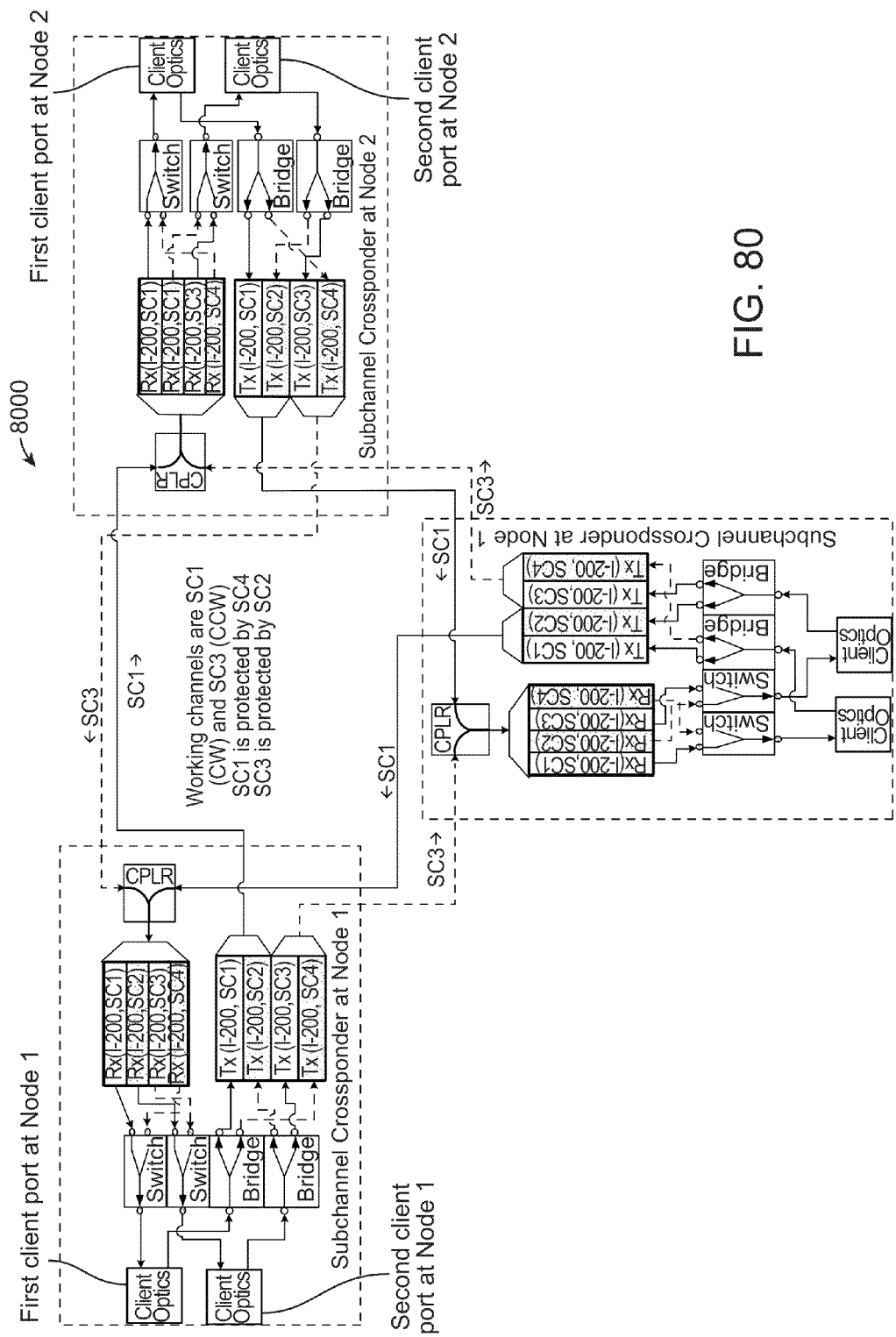

FIG. 80 is a block diagram illustrating the deployment of a subchannel muxponder of the present invention in a shared protection mode.

Figure 81:
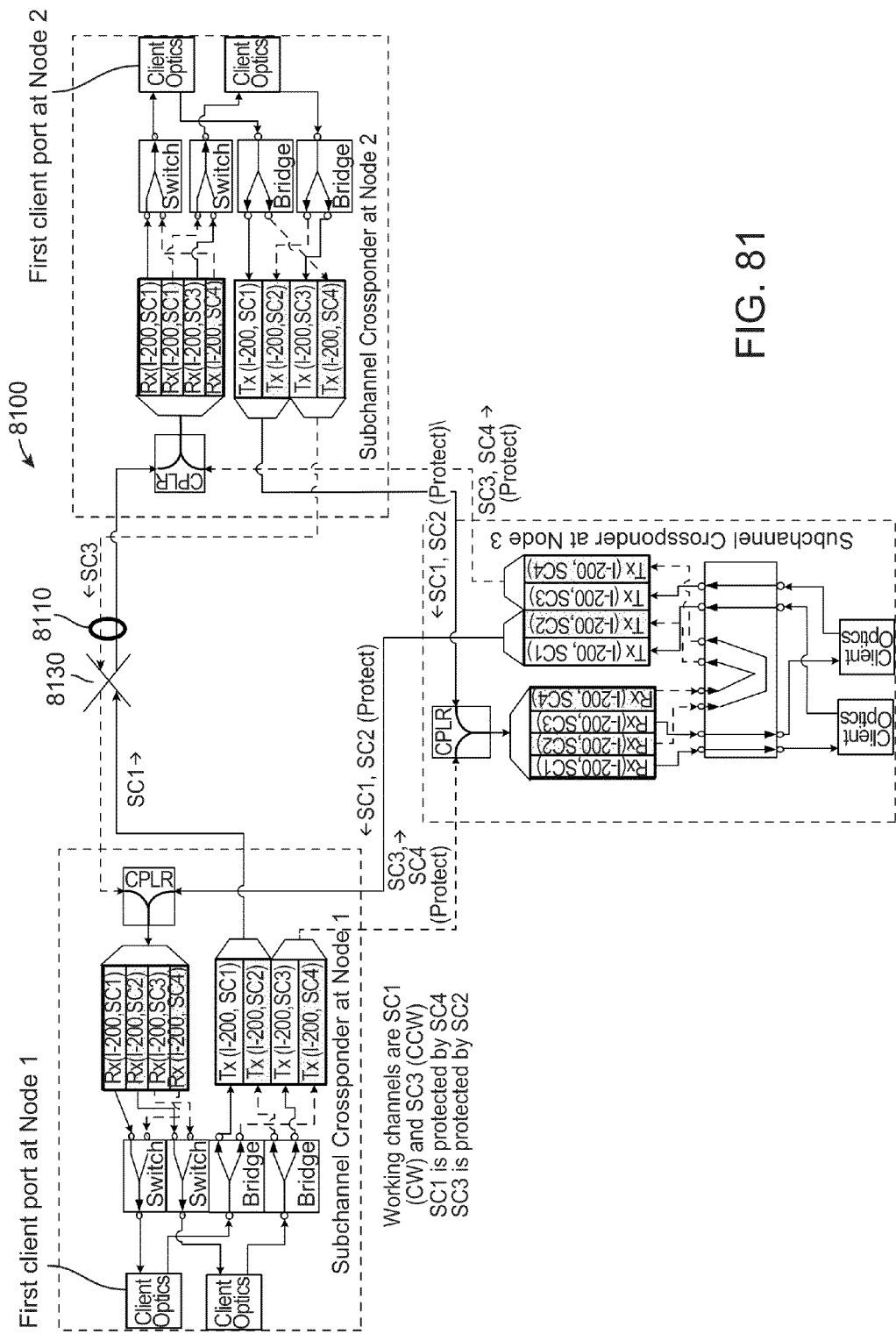

FIG. 81 is a block diagram illustrating the deployment of a subchannel muxponder of the present invention in a shared protection mode where the protection subchannels are regenerated at an "intermediate node" (not directly connected to a cut fiber).

Figure 82:
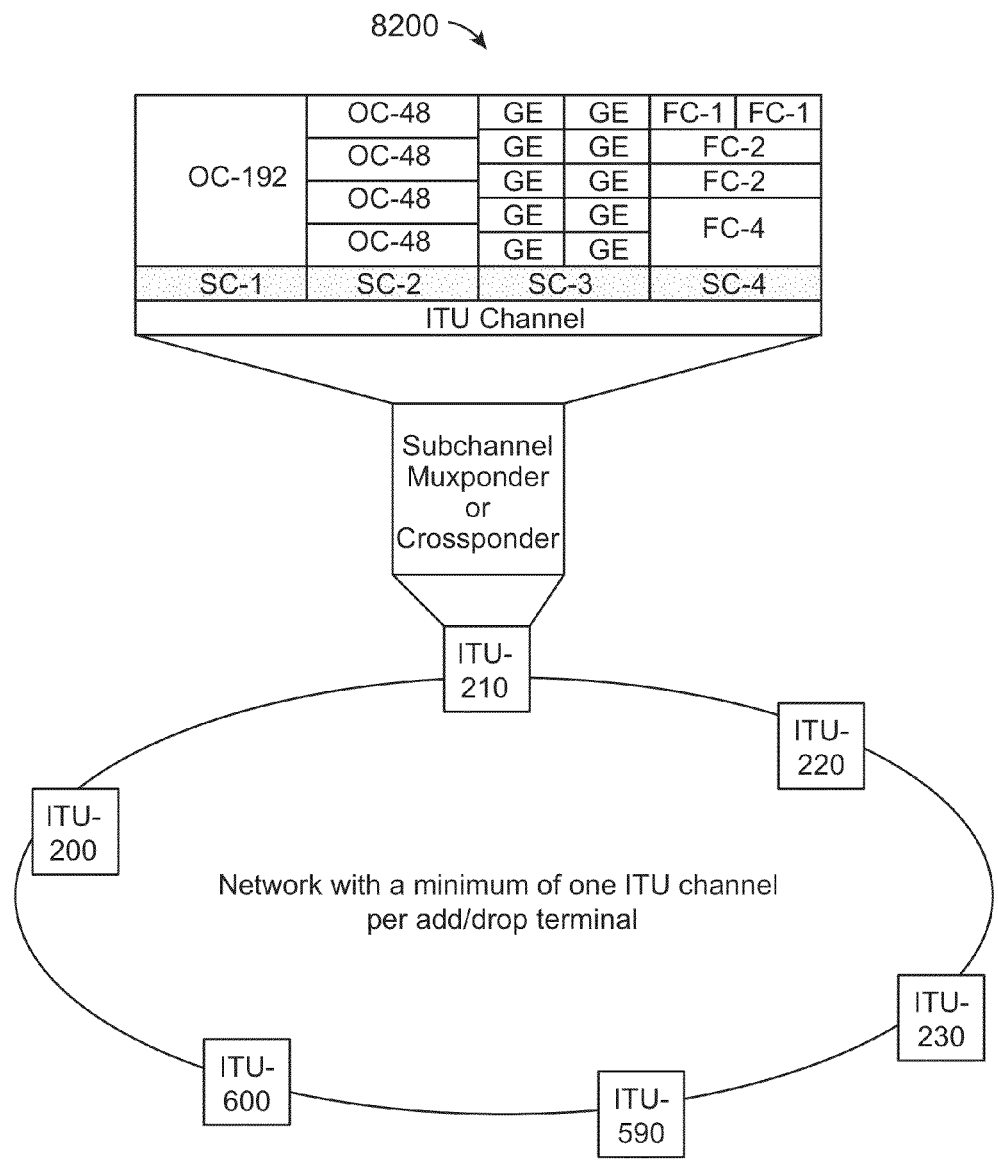

FIG. 82 is a block diagram of one embodiment of a distributed subchannel switching network of the present invention with up to N (number of subchannels) interconnects.

Figure 83:
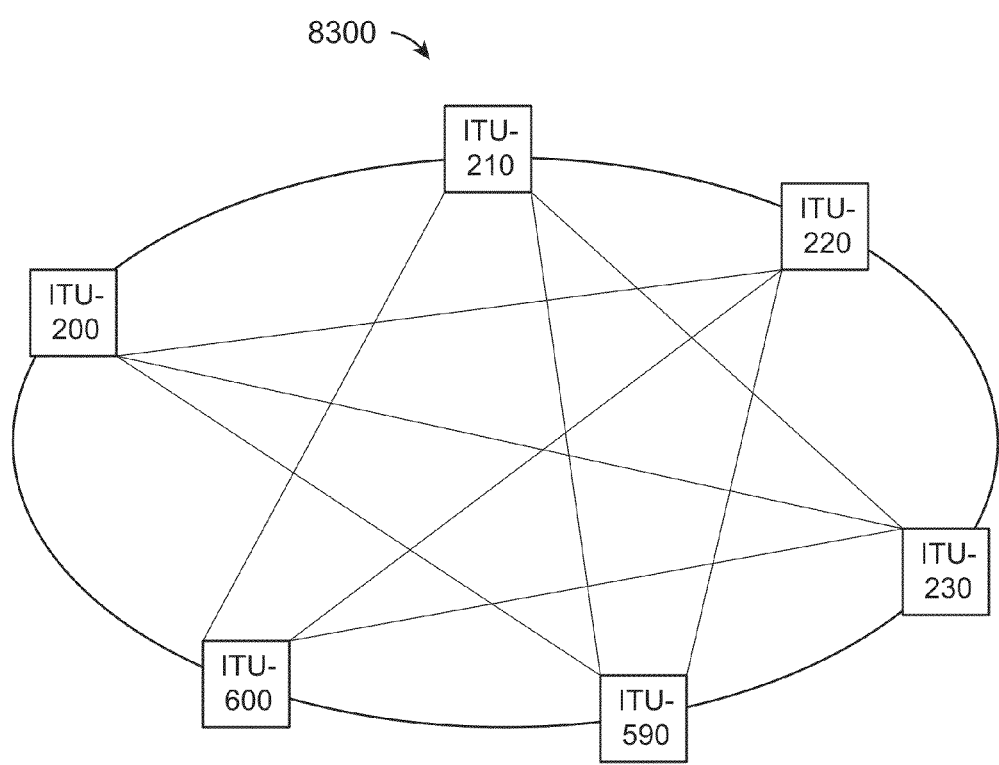

FIG. 83 is a block diagram of a logical mesh, provided by the distributed subchannel switching network illustrated in FIG. 82, in which routing is controlled by tuning subchannel frequencies.

Figure 84:
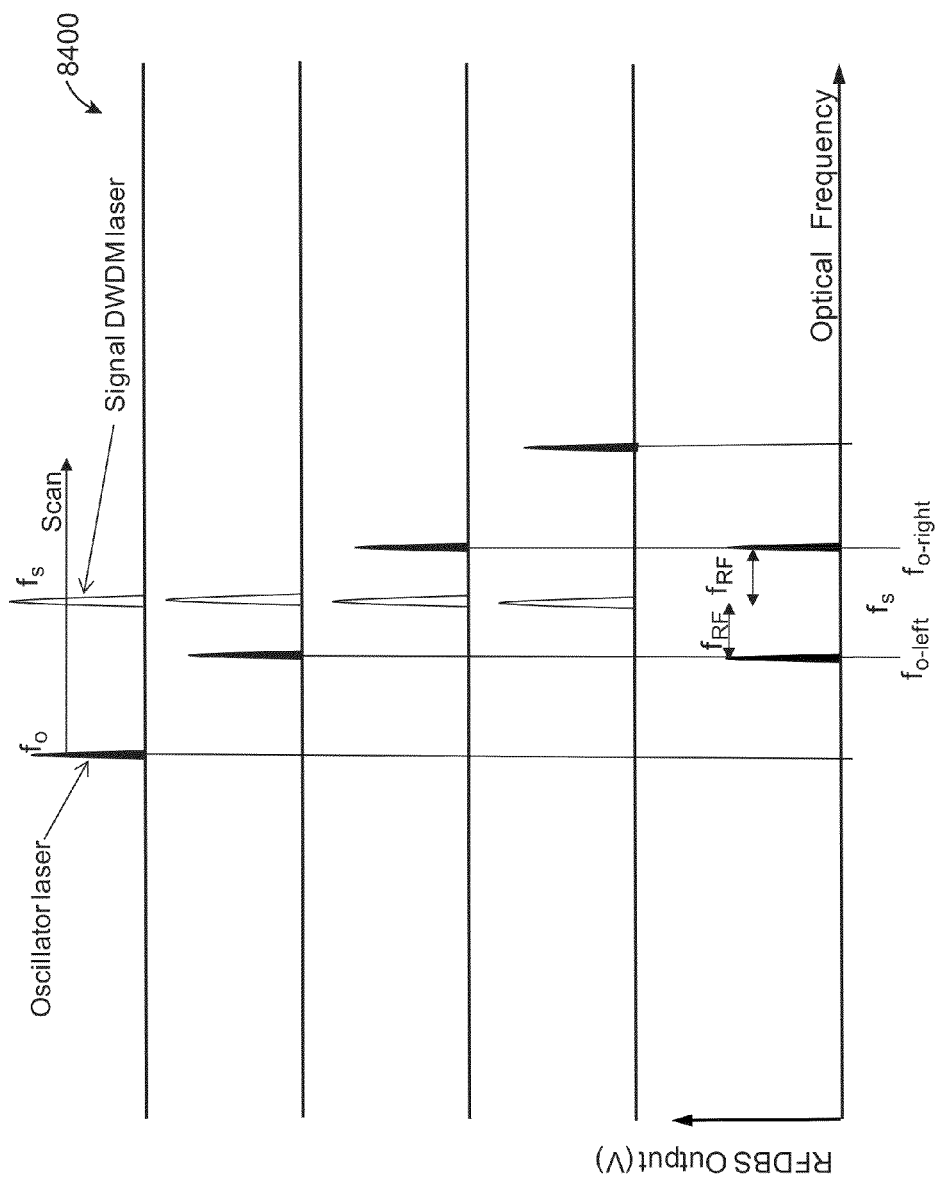

FIG. 84 is a graph illustrating a DWDM signal laser of the present invention beating at a fixed frequency with a narrow optical carrier while an oscillator laser frequency is scanned.

Figure 85:
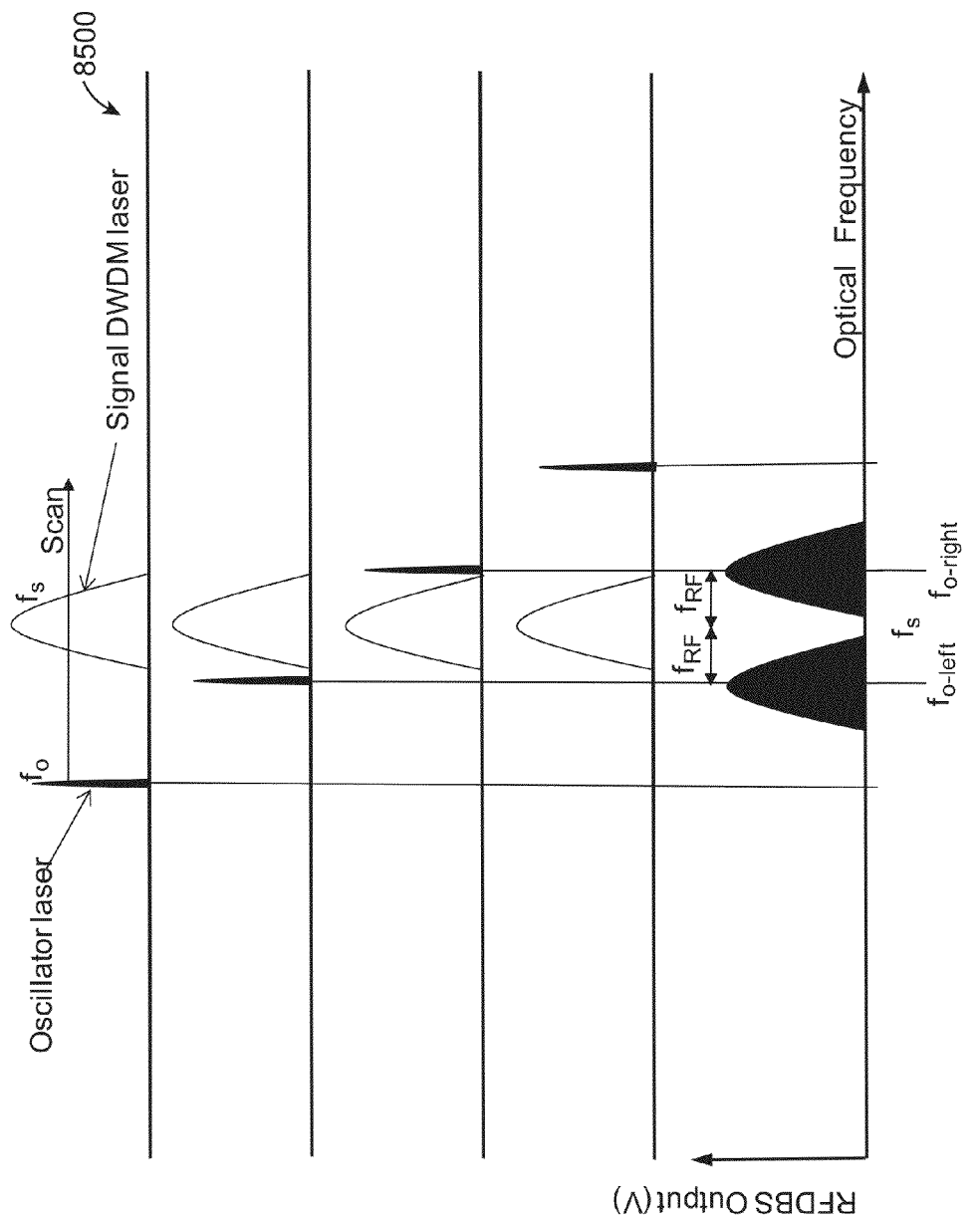

FIG. 85 is a graph illustrating a DWDM signal laser of the present invention beating at a fixed frequency over a broad spectrum while an oscillator laser frequency is scanned.

Figure 86:
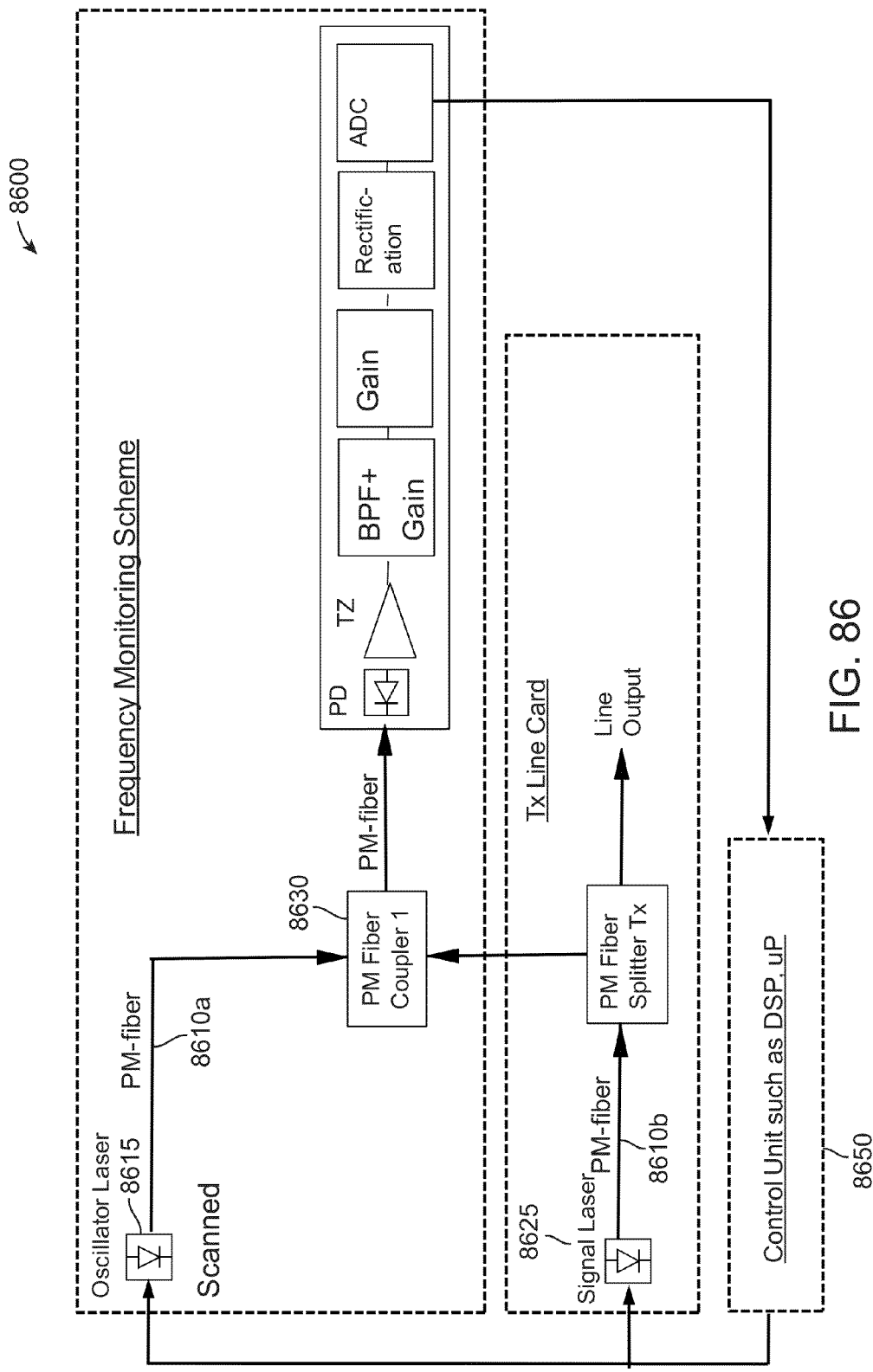

FIG. 86 is a block diagram of one embodiment of an optical frequency stabilization scheme of the present invention for one DWDM signal laser with polarizations of both signal and oscillator lasers aligned.

Figure 87:
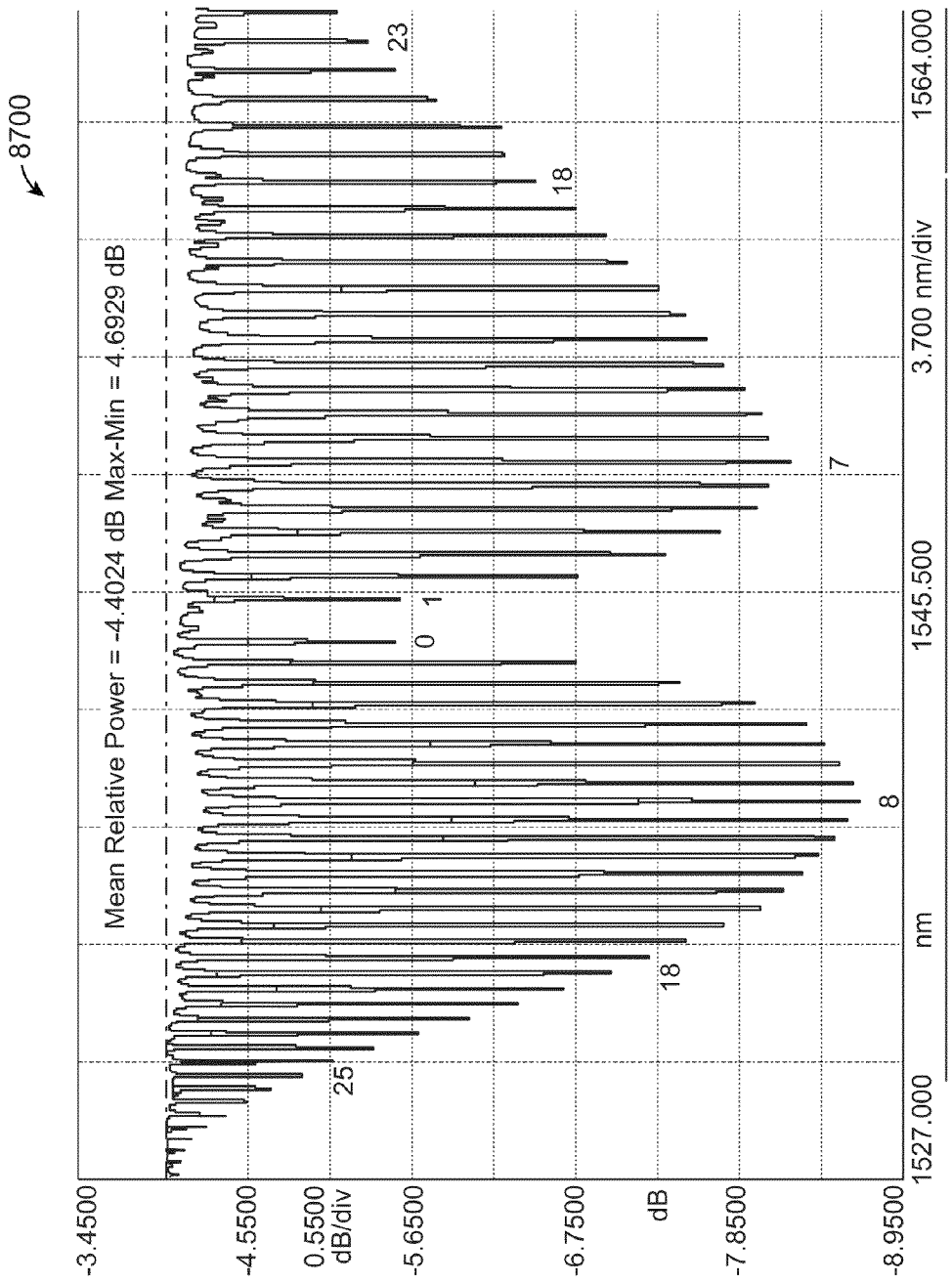

FIG. 87 is a graph illustrating typical absorption lines of a hydrogen cyanide ($H^{13}C^{14}N$) gas cell.

Figure 88:
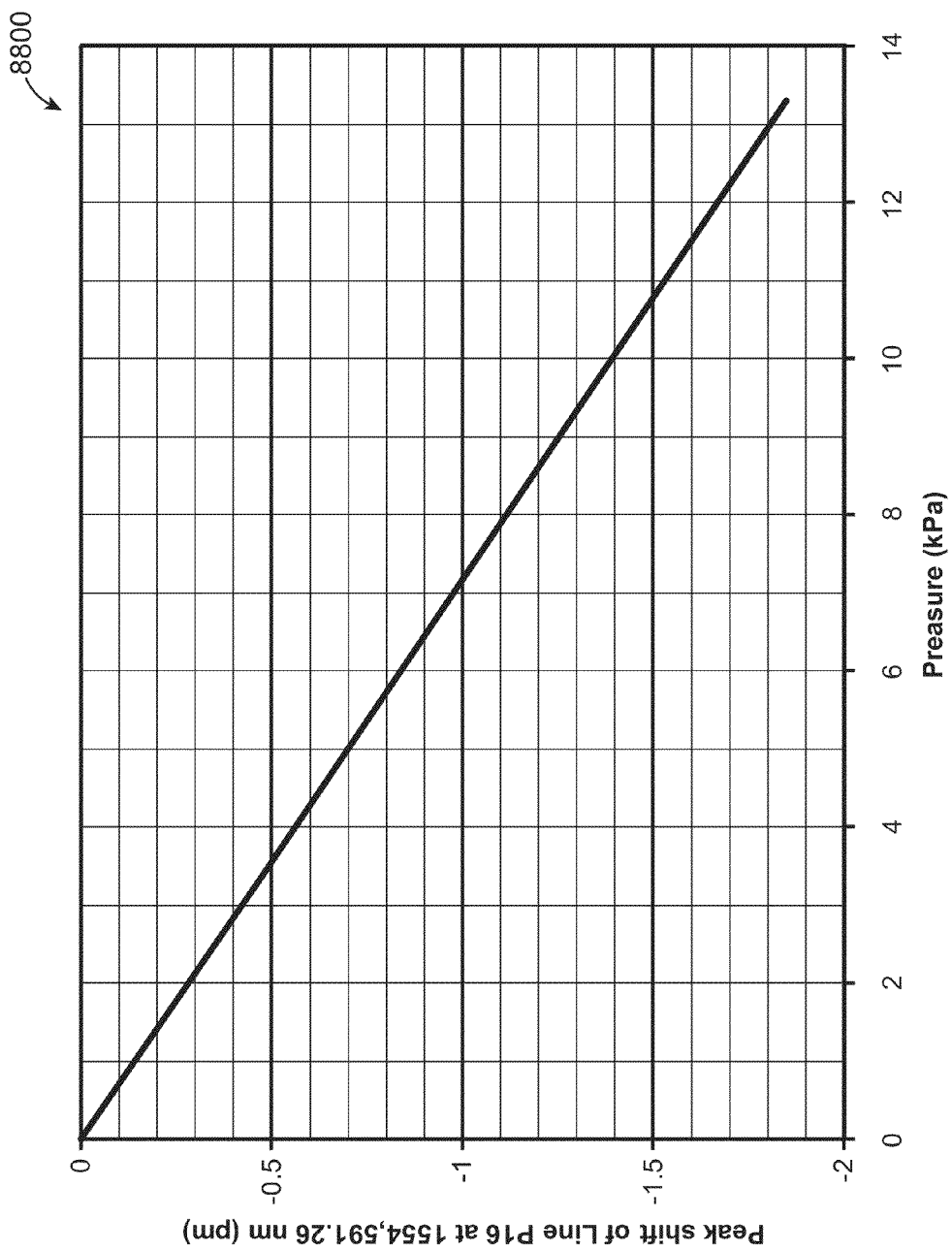

FIG. 88 is a graph illustrating the dependence of the P16 absorption line spectral position on gas pressure for hydrogen cyanide ($H^{13}C^{14}N$).

Figure 89:
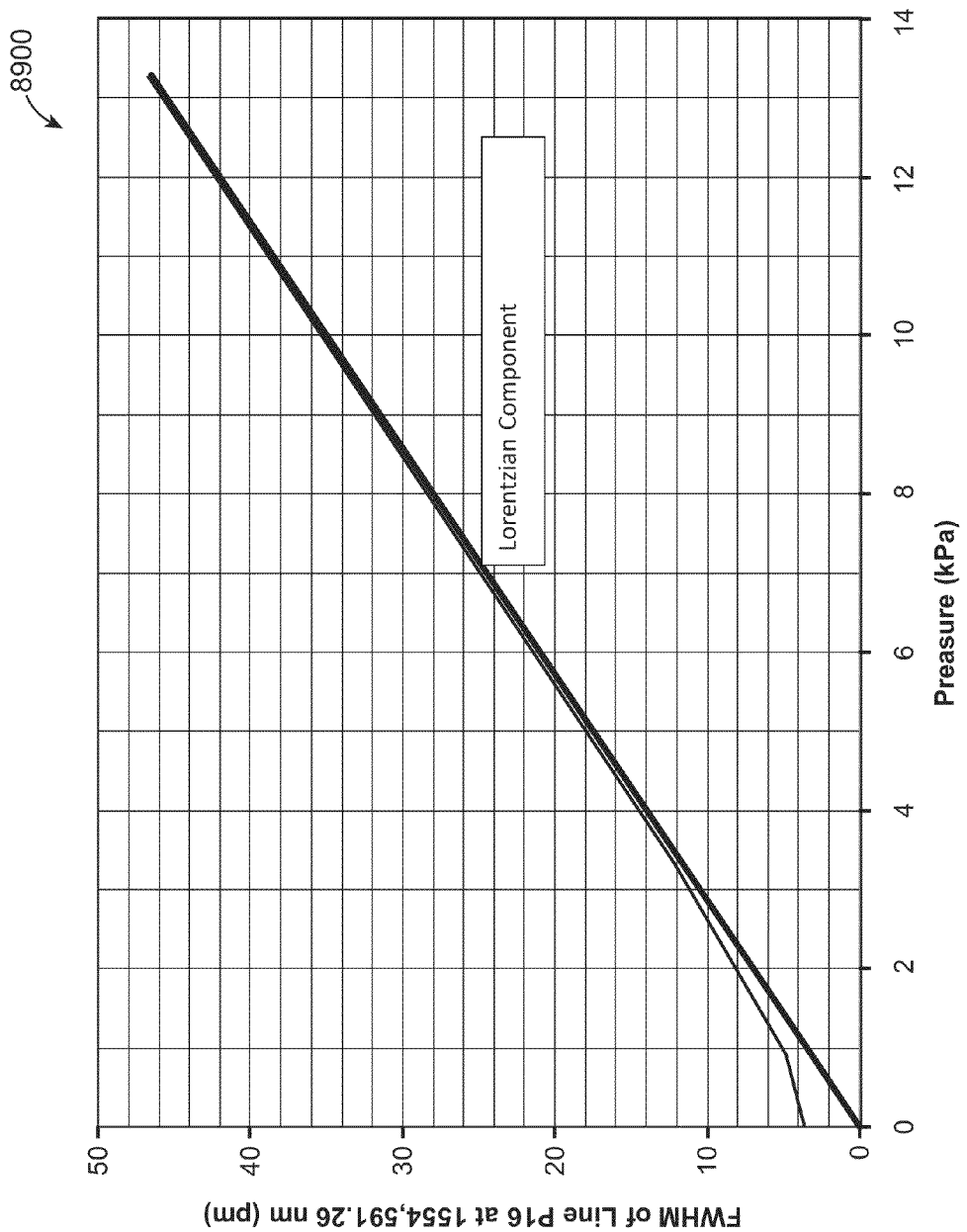

FIG. 89 is a graph illustrating the dependence of the P16 absorption line FWHM ("Full Width at Half Maximum") linewidth on gas pressure for hydrogen cyanide ($H^{13}C^{14}N$).

Figure 90:
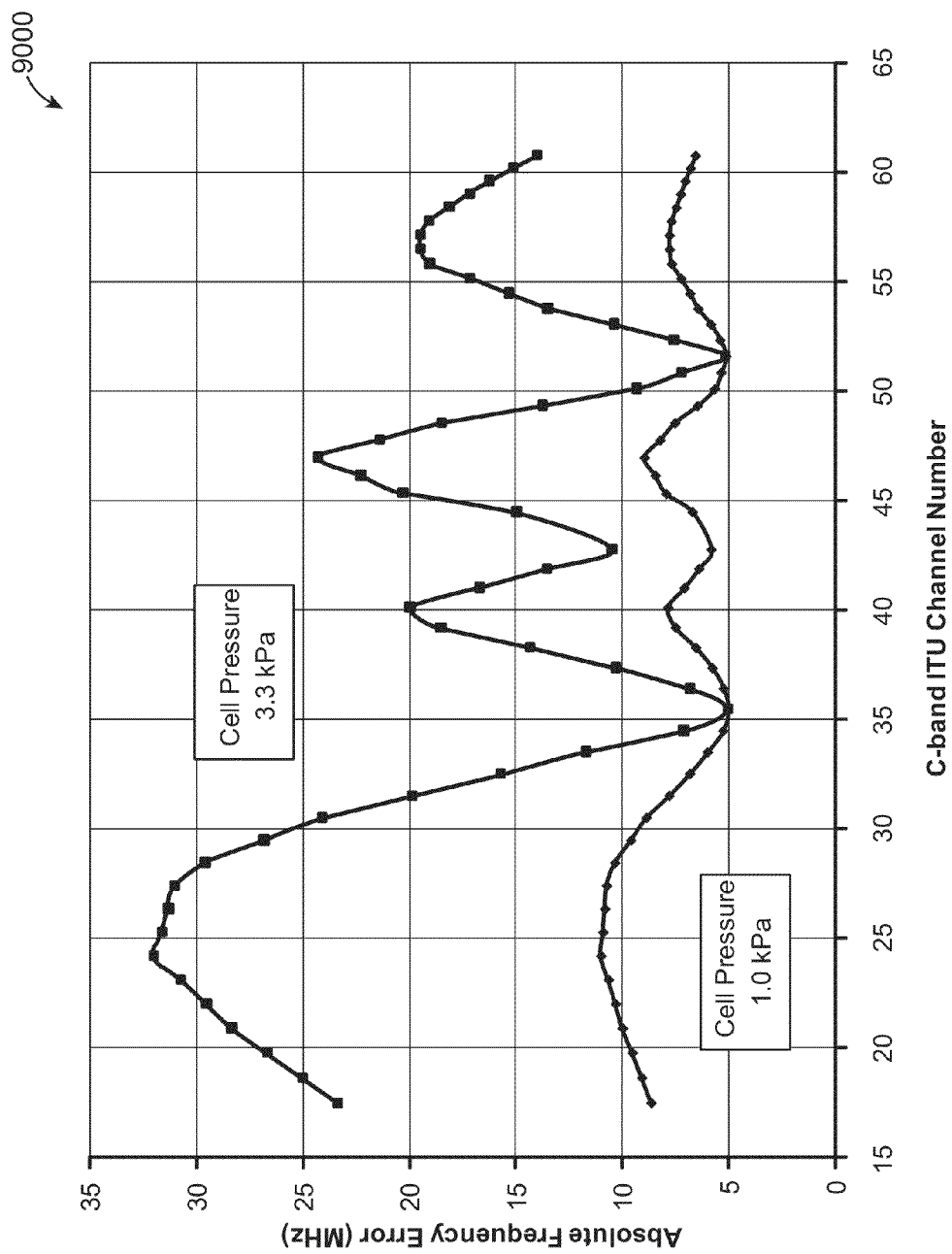

FIG. 90 is a graph illustrating the absolute frequency accuracy of hydrogen cyanide ($H^{13}C^{14}N$) absorption line positions.

Figure 91:
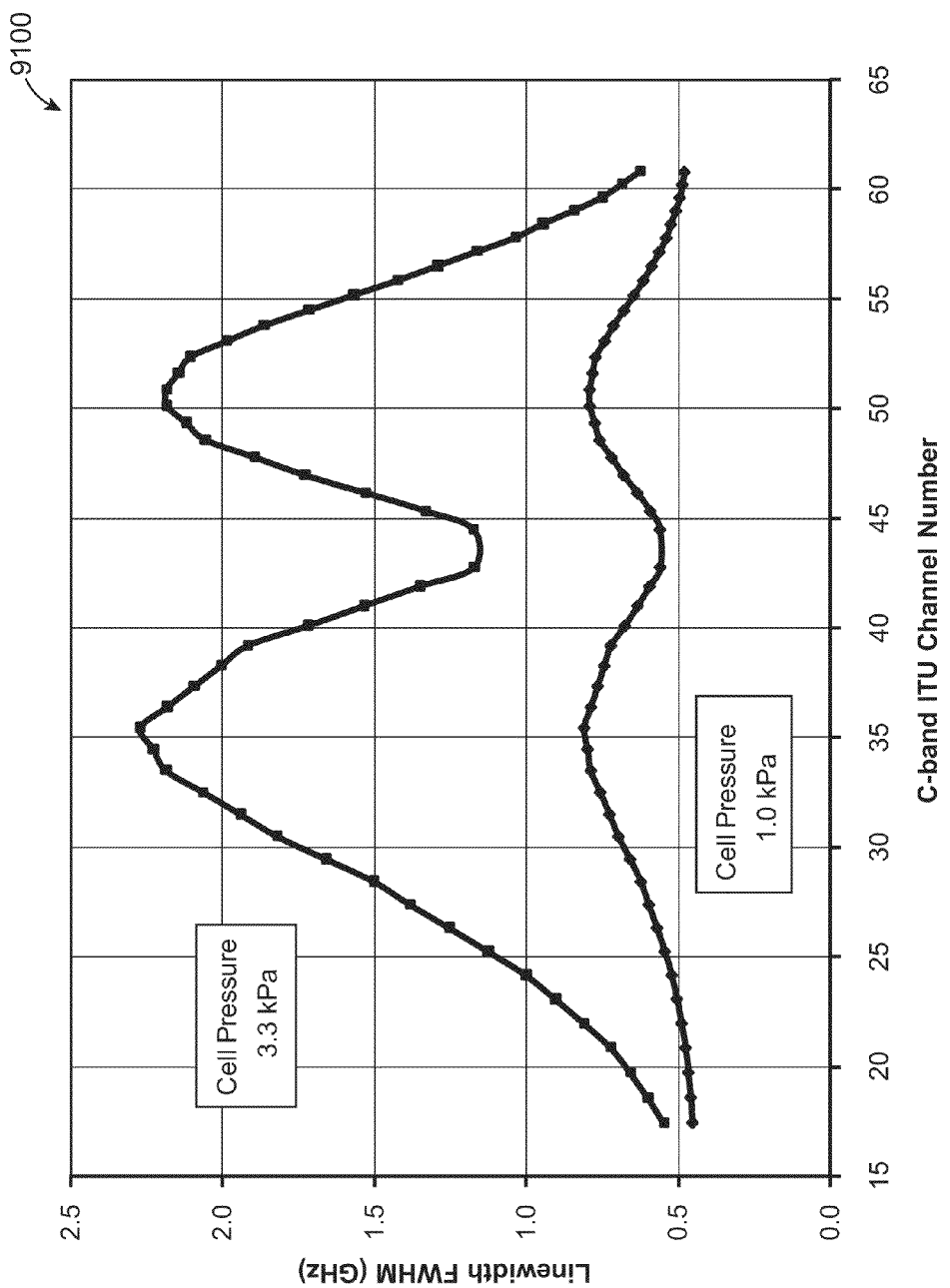

FIG. 91 is a graph illustrating the FWHM ("Full Width at Half Maximum") linewidths of hydrogen cyanide ($H^{13}C^{14}N$) absorption lines.

Figure 92:
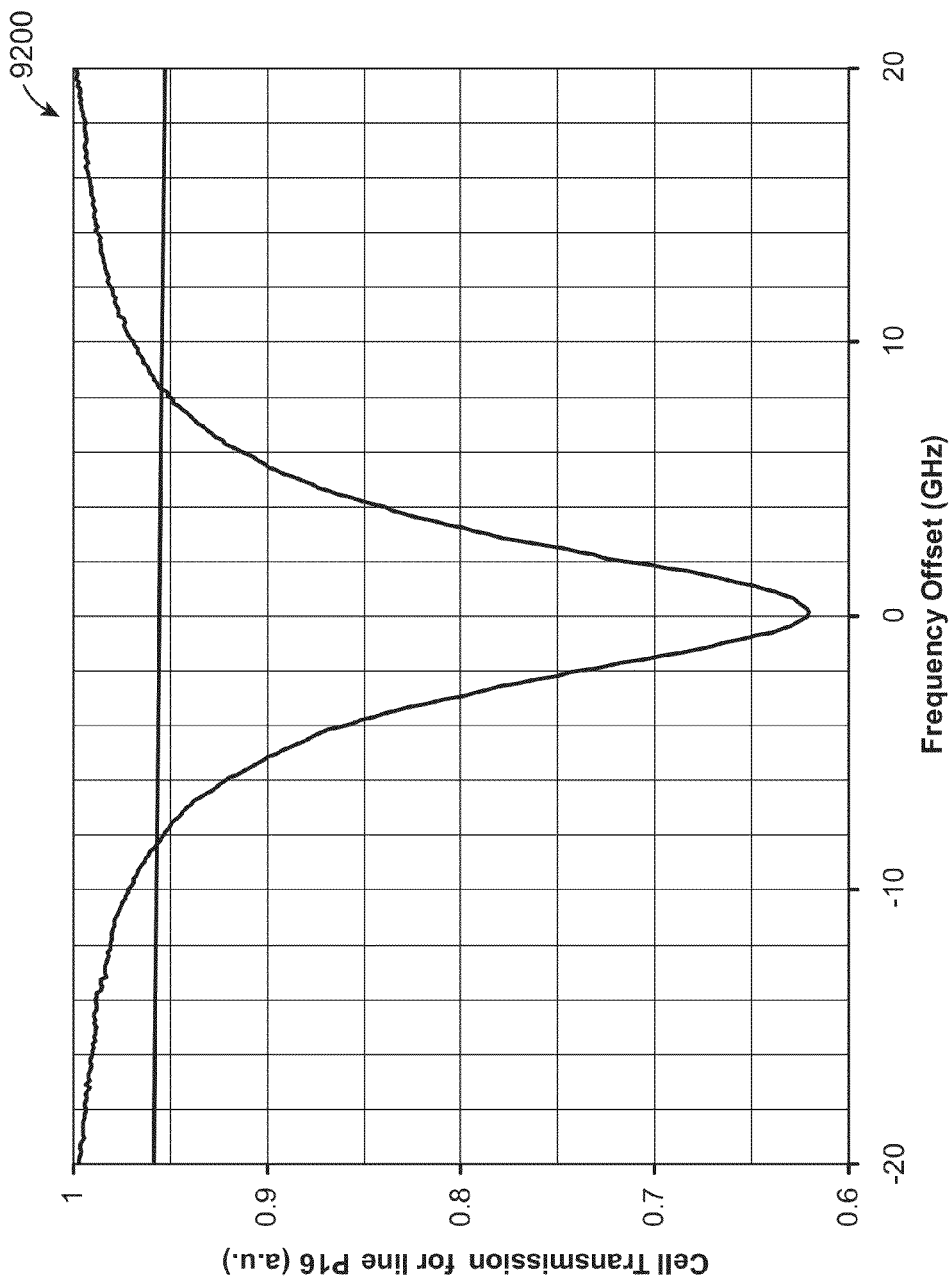

FIG. 92 is a graph illustrating the spectral shape of the P16 absorption line of hydrogen cyanide ($H^{13}C^{14}N$) at a pressure of 13 kPa (measured with a 1 pm scanning step at approximately 74 MHz).

Figure 93:
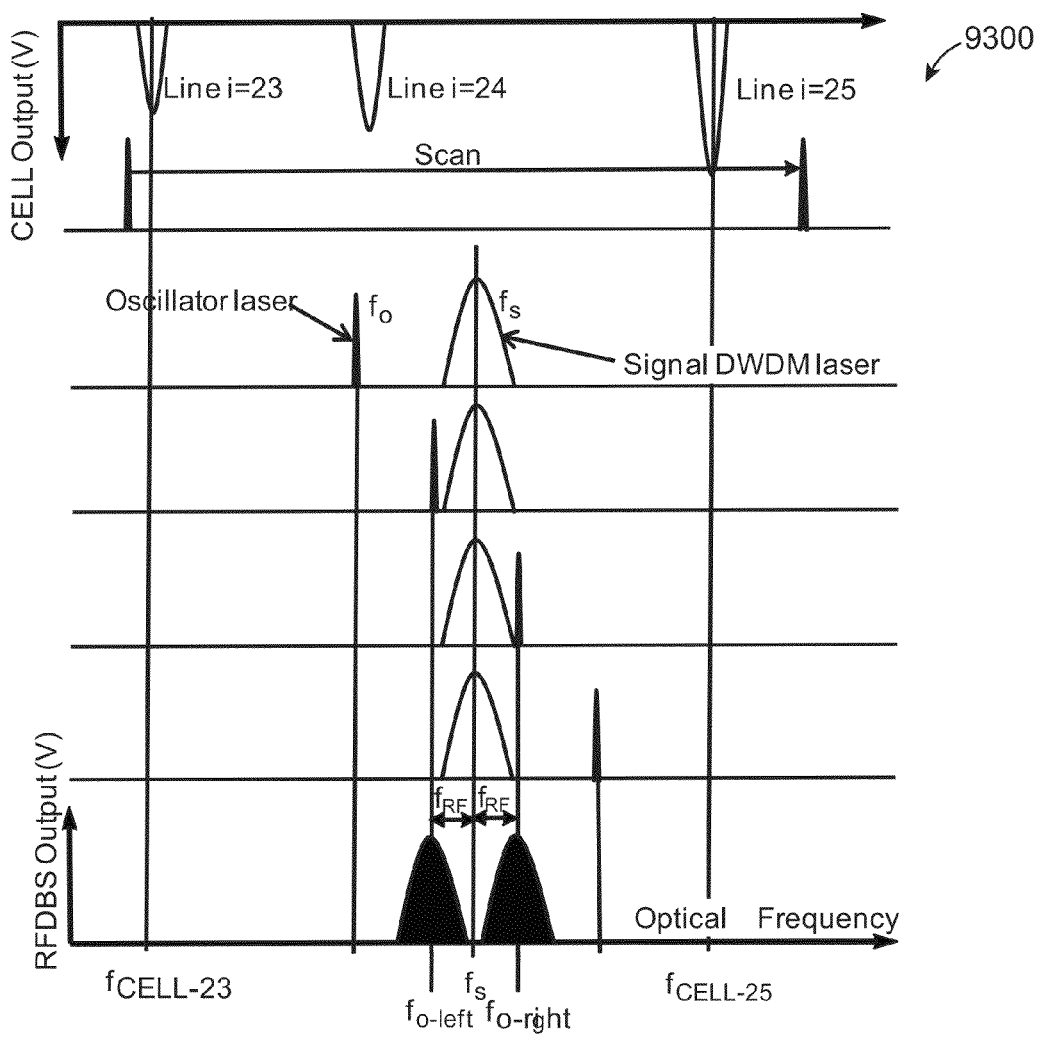

FIG. 93 is a graph illustrating calibration of the oscillator laser frequency setpoints by reference frequencies of the absorption cell.

Figure 94:
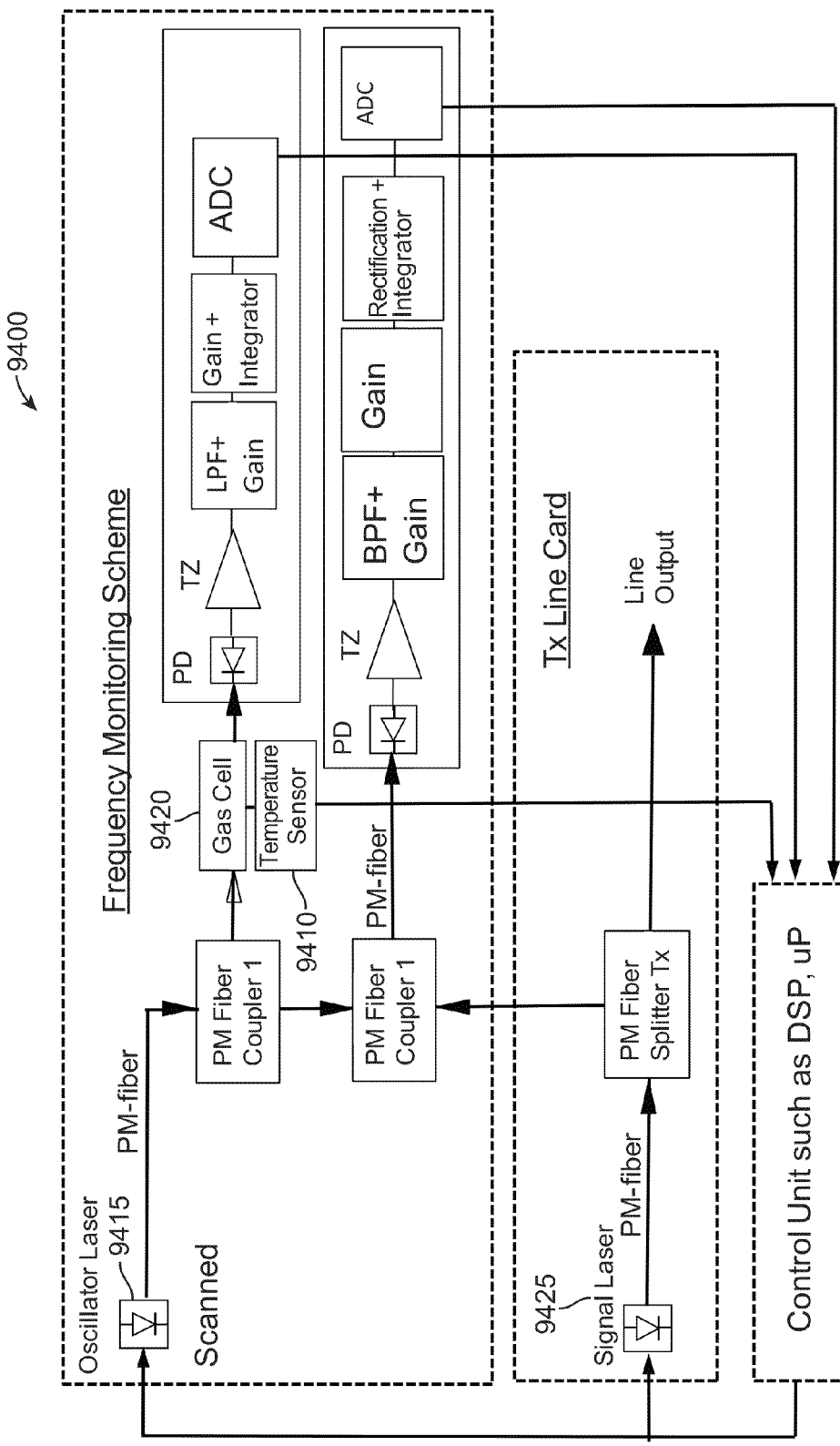

FIG. 94 is a block diagram of one embodiment of an optical frequency stabilization scheme of the present invention for one DWDM signal laser (with polarizations of both signal and oscillator lasers aligned) and a reference absorption cell.

Figure 95:
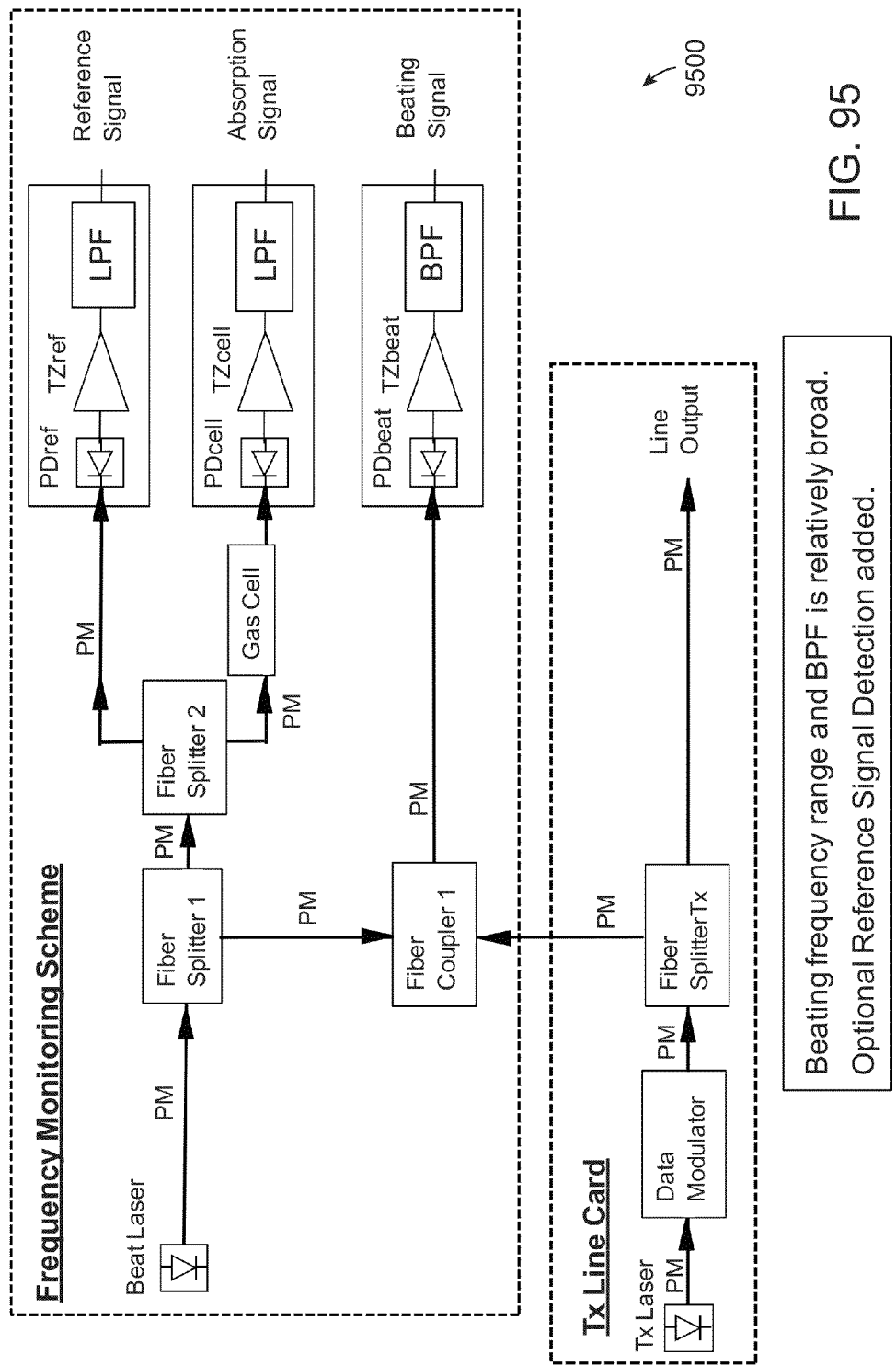

FIG. 95 is a block diagram of one embodiment of an optical frequency stabilization scheme of the present invention where variations of the oscillator laser optical power are measured and used as a reference signal.

Figure 96:
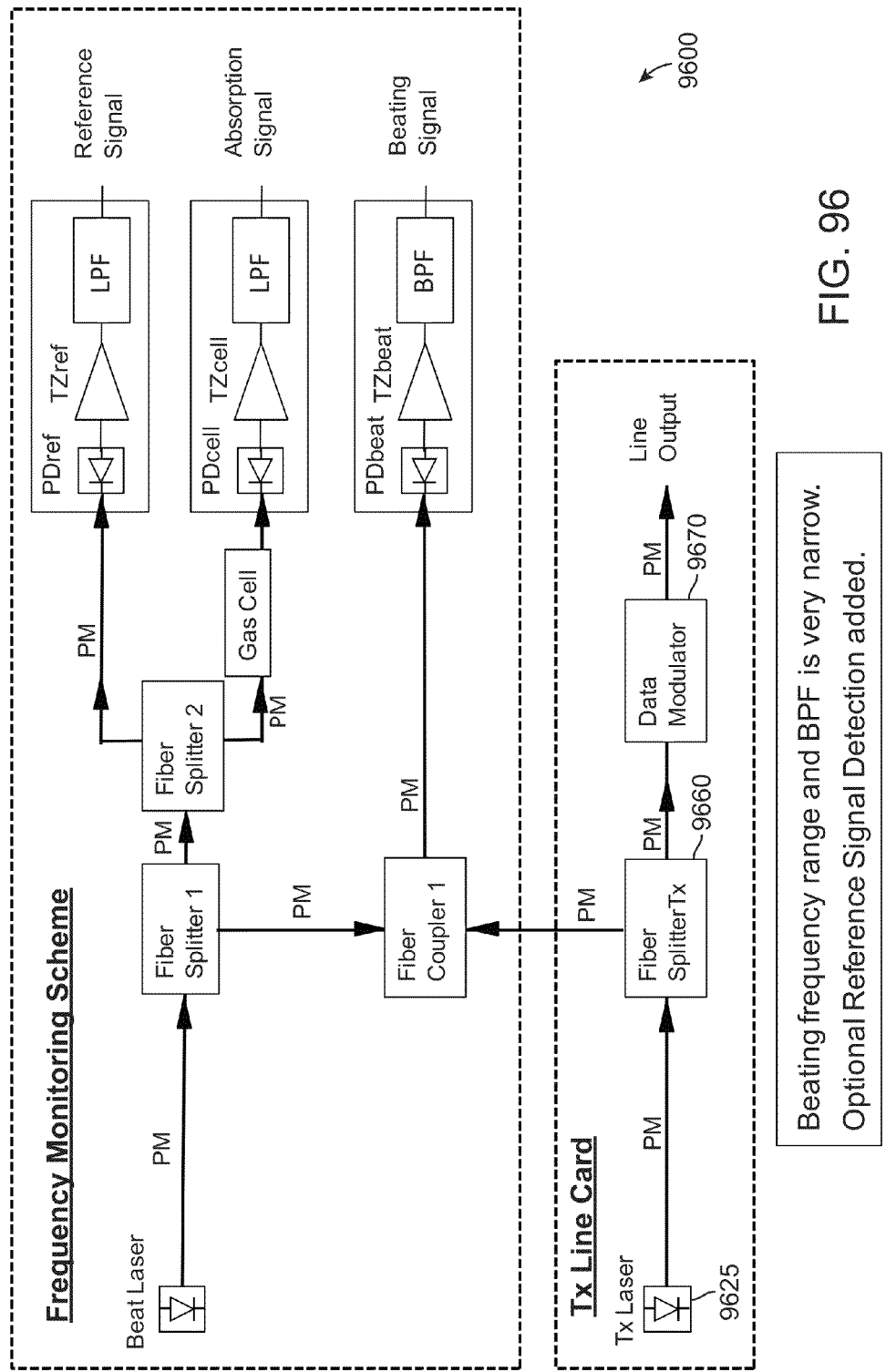

FIG. 96 is a block diagram of one embodiment of an optical frequency stabilization scheme of the present invention where the absolute accuracy of DWDM signal laser frequency is increased by measuring the frequency prior to data modulation.

Figure 97:
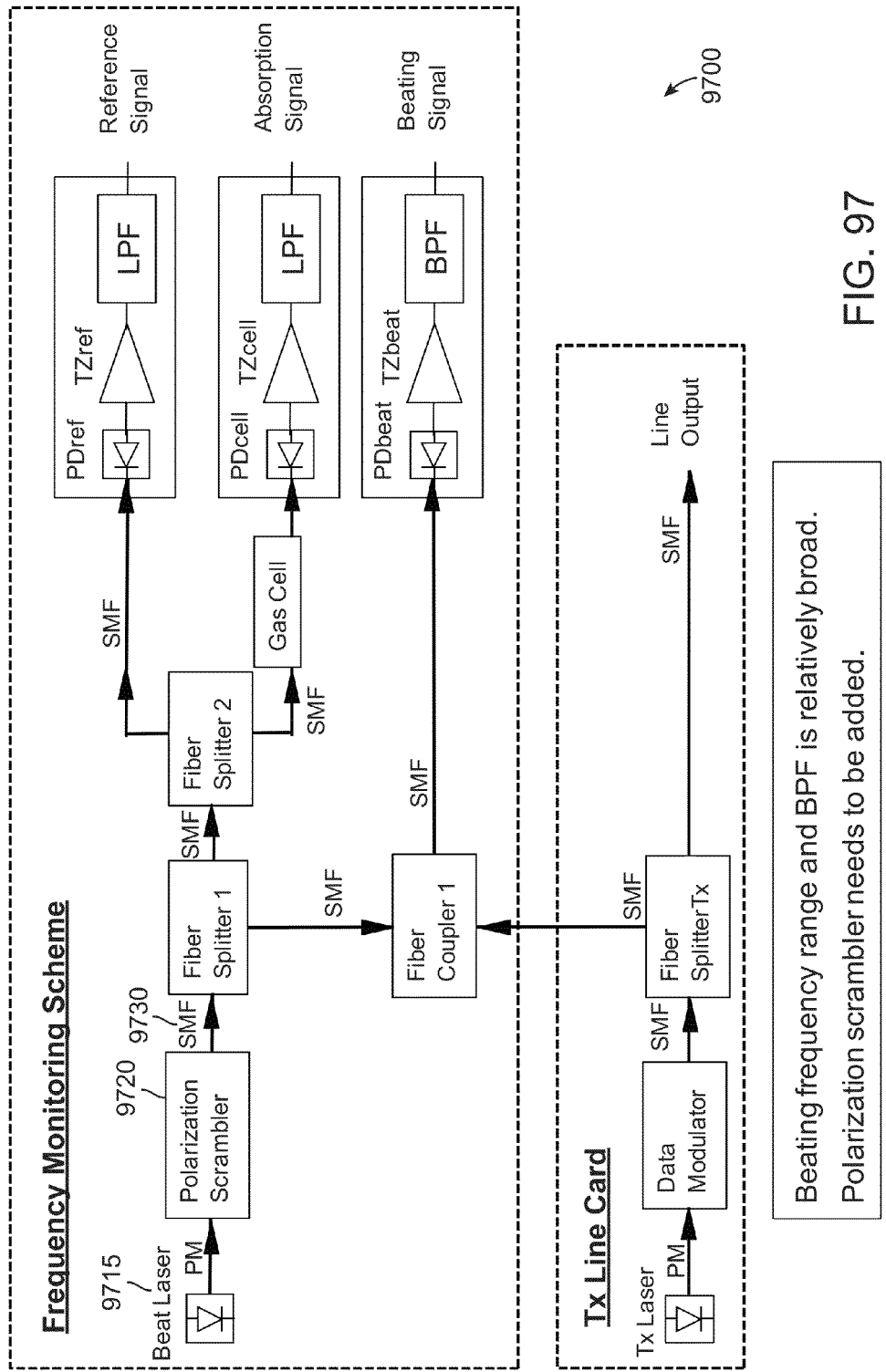

FIG. 97 is a block diagram of one embodiment of an optical frequency stabilization scheme of the present invention where there are no restrictions on the state of polarization of the signal laser (and a single mode fiber can be used for all optical connections except from the Tx Laser to the Data Modulator).

Figure 98:
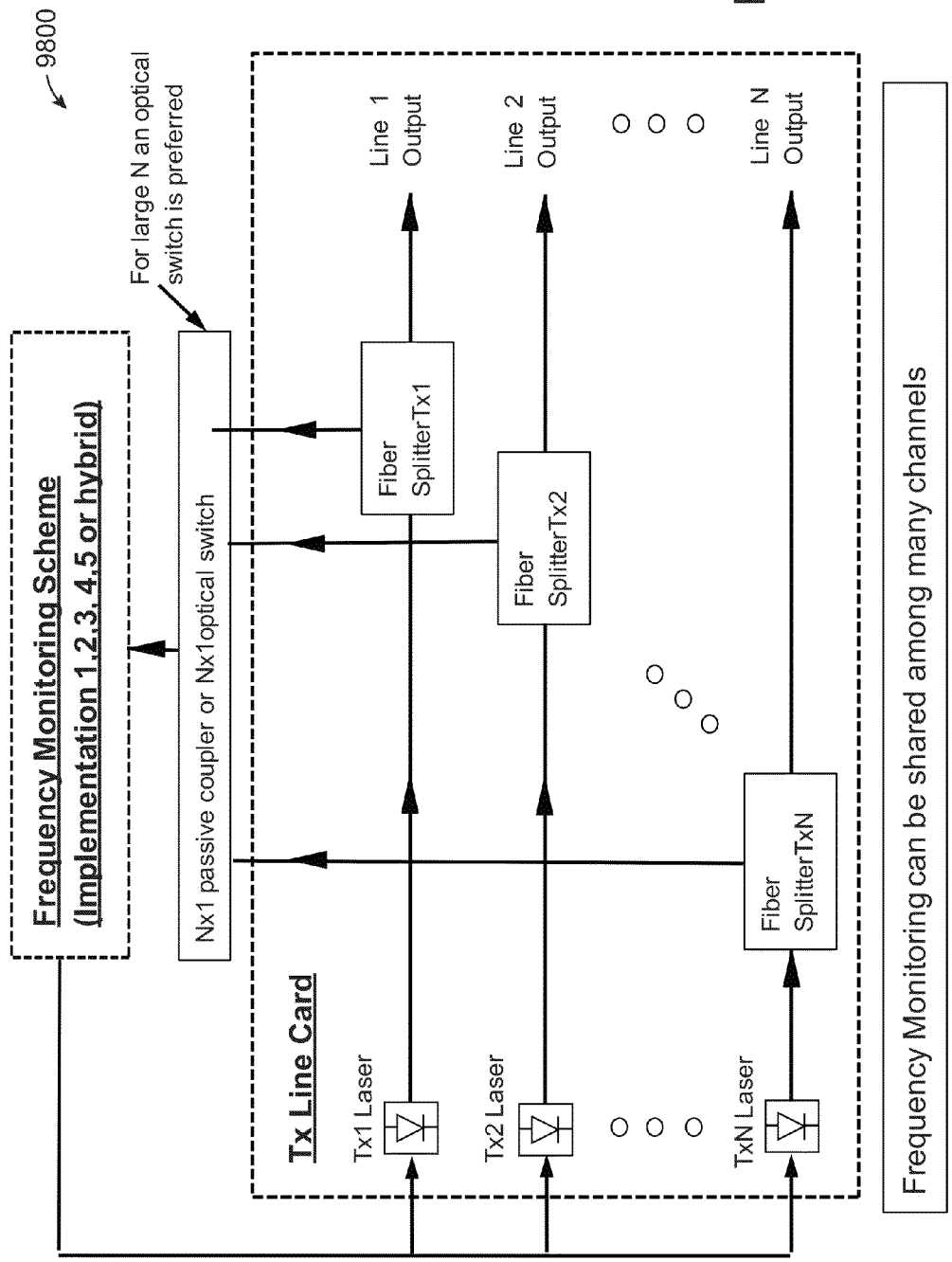

FIG. 98 is a block diagram of one embodiment of an absolute wavelength stabilization scheme of the present invention for multiple DWDM signal lasers propagating in dedicated fibers.

Figure 99:
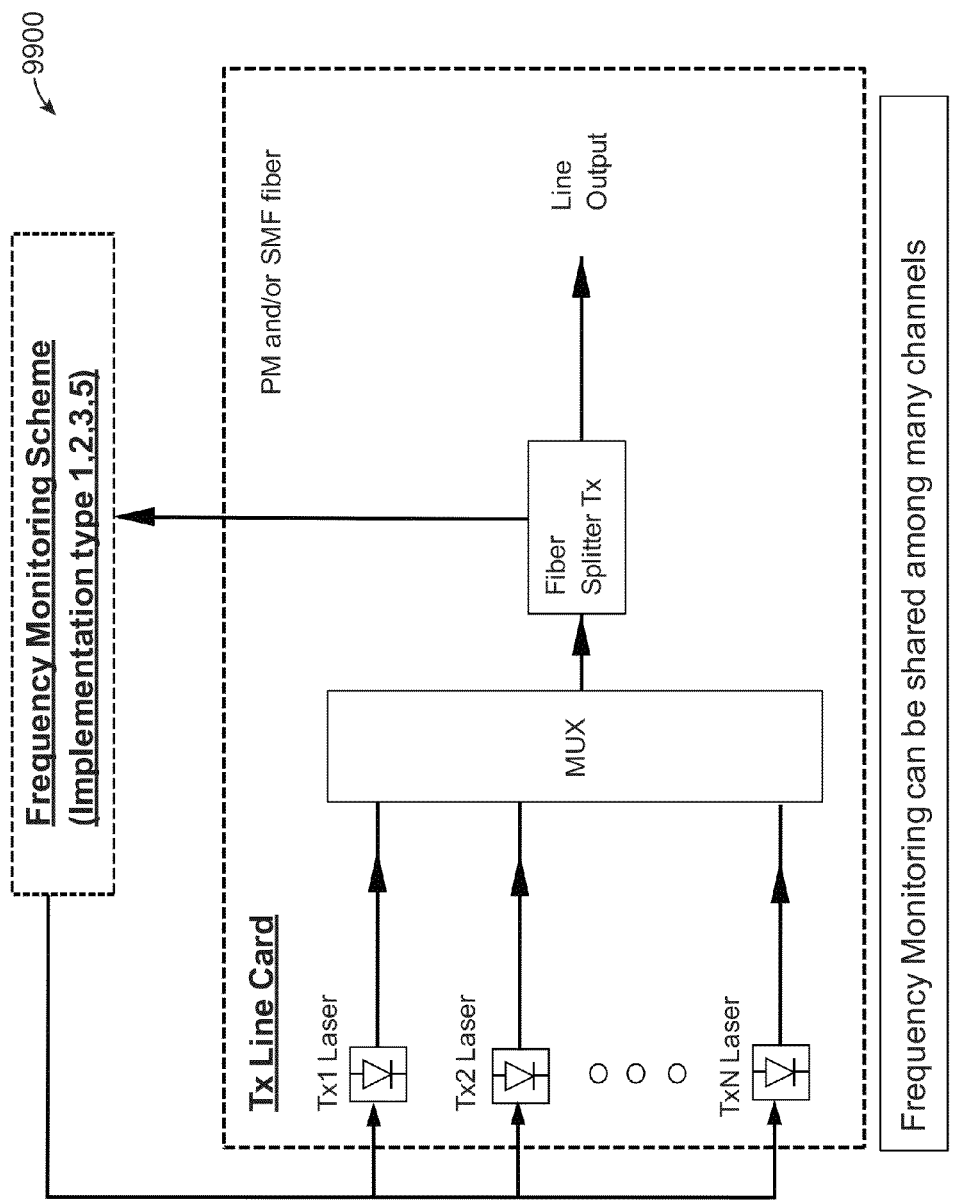

FIG. 99 is a block diagram of one embodiment of an absolute wavelength stabilization scheme of the present invention for multiple DWDM signal lasers propagating in a single fiber.

Figure 100:
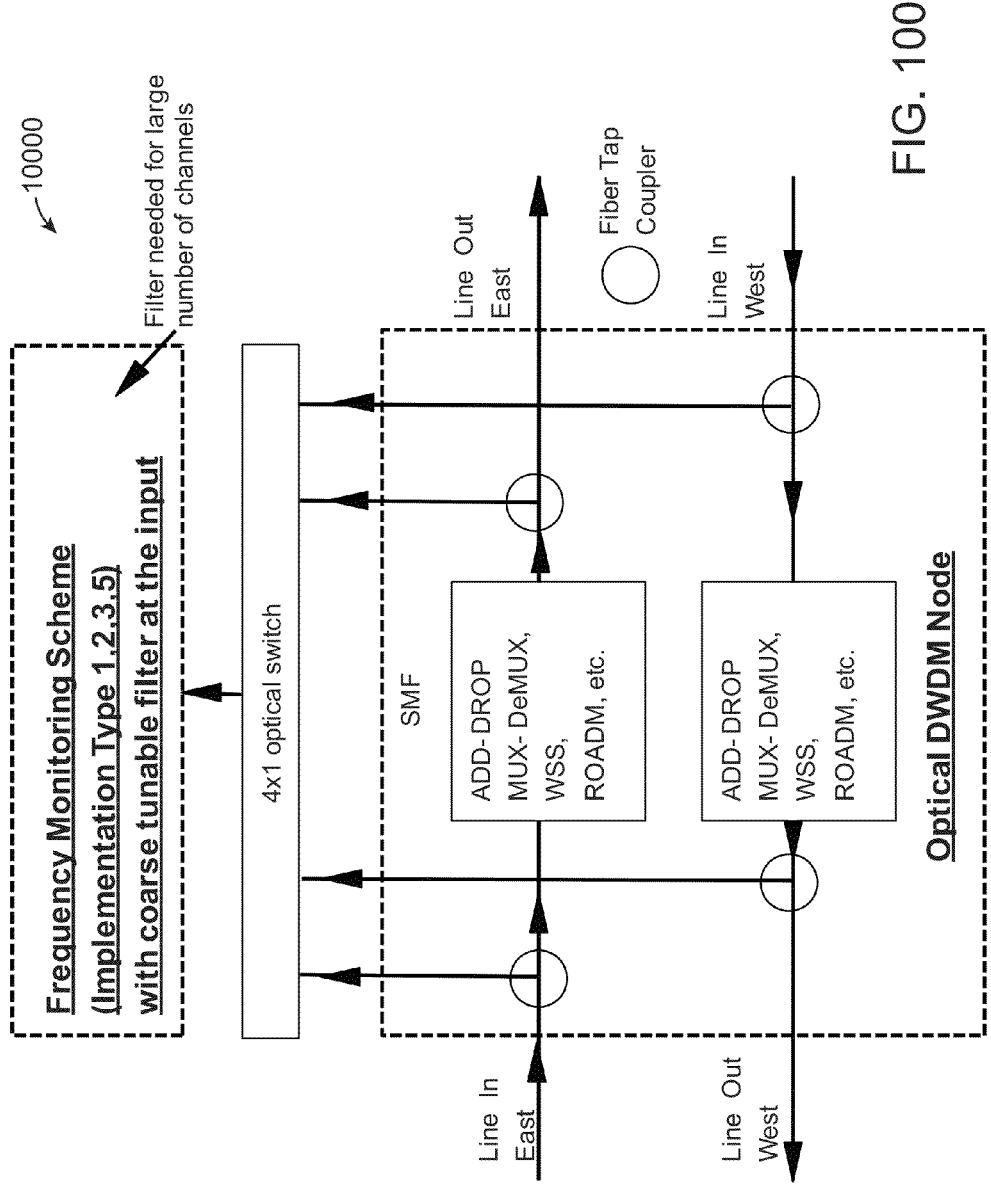

FIG. 100 is a block diagram of one embodiment of a frequency monitoring scheme of the present invention where the DWDM spectrum in a network node (i.e., all incoming and outgoing optical spectra in all fibers of the node) are monitored with ultrahigh absolute accuracy.

Figure 101:
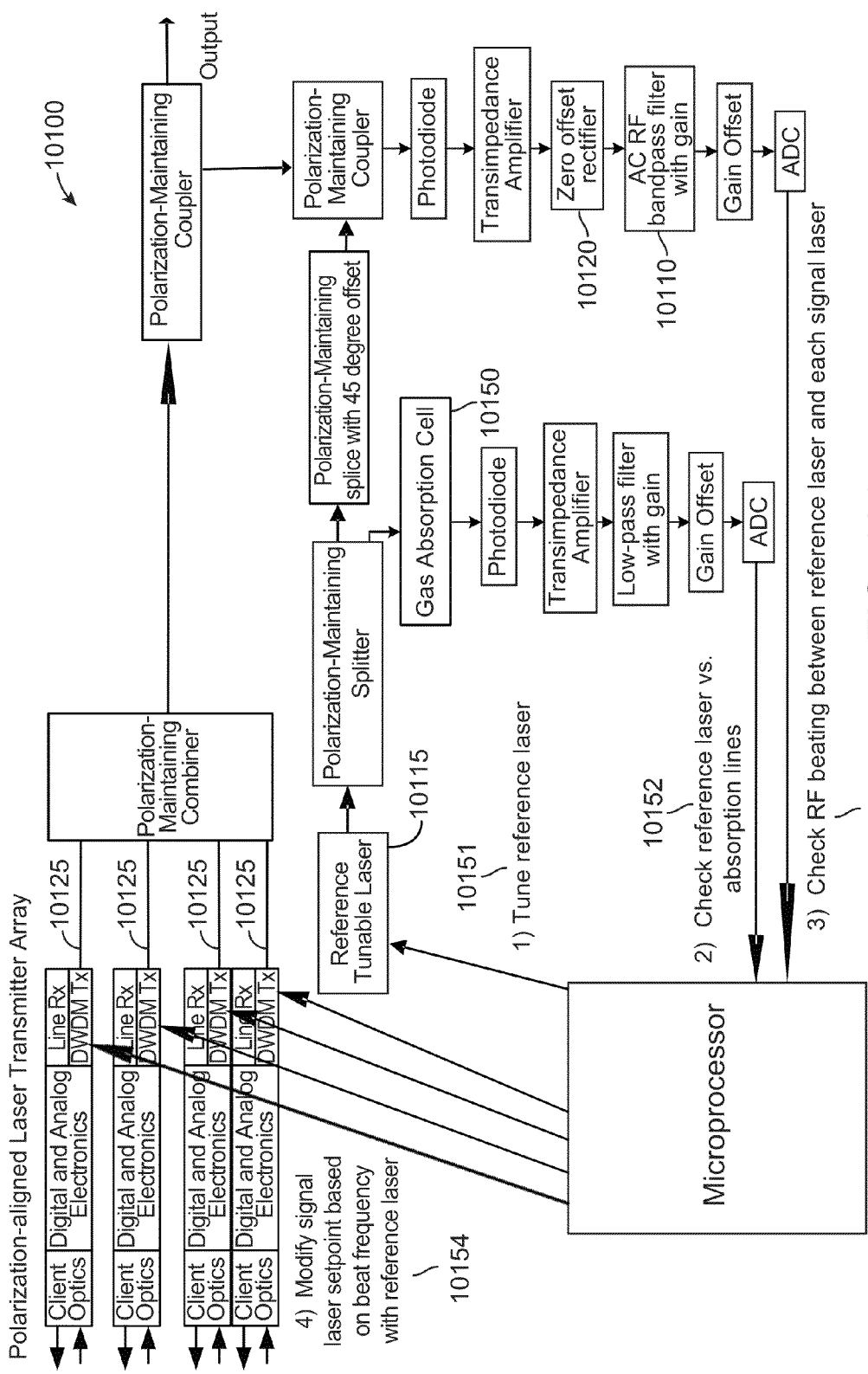

FIG. 101 is a block diagram of one embodiment of a circuit of the present invention to measure the beat signal between a reference tunable laser and an array of signal lasers.

Figure 102:
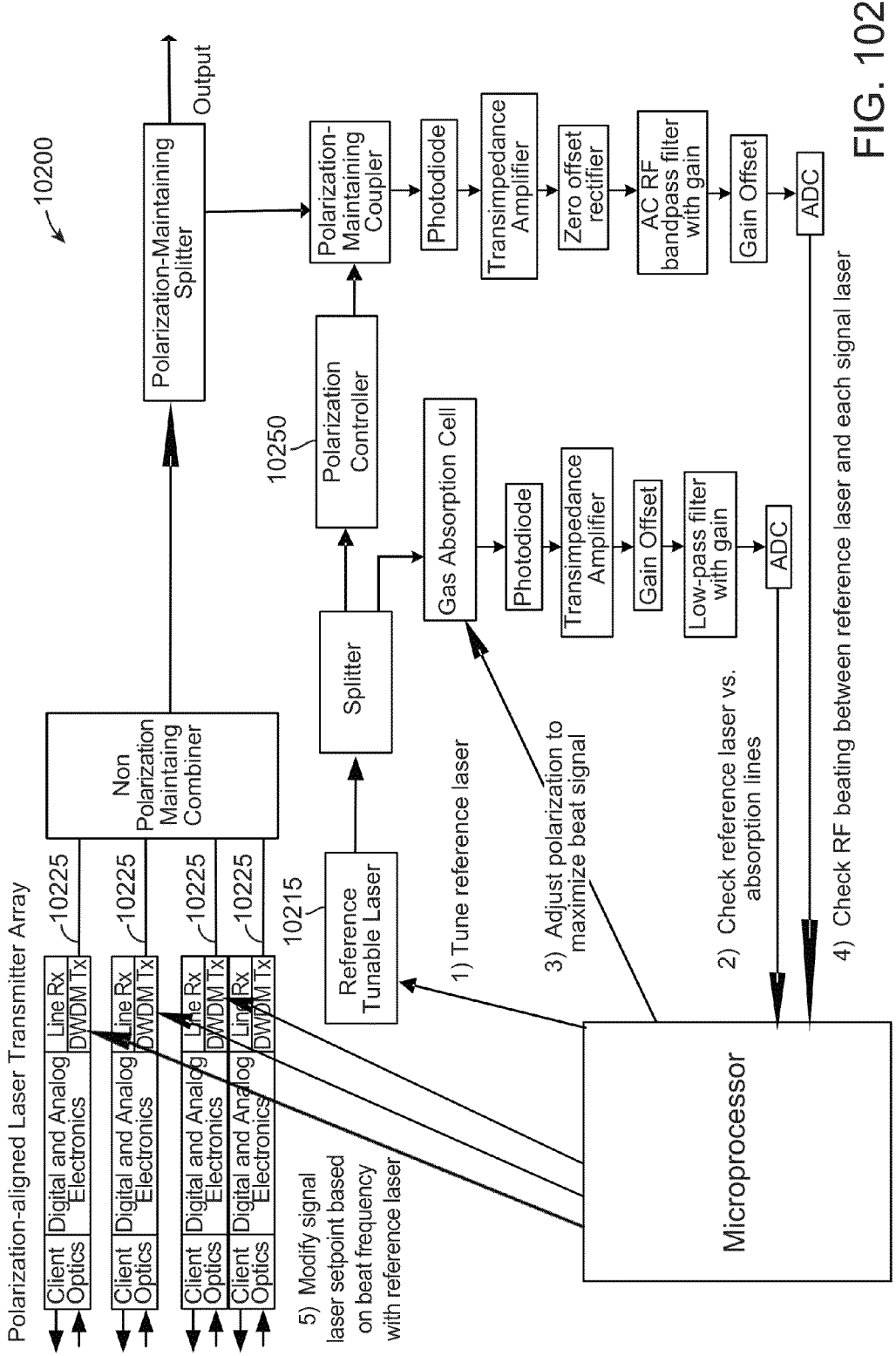

FIG. 102 is a block diagram of one embodiment of a circuit of the present invention to measure the beat signal between a reference tunable laser and an array of signal lasers with a polarization controller.

Figure 103:
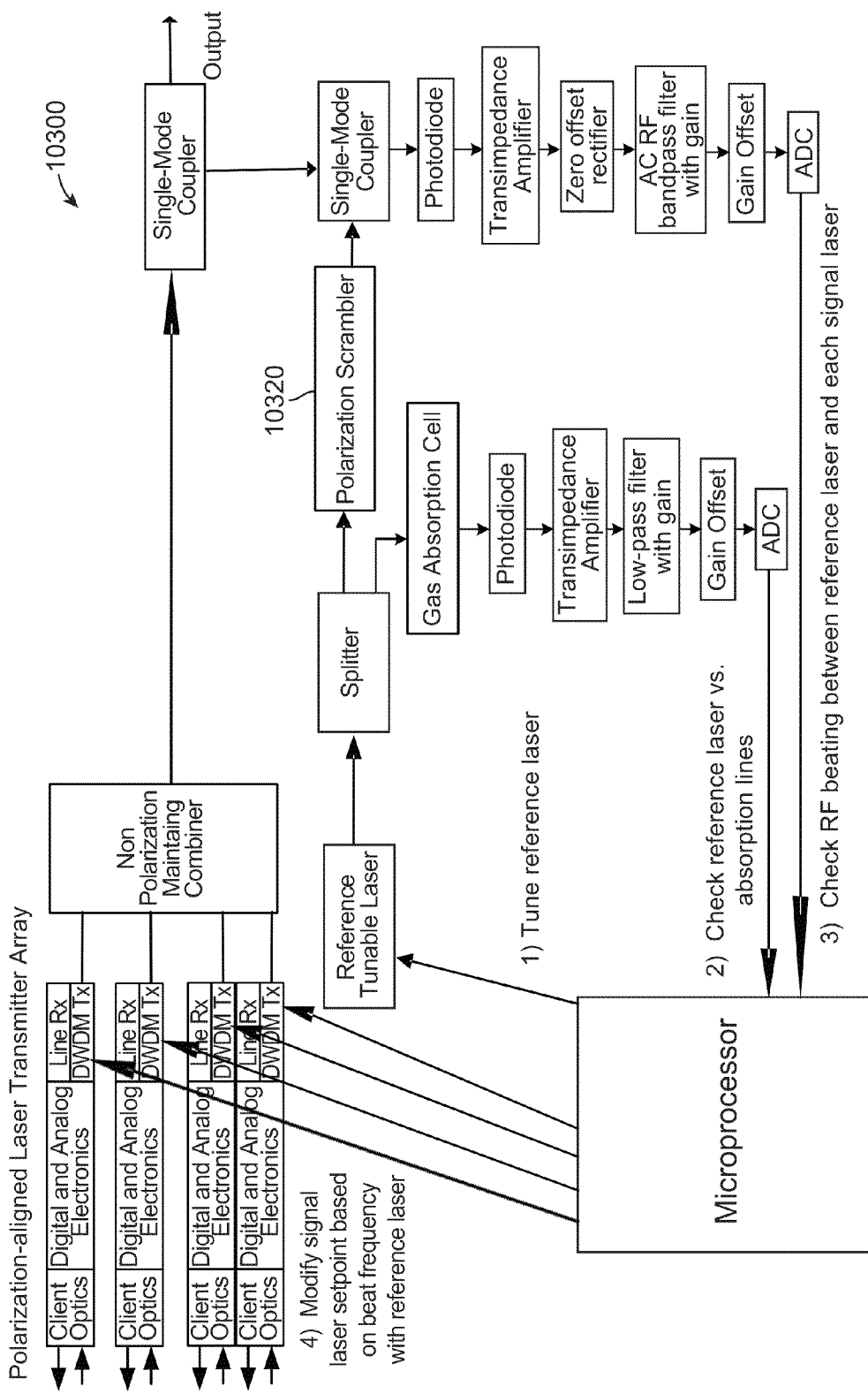

FIG. 103 is a block diagram of one embodiment of a circuit of the present invention to measure the beat signal between a reference tunable laser and an array of signal lasers with a polarization scrambler.

Figure 104:
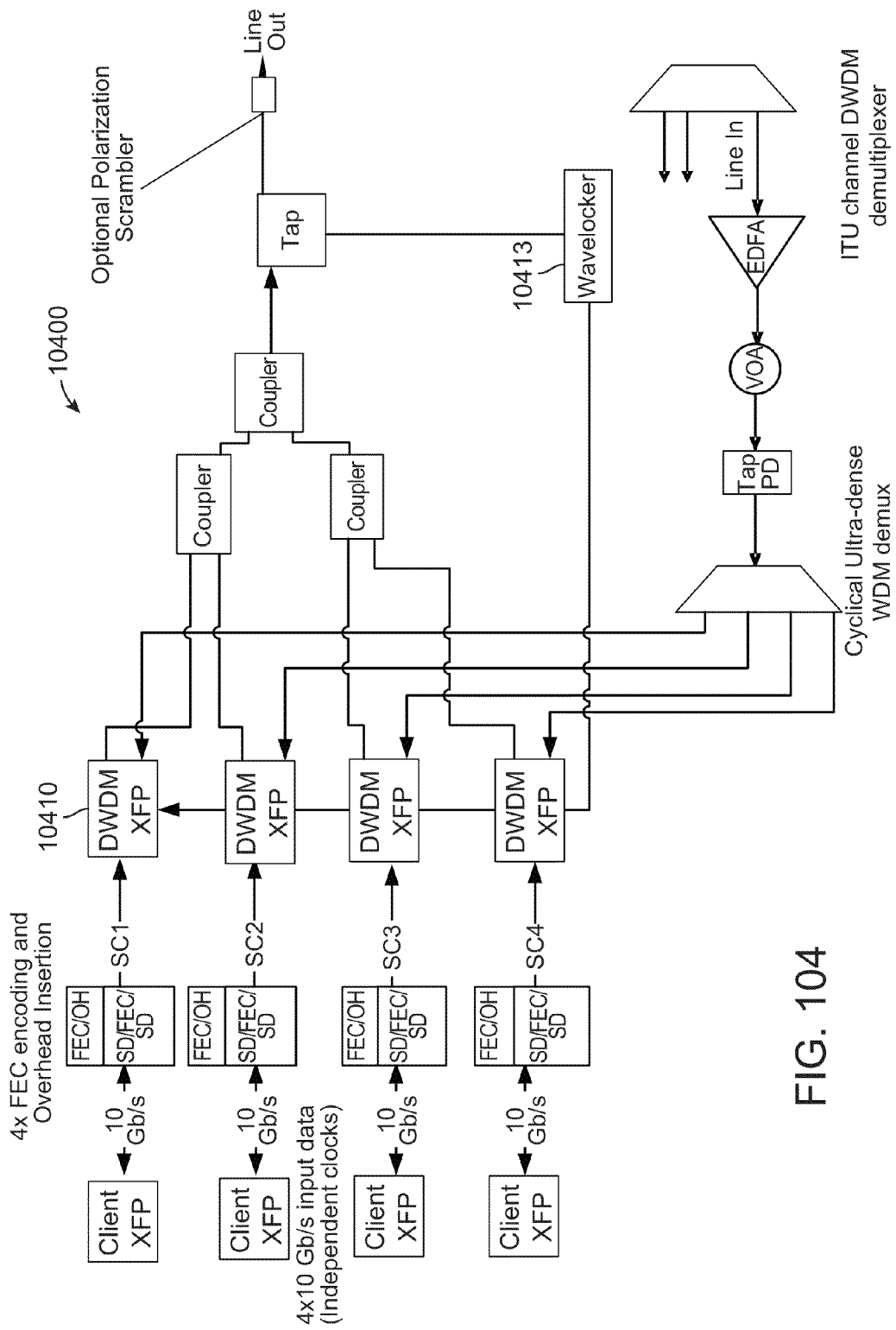

FIG. 104 is a block diagram of one embodiment of a subchannel muxponder of the present invention with integrated DWDM transceivers.

IV. DETAILED DESCRIPTION OF THE CURRENT INVENTION

A. Subchannel Architecture

As noted above, the current invention employs subchannels to increase the number of optical circuits in a single fiber, and leverages those subchannels to fully realize the benefits of the increased bandwidth by facilitating the desired optical routing, switching, concatenation and protection of the client circuits mapped to those subchannels. To illustrate how this subchannel architecture can be implemented in a WDM network, one embodiment of a subchannel muxponder is described, followed by descriptions of the corresponding channel plans, filters and associated hardware and software used to map client circuits to (and extract them from) subchannels across various nodes of a WDM network.

1. Subchannel Muxponder

Figure 15:
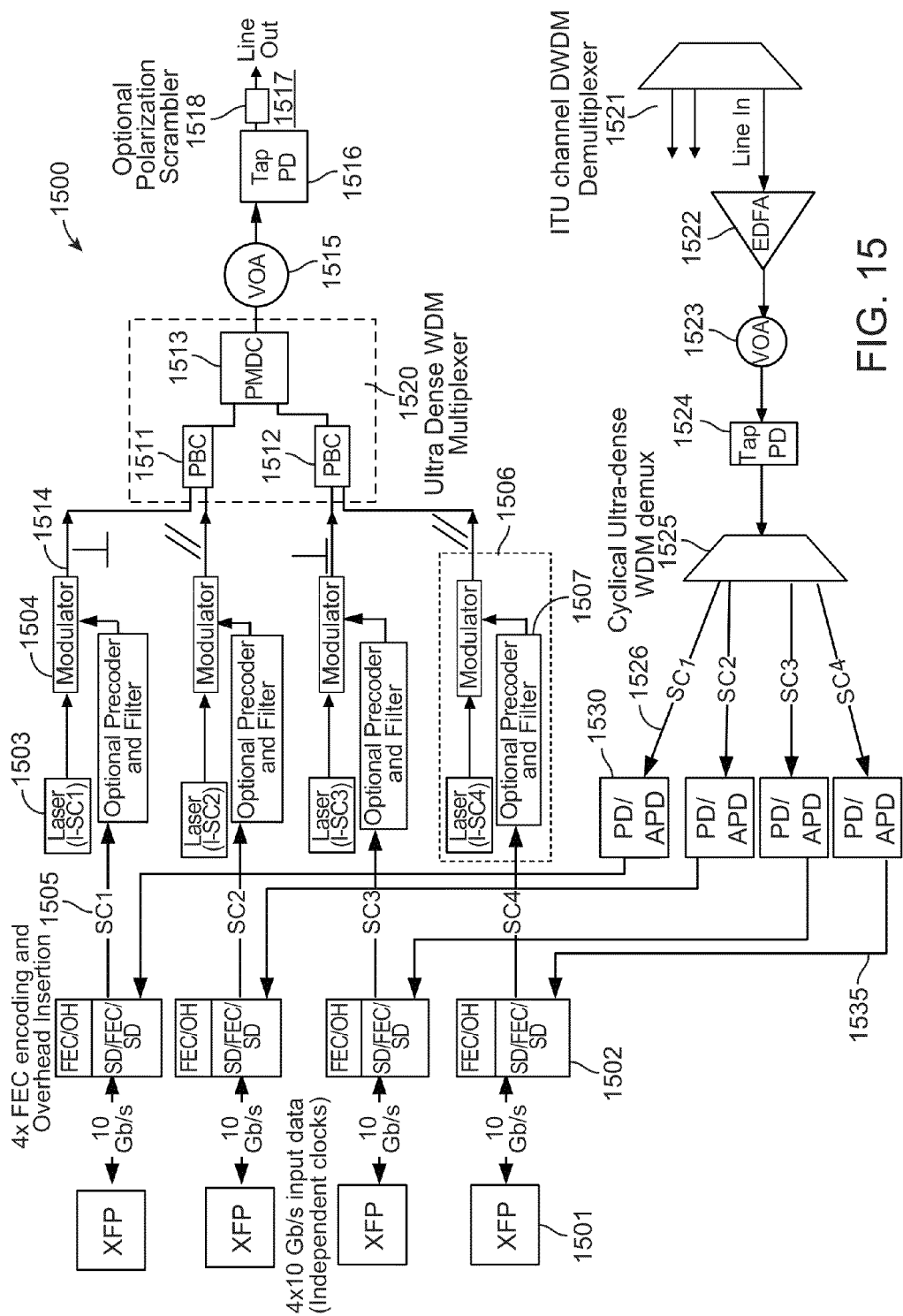
FIG. 15 is a block diagram of one embodiment of a subchannel muxponder of the present invention.

One embodiment of a subchannel muxponder 1500 is shown in FIG. 15. In this embodiment the subchannel muxponder maps data from client traffic onto four subchannels. Data from the client traffic is terminated with client optics, 1501, typically pluggable devices such as an XFP, Xenpak, or SFP.

After the optical client signal is converted to an equivalent electrical signal on the subchannel muxponder, each subchannel's electrical signals can be processed digitally to optionally (1) extract performance monitoring information, (2) add channel overhead for remote network management, and (3) encode the data for forward error correction. This can be done with the SERDES-FEC-SERDES block, 1502 (SERDES=Serializer-Deserializer). The 10 Gb/s deserializer converts the data to parallel streams of lower-rate data that are then processed by an FEC device.

The data is thereby mapped to a subchannel within an FEC frame. Management overhead can optionally be inserted into one or more of the FEC frames. Moreover, in one embodiment, block 1502 can also monitor a client signal's overhead bytes to extract various data, such as a "destination tag" (e.g., an Ethernet address, IP address, VLAN ID, MPLS tag, etc.). The header information can be relayed to the management software that uses the destination tag to determine the destination port. The management software can then provision the subchannel frequency to the frequency assigned to that destination port.

Controlling wavelength switching in an optical network based on destination tags can, in one embodiment, proceed as follows:
1. Network operator provisions switching mechanism, e.g. Virtual Local Area Network identifiers
2. Client receiver detects source address (SA) and destination address (DA)
3. NE broadcasts SA to other nodes over OSC or in-band overhead
4. NE broadcasts DA to other nodes paired with receiver ITU channel and subchannel. ITU channel can be a fixed value (determined by fixed drop filter) or range of values if ROADM is being used.
5. The nodes distribute the SA/DA information to build up a network-wide distributed switch table
6. Given an associated DA with ITU channel and subchannel, a signal appearing at a client port causes the source node to tune its subchannel frequency wavelength to the correct subchannel frequency
7. If required, ITU channel filter ROADM add/drop/passthrough channels are tuned accordingly
8. Client Rx periodically checks the SA/DA and triggers a wavelength change when the DA changes Returning to FIG. 15, an optical modulator 1504 modulates a CW laser beam to produce a modulated laser beam that carries the respective lower speed electronic signals 1505. Each tunable laser 1503 is set to an ITU G.692 frequency, with an offset dependent on the subchannel. The different electronic-to-optical conversion units 1506 are configured to have different lasers 1503 at different subchannel frequencies that may or may not be within the same ITU G.692 channel. The subchannel lasers 1503 can therefore be (a) assigned to different subchannels within different ITU G.692 windows, and (b) be transmitted to different receive nodes that have different ITU channel filters.

This embodiment can be distinguished from subcarrier multiplexing [such as was described in U.S. Pat. No. 6,525,857] where a single laser is deployed for a group of subcarriers. Here, each subchannel has its own independently tuned and modulated laser, and each subcarrier can carry independent protocols. Moreover, there are no restrictions at the transmit side on the frequency spacing between subchannels, and each subchannel can be transmitted in a different ITU channel.

The modulation of each subchannel can be selectively chosen to be one of many different types of modulation such as Non-return to Zero, Duobinary, or Differential Quadrature Phase Shift Keying. Modulation formats with a narrow spectral width, such as duobinary and DQPSK, are favored because their spectra must pass through the narrow-band filter 1525 at the receive side. If duobinary modulation is used, a precoder and low-pass filter 1507 are inserted in the data path. The precoder is used such that the recovered signal is identical to the transmitted signal. For a duobinary signal of a bandwidth of B, the low-pass filter passband is set to approximately from 0.2B to 0.3B, in which the electrical baseband modulation signal swings from $-V_\pi$ to $+V_\pi$ (with the modulator biased at a minimum point). The modulation signal is then fed into the optical modulator 1504 to control the optical modulation which produces the optical WDM signal 1514.

The light from each subchannel is then combined optically with a polarization combiner, 1:4 coupler, or subchannel multiplexing filter 1520. In the illustrated example, the optical polarization of each signal is controlled so that two optical WDM channels next to each other in frequency are orthogonally polarized to each other. The optical WDM channels in the same polarization are directed into beam combiners 1511 and 1512 to produce a combined signal with optical channels in the same polarization. Two such beam combiners 1511 and 1512 are used, one for each polarization. The combined signals from the beam combiners 1511 and 1512 are directed into a polarization-maintaining directional coupler 1513, to produce an output signal that combines all subchannels 1514 so that any two adjacent subchannels have orthogonal polarizations.

Having adjacent channels launched at orthogonal polarizations minimizes crosstalk penalties at the receiver. However, when the adjacent lasers on the subchannel transceiver are allowed to be set to arbitrary ITU G.692 channels and subchannels, the adjacent subchannel at a receiver may be transmitted from completely different source locations. In this case it is very difficult to maintain orthogonal polarizations between the adjacent signals. To minimize penalties in this case, an optional polarization scrambler 1518 can be inserted in the path to reduce the crosstalk penalties. Regardless of the means to control polarization of the adjacent subchannels, the system impact of adjacent-channel crosstalk must be quantified and accounted for during the network engineering. Typically, the crosstalk penalty leads to a slight increase in the required Optical Signal-to-Noise Ratio (OSNR) at the receiver.

A variable optical attenuator (VOA) 1515 combined with a tap coupler and monitor photodiode 1516 can optionally be used to control the output power of the combined subchannels. If the output is too low an optional optical amplifier 1517 could also be inserted in the transmit path. This output signal is transmitted through a single fiber connected to the line output port that is connected to an optical network. Note that it is preferable to use a VOA to control the output power, rather than adjusting the laser power. Keeping the laser power fixed in time (after initial calibration) simplifies the control circuits that maintain the transmit eye quality. The optical network transmits the subchannels from the transmit node through optical fiber waveguides to the receive node.

On the receive side an optical amplifier and/or variable attenuator can be used to control the received power. In this example, the ITU G.692 channel WDM demultiplexer 1521 is used to receive the light from the network and select the subchannels in a single ITU channel to be directed to the Line Input port of the subchannel transceiver.

On the receive side of the transceiver an optional optical amplifier 1522 (e.g. an EDFA) can be used to amplify the received signal. An optical attenuator 1523 with tap coupler and monitoring photodiode 1524 after the amplifier 1522 can be used to ensure that the amplified signal does not overload the photodetectors 1530. Furthermore, control software can be used to control the variable optical attenuator VOA 1523 so that the optical power incident on each photodetector 1530 is kept very close to the ideal incident power of the photodetector 1530, thereby optimizing system performance. Preferably, EDFA 1522 is kept at high gain (hence low noise and high optical signal to noise ratio) and uses the VOA 1523 to optimize the received powers.

Note that the EDFA 1522 and VOA 1523 at the receiver can be shared among the subchannels, dedicated to a single subchannel, or not used at all. These choices depend on the requirements for the reach of the subchannel muxponder and the cost targets.

The composite signal containing the subchannels is then directed to an Ultra-dense WDM filter 1525 that separates the subchannels to output paths 1526. The cyclical filter 1525 described below requires that the subchannel spacing be equal to the ITU frequency spacing (in GHz) divided by an integer M. In the case when the bit rate per subchannel is on the order of 11 Gb/s, the channel spacing is typically set at 10 or 12.5 GHz.

Multiple optical detectors 1530 are used to respectively receive and detect the separated optical subchannel signals, with one subchannel per detector, to produce electronic signals 1535 that are directed back to the FEC blocks 1502. Each electronic signal path may include an electrical equalizer that is typically integrated into the photodetector's transimpedance amplifier or deserializer. The equalizer can mitigate the eye distortion, either due to static band-limiting effects caused by the electrical or optical pre-filtering in the optical transmitter module, or due to fiber chromatic dispersion.

The SERDES-FEC-SERDES block 1502 then decodes the FEC frame, corrects the errors according to the FEC algorithm, demaps the data, and optionally provides performance monitoring information on the data that is directed to the client transmit optical transceivers 1501.

Note that each subchannel has independent clock recovery and generation circuitry to support different data rates and protocols. One embodiment of these circuits is shown in detail in FIG. 16.

Figure 16:
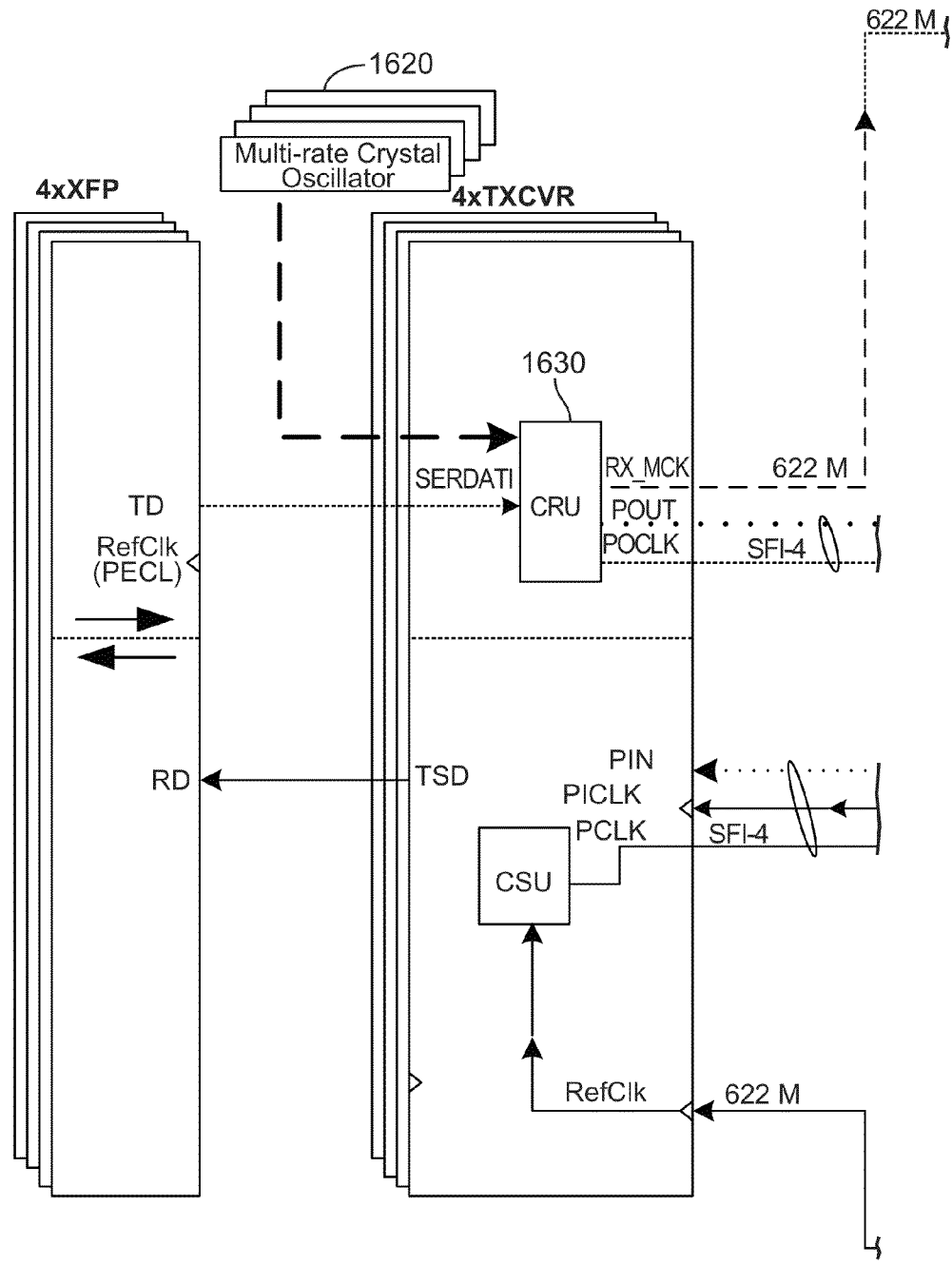
FIG. 16 is a block diagram of one embodiment of multichannel clock recovery circuits in a subchannel muxponder of the present invention.
Figure 16:
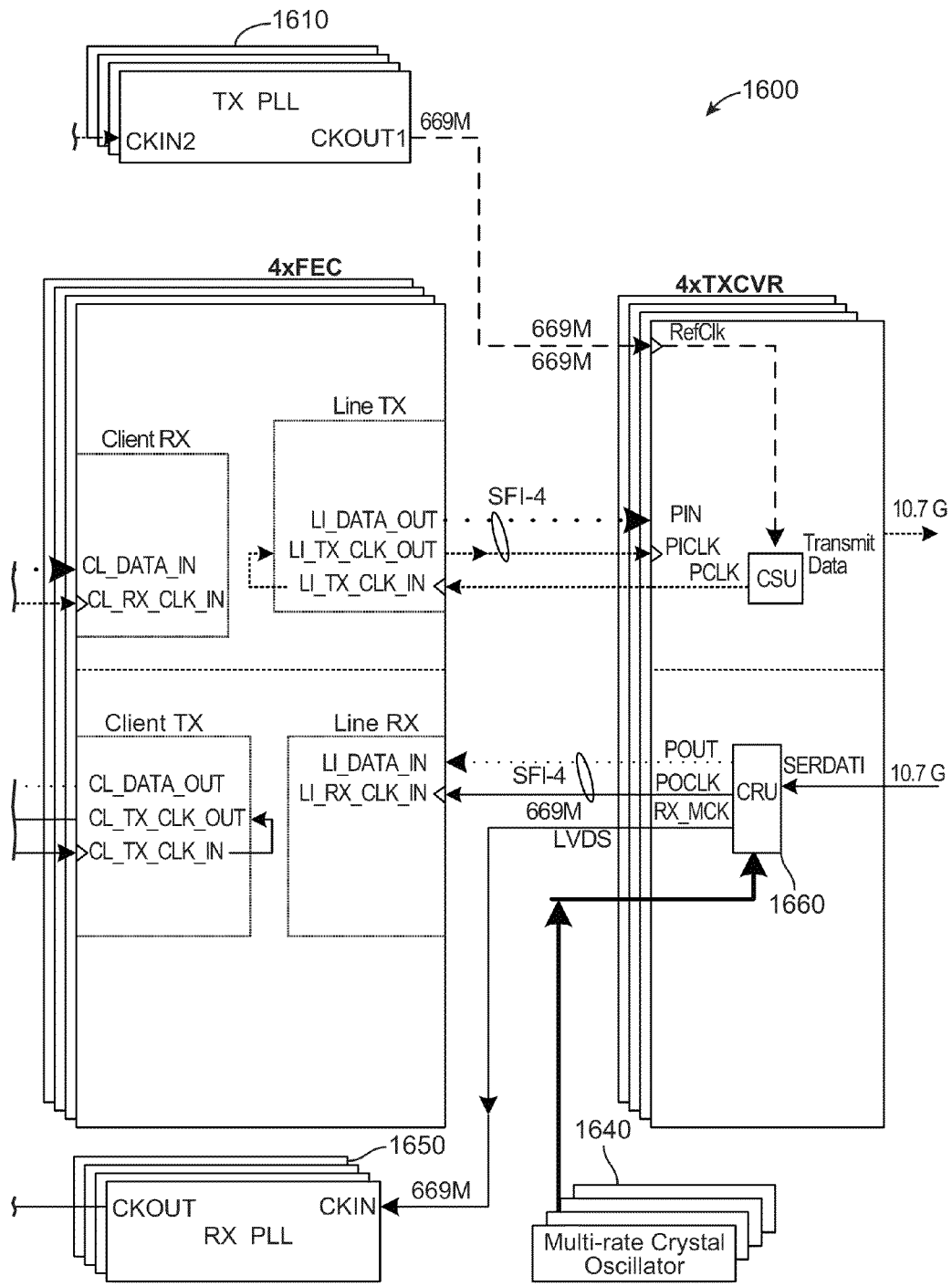

Circuit 1600 in FIG. 16 shows one embodiment of independent clock circuits for the subchannel timing of the SERDES-FEC-SERDES block. Each client-side clock recovery unit (CRU) 1630 has a multi-rate reference clock 1620 that can be set independently for each subchannel's reference clock rate. A transmit digital phase-locked loop (PLL) 1610 for each subchannel multiplies the recovered client clock by a factor that provides the FEC rate clock. Similarly, the line side SERDES has a multi-rate reference clock 1640 for each subchannel receiver CRU 1660, and a receive PLL 1650 is used to convert the subchannel FEC rate clock to the subchannel client rate. The reference clocks 1620 and 1640 can also be used as the source clocks to transmit maintenance signals, such as an OTN AIS (Alarm Insertion Signal) when the client services are in an alarm state or out of service. Note that running each client service on an independent subchannel maintains the end-to-end synchronization of each client service. Compared to implementations that use electronic multiplexing to combine 10 Gb/s client services into a native 40 Gb/s service, this invention provides a distinct advantage for applications such as SONET and Synchronous Ethernet that require end-to-end synchronization of the client signals.

The subchannel muxponder (e.g., subchannel muxponder 1500 from FIG. 15) supports capacity upgrades of ITU channel-based networks. The transmission symbol rate (e.g., 10

Gbaud) per subchannel is equivalent to an existing low-data rate (e.g., 10 Gb/sec), which is already running on the incumbent infrastructure. This limits signal degradations caused by network impairments such as chromatic dispersion (CD), polarization-mode dispersion (PMD), and amplifier noise within the incumbent optical fiber infrastructure. Therefore, if the fiber network has been designed to work at line rates of 10 Gb/s the network infrastructure (amplifiers and dispersion compensation modules) need not be changed when implementing the subchannel optical transceiver since the bit-rate dependent penalties of the subchannel and ITU channel are equivalent. In this embodiment, the subchannel muxponder can be used to increase the available bandwidth in an ITU channel by four times without changing or modifying the network. Furthermore, allowing the control software to provision the subchannel laser wavelengths at different ITU channels enables the subchannel muxponder to perform optical routing based on the subchannel frequencies.

To optimize optical performance it may be required to balance the powers of the subchannels. This can be accomplished after the subchannel muxponder is activated by turning on one laser at a time, recording the power on the tap photodiode of each laser and applying an offset to each laser to compensate for the power differences. This balancing can be done at low output power with the VOA at or near full attenuation.

Figure 17:
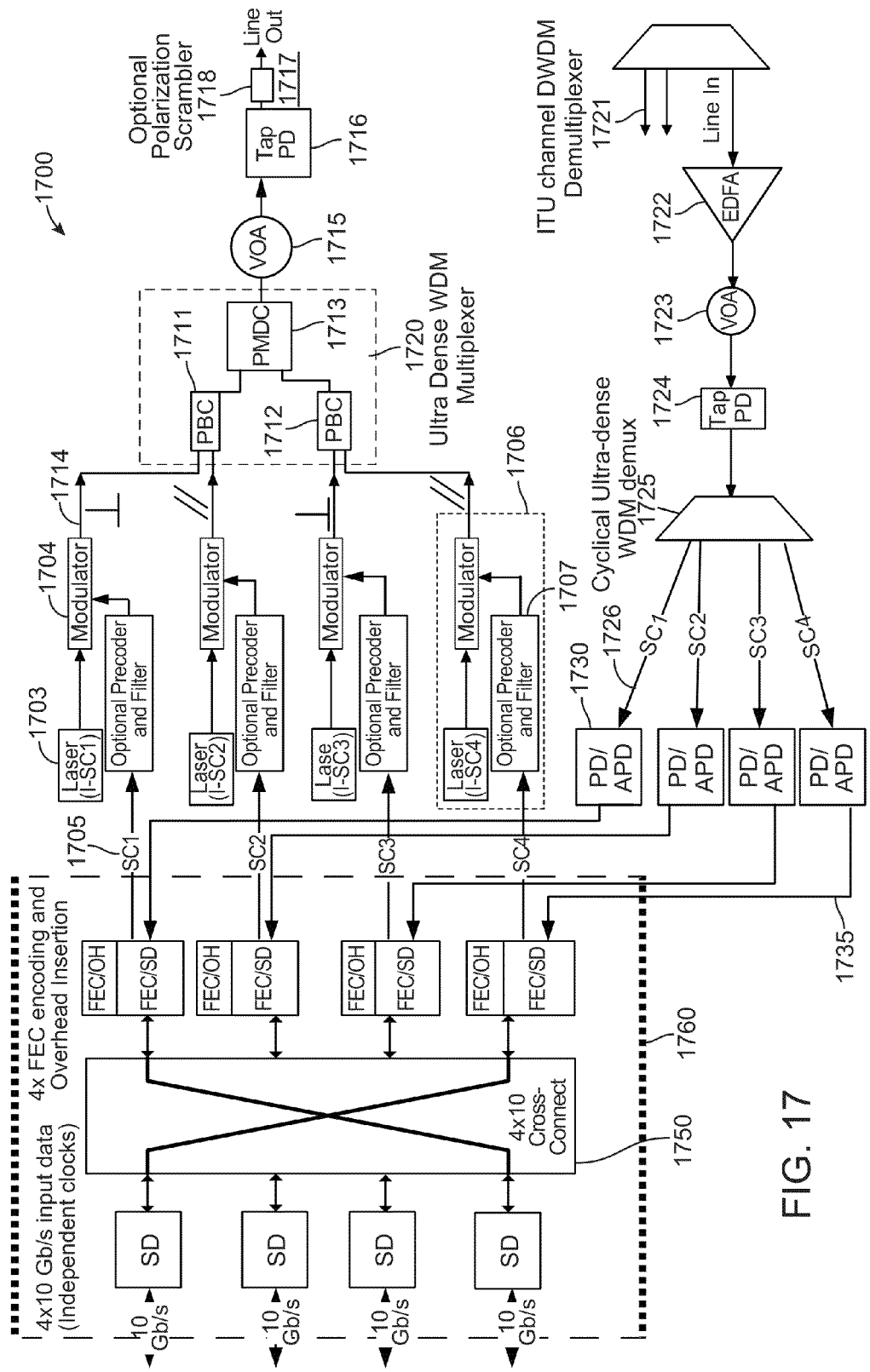
FIG. 17 is a block diagram of one embodiment of a subchannel muxponder of the present invention with an electrical crossconnect switch.

FIG. 17 shows another embodiment of a subchannel muxponder 1700 with an electronic crossconnect. The crossconnect switch 1750 is added between the SERDES and external FEC blocks and provides further switching and routing functionality as described below. Note that the SERDES, FEC, and crossconnect functions can be integrated into a single VLSI device 1760.

2. Channel Plans

Figure 18:
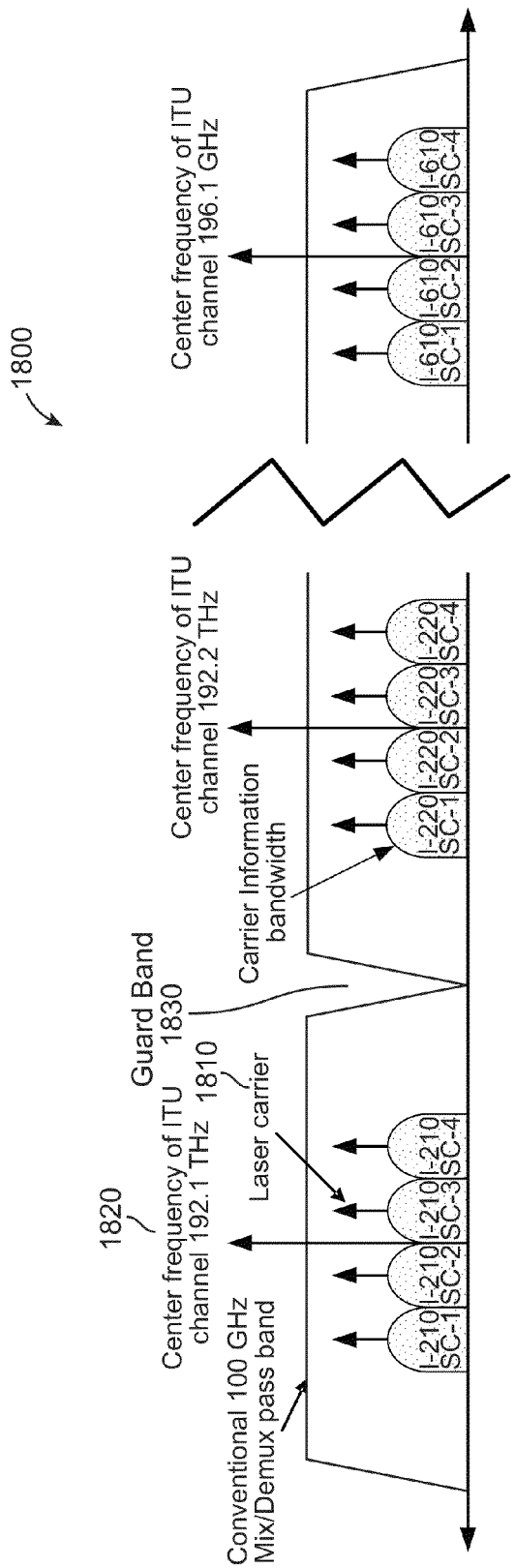
FIG. 18 illustrates one embodiment of an overlay of the subchannels of the present invention on 100-GHz ITU channels and filters.

An example of a channel plan 1800 followed by the disclosed design is shown in FIG. 18. In this embodiment, the carriers 1810 are spaced 12.5 GHz apart centered around ITU channels 1820 spaced at 100 GHz. There is a guard band 1830 between the ITU channels 1820 where no carriers are present. This allows for bandwidth narrowing of the ITU channel as it passes through optical elements in the transmission network.

In this embodiment of the present invention, tunable lasers are used to generate each subchannel, so that any client signal can be transmitted on any of the subchannels.

The receiver demultiplexing required in this network consists of two stages. The first stage is comprised of fixed, tunable, or reconfigurable ITU-T G.692 channel filters that may be built with technologies such as (but not limited to) thin-film filters, Array Waveguide Gratings, MEMS arrays, or diffraction gratings. The second stage of demultiplexing in this network consists of a narrow-band cyclical or tunable filter to select one of the subchannels within the ITU passband. Example of a cyclical filter are the Array Waveguide Grating and cascaded interleavers.

Figure 19:
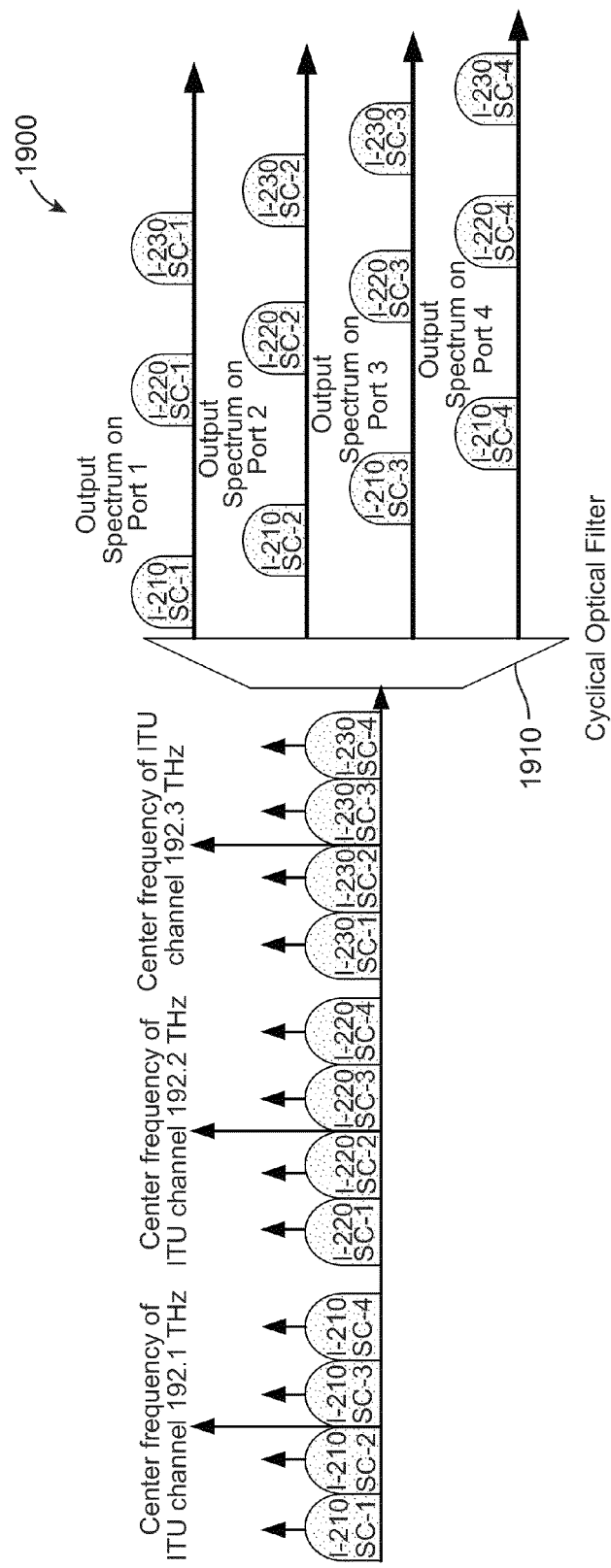
FIG. 19 illustrates the characteristics of one embodiment of cyclical filters of the present invention.

A common characteristic of cyclical filters in this network design is that the nth subchannel in each ITU window is directed to the nth output port, as shown in channel plan 1900 in FIG. 19, and implemented by cyclical filter 1910.

Figure 20:
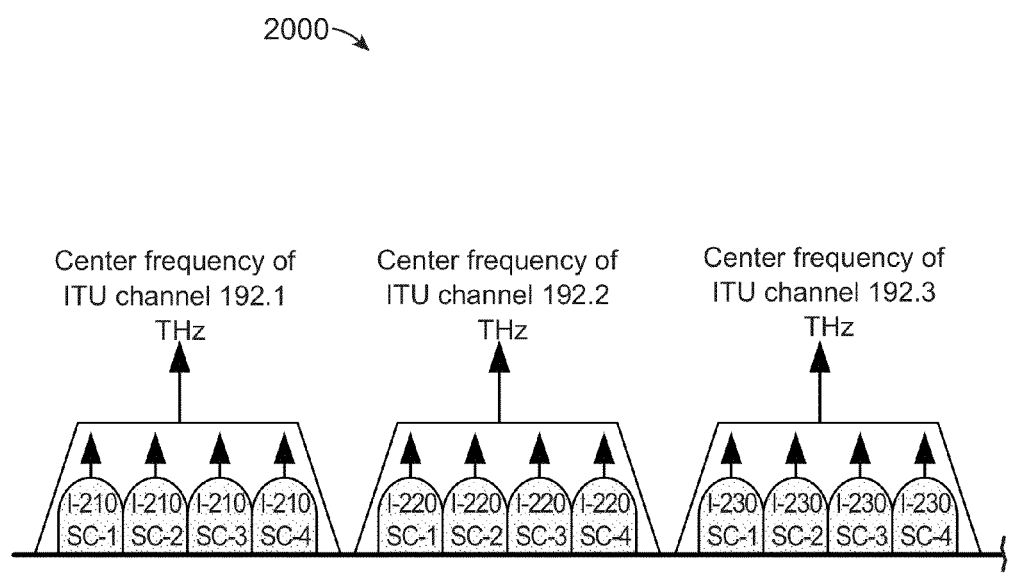
FIG. 20 illustrates the filtering of subchannels in one embodiment of the present invention, where an ITU filter is followed by cyclical filters.
Figure 20:
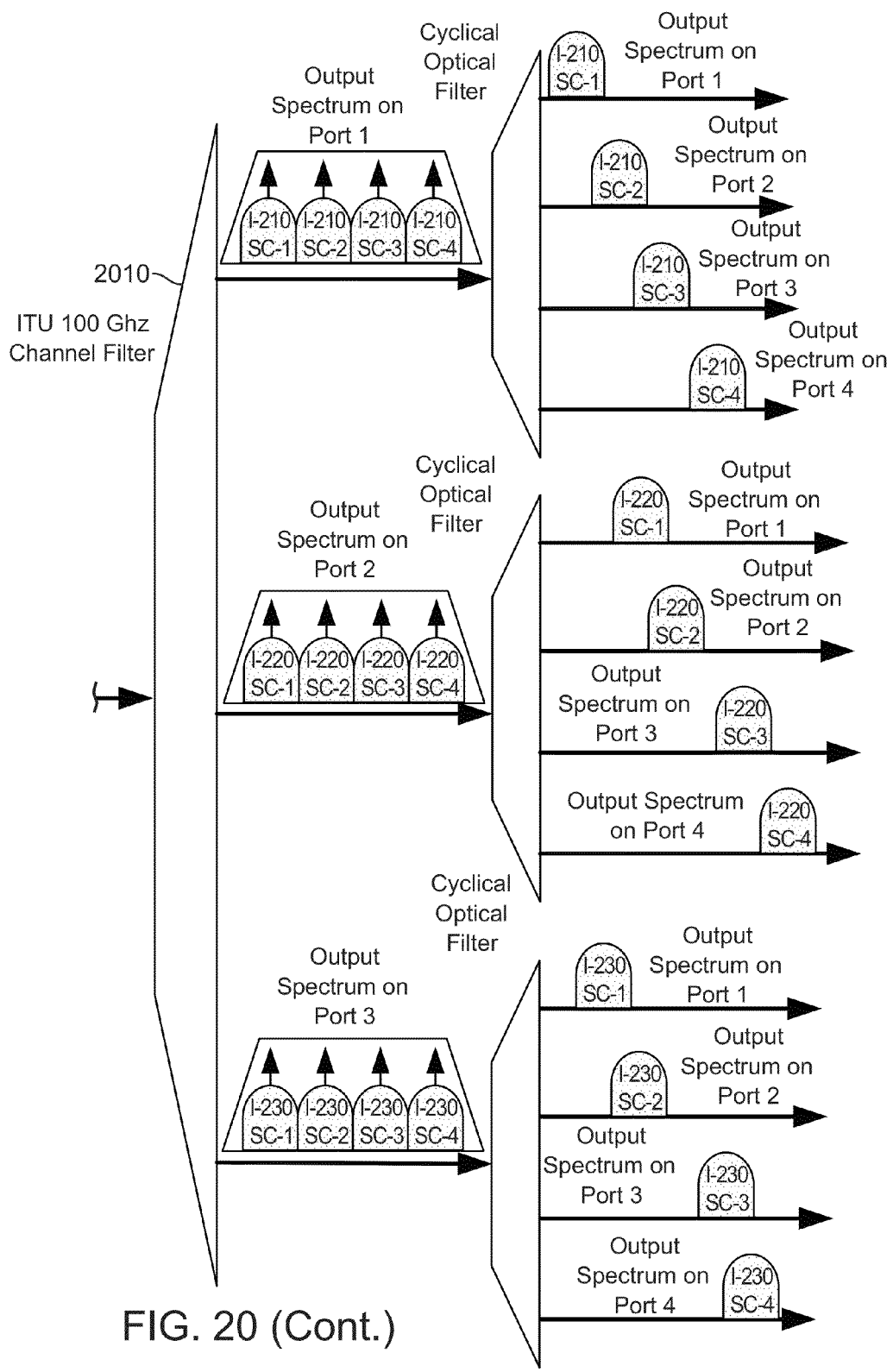

To fully separate each carrier, the cyclical filter is cascaded with an ITU channel filter as shown in FIG. 20. In this example filtering architecture 2000, a standard 100-GHz ITU channel filter 2010 is used as the first filtering stage. This design therefore supports an upgrade of an installed WDM system that uses 100 GHz channel filters. The upgrade can be implemented gradually over time so that any port of the ITU channel filter 2010 in FIG. 20 can be used to drop a legacy ITU channel signal.

Figure 21:
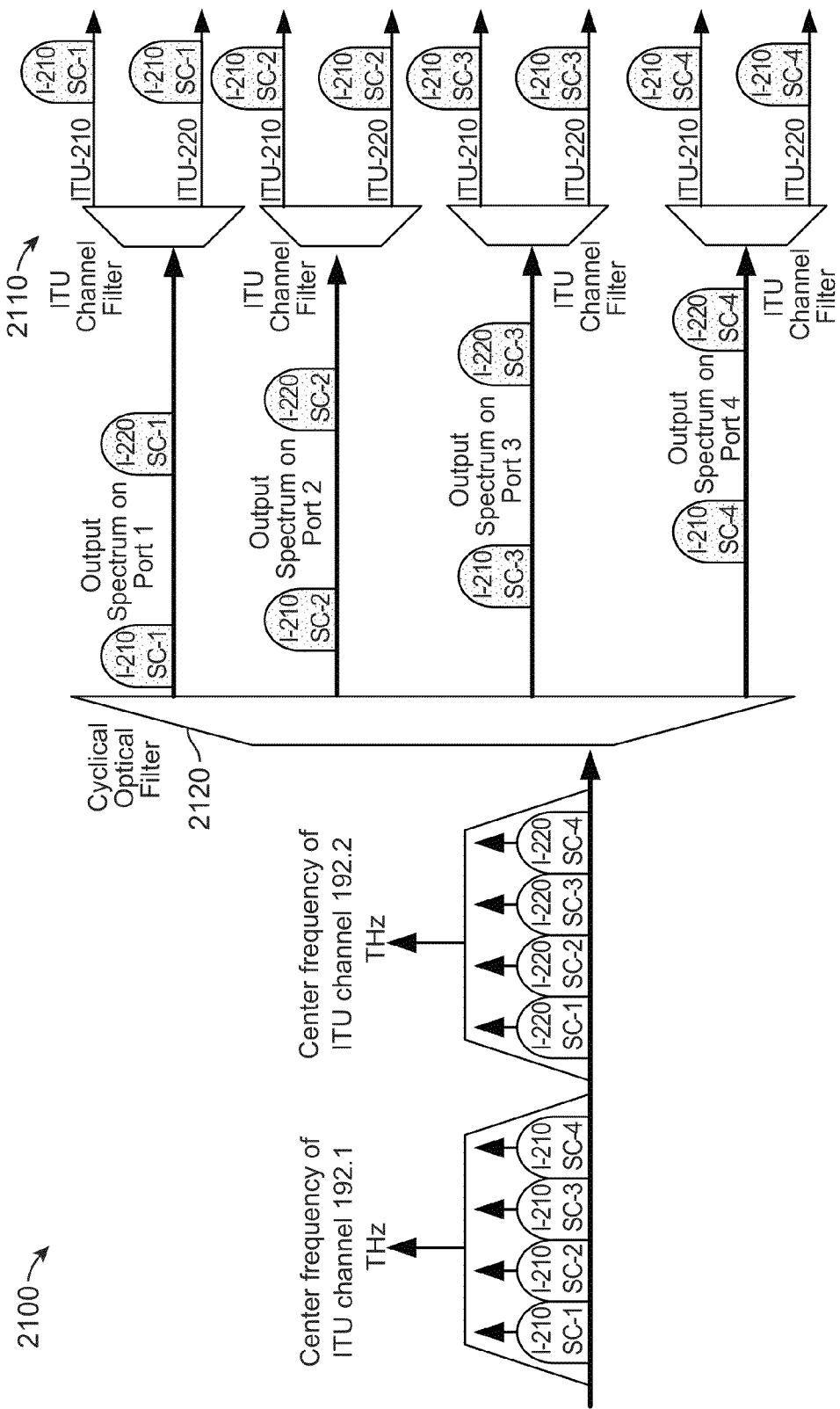
FIG. 21 illustrates the filtering of subchannels in one embodiment of the present invention, where cyclical filters are followed by an ITU filter.

The same filtering of subchannels can also be achieved by placing the ITU channel filters 2110 after the cyclical filter 2120 as shown in the filtering architecture 2100 of FIG. 21.

Figure 22:
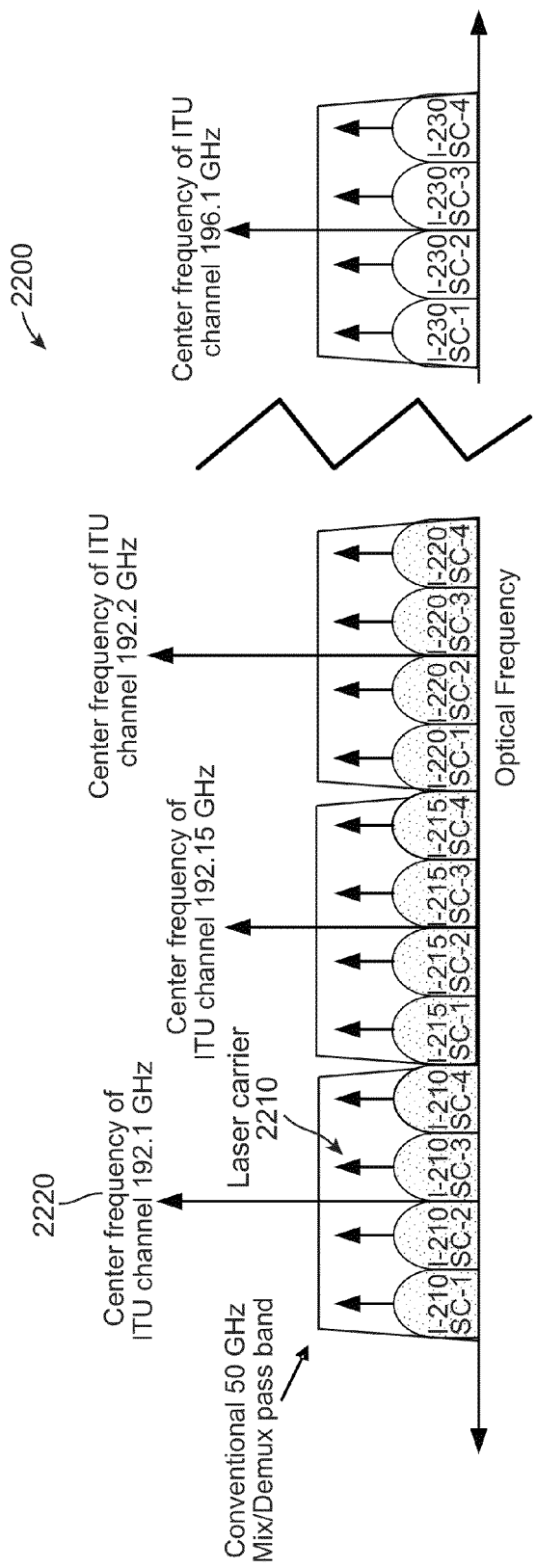
FIG. 22 illustrates one embodiment of an overlay of the subchannels of the present invention on 50-GHz ITU channels and filters.

Another example of a channel plan 2200 is shown in FIG. 22. In this case the subchannels 2210 are centered around the ITU channels 2220 at 50 GHz spacing. In this case the 100 GHz carriers can be separated from the 50 GHz carriers with (1) Two separate cyclical filters, one for the 100 GHz grid and one for the 50 GHz grid, or (2) a cyclical filter that can be shifted between the two grids by temperature tuning for example, or (3) a cyclical filter with 8 ports, 4 for the 100 GHz channels, and 4 for the 50 GHz channels.

Figure 23:
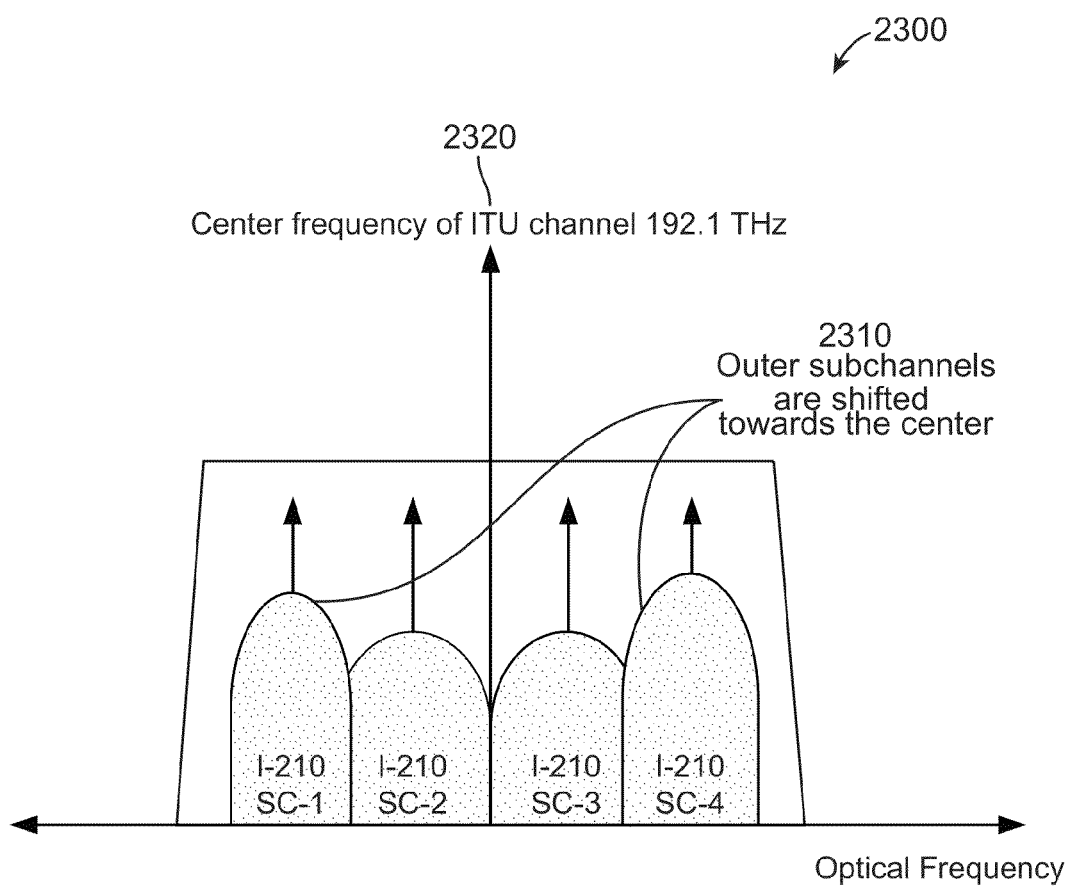
FIG. 23 illustrates one embodiment of a pre-emphasis on the subchannels of the present invention to counteract penalties from the edge of ITU channel filters.

When the subchannels are spaced as in FIG. 22, the outer channels, i.e. SC-1 and SC-4, can be attenuated by the edges of the ITU channel filter. This attenuation and its subsequent bit-error rate penalty can be mitigated, as shown in channel plan 2300 in FIG. 23, by adding power and/or frequency pre-emphasis on the outer carriers. This is done by shifting the outer subchannels 2310 toward the ITU channel's center frequency 2320 and boosting their transmit powers by adjusting the laser transmit powers. This pre-emphasis can be adjusted by software depending on the penalties on the edge subchannels.

The optical network in one embodiment uses a transmitter module that combines a plurality of subchannels (in the examples shown herein, 4 subchannels are used, but any number greater than 1 could be employed). Furthermore, the examples shown above are given for the case where the data mapped to the carrier is approximately 10 Gb/s, but the same methodology could be extended to any arbitrary rate per carrier.

3. Details on the Cyclical Filter

Figure 24:
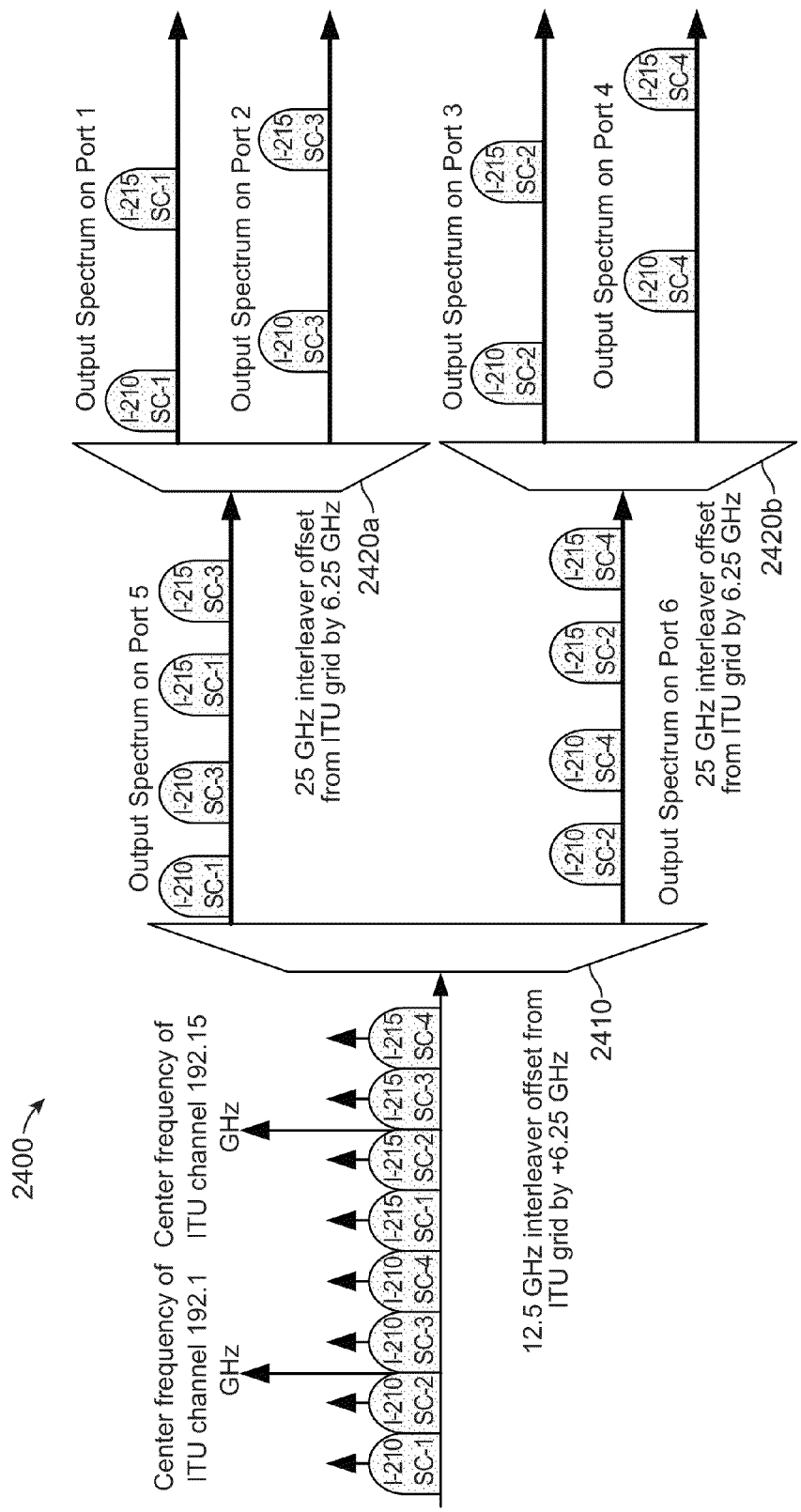
FIG. 24 illustrates one embodiment of cyclical filters of the present invention with cascaded interleavers.

The cyclical filter can be an interleaver [see, eg, U.S. Pat. No. 7,257,287], cascaded interleavers, or an array waveguide grating (AWG) [see, eg, U.S. Pat. Nos. 6,594,049, 4,904,042, and 5,600,742]. For the interleaver case, shown in cyclical filtering architecture 2400 in FIG. 24, a 4-channel 12.5 GHz cyclical filter can be made by cascading a 12.5 GHz interleaver 2410 with two 25 GHz interleavers 2420a and 2420b. Note that centering the subchannels on the ITU grid requires that the subchannels and interleavers are offset from the ITU grid by half the subchannel spacing, which is 6.25 GHz in this example. In the case of an odd number of subchannels (eg, 5 subchannels), the central subchannel is not offset from the ITU grid.

Figure 25:
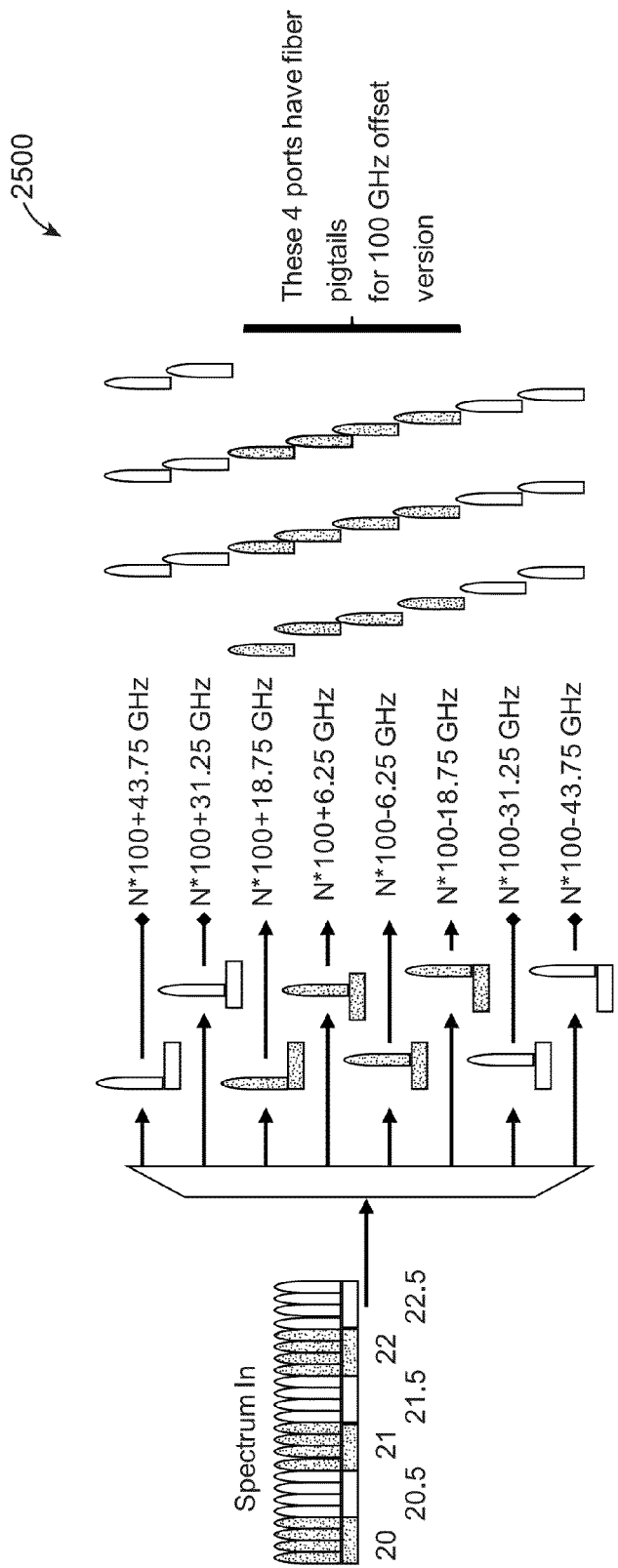
FIG. 25 illustrates one embodiment of a cyclical filter of the present invention made with an array waveguide grating (AWG).

Another embodiment of the cyclical filter is based on array waveguide grating (AWG) technology [see, eg, U.S. Pat. No. 6,594,049]. The principle of operation of cyclical AWG 2500 is shown in FIG. 25. In this example the AWG 2500 has a channel spacing of 12.5 GHz. For an application using 100 GHz channel spacing, the four middle output ports can be used to select the four subchannels adjacent to the ITU grid.

Figure 26:
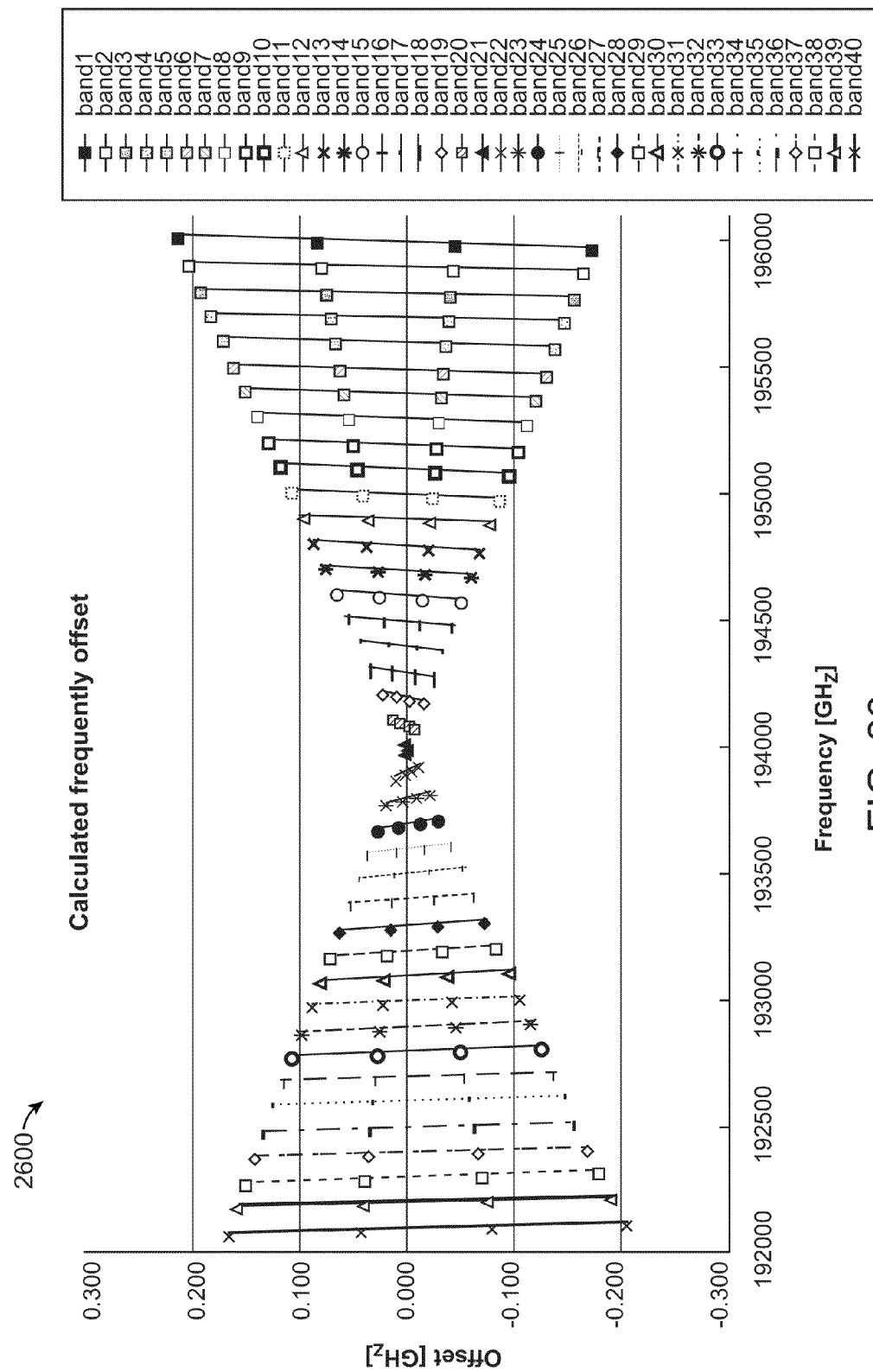
FIG. 26 is a graph illustrating the frequency offset from the optimum AWG design frequency (for an AWG cyclical filter of the present invention).

The channel spacing of a cyclical AWG is based on wavelength and the ITU channel spacing is based on frequency. This discrepancy causes a frequency offset for channels that are further from the AWG optimum design frequency. This offset is illustrated in graph 2600 in FIG. 26.

Such use of an AWG may not yield sufficient accuracy for applications such as the subchannel demultiplexer that need frequency accuracy within a fraction of the accuracy required by ITU channel filters. In such cases, a new way of controlling the temperature of an optical filter provides more accurate operation of the filter within a wide range of optical frequencies and ambient temperatures.

The performance characteristics of the optical filters employed in DWDM systems change with temperature and over time. In particular, a central frequency of bandpass optical filters change due to ambient temperature variations (typically from −5 deg C. to 65 deg C.), and due to aging. The center frequency of an AWG is temperature dependent with a shift approximately equal to 1.5 GHz/° C. In applications requiring high accuracy of the filter spectral response, such as WDM channel filtering, the temperature of the filter is controlled by mounting it on a heater or thermoelectric cooler, and using control circuits to maintain the voltage reading on a thermistor inside the filter package.

Figure 27:
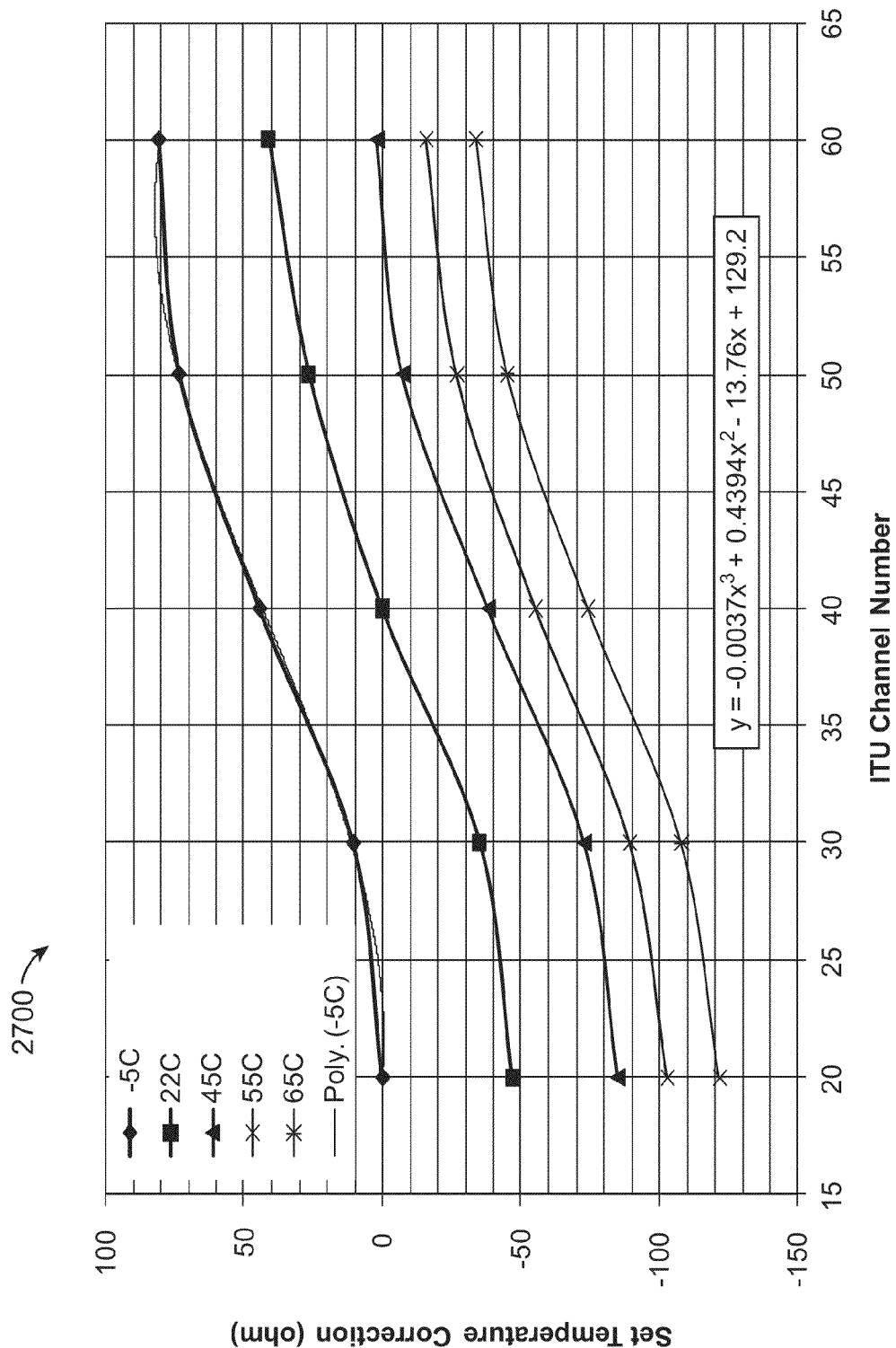
FIG. 27 is a graph illustrating the shift in the AWG temperature setpoint (for an AWG cyclical filter of the present invention) with the ITU channel number.
Figure 28:
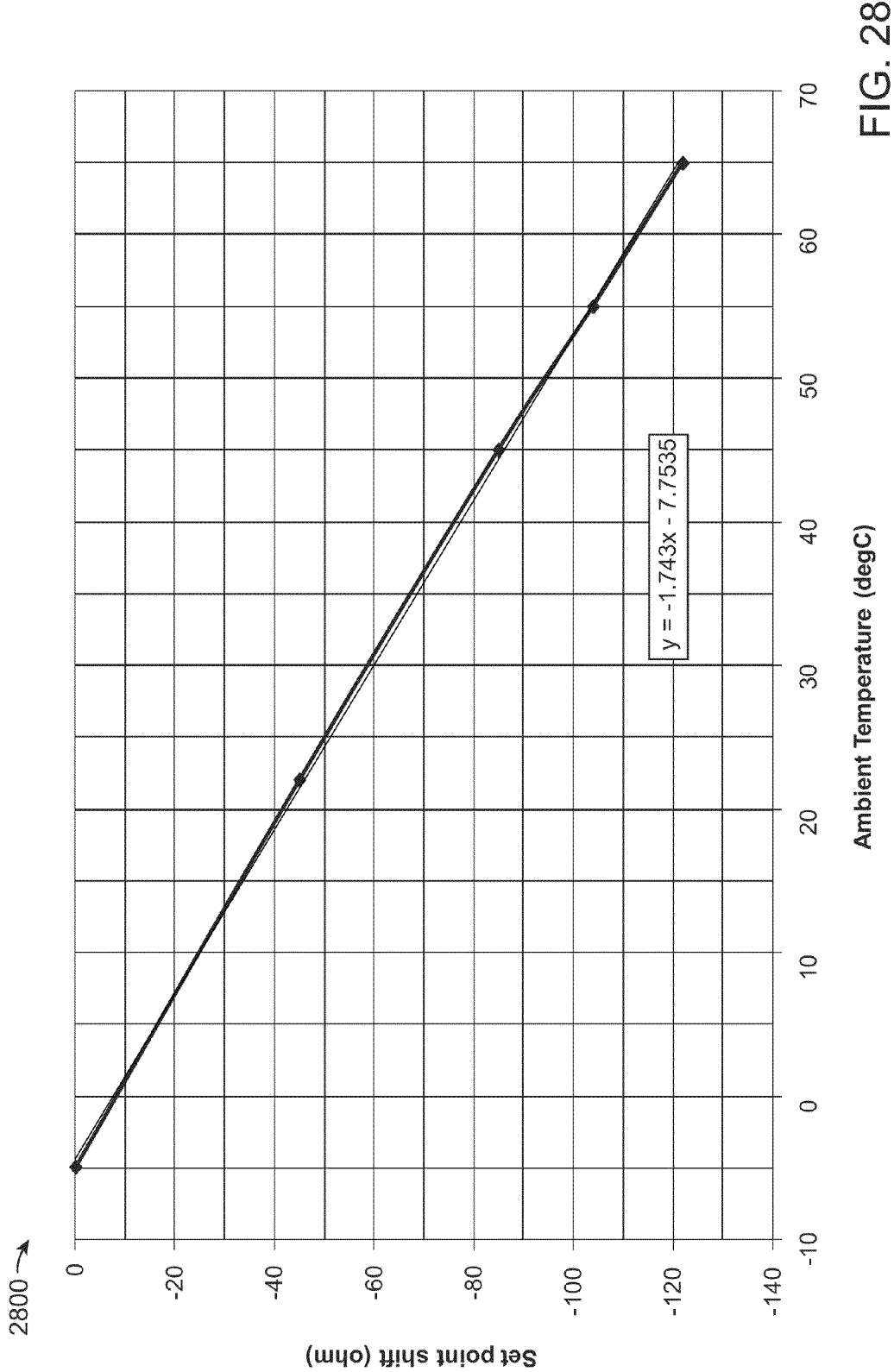
FIG. 28 is a graph illustrating the shift in the AWG temperature setpoint (for an AWG cyclical filter of the present invention) with the ambient temperature.
Figures 29A, 29B:
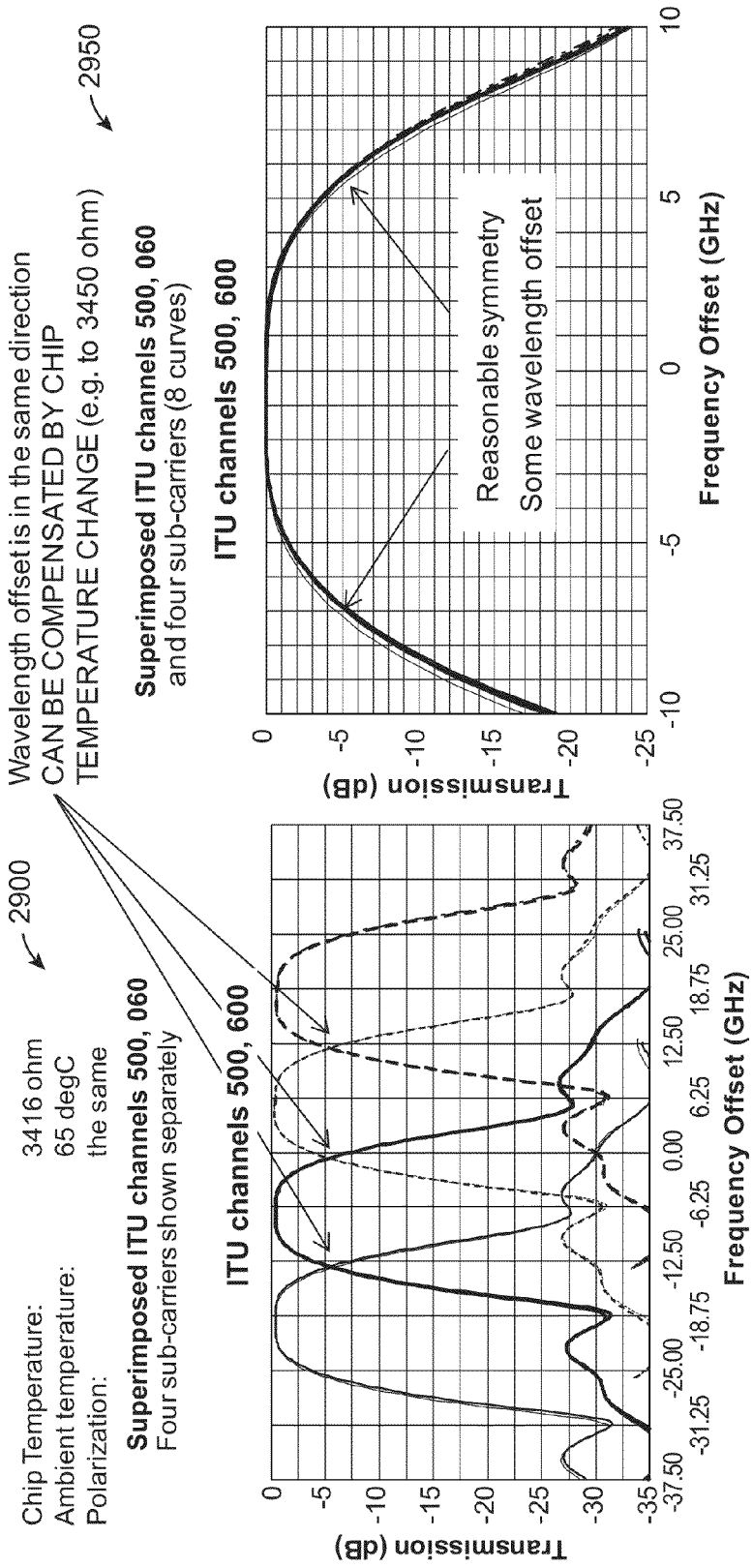
FIGS. 29A and 29B are graphs illustrating changes in superimposed AWG transmission spectra (for an AWG cyclical filter of the present invention) of 4 subchannels for ITU channels 50 and 60 with changes in ambient temperature (65 deg C.).
Figures 30A, 30B:
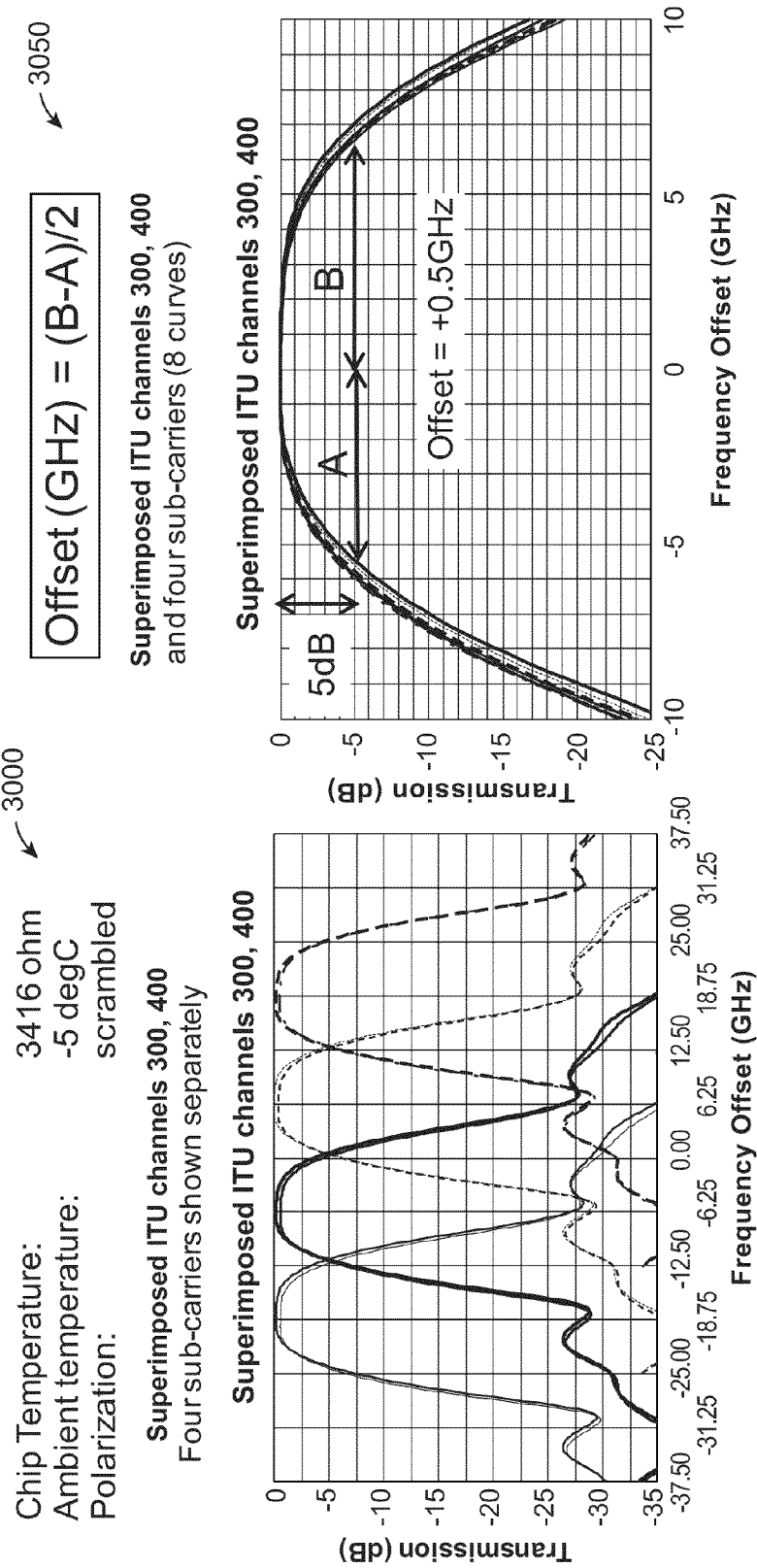
FIGS. 30A and 30B are graphs illustrating changes in superimposed AWG transmission spectra (for an AWG cyclical filter of the present invention) of 4 subchannels for ITU channels 30 and 40 with changes in ambient temperature (−5 deg C.).
Figure 31:
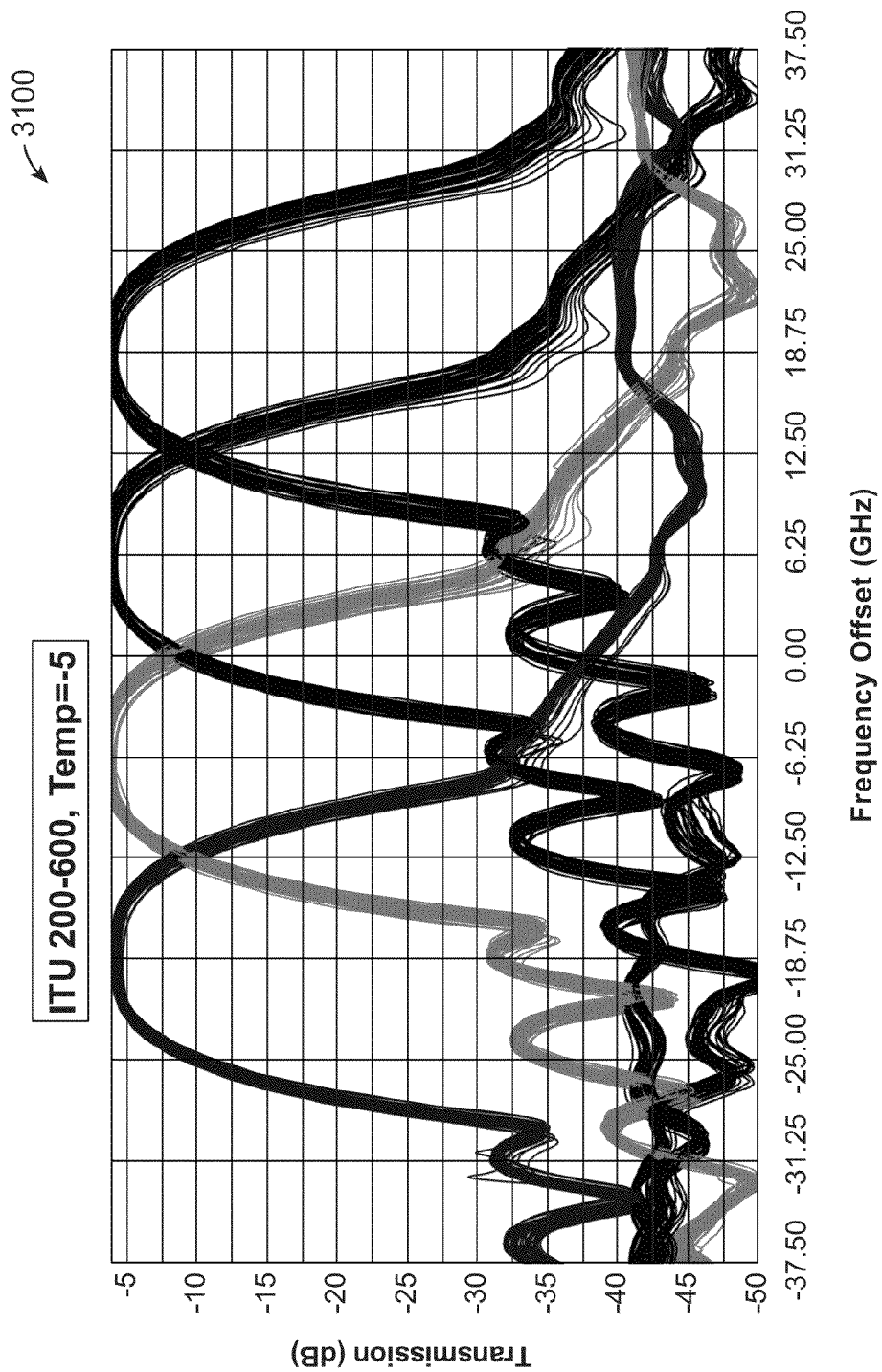
FIG. 31 is a graph illustrating superimposed AWG transmission spectra (for an AWG cyclical filter of the present invention) of 4 subchannels for 40 ITU channels (channels 20-60) at ambient temperature (−5 deg C.).
Figure 32:
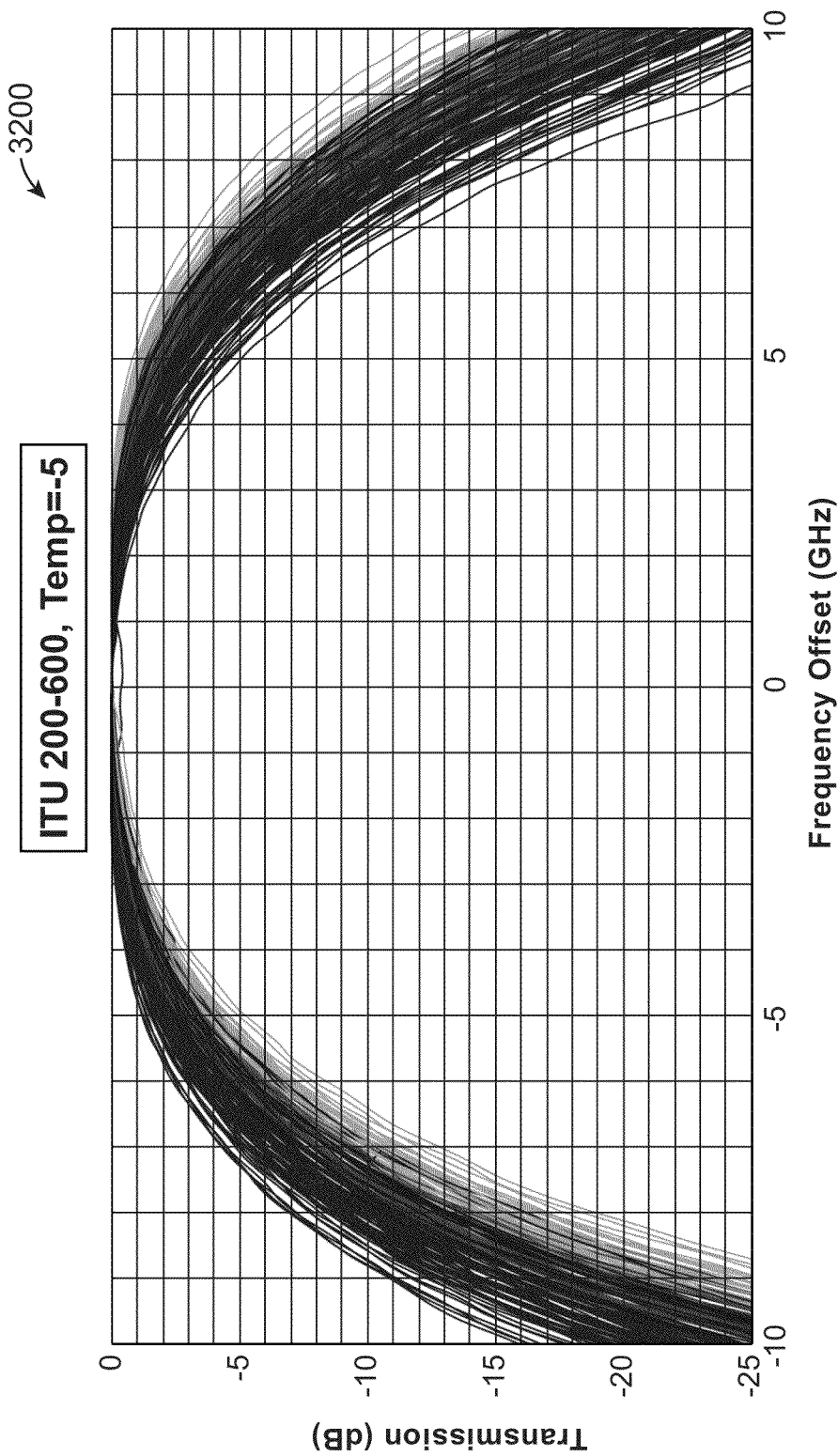
FIG. 32 is a graph illustrating superimposed AWG transmission spectra (for an AWG cyclical filter of the present invention) of 160 subchannels for 40 ITU channels (channels 20-60) at ambient temperature (−5 deg C.).
Figure 33:
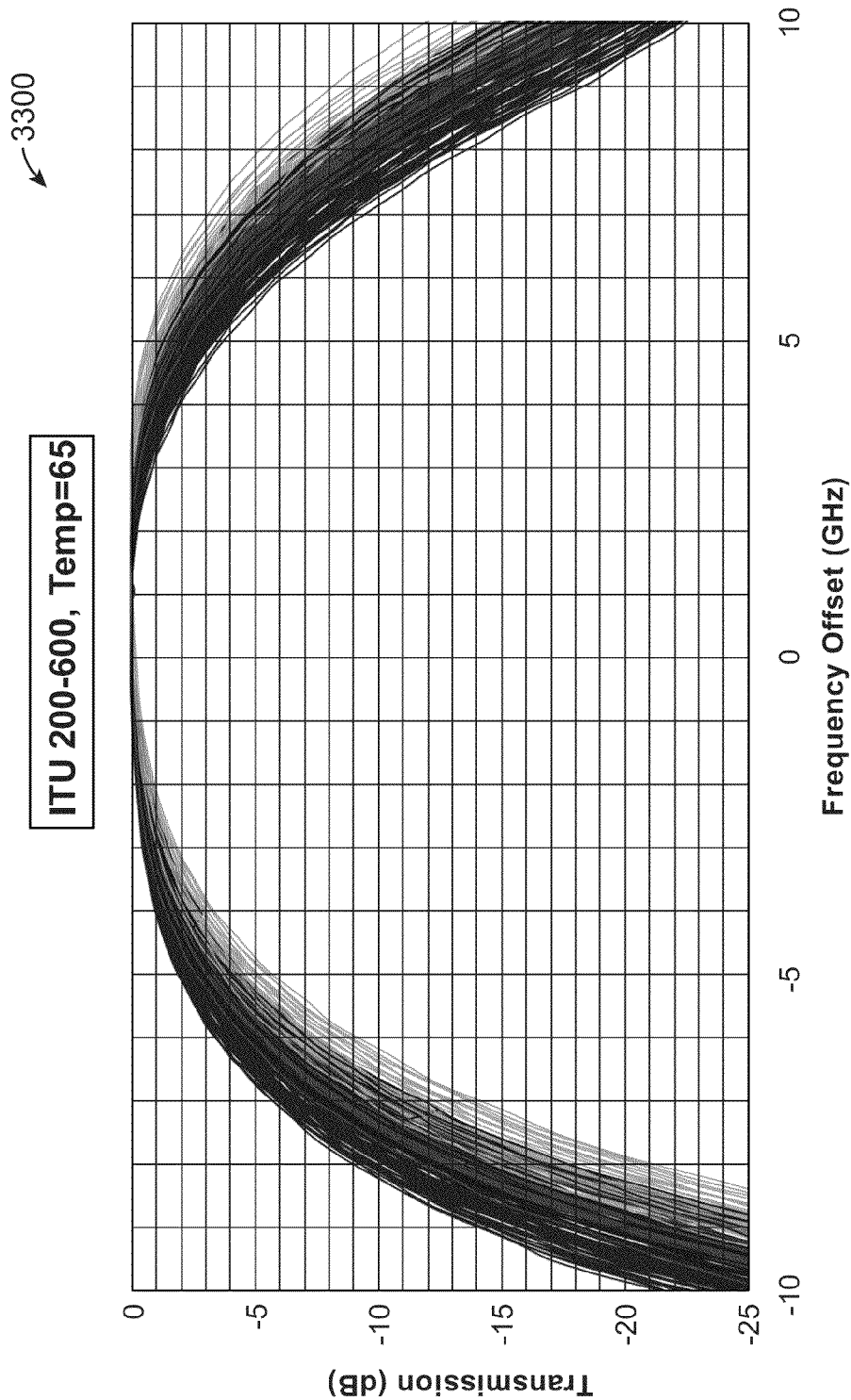
FIG. 33 is a graph illustrating superimposed AWG transmission spectra (for an AWG cyclical filter of the present invention) of 160 subchannels for 40 ITU channels (channels 20-60) at ambient temperature (65 deg C.).

The close spacing of the subchannels as described herein can be made more accurate with refinement of the AWG design and controls. First, the change in subchannel offset with frequency can be compensated by shifting the AWG chip temperature when the ITU channel is changed (see, eg, top of FIG. 28). Second, the ideal AWG chip temperature set point depends on the ambient or case temperature (see, eg, bottom of FIG. 28). Therefore, the AWG channel spacing can be made more accurate by calibrating the performance over wavelength and ambient temperature for different control set points, and then adjusting the control set point in normal operations depending on the ITU channel and ambient temperature. Examples of this calibration are shown in both graph 2700 in FIG. 27 and graph 2800 in FIG. 28. The vertical temperature scale in these figures is expressed in a change of a thermistor resistance.

Several examples of the AWG performance under different operating conditions such as ambient temperature, AWG temperature setpoint and ITU channel are presented in the graphs shown in FIGS. 29-33. These graphs demonstrate that, by adjusting the setpoint temperature of the AWG chip according to changes of ambient temperature and the ITU channel of interest, the center frequency accuracy of the AWG subchannel spectra can be kept within the limits required by the system specifications.

Figure 34:
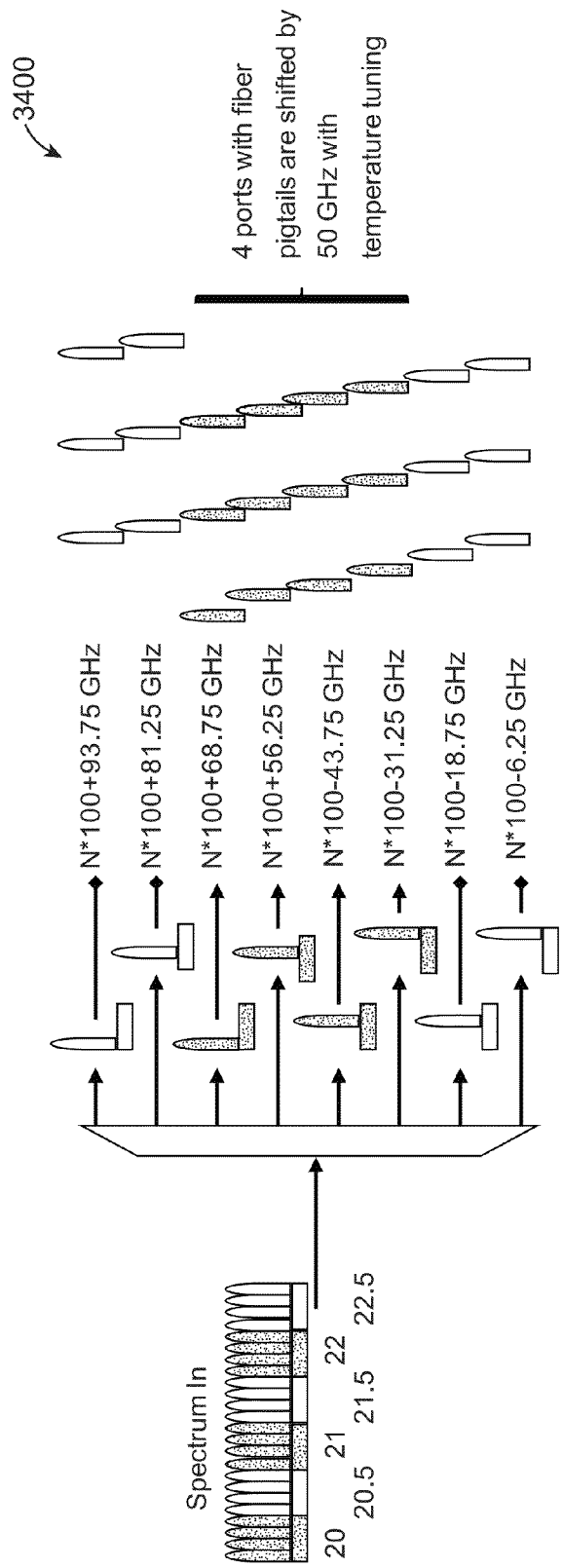
FIG. 34 is a graph illustrating how a shift in channel spacing (for an AWG cyclical filter of the present invention) can be achieved by a change in ambient temperature.

The shift in AWG channel spacing with AWG chip temperature can also be used to select a different subset of carriers. This is shown in graph 3400 in FIG. 34, where the operating temperature has been shifted by approximately 30 deg C. to shift the channel spacing by 50 GHz. Applying this temperature shift enables one to use the same AWG to demultiplex four subchannels on the 100 GHz grid with the normal setpoint, or four subchannels on the 50 GHz grid with the setpoint shifted by approximately 30 deg C.

Thermo-Mechanical Considerations

Figure 35:
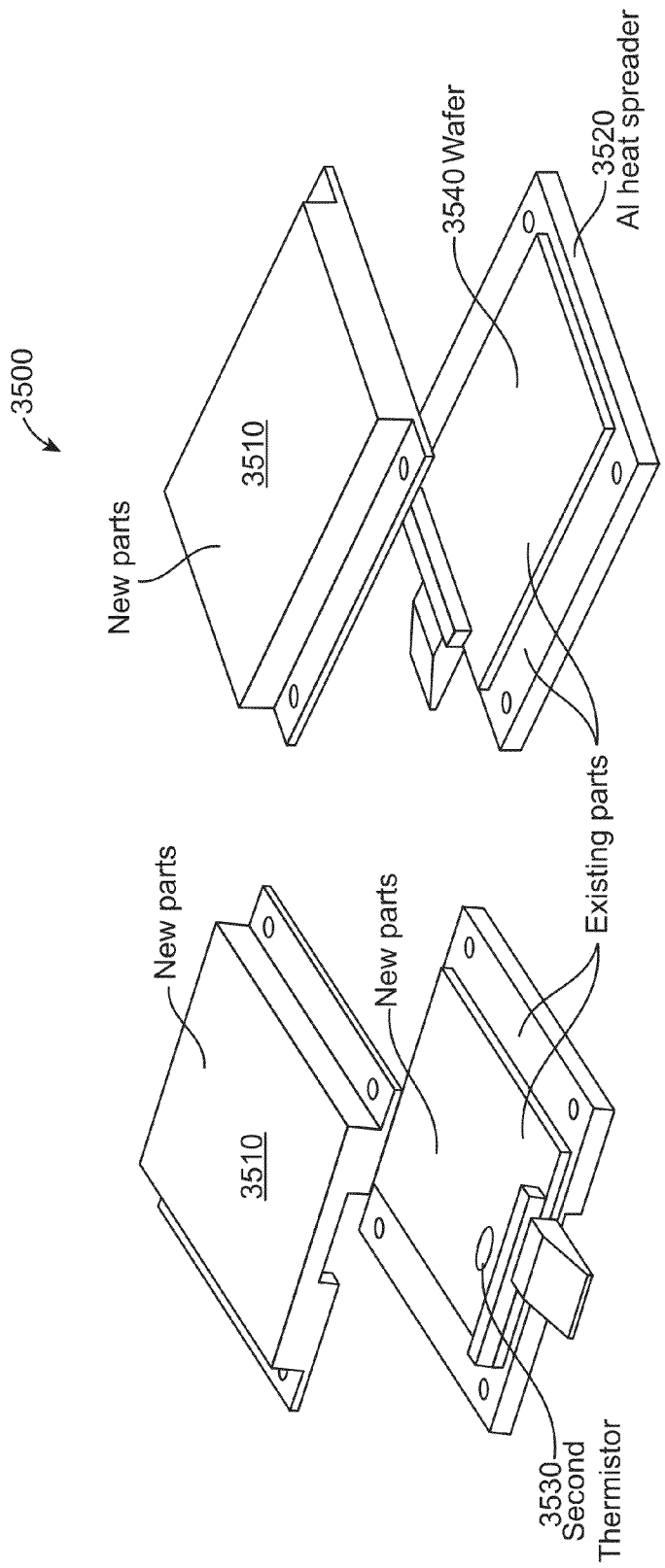
FIG. 35 is a top view of a top enclosure for an AWG wafer (chip) embodying an AWG cyclical filter of the present invention.

A high precision and accuracy of the AWG chip temperature requires a well-designed mechanical enclosure. A detailed design of such an enclosure is presented in FIGS. 35-37.

Figure 36:
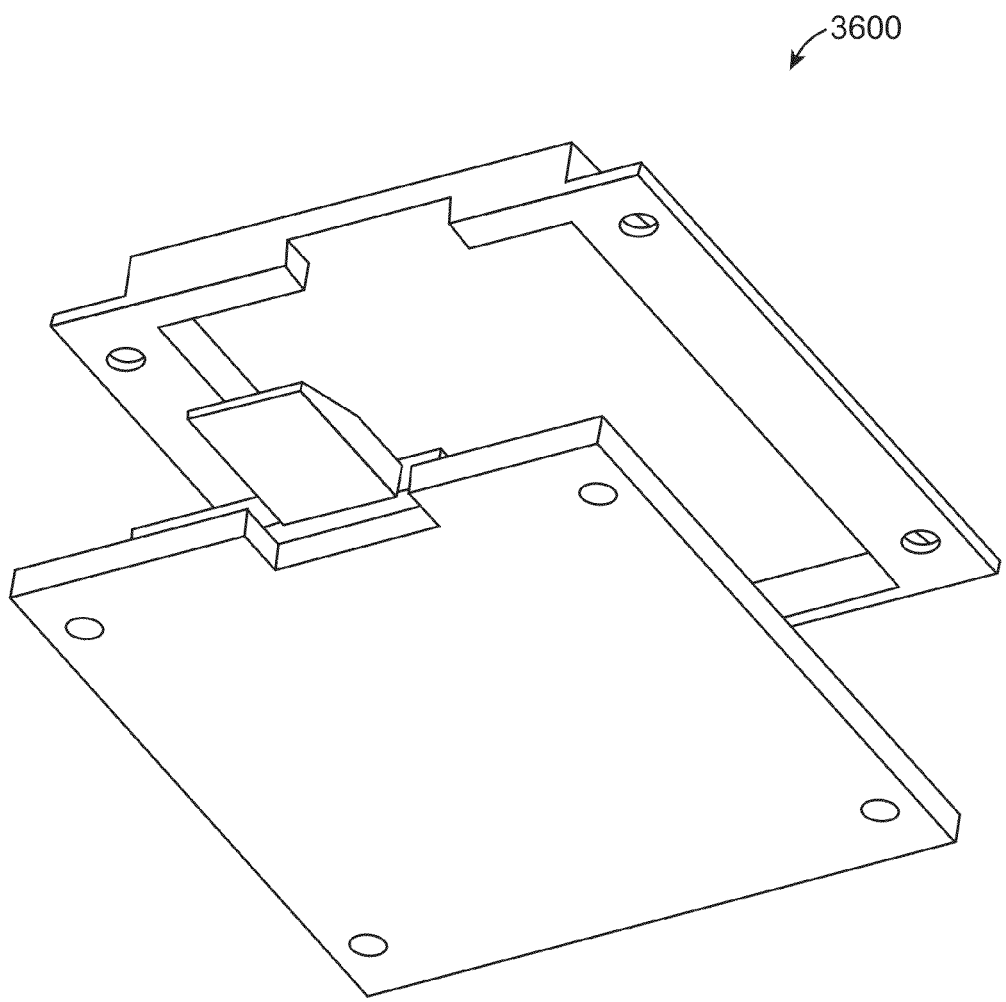
FIG. 36 is a bottom view of a top enclosure for an AWG wafer (chip) embodying an AWG cyclical filter of the present invention.
Figure 37:
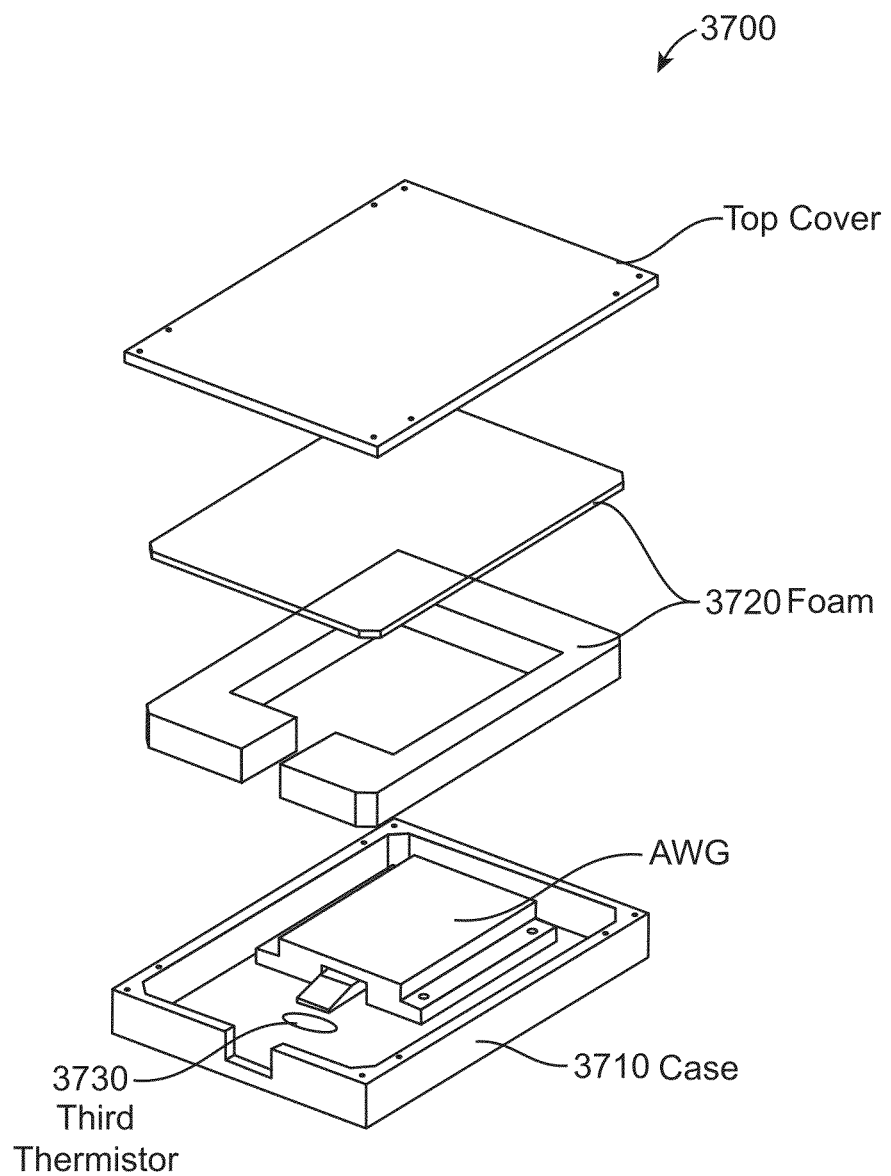
FIG. 37 is a component view of the thermo-mechanical design of an AWG wafer (chip) embodying an AWG cyclical filter of the present invention.

In one embodiment:
An aluminum small top cover for the AWG chip is employed, such as top cover 3510 in FIG. 35 (a bottom view of which is illustrated in FIG. 36). This aluminum top cover 3510 is thermally well attached to the existing bottom aluminum heat spreader 3520.

A second thermistor 3530 to monitor the AWG chip temperature is attached directly to the AWG chip wafer 3540, as close as possible to the optical waveguides at the wafer center.

The case 3710 (shown in FIG. 37) is filled with polyurethane foam 3720, including space between the aluminum wafer cover and plastic top case cover.

A third thermistor 3730 is mounted on the bottom of the case 3710 to measure ambient temperature.

Electronics Considerations

Figure 38:
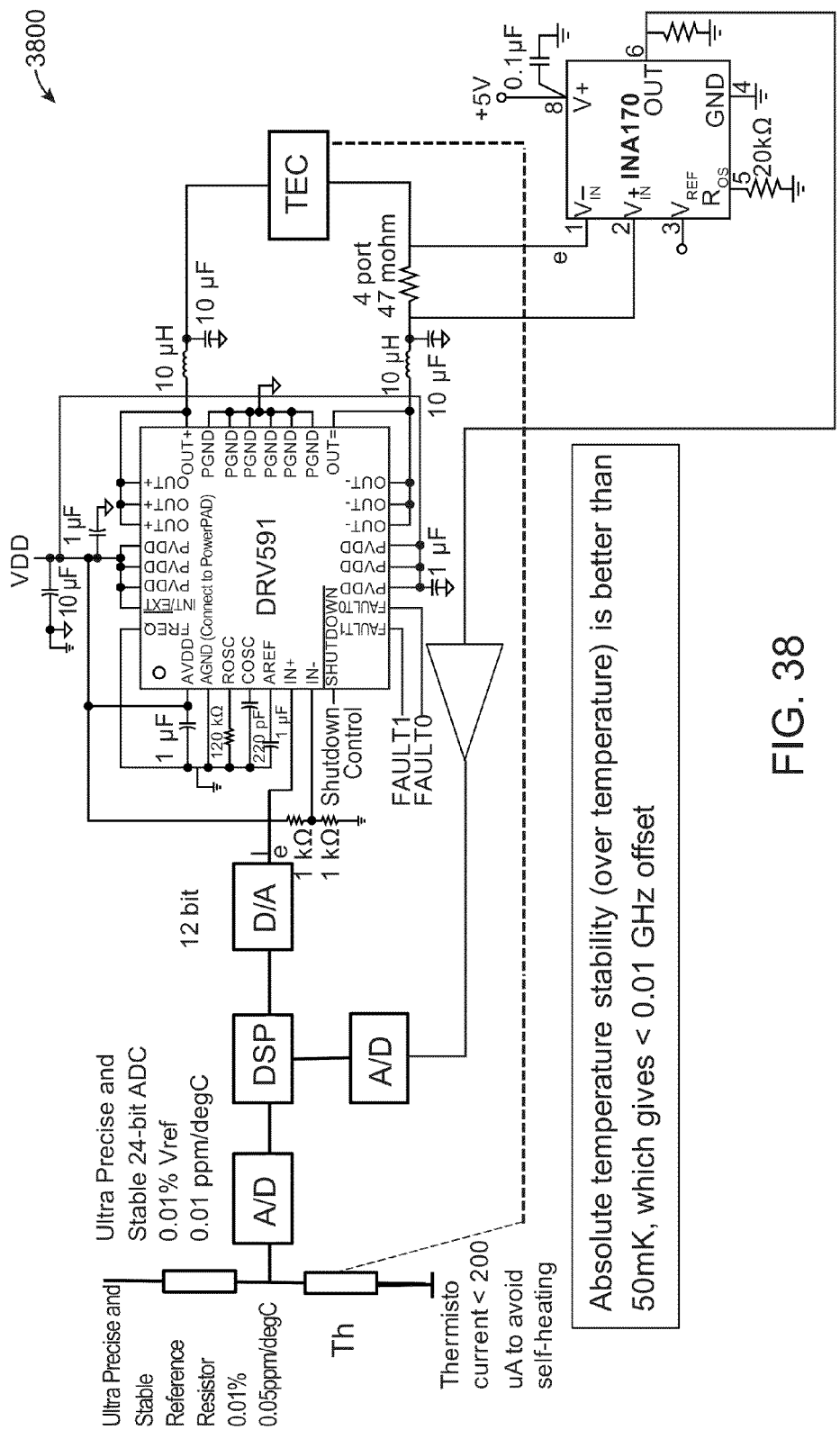
FIG. 38 is a schematic diagram of a high-precision electronic circuit to control the temperature of an AWG wafer (chip) embodying an AWG cyclical filter of the present invention.

The required high precision and accuracy of the AWG chip temperature also requires accurate control electronics, one embodiment of which 3800 is presented in FIG. 38, which shows a Thomson bridge implementation of the chip temperature sensing with 3 Ultra-precise resistors and the AWG chip thermistor. Note that the ADC is probing the Thomson bridge differentially.

4. Subchannel Multiplexer with Polarization Multiplexing and Demultiplexing

Many of the embodiments of the present invention discussed above, including those relating to optical network topologies and various network elements, are based on wavelength-division multiplexing—where different frequencies of light represent different ITU transmission channels and their subchannels.

Data transport capacity of such networks can be doubled when, in addition to wavelength multiplexing, polarization multiplexing is employed. Various polarization multiplexing schemes can be applied to the wavelength multiplexing systems described herein, including those implementing subchannel-based architectures.

Figure 39A:
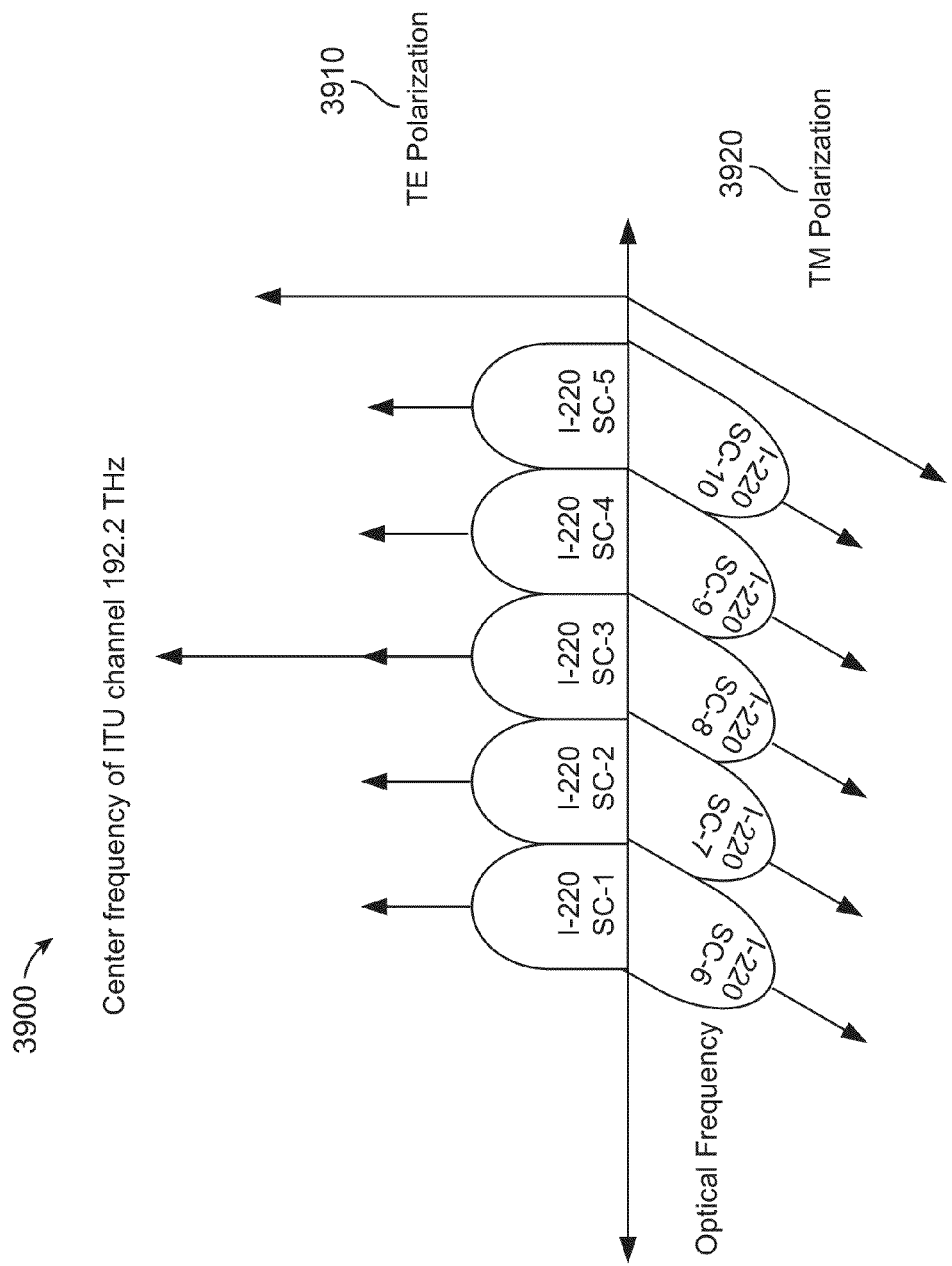
FIG. 39A illustrates one embodiment of a channel plan for subchannels of the present invention with polarization multiplexing.

As will be illustrated below, polarization multiplexing can be used as a means of increasing the subchannel spectral density. An example of a channel plan 3900 for subchannels in this case is shown in FIG. 39A. Here the first five subchannels (SC-1 to SC-5) are aligned along one polarization axis 3910 and the last five subchannels (SC-6 to SC-10) are aligned along the second polarization axis 3920.

In this embodiment, the subchannel transmit laser can be combined with cascaded polarization combiners, similar to combiners 1511 and 1512 in FIG. 15. At the receive side the subchannels in orthogonal polarizations can be demultiplexed with the circuit 3950 shown in FIG. 39B. In this circuit, a polarization coupler 3960 is used to separate the orthogonal polarizations. A polarization controller 3970 is placed in front of the polarization coupler 3960 to align the subchannel polarization axes to the axes of the polarization coupler 3960.

Figure 39B:
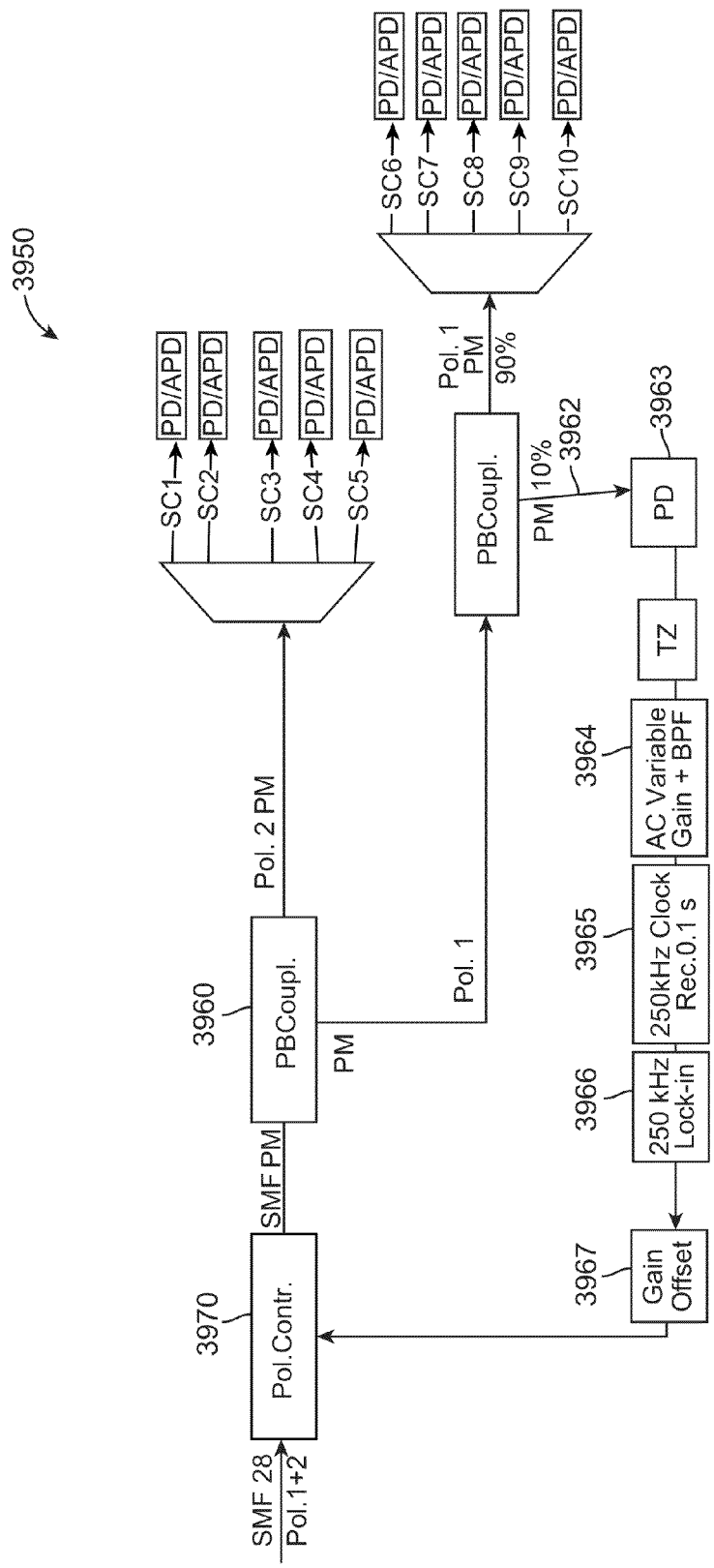
FIG. 39B is a block diagram of one embodiment of a receive circuit to demultiplex polarization-multiplexed subchannels of the present invention.

The alignment circuit 3950 shown in FIG. 39B detects the strength of the subchannel signals in one polarization. This circuit 3950 assumes that a low-amplitude dither at a fixed frequency (250 kHz in this embodiment) is superimposed on the signal transmitters using the first polarization. The control electronics and software monitor the strength of the received dither signal 3962 and adjust the polarization controller 3970 to maximize the signal.

Key elements of the circuit shown in FIG. 39B include:
A photodetector 3963 detecting the fraction of light in one of the outputs of the polarization coupler/splitter;
A band pass filter (to filter a dither frequency) with an adjustable gain 3964, where the gain adjustment is based on the optical signal power incoming from a line fiber to the receiver. The gain-adjusting algorithm assures that the amplitude of the dither signal at the filter/gain stage output does not change significantly with significant changes of incoming optical power;
A clock recovery circuit 3965 to recover the dither frequency with substantially low time constant;
A lock-in amplifier 3966 which, synchronously with the recovered clock, detects the amplitude of the dither signal changing due to polarization changes of the incoming optical signal; and
A lock-in amplifier 3967 with substantially smaller time constant of its output integrator than that of the dither clock recovery circuitry 3965 to provide a fast feedback signal to the polarization controller-tracker 3970.

This circuit can be implemented employing analog electronics circuitry, or the signal processing can be performed in the digital domain (eg, by a DSP) after the photodiode analog signal is converted into the digital domain. Furthermore, both orthogonal polarizations can be dithered at different frequencies; two electronics dither processing circuits can be used in parallel, each optimized for one of the two dither frequencies, respectively.

Although it has the added cost of the polarization controller 3970, this design of a subchannel muxponder has the advantage that it can double the spectral density by using polarization as an additional dimension. This embodiment, however, does not support routing of subchannels from different sites to the same subchannel receiver since there is only one polarization demultiplexer per receiver. Polarization-multiplexed subchannels from different sites could be demultiplexed, though that would require one polarization controller per subchannel.

a. Existing Implementation of Polarization Multiplexing

Figure 40A:
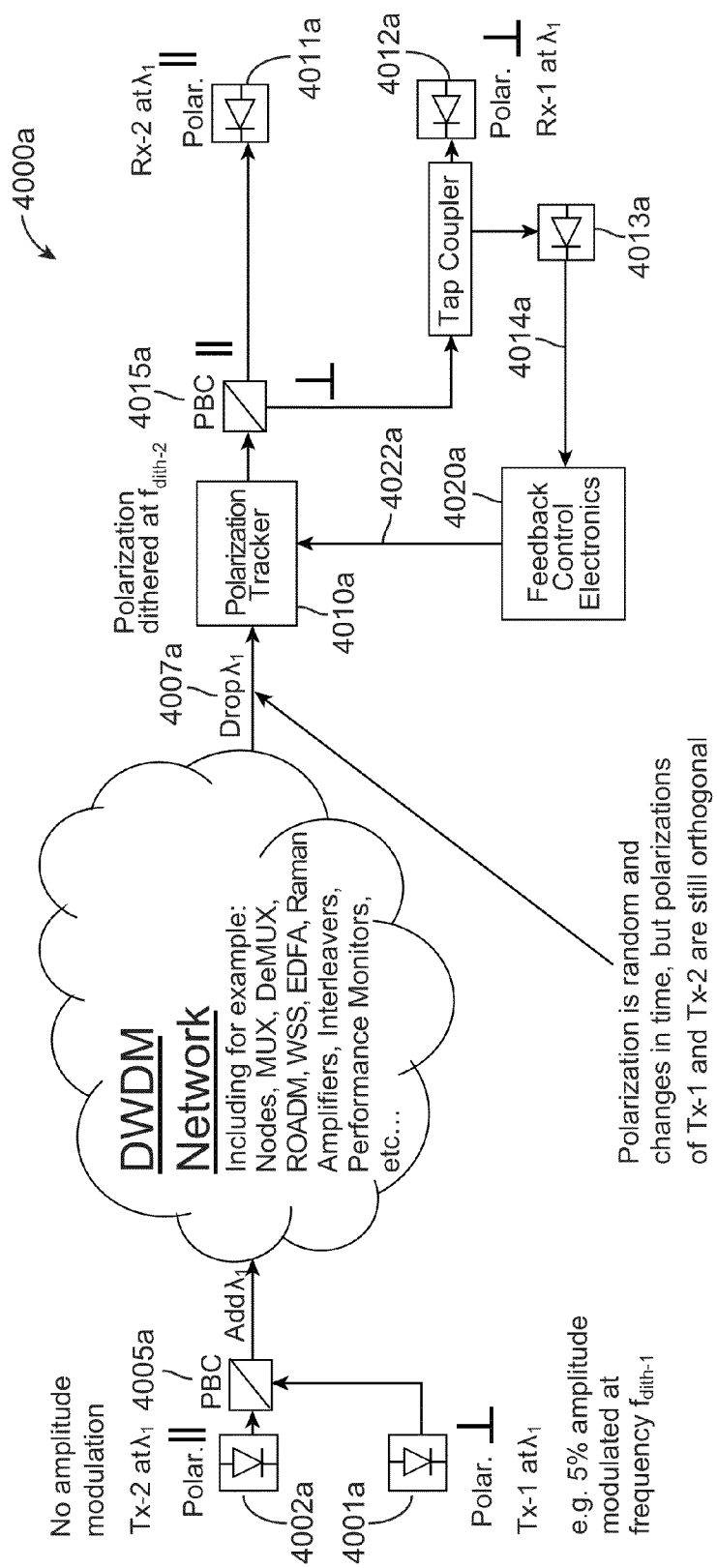
FIG. 40A is a block diagram of an existing implementation of polarization multiplexing in a DWDM network.

One embodiment of an implementation 4000a of polarization multiplexing is presented in FIG. 40A. For a given wavelength, $\lambda_1$, of a DWDM system, two independent data channels are being used: Tx-1 4001a and Tx-2 4002a. The output light of both lasers is linearly polarized and both polarizations are combined into a single fiber by a polarization beam combiner (PBC) 4005a in such a way that the polarizations of Tx-1 4001a and Tx-2 4002a are linear and orthogonal on the transmit side.

Both multiplexed polarization channels are added to the network and propagate through a variety of optical components of the network such as nodes, wavelength multiplexers and demultiplexers, fiber, EDFAs, Raman amplifiers, interleavers, ROADMs, WSSs and so forth. During the propagation, the state of polarization of each channel Tx-1 4001a and Tx-2 4002a changes due to birefringent effects of optical network components. Moreover, since the birefringent effects evolve over time, the state of polarization changes randomly on the receive end where the wavelength, $\lambda_1$ 4007a, is dropped.

Random changes of polarization act on both channels in such a way that the state of polarization at the receive end of Tx-1 light is still orthogonal to the state of polarization of Tx-2 light. Therefore, polarization demultiplexing can be performed as long as random polarization of each (or in fact one) channel is changed to a linear polarization with a known orientation, and the channels are demultiplexed by a polarization beam splitter/combiner (PBC) 4015a.

A change from random polarization to a linear polarization can be performed by commercially available Polarization Trackers, such as polarization tracker 4010a. Since dropped polarization changes over time, a polarization tracker needs to follow these changes and correct incoming polarization accordingly. This is typically accomplished by a feedback loop 4020a which detects the polarization state at the output of the polarization tracker and provides a control signal 4022a to the tracker 4010a to assure that the polarization is linear, and a proper polarization channel is directed to a proper receiver—i.e. the light from Tx-1 reaches the receiver Rx-1 4011a, and Tx-2 reaches Rx-2 4012a, respectively. Several known implementations of such feedback mechanisms are described on the General Photonics website (http://www.generalphotonics.com/articles.aspx?a=1073).

One of these implementations presents a scheme 4000a shown in FIG. 40A in which (on the transmit end) the amplitude of Tx-1 4001a is modulated by a small sine wave signal at frequency $f_{dith-1}$=100 kHz. The modulation depth typically does not exceed a few percent of the average light intensity. The amplitude of Tx-2 4002a is not modulated at all.

At the receive end the polarization tracker dithers polarization at a frequency $f_{dith-2}$ and a photodiode monitors light intensity in one arm of the polarization beam splitter. The photodetector detects light from Tx-1 4001a and Tx-2 4002a, both dithered in intensity by $f_{dith-2}$. In addition, the light from Tx-1 4001a is also dithered in intensity by $f_{dith-1}$.

The signal 4014a from the photodetector 4013a is processed by feedback control electronics 4020a and input as a feedback signal 4022a to the polarization tracker 4010a.

For control purposes: (i) the dithering of the tracker 4010a at $f_{dith-2}$ is used to determine the direction in which to adjust the polarization in order to track it, if needed, to accomplish polarization demultiplexing; and (ii) the dithering of the Tx-1 4001a at $f_{dith-1}$ is used to maximize the amplitude of this dither in the Rx-1 arm of the PBC 4015a at the receive end and direct a proper transmitter signal to a proper receiver.

Various novel implementations of this basic approach to polarization multiplexing are described below.

b. A Particular Implementation of the Feedback Control Electronics in FIG. 40A

Figure 40B:
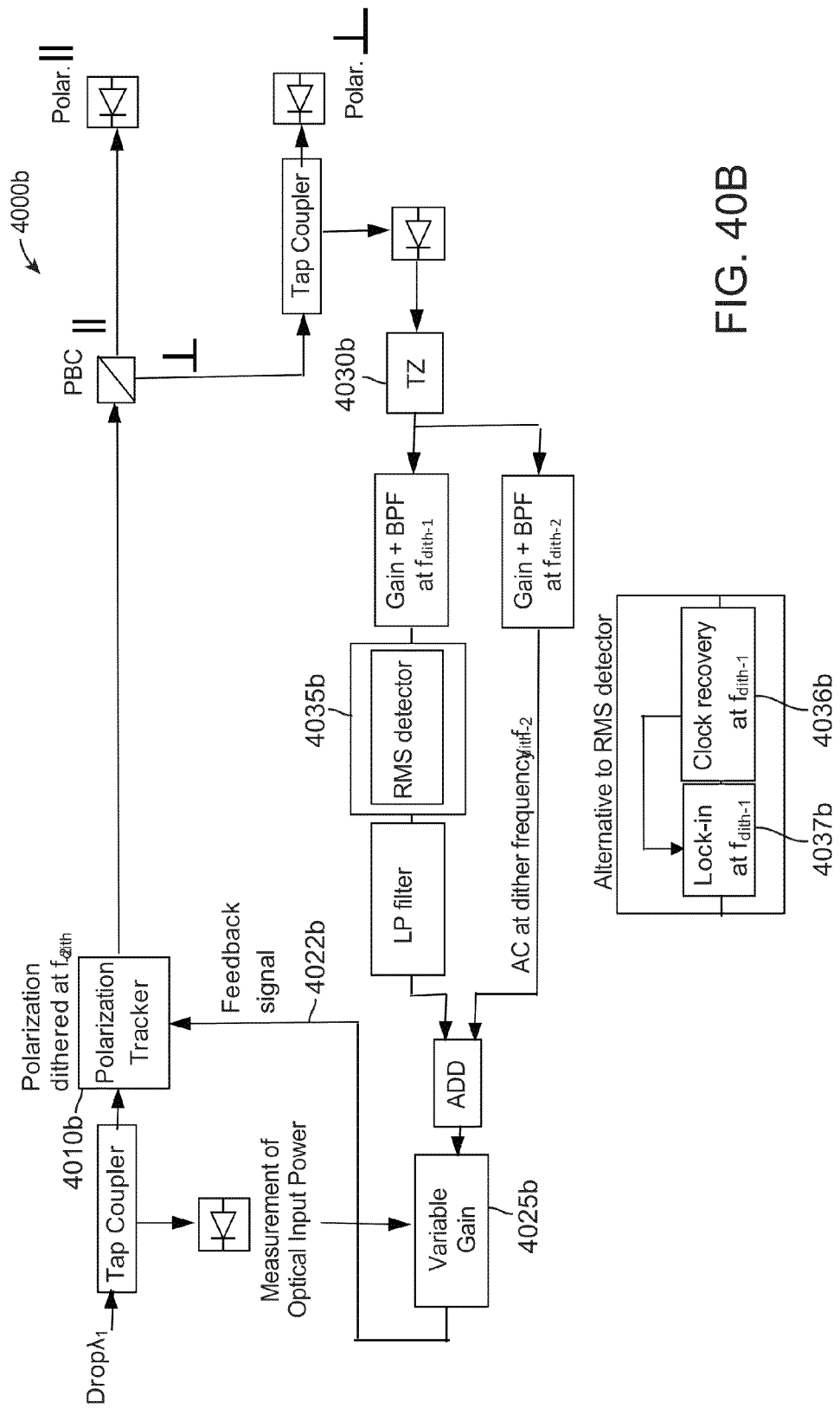
FIG. 40B is a block diagram of a novel embodiment of the feedback control electronics in the dithering scheme employed in the implementation of polarization multiplexing presented in FIG. 40A.

FIG. 40B presents a particular implementation 4000b of the feedback control electronics in the dithering scheme presented in FIG. 40A. In this embodiment, two electrical circuits are processing in parallel: (i) a Tx-2 dither at frequency $f_{dith-1}$ and (ii) a polarization tracker dither at frequency $f_{dith-2}$.

The abbreviations in FIG. 40B include the following:
BPF—band pass filter
LP—low pass filter
RMS—root mean square
TZ—transimpedance amplifier
ADD—adding two electrical analog voltages As shown in FIG. 40B, just before the feedback signal 4022b is input to the polarization tracker 4010b, it is amplified by a variable gain amplifier 4025b, where the amplifier gain is adjusted appropriately to accommodate for changes in optical input power of a dropped channel while keeping at a constant value the average voltage of the feedback signal at the input of the polarization tracker. Alternatively, the variable gain amplifier can be placed at the output of a TZ 4030b.

The RMS detector 4035b (such as LTC1968 from Linear Technologies) can be replaced by a combination of a clock recovery circuit 4036b recovering dither frequency at $f_{dith-1}$ followed by a lock-in amplifier 4037b which transforms its AC input signal into DC.

Figure 40C:
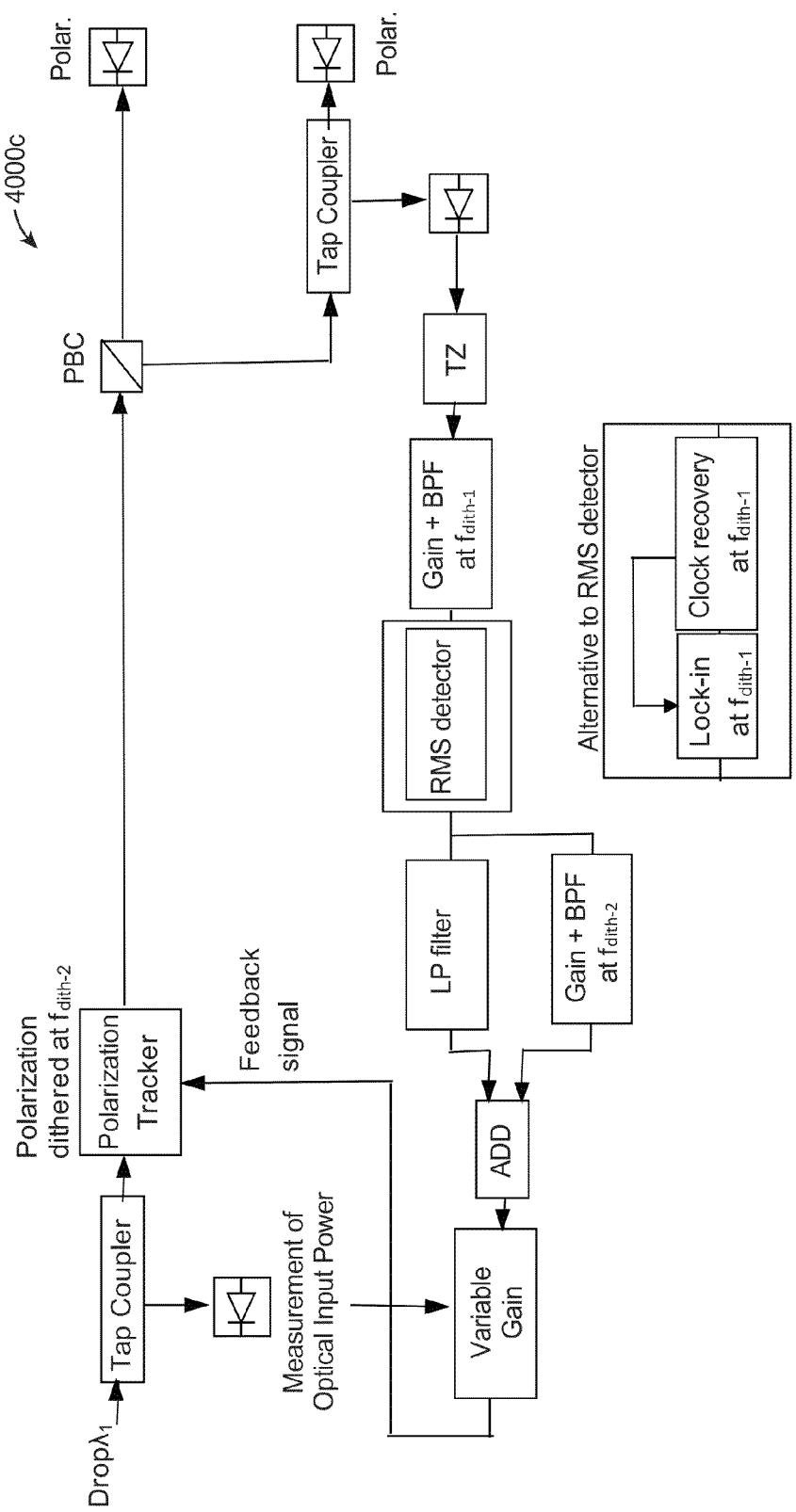
FIG. 40C is a block diagram of a novel embodiment of the feedback control electronics in the dithering scheme employed in the implementation of polarization multiplexing presented in FIG. 40A for $f_{dith-2}$ substantially lower than $f_{dith-1}$.

In a case when $f_{dith-2}$ is substantially lower than $f_{dith-1}$, two parallel paths can be realized as shown in FIG. 40C.

The processing algorithms shown in FIG. 40B and FIG. 40C (and all other Figures discussed herein and illustrating embodiments of polarization multiplexing) can be implemented by using analog electronics or DSP in the digital domain. In the latter case, the TZ output signal could be sampled by an ADC, and DSP processing output could drive a DAC and provide feedback voltage to the polarization tracker.

One advantage of such solutions over existing art is that, in each parallel signal processing path, different processing can be implemented—e.g. different gain, different spectral transfer function (e.g. shape of a BPF, LPF), etc.

c. A Novel Polarization Multiplexed System Based on 3 Dithering Frequencies

Figure 40D:
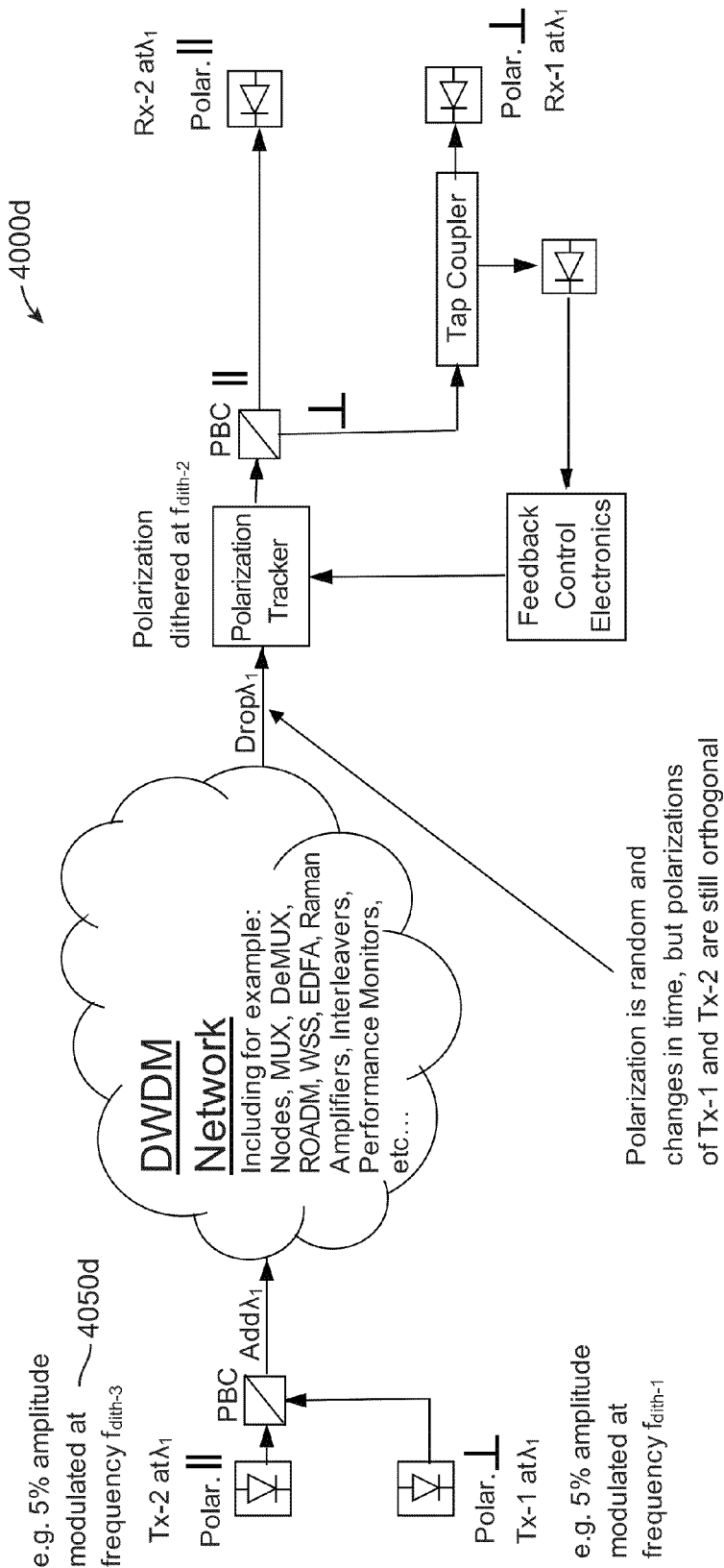
FIG. 40D is a block diagram of one embodiment of a polarization tracking scheme of the present invention with three dithering frequencies.

A known method of implementing dithers (see FIG. 40A) can be significantly improved by adding an additional third dither to Tx-2 at a frequency $f_{dith-3}$ 4050d as presented in FIG. 40D.

d. A Particular Implementation of the Feedback Control Electronics in FIG. 40D

Figure 40E:
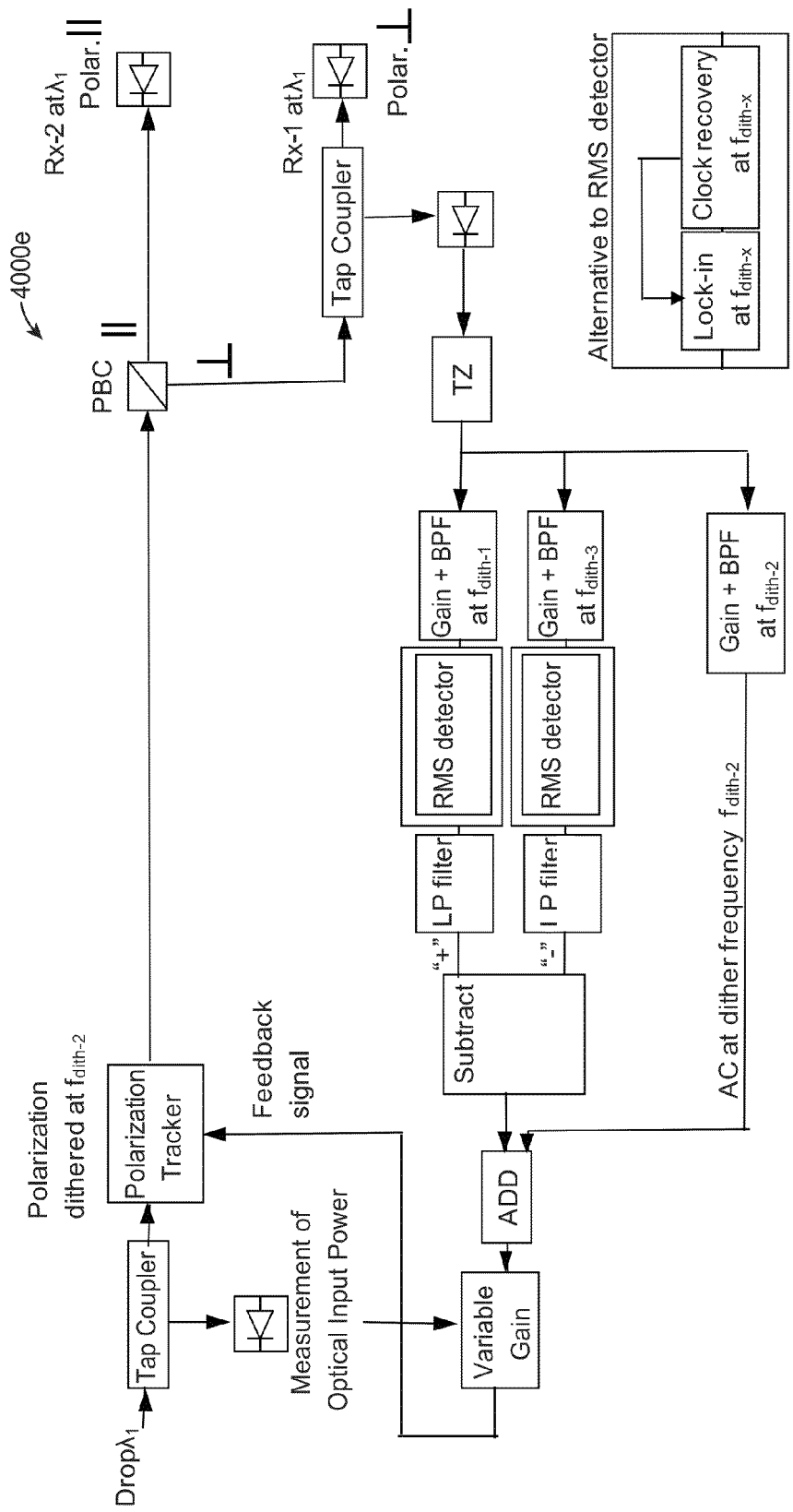
FIG. 40E is a block diagram of one embodiment of the feedback control electronics for the polarization multiplexed system presented in FIG. 40D.

A particular implementation 4000e of feedback control electronics for three dithering frequencies is presented in FIG. 40E. In this embodiment, both dithers at the receive end are detected in two parallel arms of the feedback control electronics, and after filtering they are subtracted.

Figure 40F:
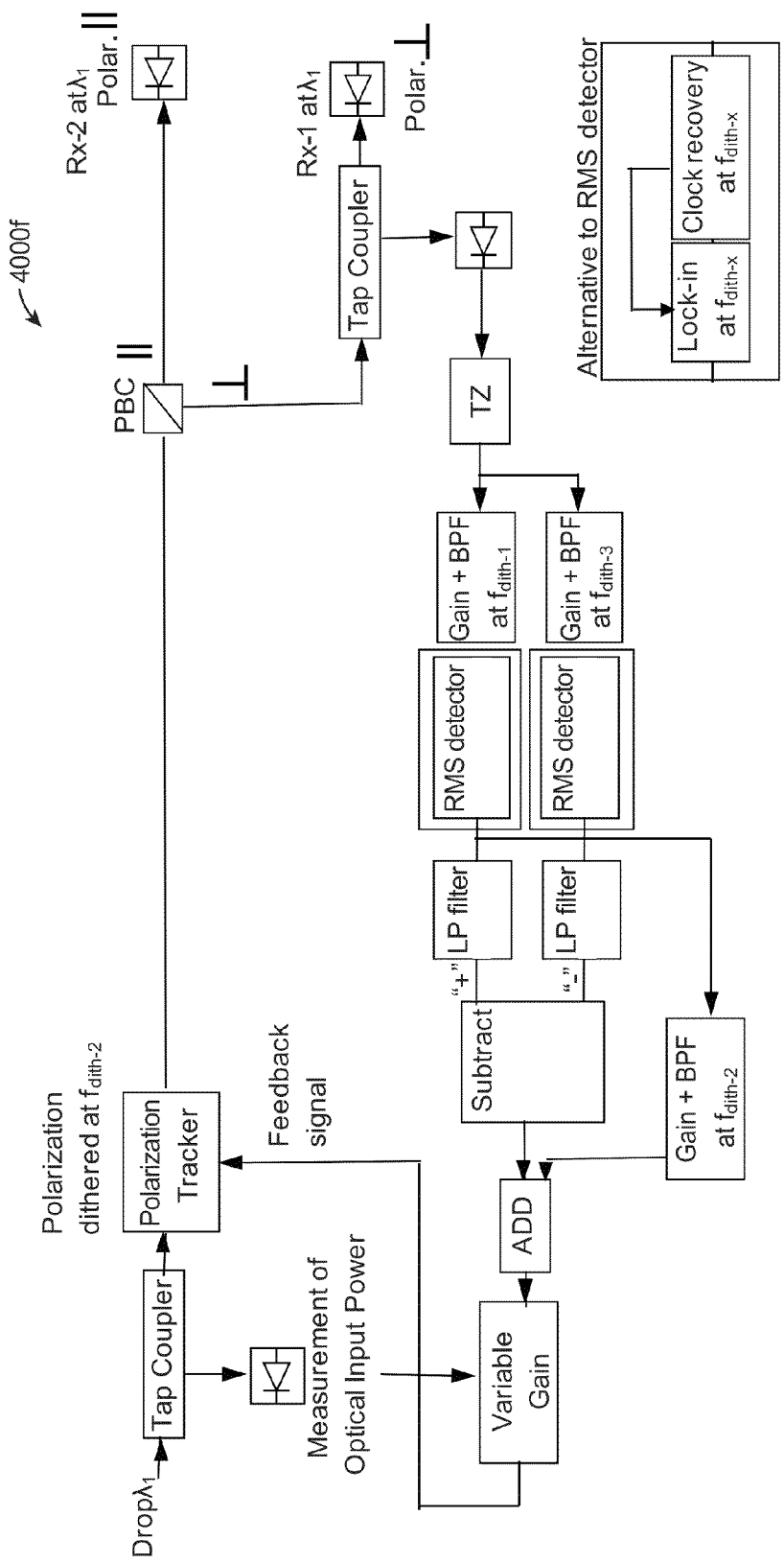
FIG. 40F is a block diagram of one embodiment of the feedback control electronics for the polarization multiplexed system presented in FIG. 40D for $f_{dith-2}$ substantially lower than $f_{dith-2}$.
Figure 40G:
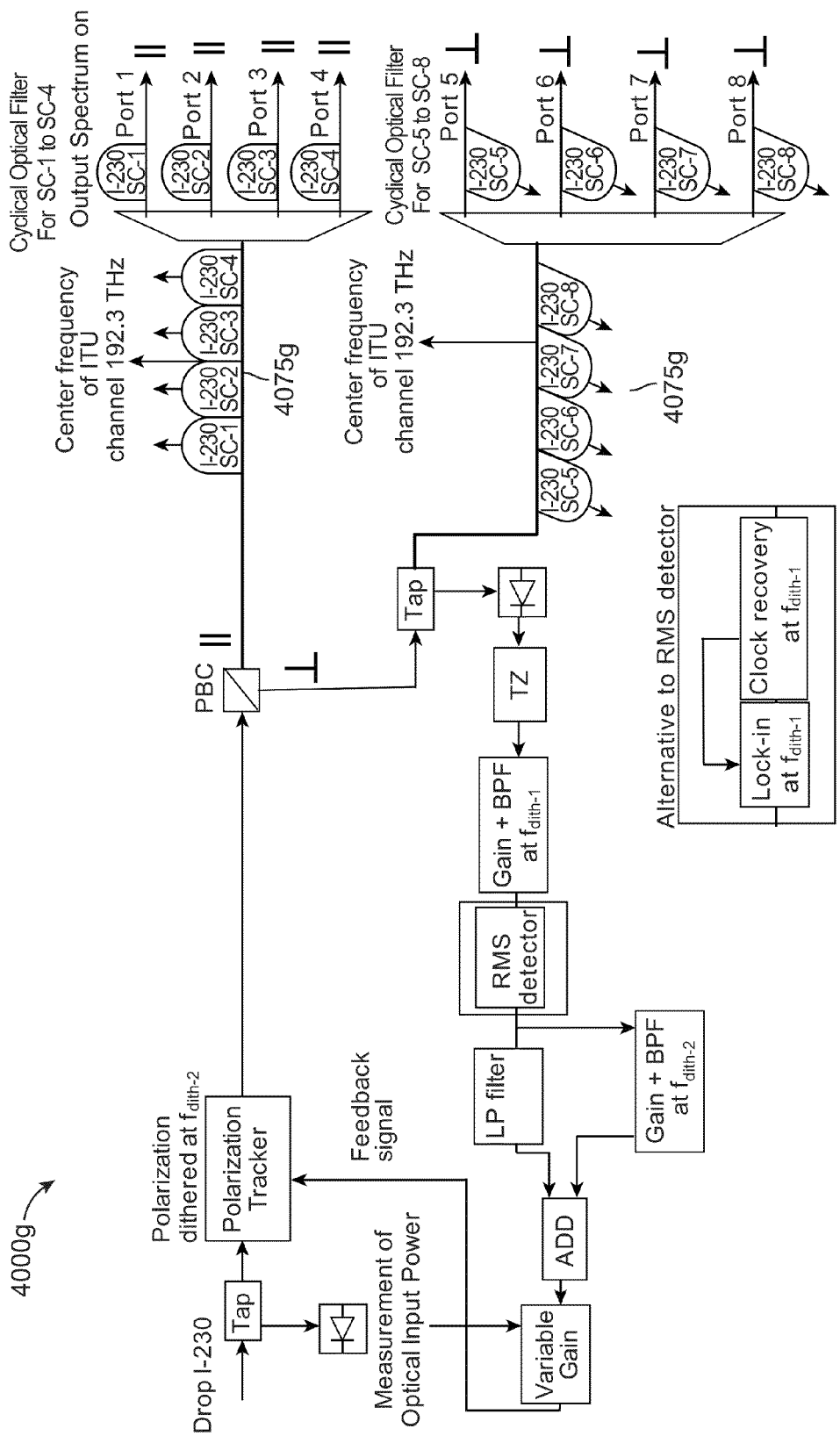
FIG. 40G is a block diagram of one embodiment of polarization multiplexing feedback control electronics applied to a subchannel-based DWDM system of the present invention.

As a result, dithering amplitude at frequency $f_{dith-1}$ is maximized and dithering amplitude at $f_{dith-3}$ is minimized, providing substantially better extinction ratio of polarization tracking. As above with respect to FIG. 40D, parallel paths can be implemented in two different ways depending on the relationship between the values of $f_{dith-2}$ and $f_{dith-1}$—of FIG. 40E to FIG. 40F.

e. Subchannel-Based DWDM Implementations of the Above Polarization Multiplexing Schemes The techniques in the above embodiments of dithering and feedback control electronics can be further enhanced by introducing subchannels (as discussed above) to the ITU grid of frequencies. FIG. 40G illustrates one of the possible embodiments (employing subchannels 4075g) based on the control electronics illustrated in FIG. 40B.

Figure 40H:
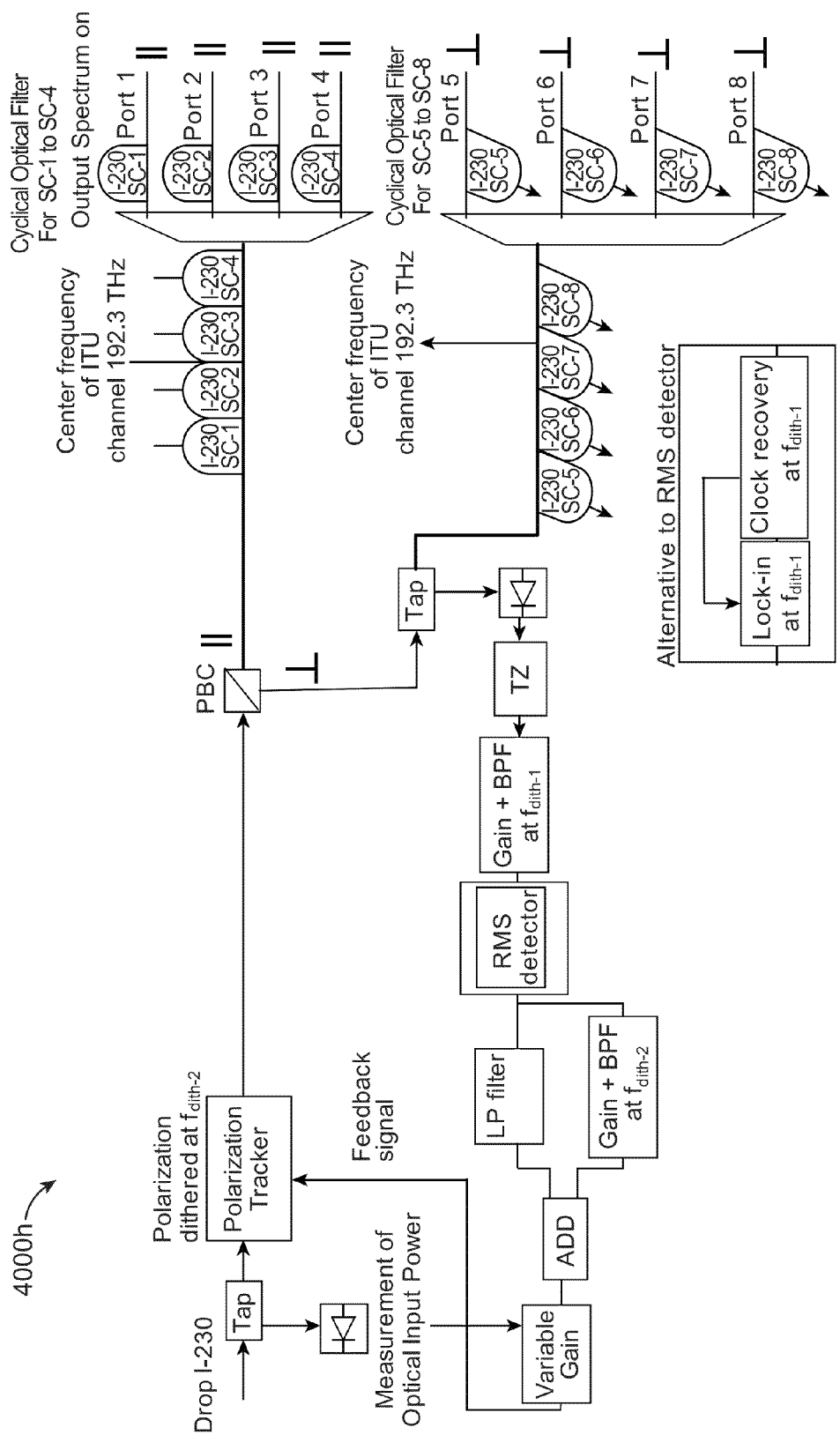
FIG. 40H is a block diagram of an alternative embodiment of polarization multiplexing feedback control electronics applied to a subchannel-based DWDM system of the present invention.

While all of the dithering and feedback control electronics schemes discussed above can be applied to the subchannel architecture 4000g presented in FIG. 40G, one such example 4000h (with respect to the feedback control electronics illustrated in FIG. 40C) is illustrated in FIG. 40H.

f. A Polarization Multiplexing System without Dithering of Transmitting Lasers

Figure 40I:
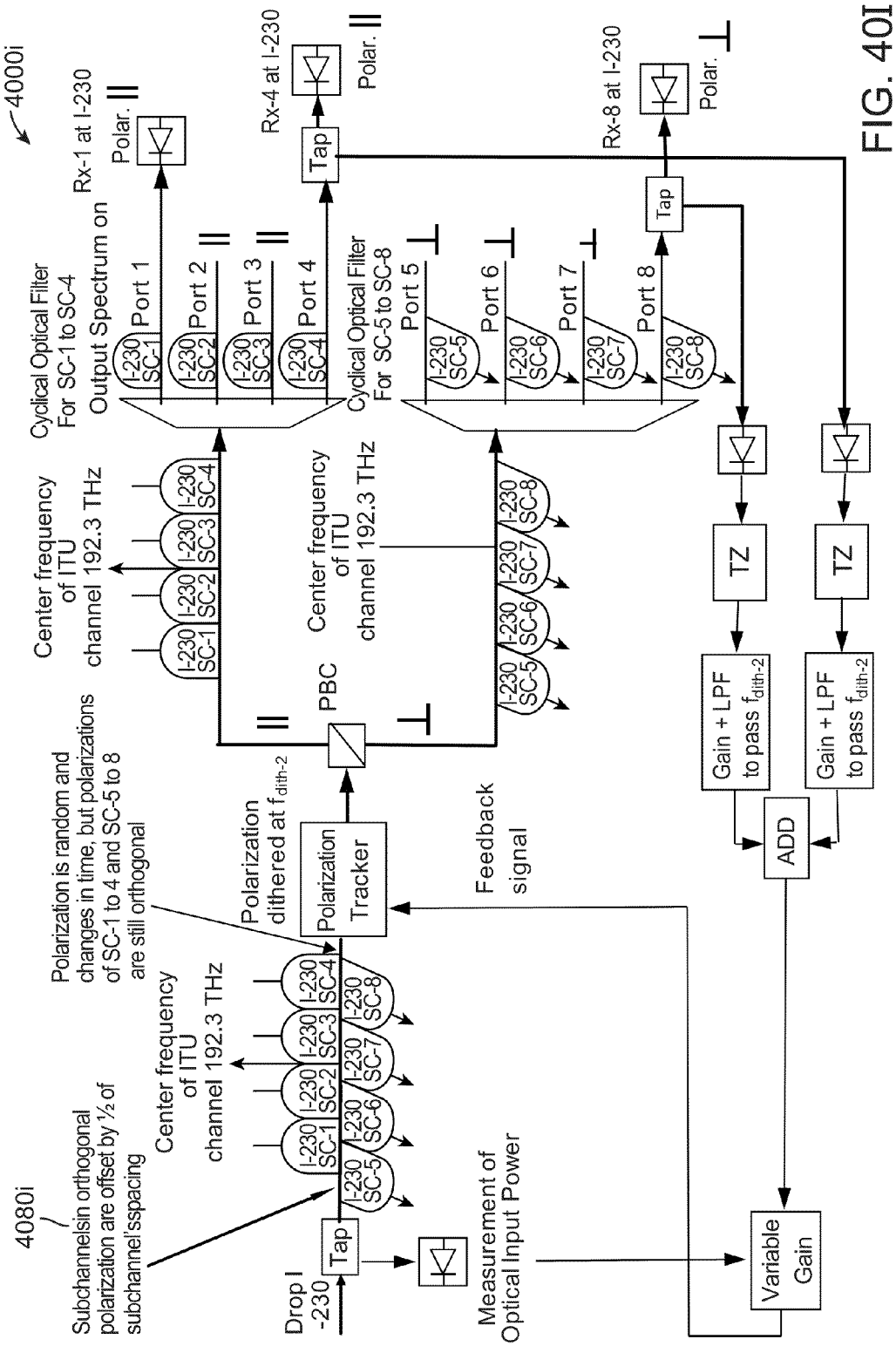
FIG. 40I is a block diagram of one embodiment of a polarization tracking scheme of the present invention without dithering lasers on the transmit end.

In the polarization tracking schemes described above, one or more dither frequencies are required on the transmit end. In many applications, introducing dither at the transmit end and detecting it at the receive end may not be practical. For example, during propagation of the signal from the transmit end to the receive end, the dither signal applied to the transmitters can be distorted to the extent that it is not useful anymore at the receive end as a valid signal for a feedback loop to track polarization. FIG. 40I illustrates a novel embodiment 4000i of a polarization tracking scheme applied to the subchannel architecture of the present invention which does not require any dithering at the transmit end.

In this scheme, the distinction between two orthogonal polarizations on the transmit end is implemented in the wavelength domain, i.e. subchannels in orthogonal polarizations are offset by half of the subchannel spacing, as shown in element 4080i. Note that the wavelength offset between subchannels in two orthogonal polarizations does not need to be exactly half of the subchannel spacing; the offset can be anywhere between half the channel spacing to zero offset. The selection of the offset in any particular implementation may depend on the accuracy of the polarization tracker and the allowed total signal bandwidth. The feedback control electronics is designed to maximize light intensity of one or more subchannels (or all subchannels in both polarizations) after the input signal is demultiplexed into separate single subchannels. The particular embodiment 4000i presented in FIG. 40I shows a case of the feedback control electronics maximizing intensity of two subchannels—one for each polarization as an example. Note that instead of tapping the output of each cyclical filter, the signals can be taken from the receiver bias currents.

Figure 40J:
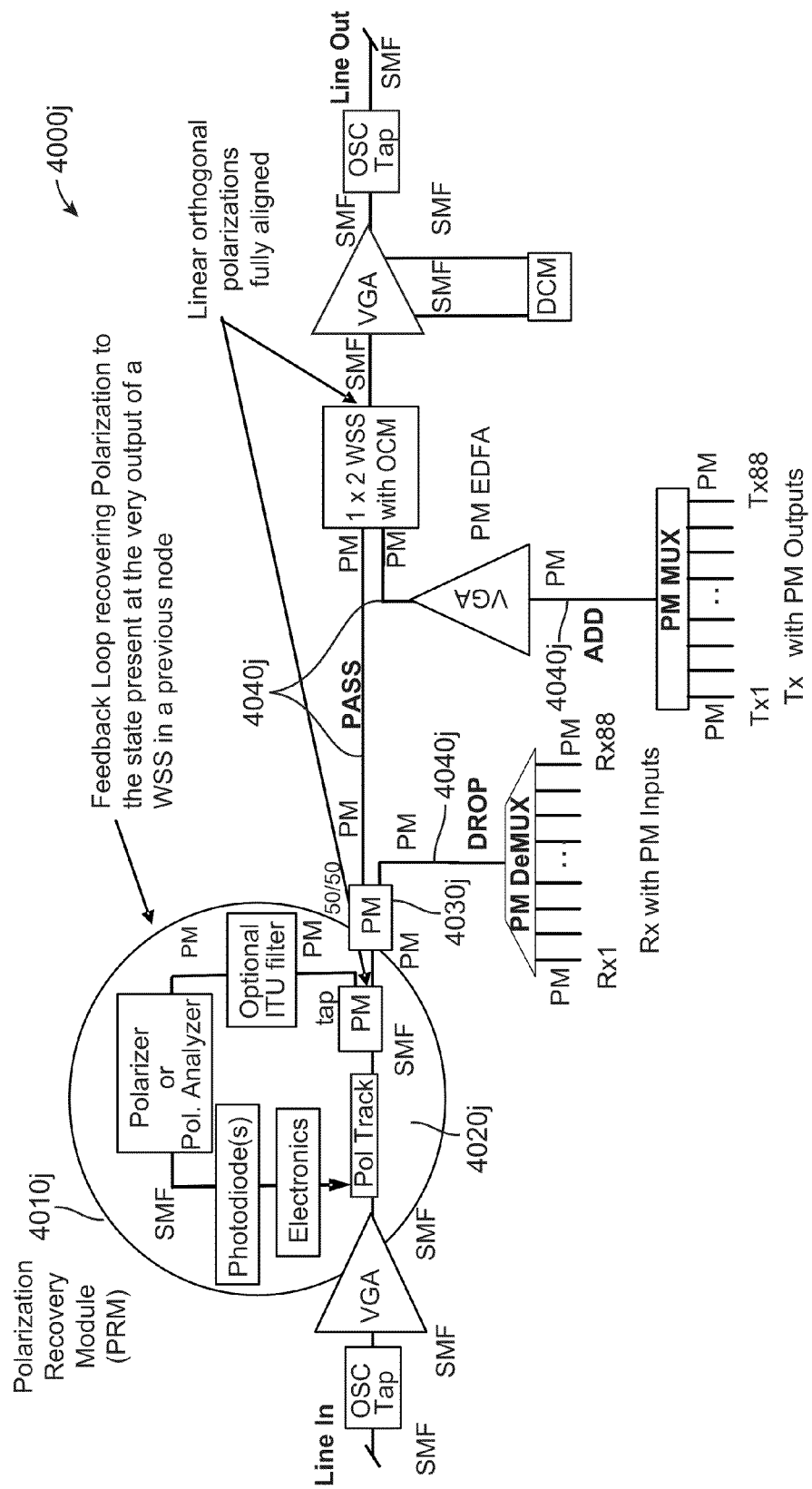
FIG. 40J is a block diagram of one embodiment of a polarization tracking scheme of the present invention that enables polarization matching of added signals to passthrough signals.

In these polarization tracking schemes, there can be a requirement for an add/drop node where signals are being added to the optical network at the same node where signals are optically passing through. When polarization multiplexing of subchannels is used as shown in FIG. 39A, there can be a requirement to match the polarization of the added signals to the polarization of the passthrough signals. The embodiment 4000j presented in FIG. 40J shows a polarization recovery module 4010j that monitors the polarization of signals coming into a node and adjusts a polarization tracker 4020j so that the polarization of the signal at the output of the polarization tracker 4020j is aligned with a linear axis of a polarization maintaining coupler 4030j. Polarization-maintaining fibers 4040j are used on the add side of the node to ensure that the polarization of the added signals is aligned with the passthrough signals. The embodiment shown is for the case of a 1×2 WSS node. Those skilled in the art will recognize that a similar design can be used for other types of passthrough nodes where a polarization tracker with a design shown in one of the embodiments of FIGS. 40A-40I is used to align the incoming signal polarizations to a linear axis of the add/drop node and polarization maintaining fibers and optical components are used in the node to ensure that signals are being added along the same linear axis.

5. Subchannel Mapping of Client Services on the Subchannel Muxponder

Figure 41:
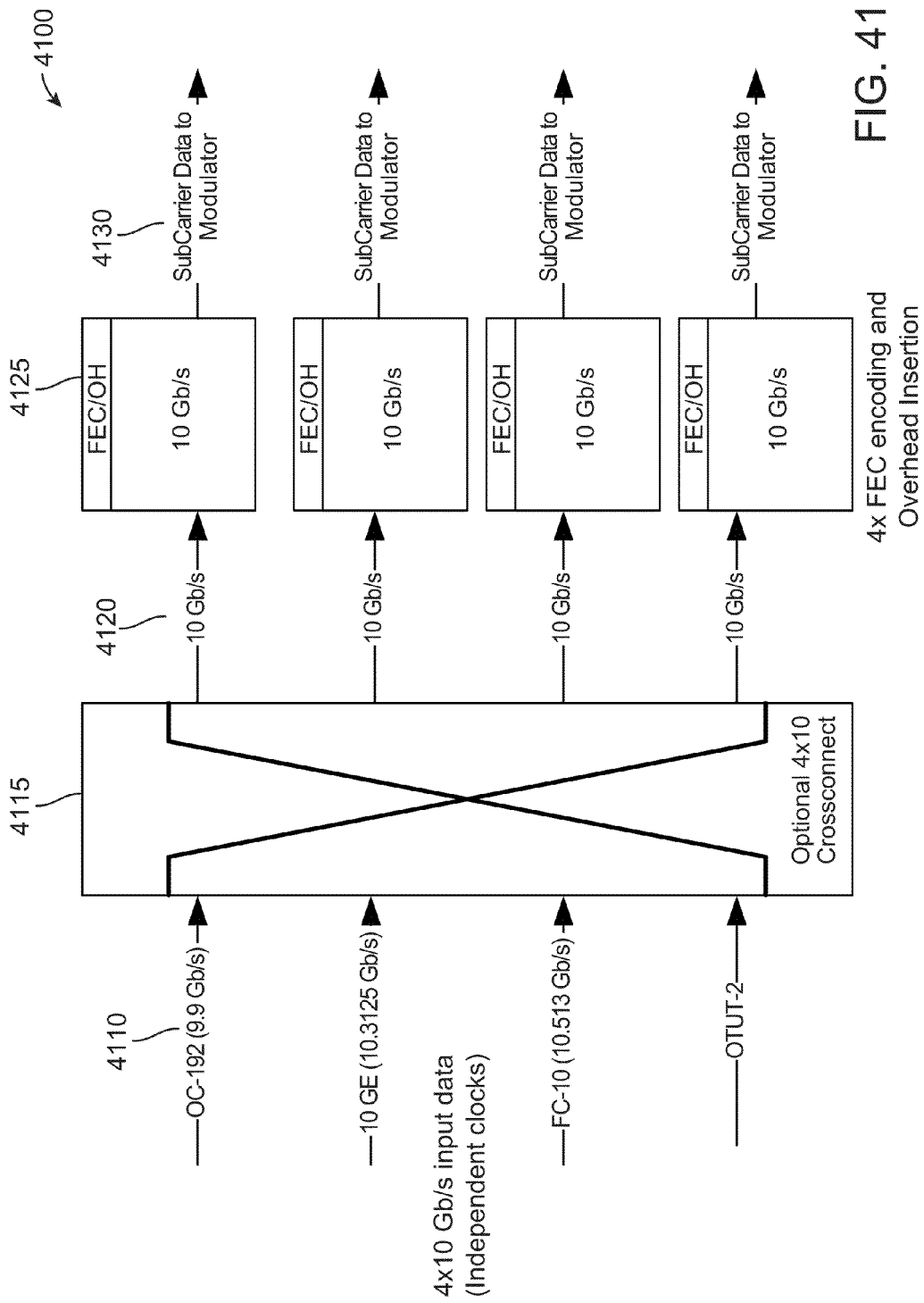
FIG. 41 is a block diagram of one embodiment of the mapping of client services to subchannels of the present invention.

Client data can be mapped to the subchannels as shown in FIG. 41, in which data from independent 10 Gb/s sources 4110 is mapped directly to each subchannel 4120. In each 10G data path an FEC encoding device 4125 (either an FPGA or ASIC) is used to encode the data according to an error correction algorithm that improves the optical performance [G.709 and G.975]. Overhead (OH) data can also be inserted in the FEC overhead to enable the exchange of OAM&P (operations, administration, maintenance, and provisioning) data to be exchanged between the terminals.

Note that a 10 Gb/s crossconnect 4115 may be inserted between the input data 4110 and the subchannels 4120. This may be either a digital or analog electronic crossconnect, or optical crossconnect [see, eg, U.S. Pat. No. 6,574,386]. It can also be a protocol-dependent switch such as an ethernet switch. This enables more flexible functionality as described below.

The design 4100 shown in FIG. 41 is flexible in that any 10G protocol (e.g., 10GE, OC-192, FC-10, etc.) can be connected to any input port 4110. Each port 4110 has independent clock recovery and clock multiplication circuits, and can be assigned, via optional crossconnect switch 4115, to any subchannel 4120. After the data associated with each subchannel 4120 is encoded (and overhead data inserted) via FEC encoding device 4125, such data is then sent to be modulated onto the subchannel's associated subcarrier wavelength 4130.

It should be noted that tuning a laser to map a client circuit to a subchannel may require a relative long period of time, e.g., approximately a minute. Yet, if a subchannel laser has already been tuned to a particular frequency (subcarrier wavelength), and a client circuit is being mapped to that subchannel via crossconnect switch 4115, then the process will typically require much less time, as the switching time of a switch such as crossconnect switch 4115 is typically much faster than the time required to tune or retune a laser.

Figure 42:
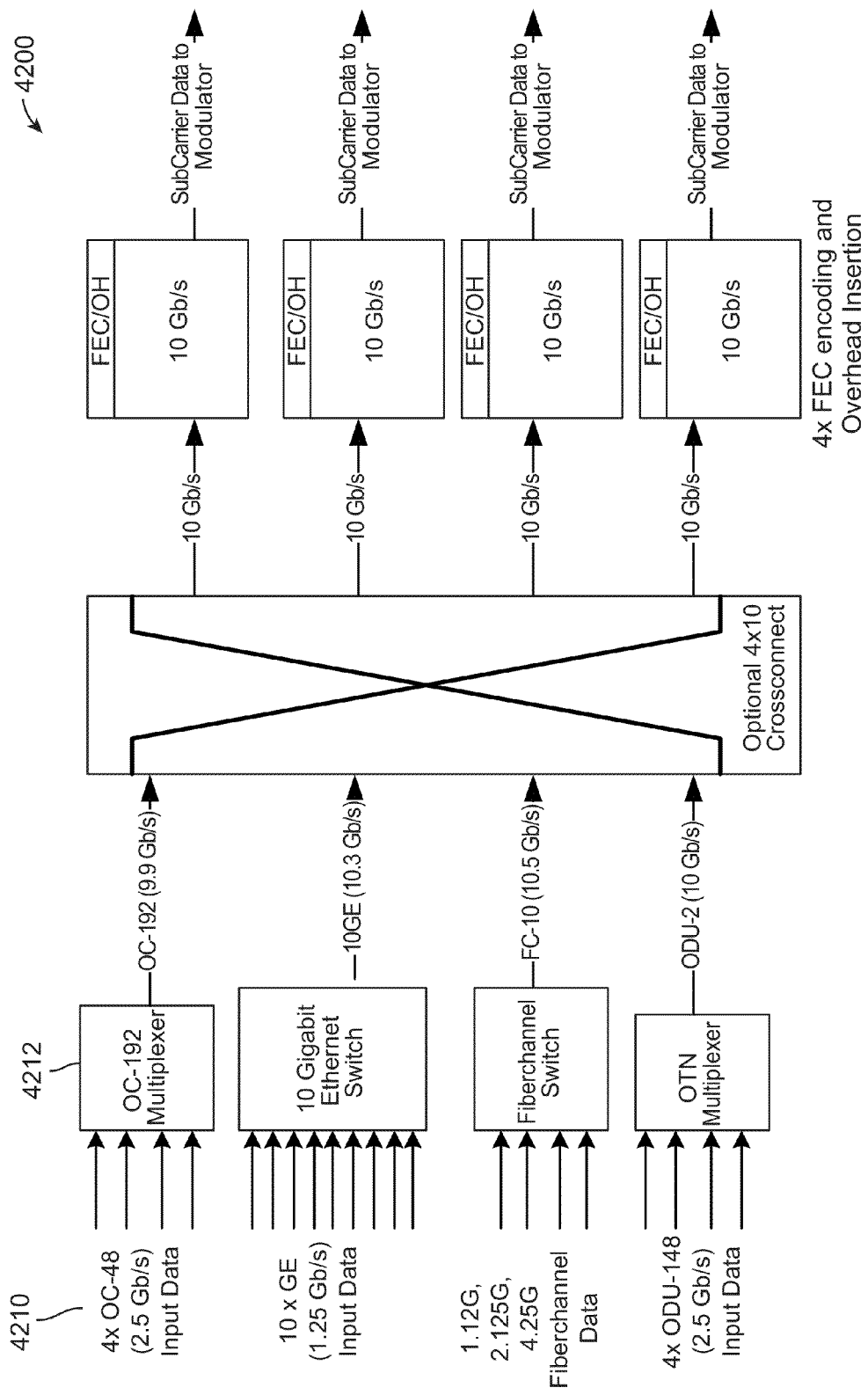
FIG. 42 is a block diagram of one embodiment of mapping lower-rate client services to subchannels of the present invention.

FIG. 42 shows an embodiment 4200 where standard digital multiplexing and switching circuits 4212 are used to multiplex lower rate data 4210 up to 10 Gb/s. With modular data mapping and multiplexing, any subchannel can carry either a native 10 Gb/s service or multiplexed lower-rate services.

Figure 43:
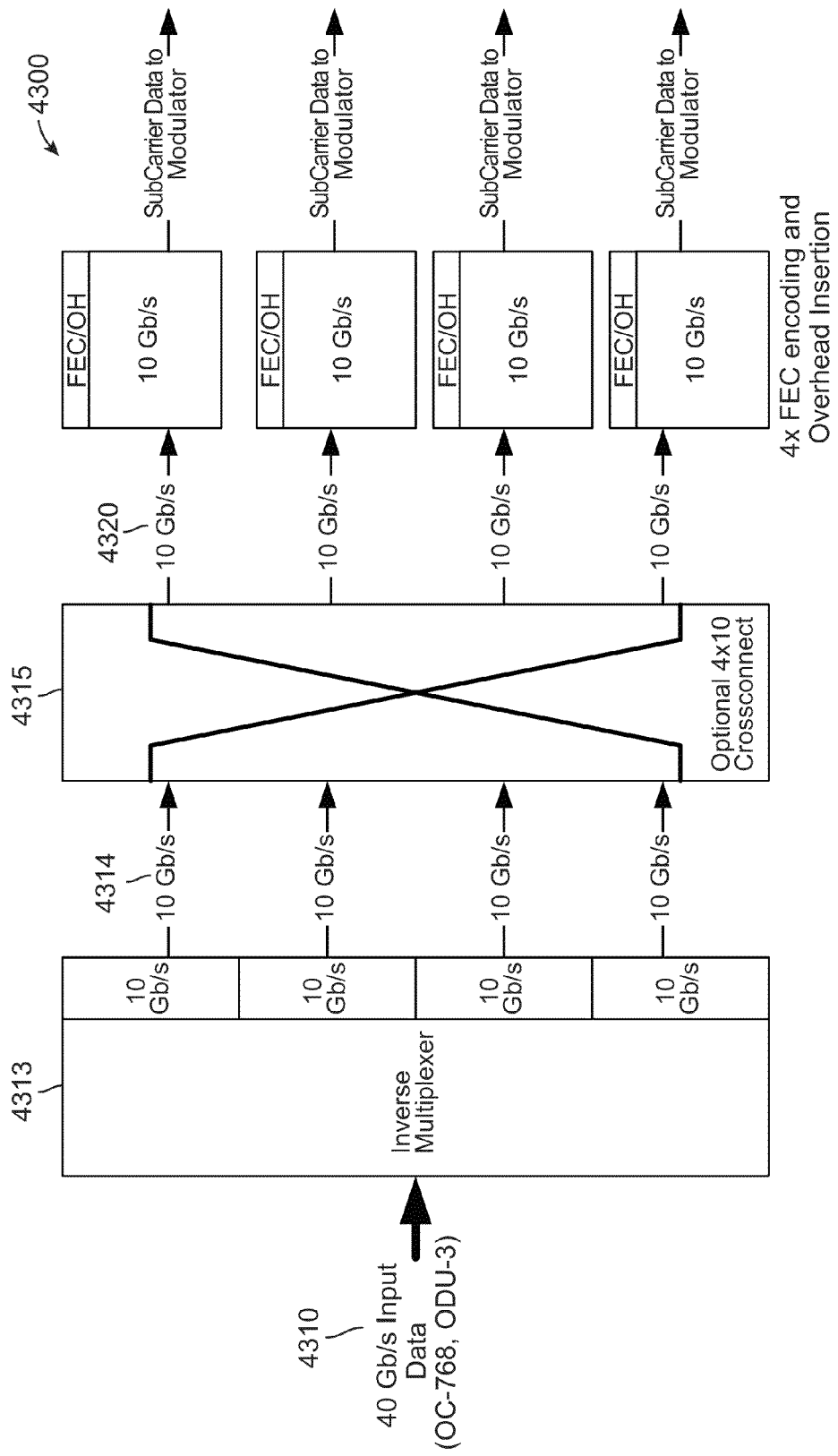
FIG. 43 is a block diagram of one embodiment of mapping 40G client services to subchannels of the present invention.

FIG. 43 shows a third mapping method 4300 where data 4310 with a bandwidth greater than the per-carrier bandwidth is transmitted. In this embodiment, the client data 4310 is inverse multiplexed (via inverse multiplexer 4313) to divide the data into 4 separate data streams 4314 (each of which can be assigned to a respective subchannel 4320, e.g., via optional crossconnect 4315). Inverse multiplexing is well known in the art. For example, IMA (Inverse Multiplexing for ATM) is a standardized technology used to transport ATM traffic over a bundle of T1 or E1 cables using inverse multiplexing.

In the mapping method 4300 shown in FIG. 43, inverse multiplexing can be implemented in an Field-Programmable Gate Array (FPGA) or Application-Specific Integrated Circuit (ASIC). Inverse multiplexing at the transmit side must be done in such a way that the original traffic stream can be recovered at the receiver. Inverse multiplexed data streams have frame markers for the receiver to re-align the data. The frame markers can be based on standard protocols, such as SONET, or they can be proprietary. The receiver also has buffers to hold data before it is realigned. The buffers typically have enough memory to compensate for any skew in the network caused by variations in the propagation speed of the different inverse multiplexed data streams.

6. Line Interface Between Subchannel Muxponders and Lower-Rate Transponders and Muxponders In network applications where lower-bandwidth satellite nodes feed into a hub node, there is a need for a cost effective solution that supports high bandwidth at the hub and low bandwidth at the satellite nodes. This can be achieved by an application with subchannel muxponders at the hub node and lower-rate transponders or muxponders at the satellite nodes. This requires that the lower-rate transponders have (1) the same laser tuning capability as the subchannel muxponder (2) a modulation format that is compatible with the subchannel muxponder modulation, and (3) optical filtering to select the subchannels. The optical filtering may be ITU channel filtering only, as long as the subchannel muxponders are not using more than one subchannel per ITU channel.

Figure 44:
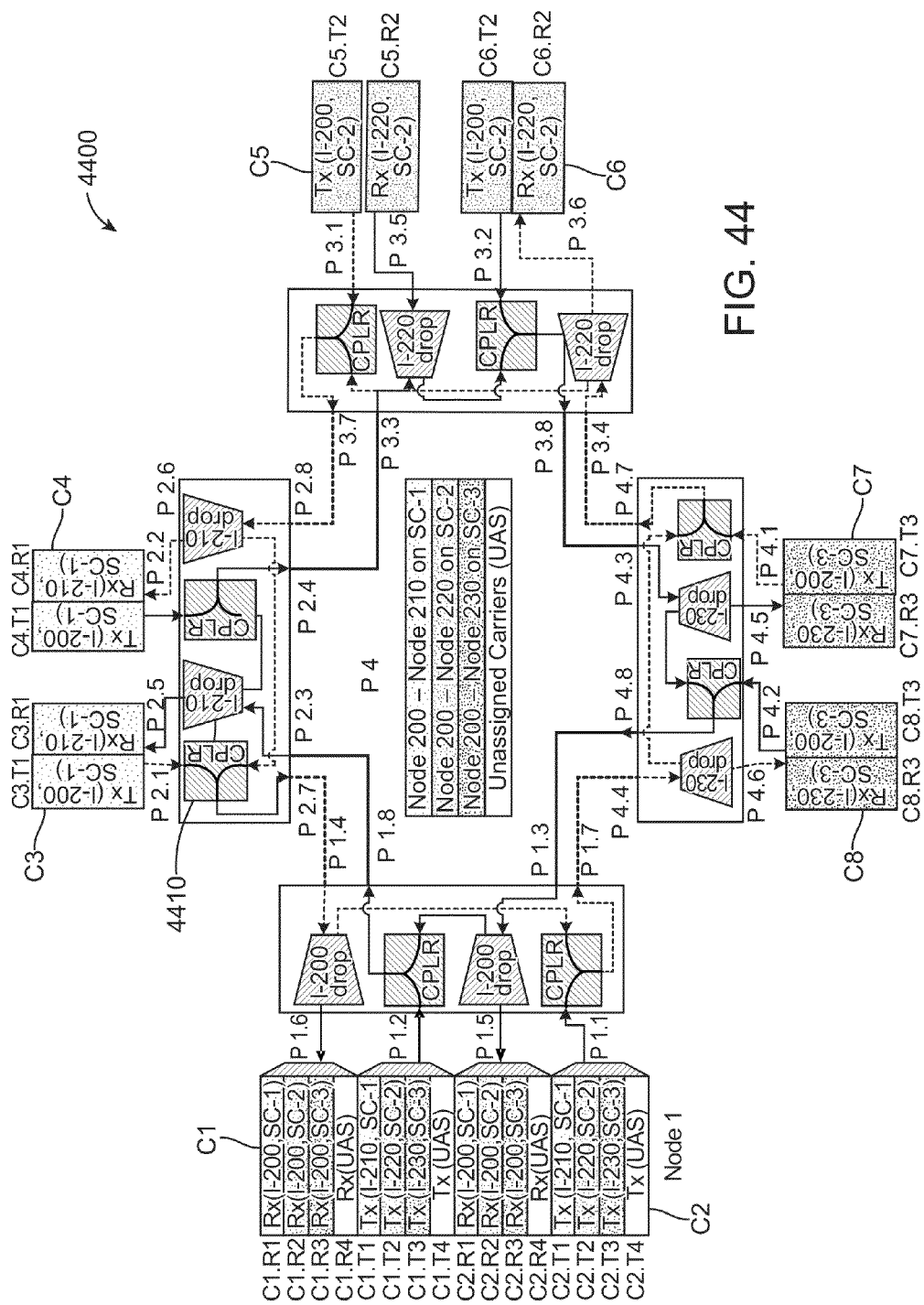
FIG. 44 is a block diagram of a 4-node WDM network with one embodiment of subchannel muxponders of the present invention at Node 1 and lower-rate transponders or muxponders at Nodes 2, 3 and 4.

FIG. 44 shows an application 4400 with a pair of subchannel muxponders C1-C2 at Node 1 and pairs of lower-rate transponders (C3-C4, C5-C6 and C7-C8) at Nodes 3, 4, and 5, respectively. The subchannel muxponder has its transmit subchannels set as (1) ITU-210, SC-1, (2) ITU-220, SC-2, (3) ITU-230, SC-3, and (4) unassigned. A single ITU channel filter (from a FOADM or ROADM) at the satellite nodes (e.g., drop filter 4410 at Node 2) can be used to filter out the subchannels from the subchannel muxponder. Each transponder at the satellite nodes must be set to transmit at one of the subchannel frequencies being received at Node 1. In this embodiment, the transponders at Node 1 are set to ITU 200, SC-1; the transponders at Node 2 are set to ITU-200, SC-2; and the transponders at Node 3 are set to ITU-200, SC-3. These subchannels are then dropped by the cyclical filter in the subchannel muxponders at Node 1. Note that this application 4400 requires that the lasers in the lower-rate transponders must have the same degree of accuracy as the subchannel muxponder lasers.

B. Dynamic Network Visibility

Facilitating Network Upgrades and Reuse of Legacy Equipment

Even when improved functionality is available, such as the novel subchannel architectures described above, it is still desirable to minimize the time and expense, as well as disruption to live networks, associated with upgrading hardware and software, as well as to reuse legacy equipment whenever feasible. Various novel techniques along these lines are described below.

1. Network Upgrades with Minimal Disruption and No East-West Ambiguity

Figure 1A:
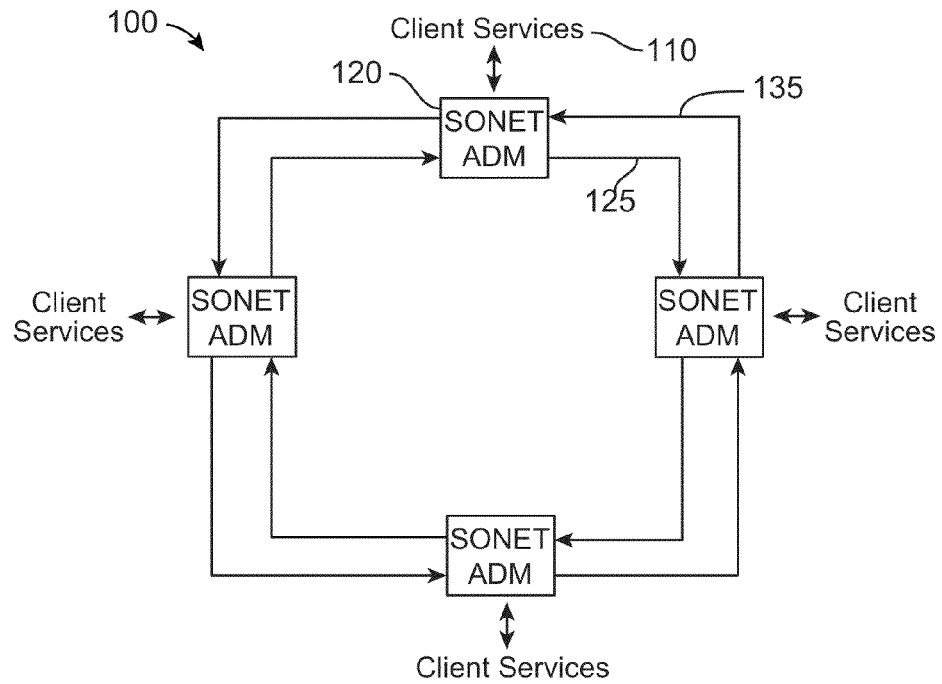
FIGS. 1A and 1B illustrate optical ring networks that utilize OC-48 SONET add/drop multiplexers and Gigabit Ethernet switches, respectively.
Figure 1B:
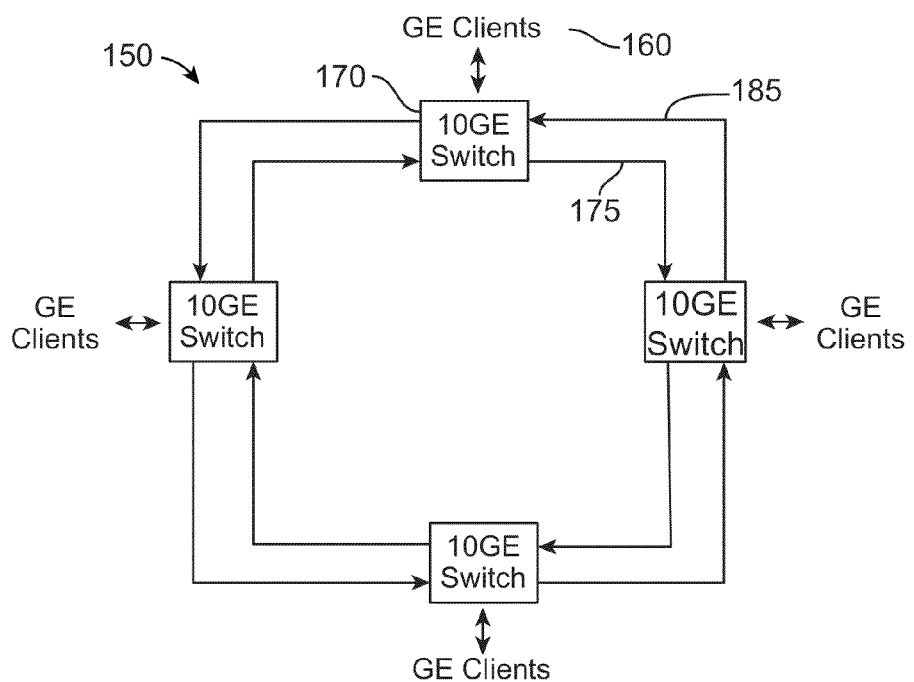
Figure 2:
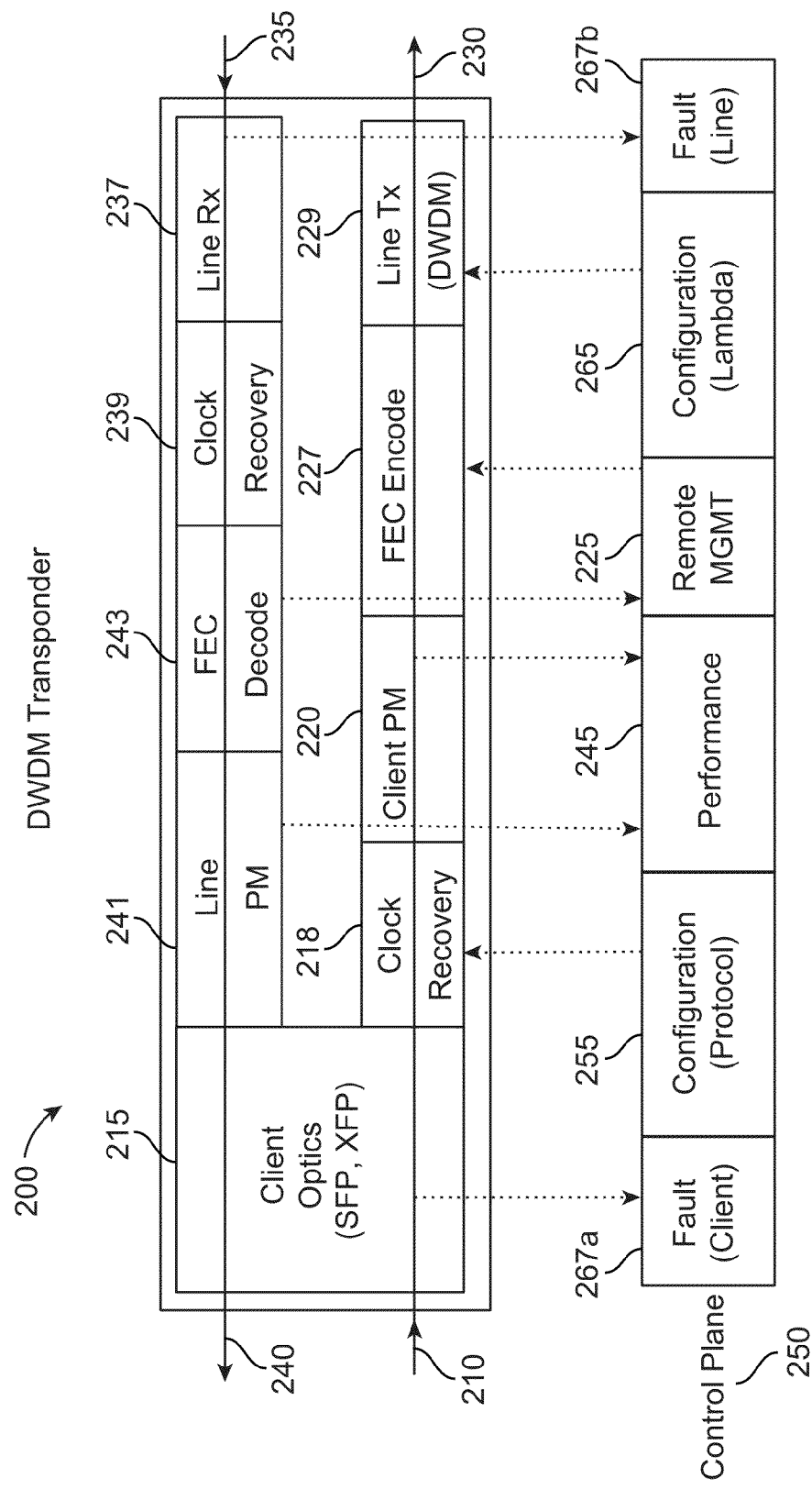
FIG. 2 is a block diagram of a WDM transponder.
Figure 3:
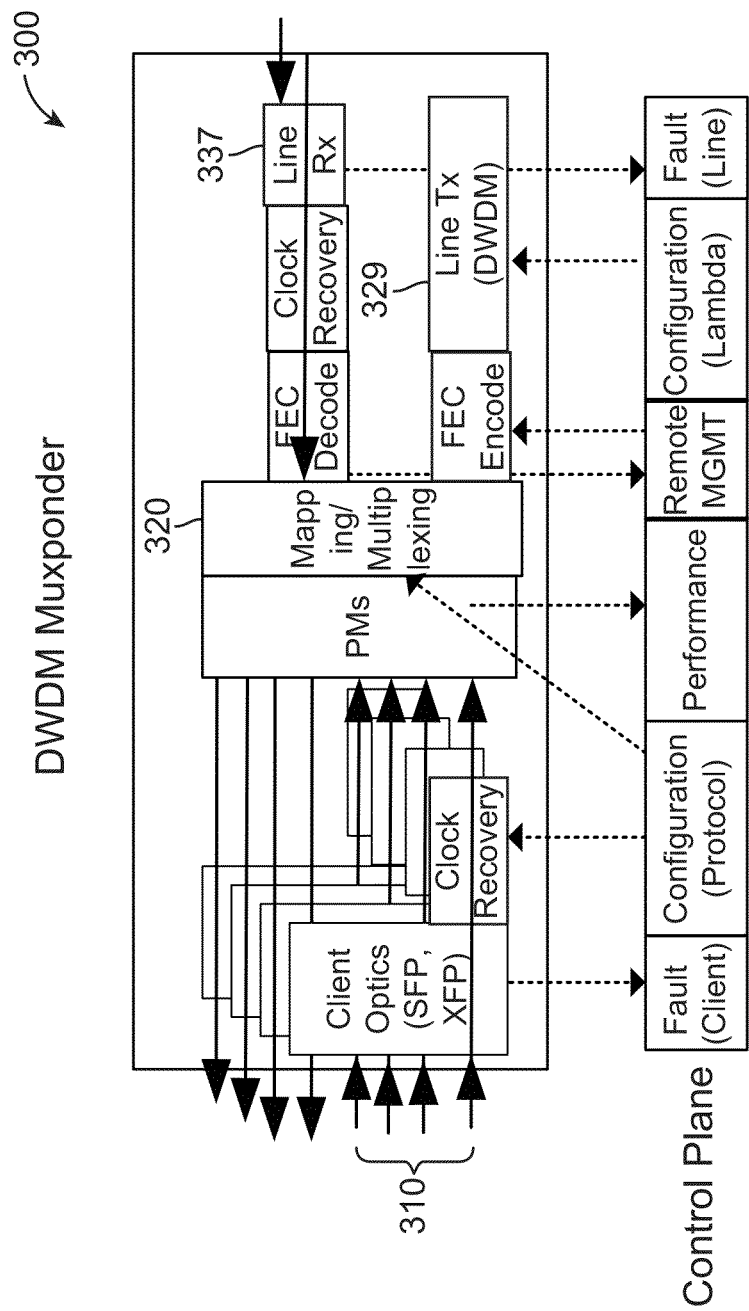
FIG. 3 is a block diagram of a WDM muxponder.
Figure 4:
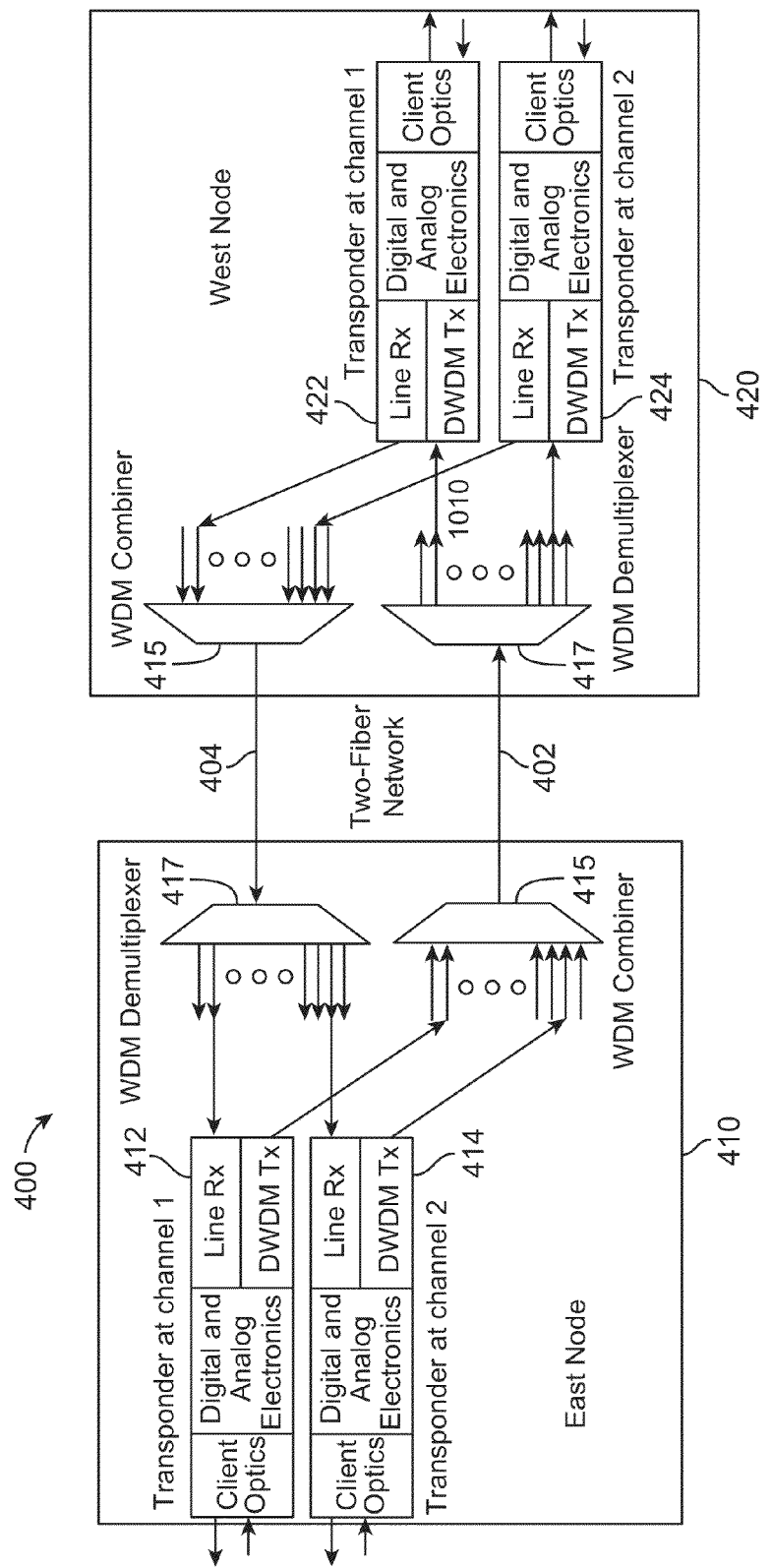
FIG. 4 is a block diagram of a point-to-point WDM network employing two fiber-optic cables.
Figure 5:
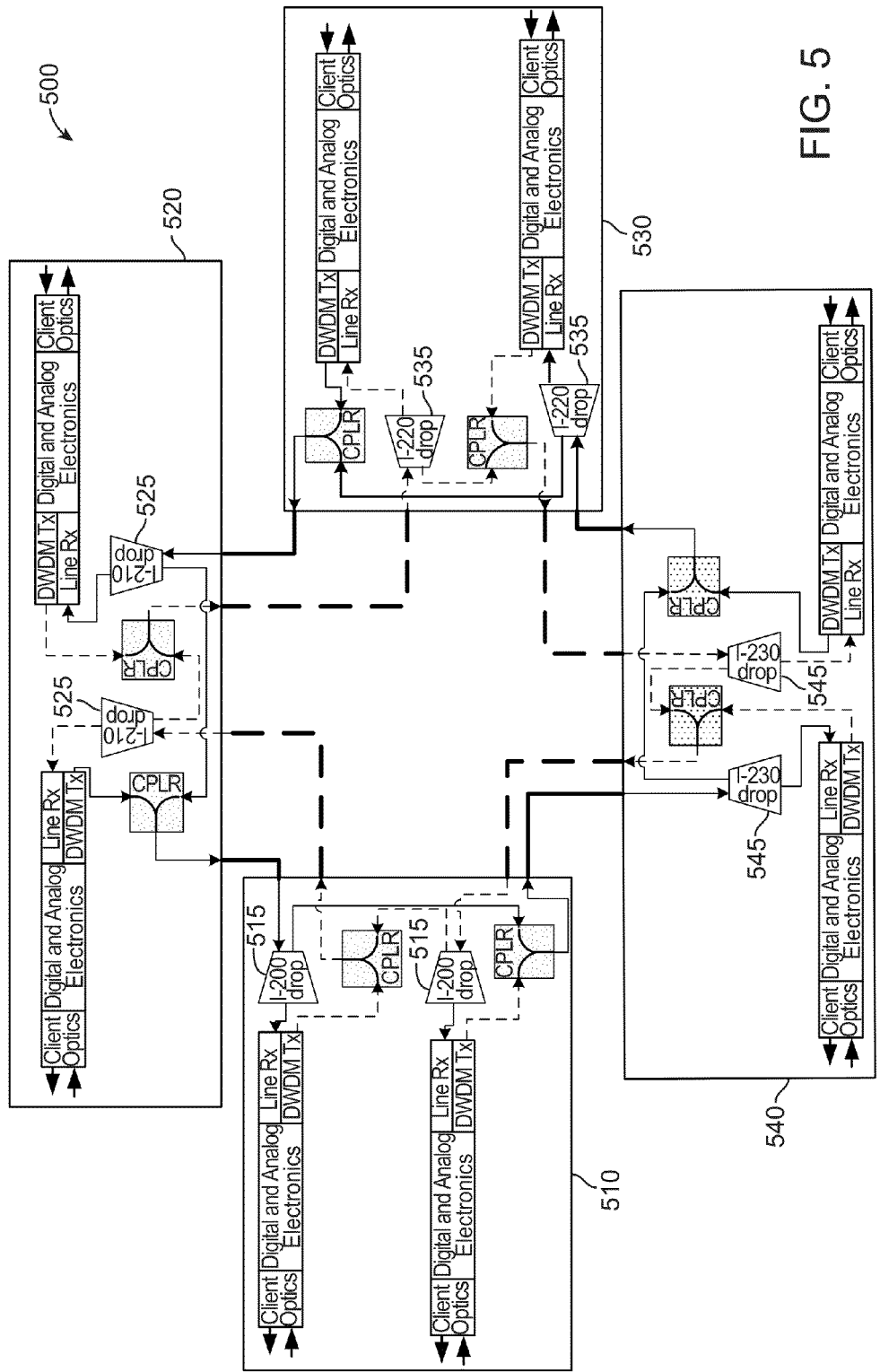
FIG. 5 is a block diagram of a WDM Ring network with drop filters and add couplers at each node.
Figure 6:
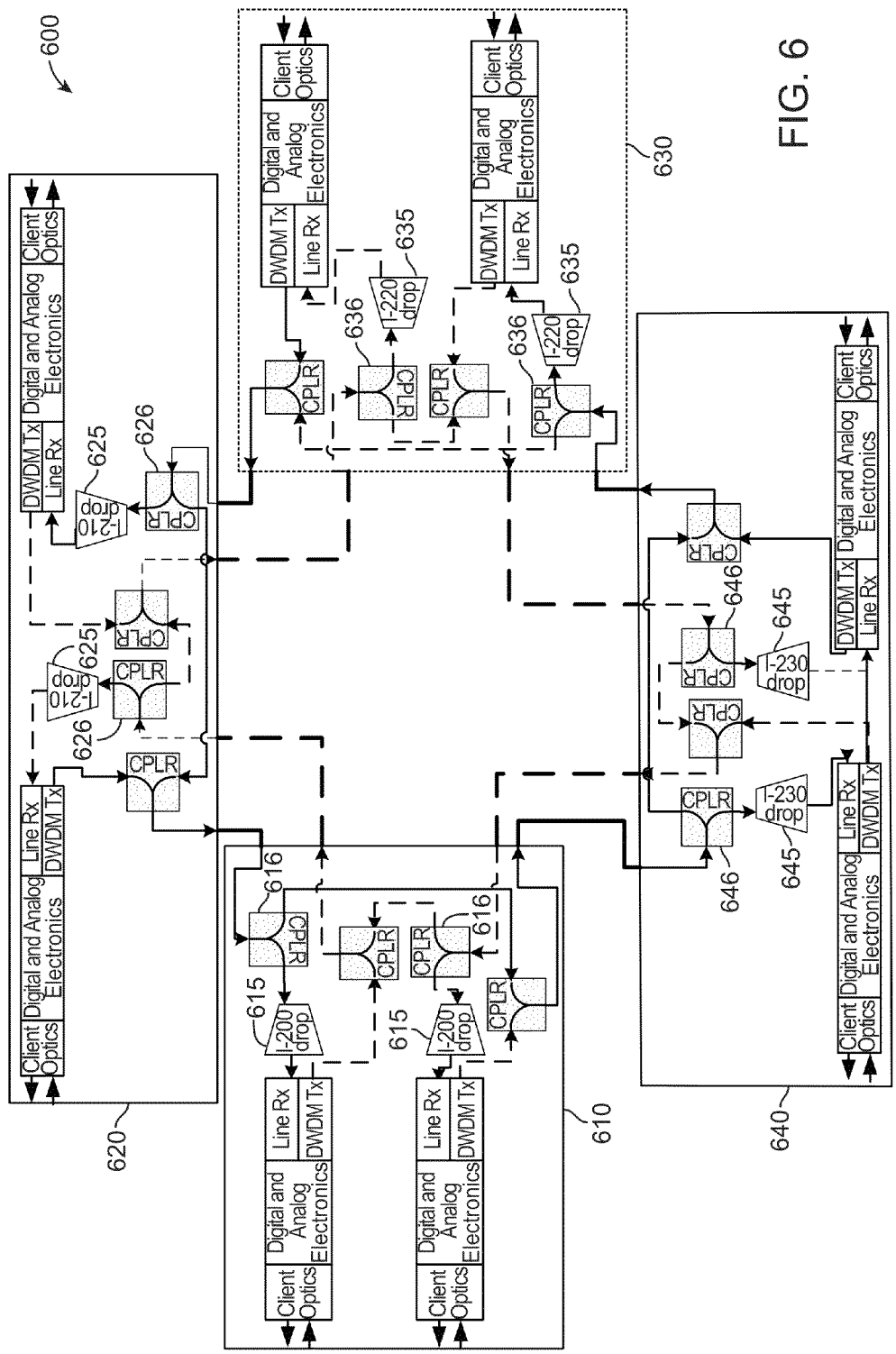
FIG. 6 is a block diagram of a Broadcast and Select WDM Ring network with drop filters and add couplers at each node.
Figure 7:
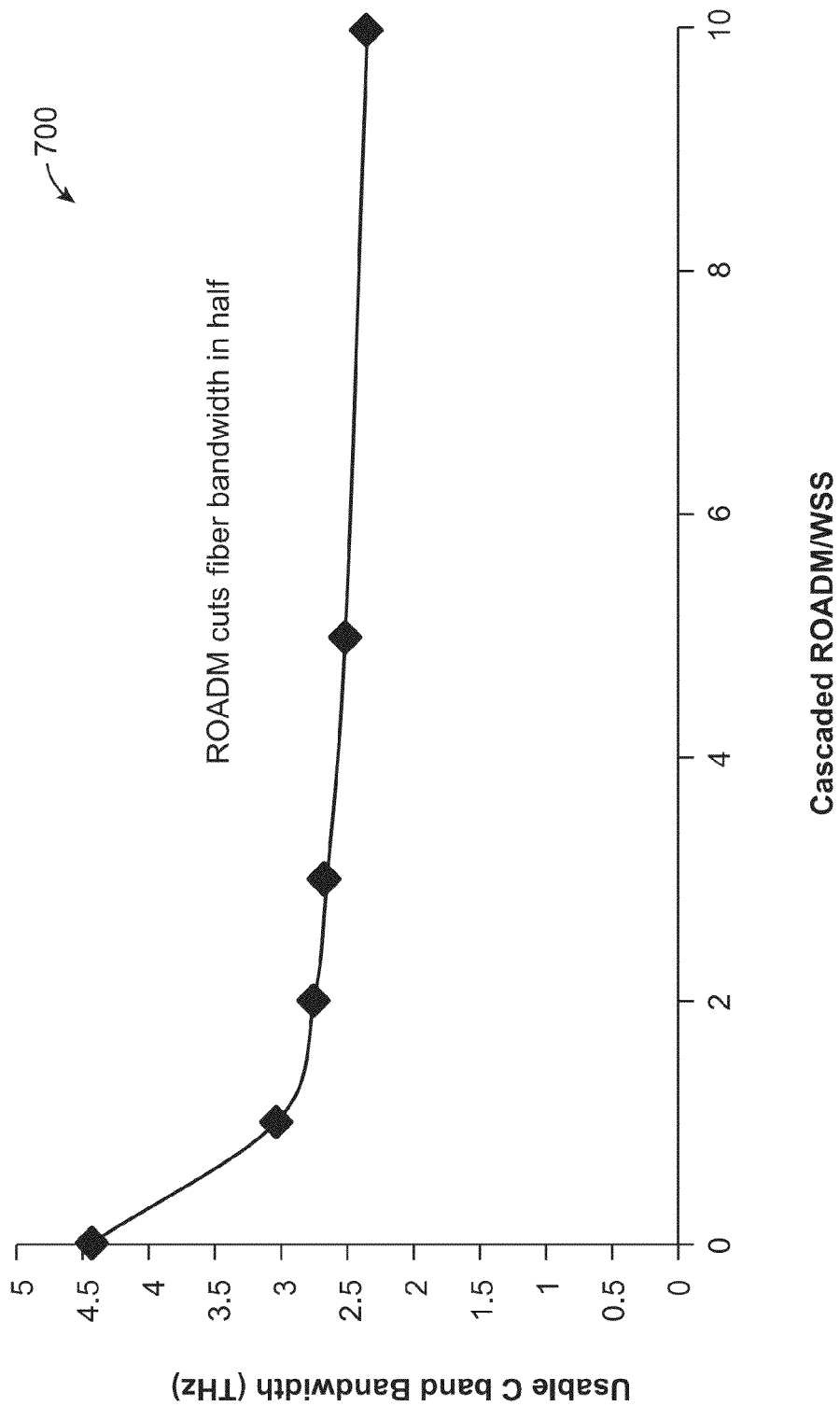
FIG. 7 is a graph illustrating the effect of cascaded ROADMs or WSS filters on usable C-band bandwidth in an optical network.
Figure 8:
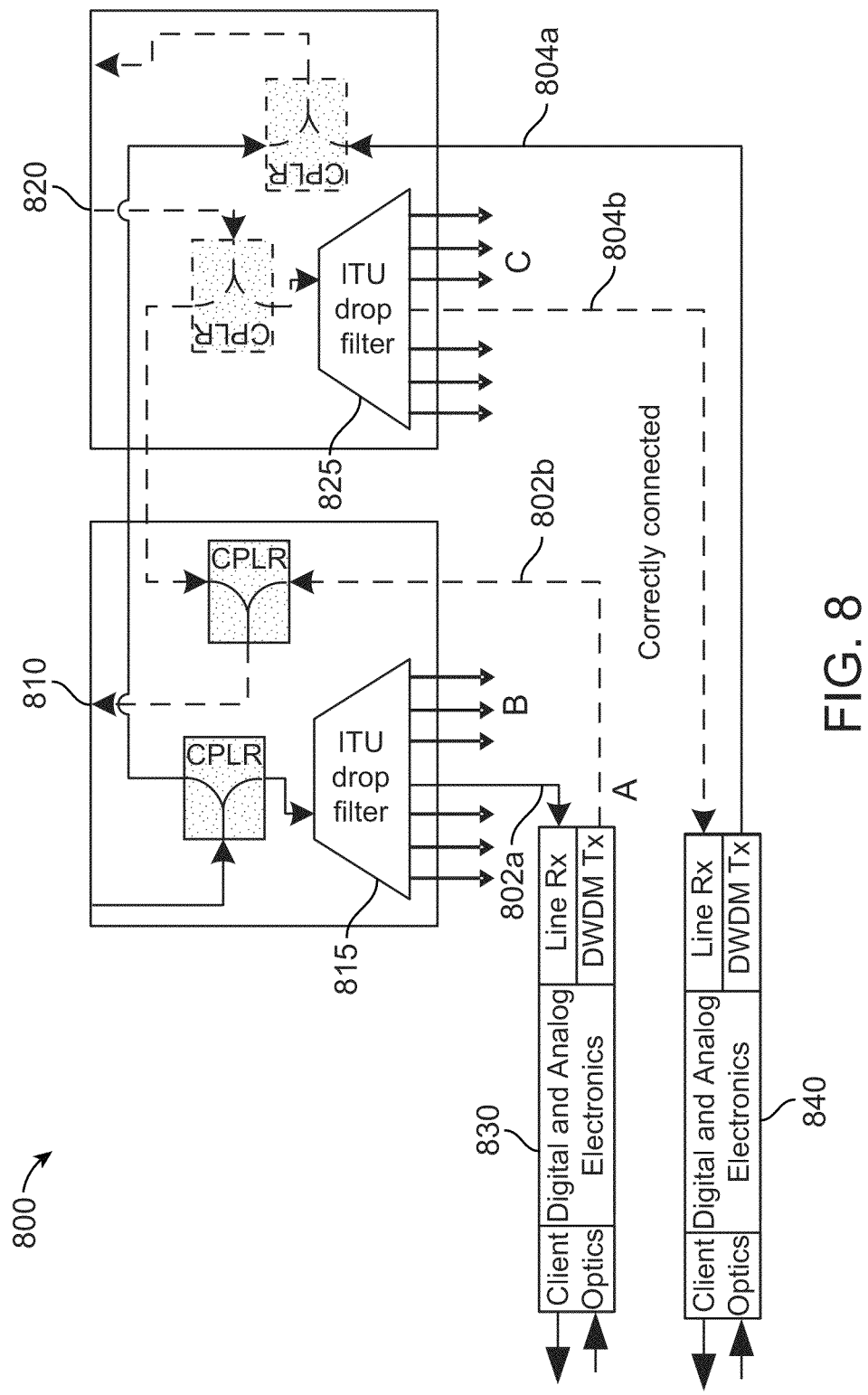
FIG. 8 is a block diagram illustrating the partitioning of WDM equipment functionality between transponder modules and add/drop filters.
Figure 9:
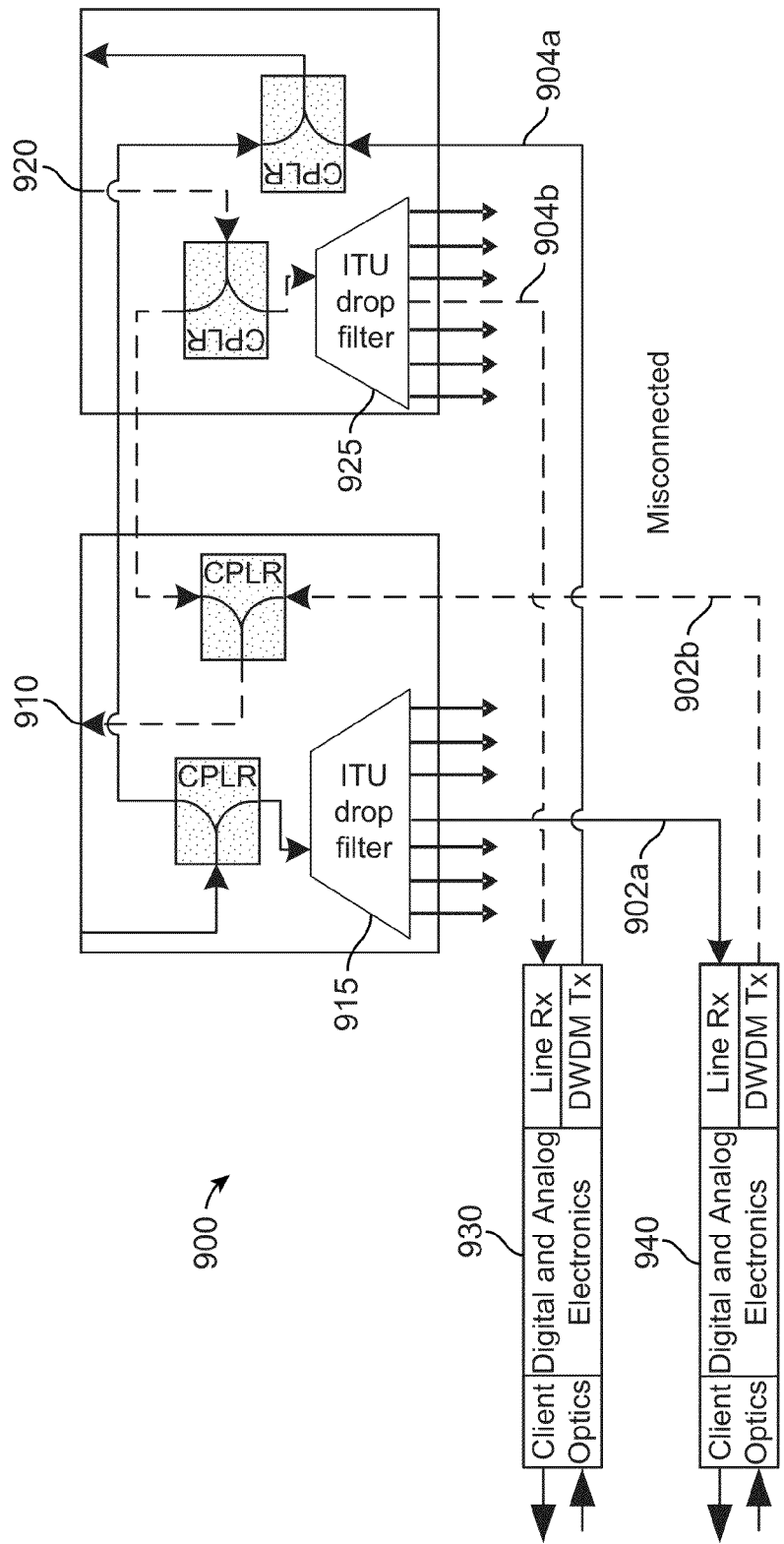
FIG. 9 is a block diagram illustrating common misconnections between WDM transponder modules and add/drop filters.

As mentioned above, and shown in FIG. 9, it can be difficult to ensure proper connections between modular line cards, such as muxponders and add/drop filters. In ring networks, mistakes can occur between the east and west connections. The control and monitoring of added signals can also be facilitated if the fixed or reconfigurable filter module has monitors on all of its input ports. These monitors do not prevent misconnections, but they do provide a means of troubleshooting misconnections.

Figure 45:
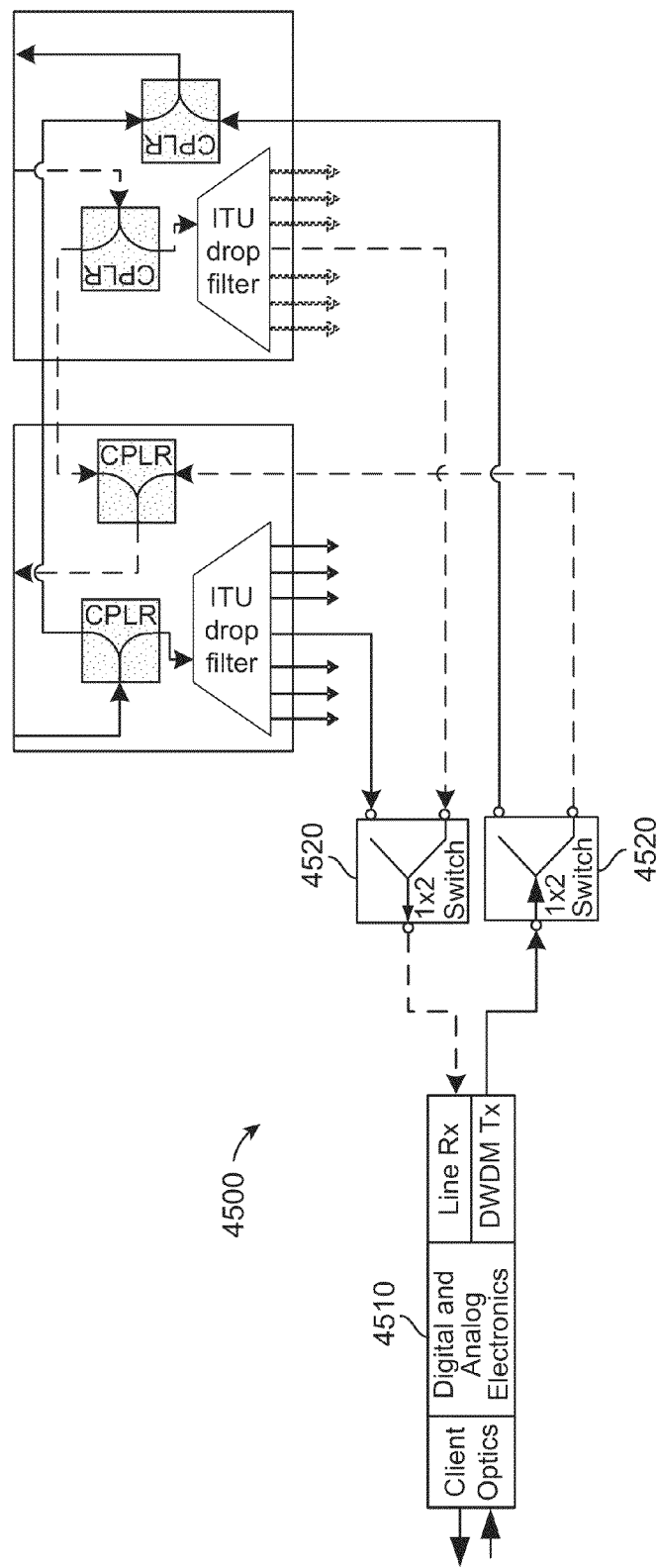
FIG. 45 is a block diagram of one embodiment of software-controlled 1×2 switches of the present invention to selectively direct traffic to the East or West side of a WDM ring network.

We propose two other methods of removing the east-west ambiguity and selectively routing traffic in either direction or both directions. The first is shown in FIG. 45 where the muxponder 4510 is connected to a pair of 1×2 software-controlled switches 4520 that control the direction of transmission and reception.

Figure 46:
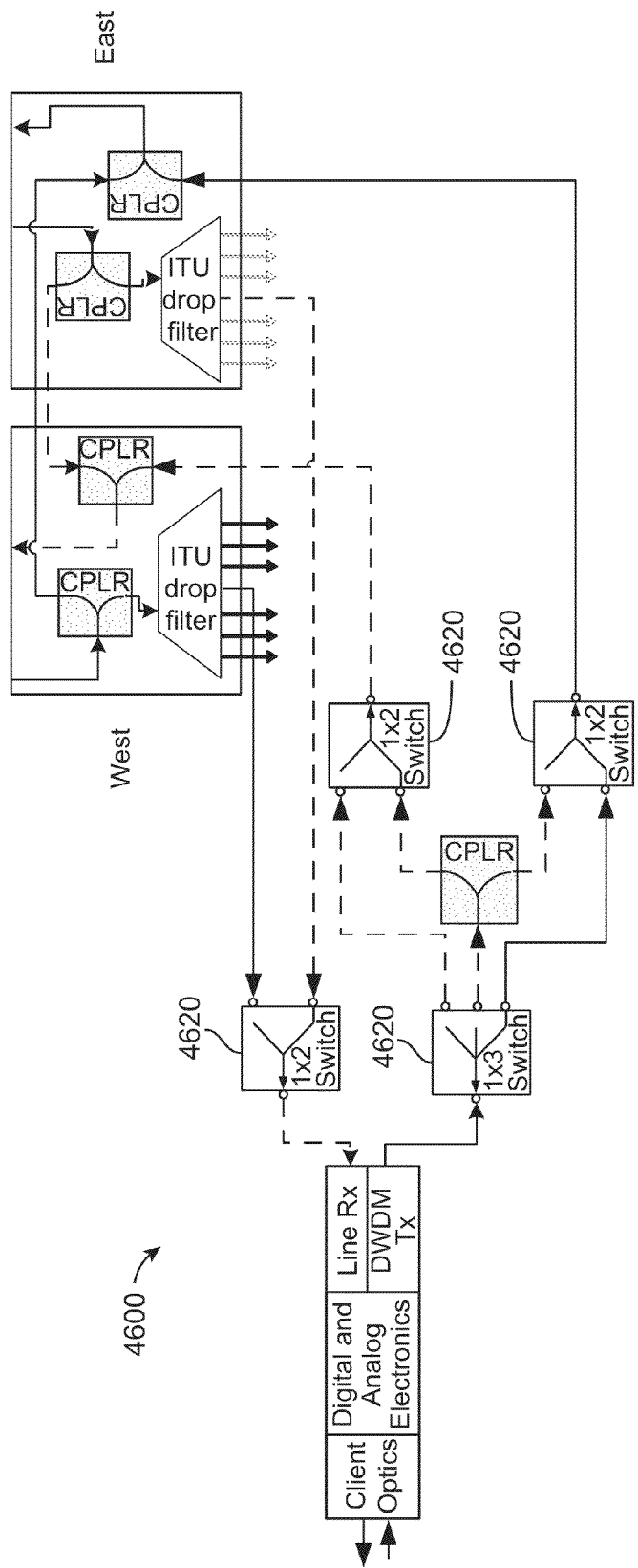
FIG. 46 is a block diagram of one embodiment of software-controlled 1×3 switches of the present invention to selectively direct traffic to the East or West side (or broadcast to both sides) of a WDM ring network.

If an option for broadcast to both directions is required, as with protected circuits, then the embodiment shown in FIG. 46 can be used to selectively transmit the traffic to the east, west, or both directions. The software-controlled switches 4520 in FIG. 45 and 4620 in FIG. 46 remove the east-west ambiguity and enable network operators to remotely reconfigure the direction of the traffic.

This embodiment 4600 is independent of the type of channel multiplexing and demultiplexing used to add and drop channels from the network. For example, it can be connected to ROADMs and WSS networks.

2. ITU-Channel Based Network Upgrades to Subchannel Networks

Cascaded ITU channel filters and cyclical filters can be used to upgrade the capacity of WDM networks based on the ITU grid. FIG. 47 gives an example of a legacy ITU channel-based WDM network 4700 that has been upgraded with subchannels 4710*a* and 4710*b* on ITU channels 192.1 GHz 4720*a* and 192.2 GHz 4720*b*, respectively. In this embodiment, the subchannels increase the capacity of those ITU channels by a factor of 4. Having the subchannels 4710*a* and 4710*b* at the same bit rate as the legacy ITU services 4720*c* (on ITU channel 192.3 GHz 4720*c*) means that they have similar link budget rules as the ITU services. This upgrade can therefore be done without significant changes to the fiber plant and dispersion compensators since the subchannels 4710*a* and 4710*b* are transmitting at the same date rate (10 Gb/s in this example) as the ITU channels that are being replaced.

The network upgrade is further simplified by the high dynamic range (>20 dB) of the subchannel transmitter (provided by the VOA 1515 in FIG. 15) and the subchannel receiver (provided by the EDFA 1522 and VOA 1523 in FIG. 15). These ranges demonstrate that a legacy network can be upgraded without adding power control elements to the network such as fixed attenuators.

Currently installed ITU channel networks can therefore be upgraded incrementally according to bandwidth demands, with minimal changes to the installed infrastructure (ITU channel filters, amplifiers, and dispersion management). Being able to reuse the ITU hardware provides a distinct cost advantage. Subchannel muxponders also provide additional functionality as described below.

The subchannel upgrade described herein supports a very large network capacity. For example, FIG. 48 shows a network capacity of 7.0 Tb/s with 704 subchannels. Subchannels are spaced at 12.5 GHz in both the Conventional (C-band) and Long-wavelength (L-band) bands. Not only does this subchannel embodiment 4800 provide large capacity, it does so with a small granularity (10 Gb/s), while maintaining client signal synchronization. Subrate multiplexing can also be combined with subchannels to provide even finer granularity as shown in FIG. 42.

Further note that the subchannel implementation based on the cyclical filter described above provides the means of de-interleaving channels spaced at 50 GHz so that an external interleaver is not required in the embodiment shown in FIG. 48.

3. Estimate of OSNR at a Receiver

Optical amplifiers, such as erbium-doped fiber amplifiers (EDFAs), can be deployed in a network to compensate for the optical fiber loss. But optical amplifiers add amplified spontaneous emission (ASE) noise to the signal. This diminishes the optical signal to noise ratio (OSNR). OSNR is a significant factor that affects the performance of an amplified optical network. Therefore, when a network is being deployed and upgraded, it is desirable to have a measurement of the OSNR of a signal. This can be measured with an instrument such as an optical spectrum analyzer (OSA). However, adding full-spectrum channel monitors at all network points can add significant cost to the network.

OSNR is given by the ratio between the optical signal power to the ASE noise power in a given noise bandwidth. Typically 0.1 nm is used in the industry as the noise bandwidth. For example, consider the following 2001 IEEE article ("OSNR Monitoring Technique Using Polarization-Nulling Method," IEEE Photonics Technology Letters, vol. 13, p 88 (2001)), which presents a method of measuring OSNR of a link by measuring the ASE noise that is orthogonal to the signal. This method requires additional equipment to be deployed in the field. We disclose here a lower-cost method of using existing optical networking equipment to measure the OSNR of the signals. This method uses the signal transmitter and receiver hardware to measure the OSNR, so it does not require any additional equipment.

Measuring OSNR with a high dynamic range requires that the optical receiver be able to monitor power with a high dynamic range. This can be accomplished by placing a resistor in series with the photodiode bias current and measuring the voltage across the receiver with a logamp connected to an analog to digital converter (ADC).

First, the receiver and filter in front of the receiver, e.g. the cyclical filter in the case of a subchannel muxponder, are calibrated in the factory. The receiver can be calibrated by inserting light with a known power level and measuring the response of the logamp. The filter can be calibrated with a wideband source (such as ASE from an EDFA) that is calibrated with a commercial OSA. Then, assuming that the source has noise spectral density S(W/Hz), and the noise power measured on the receiver is P(W), the equivalent noise bandwidth, Bf, of the cyclical filter is given by Bf=P/S.

Then the OSNR of a signal can be measured each time the signal is enabled or tuned to a new channel or subchannel. This assumes that the noise level is independent of the signal level, which is typically the case in a multichannel DWDM network with gain-controlled and gain-flattened amplifiers. The receiver first records the power before the channel is enabled, so that it is measuring the noise power, Pn (W).

After the channel is enabled, the receiver records the signal plus noise power, given by:

$$Pt=Pn(W)+Ps(W)$$

Then the signal to noise ratio is given by $$OSNR(dB)=10*\log 10(((Pt-Pn)*Bf)/(Pn*Br))$$

where Br is the reference noise bandwidth.

This method requires that an idle receiver constantly update and store its noise power in memory and use that power level to calculate the OSNR after the signal is enabled. It has the drawback that it cannot track network changes that alter the OSNR after the signal is added. But, it gives an indication when the channel is first enabled if the OSNR is too low. After the channel is added, the BER can be tracked to indicate network degradations. This method has the advantage of providing software with only the added cost of placing the logamp and ADC after the receiver, calibrating the receiver and filter, and recording the OSNR.

In a multichannel DWDM network with gain-controlled and gain-flattened amplifiers, the OSNR depends on the transmitter launch power to first order. Using this method to monitor OSNR when channels are added enables the management software to equalize the OSNR of the channels at the receiver. After channels are enabled, the measured OSNRs provide an estimate as to how much the transmit powers need to be adjusted. For example, if one channel has OSNR 1 dB lower than the other channels, it can be equalized by increasing its launch power by approximately 1 dB.

Although this method can be used by other WDM equipment, the requirement of calibrating the effective bandwidth of the optical filter means that the accuracy is diminished unless the filter is located on the same circuit pack as the receiver, as in the case of the subchannel muxponders described herein.

4. Measurement of EDFA OSNR Contributions

When networks are being upgraded, it is desirable to have visibility of the added channel at all network sites to aid in ensuring good performance of the added channel and debugging any issues. Adding full-spectrum channel monitors at all network points can add significant cost to the network. We disclose here a lower-cost method for out-of-band and out-of-service monitoring of an optical path. When a channel is out-of-service, it can be tuned to the monitor wavelength and the power levels at each node can be measured and communicated by the management software.

FIG. 49 shows an embodiment 4900 of a method to track added channels 4910 and monitor out-of-service channels. An unused channel on the edge of the amplifier gain spectrum is used for this purpose, e.g. at 1528 nm. Using a channel on the edge of the gain spectrum will not interfere with the usable channels, but there will still be some gain so that the edge channel propagates through the amplifier chain.

Placement of the monitors depends on the network configuration but it is ideally before 4920 and after 4930 each amplifier 4925 as shown in FIG. 49. The monitor 4920 before each amplifier 4925 can be used to estimate the OSNR contribution from each amplifier 4925 [see, eg, U.S. Pat. No. 6,040,933] and the difference between the input and output powers can be used to estimate the gain of each amplifier 4925. Note that the gain at the monitor wavelength may be lower than the gain in the amplifier's signal band; yet this difference can be calibrated in the factory for each amplifier 4925.

Therefore, a signal laser can be tuned to the monitor channel and its power levels can be verified at each network point. The power levels can be compared to the existing channels to balance the power of the added channel relative to the live channels. After the performance has been verified at the out-of-band monitor frequency, the channel can be tuned to its designated frequency. Standby channels and protection channels can also be periodically tuned to the monitor frequency for verification.

The noise of the amplifier 4925 can also be estimated in this configuration by disabling the monitor transmitter. In that case the output monitor photodiode (e.g., 4930b) will measure the noise at the monitor wavelength integrated over the passband of the filter (e.g., 4930a). The passband of this filter can be calibrated so that the noise measured by the photodiode 4930b can be given relative to a reference noise bandwidth, such as 0.1 nm.

If the amplifier 4925 has its gain and noise vs. wavelength stored in a calibration table, then the gain and noise at other signal wavelengths can be determined from the gain at the monitor wavelength.

5. Determining the Net Chromatic Dispersion and Polarization-Mode Dispersion of a Fiber Link with Subchannel Delay Times The performance of an optical link depends on the net dispersion of the fiber and components in the path such as amplifiers and filters. System operators often do not have a record of the precise values of the dispersion of installed fibers. If the net dispersion of the link is outside of the allowed range of the transmitters being used, then dispersion compensators may have to be installed. If the dispersion of a link is not known precisely, then whether or not dispersion compensation is required may not be known a priori. Deploying a network with incorrect dispersion compensation can cause bit errors that are difficult to debug.

To be precise, before installing or upgrading an optical network, field technicians may have to measure the dispersion of each fiber in the network. Measuring the fiber dispersion can be done with commercially available dispersion testers [eg, Exfo FTB-5700]. Portable dispersion measurement equipment, and travel and labor costs to perform these measurements, can be quite expensive.

We therefore propose a solution to this problem in which the transmission equipment is used to measure the net dispersion of the fiber link. This measurement requires a subchannel muxponder like the one shown in FIG. 15. Measuring the fiber dispersion requires that at least two of the subchannels be in a maintenance mode because the measurement will disrupt traffic on the subchannels that are used. This is the case when a service is being installed.

The dispersion of a fiber link is given in units of ps/nm. This determines the delay in ps per nm spacing between two carriers. The delay can be measured on a subchannel muxponder line card (employing a circuit such as circuit 5000 shown in FIG. 50) as follows:

(1) Set the subchannels to use the same clock source such as reference oscillator 5010 on the board normally used as the reference clock for maintenance signals such as ODU-AIS.

(2) The same reference signal must be transmitted on the subchannels. For this purpose a user-defined test sequence 5020 can be programmed into most commercially available SERDES or FEC devices.

(3) The SERDES or FEC devices for the two subchannels can be synchronized by simultaneously releasing them from reset.

(4) At the receive side the phase difference between the two subchannels can be measured with a commercially available phase detector 5030 such as the AD8302 from Analog Devices. This assumes that the voltage V from the phase detector 5030 has been calibrated to provide a constant C in (ps/V) to be used in the calculation.

(5) From these measurements, the net dispersion of the fiber link (in the measured phase difference) is given by:

$$D = V * C / \Delta\lambda \text{ where } \Delta\lambda \text{ is the wavelength spacing between carriers.}$$

(6) To get high resolution and wide range, adjacent subchannels can be used to measure larger dispersion values, and the outside subchannels can be used to measure smaller dispersion values. For example, with a device like the AD8302 that provides an output of roughly 10 mV/ps of phase difference, if the fiber dispersion is 2000 ps/nm, then the output of the phase detector 5030 will be 6 V for subchannel spacing of 37.5 GHz (or 0.3 nm) and 2 V for a subchannel spacing of 12.5 GHz (or 0.1 nm). In this case the 6 V theoretical value may saturate the electronics so the measurement from the closer spaced channels would be used.

Note that measuring dispersion requires software communication between the transmitter and receiver. We assume that an OSC link or in-band communication channel are available for this purpose. Also note that this measurement can only be done out-of-service, e.g. when the service is being installed. The measurement process can be as follows:

Network management sends a command to the link (transmitter and receiver) to measure dispersion Transmitter uses one subchannel for overhead and signals over that subchannel to the receiver that it is switching to dispersion measurement condition Transmitter switches the other 3 subchannels to the common reference clock and inserts the test sequence on those channels Receiver measures the phase differences between two of the subchannels The receiver can repeat the measurement for other channels Software calculates the dispersion seen by the signals and raise an alarm if it is out of range Note that there may be an unknown delay between channels, for example from delays in the first-in first-out (FIFO) buffers in the serializer. The error from these unknown delays can be eliminated by measuring the phase differences versus the channel spacing. The subchannels to be measured can be tuned toward each other, and away from each other, while measuring the phase difference. Several points measured in this fashion can then be fit with a least-squares fit to get the slope, and hence dispersion. The tuning range depends on the passband of the cyclical filter. An example of a phase difference versus channel spacing measurement is shown in graph 5100 in FIG. 51. Note that extrapolating the difference to zero frequency difference leads to a fixed delay caused by the electronics. The slope of this curve gives the factor $V/\Delta\lambda$ in the equation above, and the fixed offset does not affect the measurement.

Alternatively, we can eliminate the unknown transmitter phase difference by making a measurement with transmitter 1 sending $\lambda 1$ and transmitter 2 sending $\lambda 2$, and then swapping the lambdas and subtracting the results. Assuming that transmitter 1 has fixed delay Td1 and transmitter 2 has fixed delay Td2, and the transmitter delay sending $\lambda 1$ (T$\lambda 1$) is the same as the transmitter delay sending $\lambda 2$ (T$\lambda 2$), then:

$$T\text{diff1} = (Tx1 + T\lambda 1) - (Tx2 + T\lambda 2)$$

$$T\text{diff2} = (Tx1 + T\lambda 2) - (Tx2 + T\lambda 1)$$

$$T\text{diff1} - T\text{diff2} = 2(T\lambda 1 - T\lambda 2)$$

Then the measured dispersion (or delay between the two wavelengths) is given by the following expression that does not contain the unknown transmitter delays:

$$T\lambda 1 - T\lambda 2 = (T\text{diff1} - T\text{diff2})/2$$

Furthermore, this method can be used to estimate the polarization-mode dispersion (PMD) seen by the signals. PMD is a form of modal dispersion where two different polarizations of light in an optical fiber propagate at different speeds due to random imperfections and asymmetries. PMD is a statistical effect, and it depends on alignment of the launched state of polarization (SOP). When PMD is measured by a dedicated instrument according to standard FOTP-124, the polarization of the measurement light source is scrambled so that the instrument can average the measured value over all polarization states.

In one embodiment of the current invention, the relative dispersion between two subchannels can be measured as described above. If the subchannel muxponder in FIG. 15 is used such that the carriers have orthogonal polarizations, then the delay between two wavelengths can be measured for parallel polarizations and orthogonal polarizations.

If subchannels 1 and 3 have the same polarization, and subchannels 2 and 4 have the same polarization, and the polarization of subchannels 1 and 3 is orthogonal to the polarization of subchannels 2 and 4, then the method above can be used to measure the following dispersions (as shown in graph 5200 in FIG. 52):

D12=dispersion measured with subchannels 1 and 3 in ps/nm

D24=dispersion measured with subchannels 2 and 4 in ps/nm

The difference in those delays is then equal to the PMD for the SOP held by the subchannels. This is of more relevance than the PMD averaged over all SOPs, because it will be the PMD that affects the actual signal transmissions. Statistical averaging over time can be used with this technique to get the statistical distribution of PMD.

A distinct advantage of these measurement techniques is that they measure the cumulative CD and PMD seen by the signal in a single measurement. Another advantage is that these methods can measure the link without requiring a technician to break the link to insert external test equipment. Other methods may only measure the characteristics of the transmission fiber in several steps, and not measure any contributions from the optical modules used for transmission. A further advantage of these methods is that the results can easily be displayed by the network management software.

All transmitters have an acceptable dispersion window, i.e. range of dispersion values for which the transmit signal will have an allowed dispersion penalty. If the measured network dispersion or PMD is out of this range, then the software can raise an alarm to the network operator to signal that dispersion compensation is required in the network.

6. Network Upgrades with Minimal Disruption of Live Traffic

The traffic demands on an optical network evolve over time. As the demand changes, wavelengths and subchannels may have to be added or removed from service. These changes are typically done during scheduled maintenance windows. If human, hardware, or software errors occur during a network change, then some or all of the static traffic may be adversely affected. We therefore disclose a method for software to control a network upgrade to make the traffic changes as non-disruptive as possible.

When a channel is added, or the transmitter wavelength is tuned to a different channel, the output power must be disabled to avoid interference on the other channels. Then, when the transmitter power is enabled, it should be turned on gradually to avoid any adverse effects on the live channels. While it is being enabled, the BER of the other channels should be monitored for increased BER. One embodiment of a sequence for tuning a channel is shown in graph 5300 in FIG. 53. This requires software communicating with all nodes to monitor the BER (e.g. at 5310) of all the live channels while turning on the transmit power (e.g. starting at 5320). A similar procedure can be followed when a channel is first enabled.

A procedure for adding a channel with the techniques described above is as follows:

1 Install the subchannel muxponders and connect the fiber jumpers (transmitter is disabled until the traffic is assigned)

2 Use the bandwidth map to assign the subchannel frequencies

3 Assign the protection bandwidth

4 Assign the traffic direction

5 Assign the services (protocols)

6 Tune the transmitter to the EDFA monitor wavelength, turn on the power to a level that equals the other channels and check the OSNR contributions of the amplifiers. Record the OSNR at the receiver and raise an alarm if it is too low.

7 Turn off the transmitters and tune the subchannels to the designated frequencies 8 Gradually turn on the transmit power as described below.

9 Establish an overhead channel between the two end points with the line side at a predetermined rate. This is easier to do with OTN framing, where the overhead channel is independent of the protocol being used. It is also easier if the same rate is used for the different protocols. Use the overhead channel to exchange path trace information (raise an alarm if there is a path trace mismatch), IP and subchannel addresses.

10 Measure the dispersion (CD and PMD) seen by the subchannels as described above, and raise an alarm if the dispersion is out of spec 11 Enable the traffic and monitor the BER, raise an alarm if it is too high 12 Traffic is established, start the traffic monitors and update the performance status 7. Diagnostic Tool to Capture all Digital Data and Compare to Known Values Electronic equipment, such as the optical equipment described herein, can have several digital devices with registers containing configuration and status data. These registers may be implemented in custom-designed or off-the-shelf Application Specific Integrated Circuits (ASICs), field programmable gate arrays (FPGAs), and/or complex programmable logic devices (PLDs). Registers may hold provisioning information (such as the bit rate), loopback condition, or data protocol, and contain alarm conditions and performance monitoring data. Typically, real-time operating system (RTOS) software configures the registers depending on instructions from the network operator, and reads the registers to discern status.

With the development of complex ASICs and FPGAS, there may hundreds or thousands of registers on a line card. The RTOS software may provide commands to users to read certain registers, but typically it is difficult to get full visibility of all the digital data on a line card and to debug issues on the line card.

We propose here a diagnostic tool that reads all ASIC, FPGA, and CPLD registers on a line card, compares the read values to expected values and reports the differences to a user for debugging, and/or uses the differences to provide debugging advice. The interface is a spreadsheet, created for example with Microsoft Excel, that has been programmed to contain a list of all the devices on a line card with one spreadsheet tab per device.

FIG. 54 shows an example of such a spreadsheet 5400. The first column 5410 lists the register numbers of a device, the second column 5420 lists the address, the third column 5430 lists a name for the register, the fourth column 5440 lists the type of register (RW=read/write), the fifth column 5450 lists the expected value of the data read from each register, the sixth column 5460 reads the actual value, the seventh column 5470 lists the difference between the expected and actual columns, and the eighth column 5480 gives a description of each register.

The spreadsheet 5400 is first generated by a person that transposes the functional specification for each device to the spreadsheet. Reading the data from the line card requires that the user have a communications link from their laptop to the line card. This can be done with a serial debug port or standard protocol such as telnet. The expected values can be generated from the functional specification, or by reading a device in a known good state and copying the read values from the "Actual" column to the "Expected" column. Differences between read and expected values can be selectively highlighted, as shown in element 5490. Several standard configurations can be stored in the spreadsheet so that the user can compare values depending on the expected card configuration. The spreadsheet has an "Update" button 5495 that triggers a macro to read the registers on the line card (user can select which devices are updated), copy the data to the appropriate "Actual" column in the spreadsheet, and highlight any differences between the actual and expected values. The spreadsheet can also be programmed to hide data when the actual and expected values are equal.

This diagnostic spreadsheet 5400 therefore provides a network operator, field support engineer, or design engineer with a quick method to determine if a line card is correctly configured, or if there are any current alarms or hardware faults.

8. Network Upgrades with Minimal Software Upgrades to Legacy Equipment

As telecommunications products evolve, there can be a need to add new products that reuse the shelf, backplane and/or management card of a legacy product. Furthermore, the new product release may have software that is not necessarily backwards compatible to the legacy product. This may be the case because the new product is enhanced with a new software architecture, and making the new software backwards compatible may require a lot of time and investment in engineering. To get a new product to market sooner, the new product may be deployed alongside the legacy product in two separate shelves 5510 and 5520 as shown in FIG. 55. This implementation 5500 has the disadvantage that it requires extra shelf space for the new product even though there may be empty slots in the chassis of the legacy product.

We therefore disclose a method of combining the new product and legacy product in a single shelf 5610 as shown in implementation 5600 in FIG. 56. Rather than using the two ethernet busses to provide redundant management, one ethernet bus 5620 is used by MGT-1 5625 to manage the legacy cards 5627 and the second ethernet bus 5630 is used by MGT-2 5635 to manage the new cards 5637. Each MGT has a separate IP address and is connected separately to the EMS server 5650 via an IP network. In this embodiment 5600, the new line cards 5637 use the second ethernet plane and MGT software (1) disables the redundancy feature, (2) disables handshaking between MGT cards, and (3) disables shared control lines on MGT-2 5635.

The EMS 5650 managing shelf 5610 will display it as two separate shelves (with separate IP addresses). Over time, as the software in the legacy equipment is upgraded, the legacy line cards 5627 can be upgraded remotely with software downloads to be managed by MGT-2 5635. Eventually all the legacy cards 5627 will be upgraded so that all cards are managed by the new software on MGT-2 5635, and MGT-1 5625 is not being used. At that point the software on MGT-1 5625 can be upgraded with redundancy enabled so that the chassis is managed with MGT-2 5635 and MGT-1 5635 is on standby to provide redundant management.

C. Subchannel Routing, Switching, Concatenation and Protection

Having described the core hardware elements of a subchannel-based architecture, as well as various techniques (which can be applied to ITU channel-based, as well as subchannel-based systems) for facilitating network visibility generally and in the context of network upgrades (where legacy equipment is reused whenever feasible), we now turn our attention to various methods for implementing, on a subchannel-based architecture, the routing, switching, concatenation and protection of client circuits across nodes of an optical WDM network. It should be noted that the extent to which these methods are implemented in software and/or general-purpose or dedicated hardware is generally a matter of design choice.

1. OSC Options and Routing Protocols

WDM equipment often requires that the EMS have a management connection to all remote nodes for functions such as provisioning equipment, reporting faults, downloading software upgrades, and retrieving and reporting performance metrics. The node management card (MGT) also needs a management connection to remote nodes for end-to-end provisioning, controlling protection switching, and reporting remote performance and faults. For these functions, current WDM equipment deploys an optical service channel (OSC) that is outside of the ITU-T G.692 spectral window, i.e. at 1510 nm or 1620 nm.

We disclose here an alternative implementation that enables remote management information to be transmitted over (1) a separate unamplified wavelength 5710 such as 1510 nm or 1620 nm, (2) a separate amplified wavelength 5720, (3) the overhead channel 5730 of a subchannel 5735, or (4) an unused portion of the payload (not shown). In one embodiment, the management software uses OSPF routing to select the overhead channel with the highest bandwidth. Other routing protocols such as RIP may also be used. A general embodiment 5700 of this alternative routing of management traffic is shown in FIG. 57, and the advantages and limitations of various different approaches are illustrated in Table 1 below.

The alternative path selected for any given implementation is a design choice made after balancing the various advantages and limitations of each approach, such as those shown in Table 1. As will become apparent below, use of any of the alternative paths, as opposed to a dedicated OSC, enhances remote management functionality by enabling greater network visibility of information at a lower level of granularity, which in turn facilitates the detection and repair of problems, as well as the modification and upgrading of network functionality.

| Remote Management Path | Advantages | Limitations |
|---|---|---|
| OSC - non amplified wavelength | Highest bandwidth<br>Not affected by amplifier failure | Higher cost to add and drop a special wavelength<br>Not enough reach for extended links |
| OSC- amplified wavelength | Highest bandwidth<br>Good for extended links | Affected by amplifier failure |
| Out-of band overhead (GCC) | No extra cost | Lower bandwidth<br>Affected by amplifier and line card failures |
| Unused VLAN or VCG on muxponder | No extra cost<br>Higher bandwidth than GCC | Affected by amplifier and line card failures<br>Needs to be re-routed when port is assigned to traffic |

Similar to the standard OSPF protocol, management traffic is routed between nodes based on a metric that is inversely proportional to the bandwidth of each path. This requires each independent link to first establish end-to-end connectivity by handshaking with the remote end. After the connection is established, each link must publish its availability, end points, and bandwidth measure. OSPF routing tables on the MGT then select a route between each node. If required, load balancing can also be implemented on the management channels. In general, the routing algorithm and updates follow a standard OSPF implementation.

2. Security Application with Subchannel Hopping

In addition to remote management applications, subchannels also facilitate secure communications that rely upon existing optical infrastructure, such as the subchannel muxponder shown in FIG. 17. The embodiment shown in FIG. 17 can be used to provide secure communications by constantly redistributing the traffic among the carriers. This requires handshaking between the terminals to synchronize the mapping and remapping between the client traffic and the subchannels. The channel overhead can be used to signal between the subchannel transmitters and receivers. One embodiment of an algorithm for such subchannel distribution includes the following steps:

1. Assign traffic to the carriers
2. Use channel overhead to signal the carrier distribution to the receiver
3. Receiver sends acknowledgement
4. Send the traffic and start reconfiguration timer
5. After timer expires, transmitter generates new random carrier distribution and signals that distribution to the receiver
6. Transmitter buffers starts buffering the traffic or hold off with Pause signals
7. When receiver sends acknowledgement for the new channel acknowledgement, start transmitting with new carrier distribution 3. Optical Routing and Switching at the Subchannel Layer Having described details of the design and control of subchannel muxponders, we now disclose novel applications of subchannel muxponders for optical routing and switching across network nodes. In one embodiment, data mapped onto the subchannels can be routed to any end terminal by selectively and independently tuning the wavelength of each subchannel, i.e. software tuning a laser's frequency to select a subchannel.

As noted above, this is distinguished from prior implementations using multiple lasers that were constrained to be (a) fixed within the same ITU window, and (b) transmitted to the same receive node. This current embodiment uses ITU-T G.692 compliant add/drop multiplexers to select WDM channels incident on a network element to be dropped at that node or to pass through to the next node.

To appreciate the detailed implementation of the applications described herein, it is helpful to review some general background information regarding the routing functions and software used to manage these subchannel routing and switching applications. Managing a large number of ITU channels, subchannels, and client services requires multi-layer routing software that uses subchannel mapping to direct services between endpoints.

In this regard, FIG. 58 shows the addition of a new management sublayer, the Optical Subchannel Layer 5810, between existing FEC Encode/Decode and Wavelength Assignment layers. This layer 5810 manages the subchannels within each ITU channel.

To maintain the degree of flexibility necessary to manage the vast array of options afforded by the use of subchannels, the network management system responsible for maintaining the assignments of client services to subchannels throughout an optical WDM network employs (in one embodiment) the following set of rules:

Multiplexing lower-rate services into a subchannel is constrained by hardware capabilities and bandwidth per subchannel Inverse multiplexing of higher-rate services to subchannels should be done on the same ITU channel (although this network design does not preclude a distribution over different ITU channels, it is impractical since it requires dedicated hardware at the WDM receive side to recombine the subchannels)

Routing tables must provide overall network visibility

The total number of lower-rate services per subchannel is fixed by the deployed hardware, but software should be flexible to allow future upgrades The total number of subchannels per ITU channel is fixed by the deployed hardware, but software should be flexible to allow future upgrades, e.g. from 4 to 10 subchannels East-west ambiguity must be resolved, software must control and track the traffic to fiber mapping Optional user-defined labels should be supported for users to refer to services and nodes with meaningful labels User is given choices of available paths Routing is distance and OSNR aware so that a path with better optical performance is preferred Protection traffic is placed on the side of the ring with worse optical performance Reuse of bandwidth at all layers in a network is supported.

The number of nodes connected to a given node is as low as 1 for point-to-point applications, and as high as N−1, for mesh applications with an N-port WSS Interworking between subchannel muxponders and legacy ITU channel equipment is supported We now describe various methods for managing optical bandwidth in accordance with the above requirements. In the examples below, we describe the routing tables for a ring network, but the tables do not limit the number of nodes that can be connected to each node.

When a new service or node is being added to the network, software-assisted routing either selects the lowest-cost available subchannel(s) or, if no subchannels are available, requests the network operator to add subchannel muxponders as required. Because of the flexibility of this design, the traffic assignments to subchannels and assignment of subchannels to ITU G.692 channels is not known a priori. These assignments depend on the network's real-time traffic demand and evolution of the network over time.

An example of a simple optical network is shown in FIG. 59. At each node the routing table numbers the node ports from P1 to PN. A ring node has 8 ports (East add, East drop, West add, West drop, East line in, East line out, West line in, and West line out). Although we give examples here of ring nodes of degree 2 (where a node is connected to 2 other nodes), this methodology can easily be extended to higher degree nodes by adding more ports to the routing description. Also note that the routing description and tables are independent of the particular hardware used for adding and dropping channels. In FIG. 59 we show generic nodes that selectively add, drop, and passthrough traffic from and to the line fibers without restrictions on the hardware.

In FIG. 59 each node has 8 ports that can selectively direct the traffic in each ITU channel as follows:

P1) Adds channels from the node to the output port P7
P2) Adds channels from the node to the output port P8

P3) Line Input port that can drop channels to P5 or passthrough channels to P8

P4) Line Input port that can drop channels to P6 or passthrough channels to P7

P5) Drop port that can drop channels from P3

P6) Drop port that can drop channels from P4

P7) Line output port

P8) Line output port

In one embodiment, bandwidth is managed with routing tables exchanged between network nodes. A simple routing table that describes the possible connections is shown in FIG. 60. A "1" in the table between input ports and output ports indicates that a connection between those ports is possible with a single hop, and a "0" indicates that a connection between those ports is not possible.

After a node is commissioned and connected via the line fibers to a second node, the OSC connection between the nodes is used to exchange the node connections. The management cards at each node then exchange the routing information to build up a route connection table as shown in FIG. 61.

The first table 6110 in FIG. 61 only contains the intra-node connections for the 3 nodes shown in FIG. 59. In the second table 6120, we assume that the connection of Node 1, Port 8 is made to Node 2, Port 3. The table 6120 then gets filled in with new values which indicate that, since channels from Node 1 Ports 2 and 3 can be connected to Node 1, Port 8, they can also be connected to the same outputs as Node 2, Port 3. These connections are given the value of "2" in the table since they involve 2 hops. The next version of the routing table 6130 shows the additions for the connection of Node 1, Port 7 to Node 3, Port 4. The other cases shown in FIG. 61 demonstrate how the routing table is filled out. The net results, in table 6140 in the lower right-hand corner of FIG. 61, has all the connections filled out.

The fiber connections shown in this 2-dimensional table can also be listed in a linear representation as shown in FIG. 62, has tables 6200 that list the action of each port as follows:

A) To indicate an add port

D) To indicate a drop port

PI) To indicate a passthrough input port (line input)

PO) To indicate a passthrough output port (line output)

Each table proceeds from top to bottom with the propagation of light around the ring. For example the left-hand table 6210 of FIG. 62 represents the inner fiber of FIG. 59. Proceeding from the first line of the table 6210, channels input to Port 4 of node 1 can be dropped to port 6 of node 1, and channels added at Port 1 of Node 1 can be added to the passthrough channels. These channels are then passed to the output Port 7 that is connected to the Node 5 Port 4 input port. The sequence then repeats for each node around the ring. The table 6220 on the right-hand side of FIG. 62 shows the progression for the outer fiber in FIG. 59. Note that these tables "wrap around", i.e. the bottom port of each table is connected to the top port. For example, in the left-hand table 6210 Node 2, Port 7 at the bottom is connected to Node 1, Port 4 at the top.

This 2-dimensional routing table 6200 contains the possible connections only for each channel, or subchannel, but does not contain the additional dimension required to specify the actual configuration of each subchannel. To demonstrate that function, consider the example of a ring network with subchannel routing.

Each ITU channel is divided into N subchannels (N>=2); in our examples we assume that N=4. In a network with a plurality of nodes, each node can demultiplex at least one ITU channel. The control plane can map a plurality of client signals to tunable lasers at each node, and can route any client signal to any other node by tuning the transmitter laser of that signal to a subchannel within the ITU channel associated with the destination node.

FIG. 63 illustrates the concept with a simple network 6300 where a pair of single ITU-T G.692 channel filters are used at each node to drop the ITU channel indicated. As noted above, the ITU filter function can be realized by a variety of technologies, such as fixed thin-film filters or a ROADM. Since the carriers are tunable, the simplest means to add the signals to the ring is to use a wavelength-independent coupler (CPLR) as shown.

In this example, the traffic map has two 10 Gb/s connections between every node in a protected full-mesh configuration. The mapping of subchannels is given in the legend in the middle of the diagram. Note that each node has an unassigned subchannel available to carry more traffic. Also note that subchannels are reused at different ITU channels, e.g. SC-2 is used to connect Node 200 to Node 220, as well as Node 210 to Node 230.

FIG. 64 shows the simplified connection diagram 6400 for the 4-node ring example with the same numbering as the 3-node example in FIG. 59. After a subchannel is added at a node and connected to one direction, the OSC connection communicates the channel add to all the downstream nodes. Each node then classifies that subchannel as being passthrough, or dropped if a channel filter is used to drop that subchannel. When the subchannel is dropped and connected to a subchannel receiver, the connection between transmitter and receiver is updated in the routing table.

In FIG. 65 and FIG. 66, we show two different means of displaying the connection map for the 4-node ring example shown in FIG. 64.

FIG. 65 shows a connection map 6500 displaying the connection between the end points of the subchannel muxponders at each node and FIG. 66 lists the state of each subchannel at each point in the network.

FIG. 65 lists the network hierarchy from nodes (first row and first column) to cards (second row and second column) to channels (third row and third column) to client ports (fourth row and fourth column). Note that an ITU channel is assigned to each card, which is the ITU channel being received by that card. A circuit is displayed in the table as a highlighted square linking two client ports. To illustrate an example connection, the table 6500 has highlighted the connection between Client Port 3 on Card 2 at Node 1 (transmitting at Subchannel 3 of Channel 230) and Client Port 3 of Card 8 at Node 4 (transmitting at Subchannel 3 of Channel 200). The rest of the connections in the network of FIG. 63 have been entered in table 6500 of FIG. 65 as dark rectangles.

Available bandwidth in FIG. 65 is indicated by empty rows and columns. For example, the row associated with Node 1, Card 1, and Port 4 does not have a rectangle linking that port to a circuit, so that port is available for network upgrades.

FIG. 66 lists the state of each subchannel at each connection point for the network of FIG. 64. The first three columns of FIG. 66 list the fiber connections according to the convention illustrated in FIG. 62. There is one column in this table 6600 for each subchannel. The state of a subchannel is listed with the following nomenclature:

UEQ (Unequipped)—the subchannel is not present

IS-A (In Service Add)—the subchannel is being added at that port

IS-P (In Service Passthrough)—the subchannel is present and being passed through to the next port IS-D (In Service Drop)—the subchannel is being dropped at that port UAS-D (Unassigned Drop)—the subchannel is not present, but there is a filter present that would drop that subchannel Note that table 6600 is divided into two halves. The top half 6610 is for the counterclockwise fiber connection in FIG. 63 and the bottom half 6620 is for the clockwise fiber connection in FIG. 63. When the first node in a network is commissioned, a routing table is populated with all available bandwidth listed as unequipped (UEQ). The available bandwidth is determined by the management software. For the purpose of simplicity in this example, we assume that it starts with 4 ITU channels and 4 subchannels per ITU channel. Furthermore, we assume that east and west drop filters are deployed at the first site that drops a subset of ITU channels, which then constricts a subset of the UEQ channels to be dropped at that node.

To illustrate how this table 6600 works, consider the example of the connection, highlighted in FIG. 65, between Client Port 3 on Card 2 at Node 1 (transmitting at Subchannel 3 of Channel 230) and Client Port 3 of Card 8 at Node 4 (transmitting at Subchannel 3 of Channel 200). This connection is listed in the second to last column of FIG. 66 for Subchannel 3 of Channel 230. "IS-A" is listed in the third row of that column to indicate the start of the connection at Port 1 of Node 1. The subchannel passes through to Port 7 of Node 1, across the line fiber to Port 4 of Node 4, and is then dropped at Port 6 of Node 4. In the reverse direction (clockwise fiber), the Subchannel is added at Port 4 of Node 2 in the third column, second-to-last row. It then passes to Port 8 of Node 4, across the line fiber to Port 3 of Node 1, and is then dropped at Port 5 of Node 1. Note that this connection wraps around to the top of the second half 6620 of the table 6600.

This circuit has a corresponding protected connection that is highlighted in FIG. 67. This connection uses the same subchannel, but it propagates around the other side of the ring, passing through Nodes 2 and 3 between the Node 1 and Node 3 terminals.

FIG. 66 indicates the assignment and use of subchannels at any point in a fiber connection. For example, the subchannels present at the output of Port 7 from Node 1 is listed in the fourth row, where the assignments are in bold characters. That row indicates that Subchannel 1 of Channel 210, Subchannels 2 and 3 of Channel 220, and Subchannels 2, 3 and 4 of Channel 230 are In Service, and the other subchannels are unequipped.

To determine if there is a subchannel available for a new circuit, consider the request for a new circuit between Node 1 (added at Port 2) and Node 2 (dropped at Port 5). The subchannels available for such a circuit are highlighted in FIG. 68. The table 6800 lists 9 subchannels as being unused on that link. However, it is preferable to use a subchannel within an ITU channel that is already dropped at that node. Subchannel 4 of Channel 210 is available at Node 2, as indicated by the "UAS-D" entry in table 6800.

As shown in these examples, the routing table indicates to the network operator which subchannels and channels are in use at each location of the network. With the fully-tunable subchannel lasers, any unassigned laser can then be mapped to any unused subchannel to provide the requested circuit. When a new circuit is requested, the table can indicate which subchannels are available, and which have the lowest cost of deployment. The routing information can also be passed to higher layers of software that monitor and control the subchannels.

The software can therefore provide to the network operator capacity lists and/or maps of in-service capacity, present but not deployed capacity, and unused capacity. The tables can also have options to group subchannels by those that are (1) deployed and in service (2) installed, but not in service, and (3) available to be deployed.

This architecture also supports sub-rate multiplexing within a subchannel. Various mappings 6900 to subchannels are shown in FIG. 69. Subchannel mapping supports optical concatenation, e.g., four 10 Gb/s subchannels can be concatenated to carry a 40 Gb/s signal.

The same routing tables can be used to support an overlay of lower-layer protocol routing with subchannel optical routing.

For example, suppose the subchannel muxponder supports standard 10 Gigabit Ethernet data on the client side, and the 10 Gigabit Ethernet data comes from a 10×1 Gigabit Ethernet multiplexer.

An example of the same routing approach can be applied to the overlay 7000 shown in FIG. 70, which shows the overlay of 10×1GE services on one of the available subchannels of the 4-node network shown in FIG. 63. The subrate muxponder in this case has 10 client SFP ports and an ethernet switch that maps the client ports to VLANs on the line side. The traffic in the VLANs is mapped to one of the available 10 Gb/s subchannels transmitted between the three nodes.

In FIG. 70, the following services are provisioned:
3 circuits from Node 1 to Node 2 over VLANS 1-3
4 circuits from Node 1 to Node 3 over VLANS 4-7
3 circuits from Node 2 to Node 1 over VLANs 8-10
6 circuits from Node 3 to Node 1 over VLANS 1-6

FIG. 71 shows the VLAN routing map 7100 for the subrate overlays displayed in FIG. 70. Similar to the tables above, the following notation is used:

IS-A (In Service Add)—the VLAN is being added at that port

IS-D (In Service Drop)—the VLAN is being dropped at that port

IS-DP (In Service Drop-Passthrough)—the VLAN is being dropped to the adjacent card to form a passthrough connection to the next node IS-DP (In Service Add-Passthrough)—the VLAN is being added from the adjacent card to form a passthrough connection to the next node The last column 7110 of FIG. 71 lists a possible mapping of the sublayer service to the subchannels in the network shown in FIG. 63.

Figure 10:
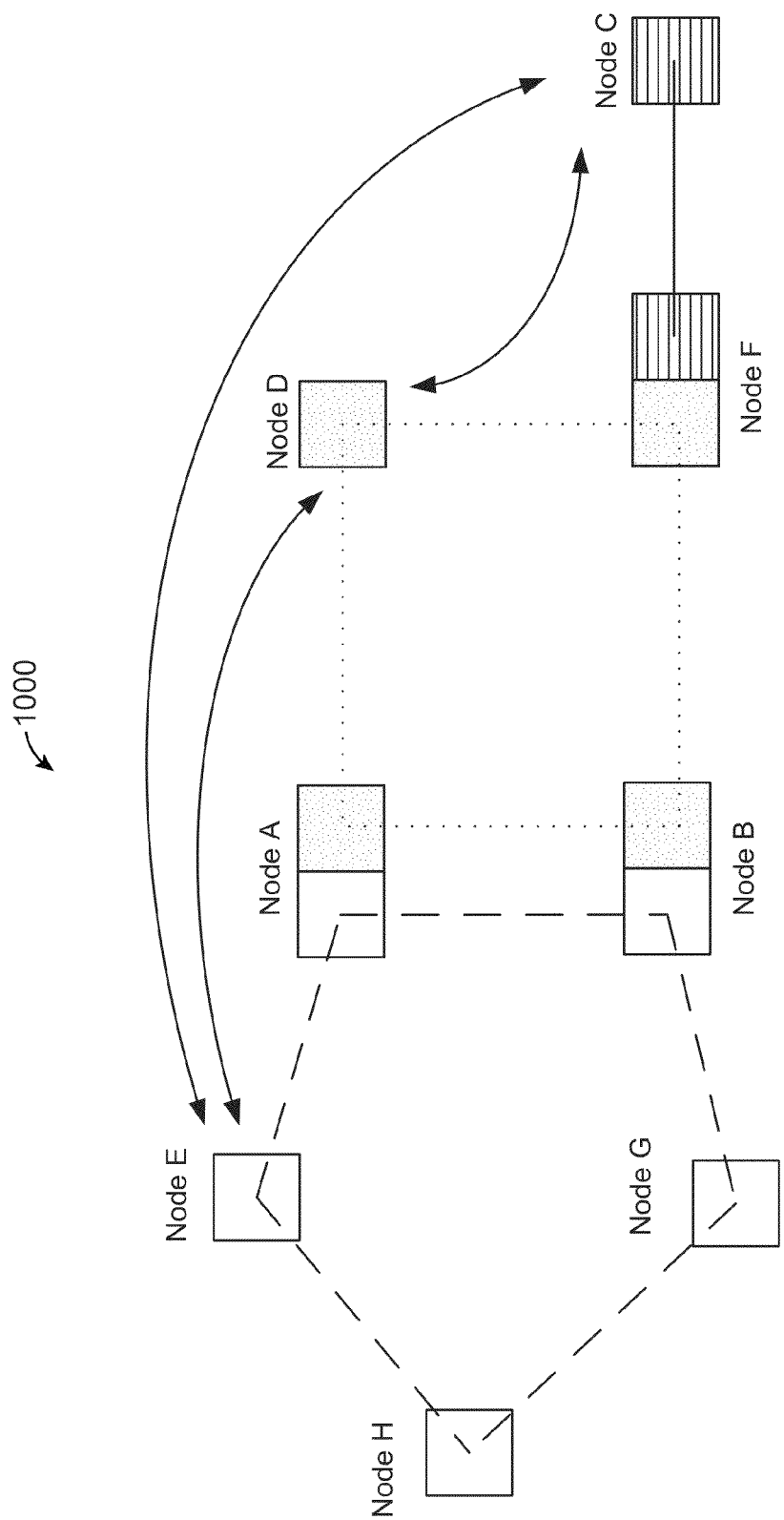
FIG. 10 is a block diagram illustrating interconnected WDM Ring networks with spur nodes.
Figure 11:
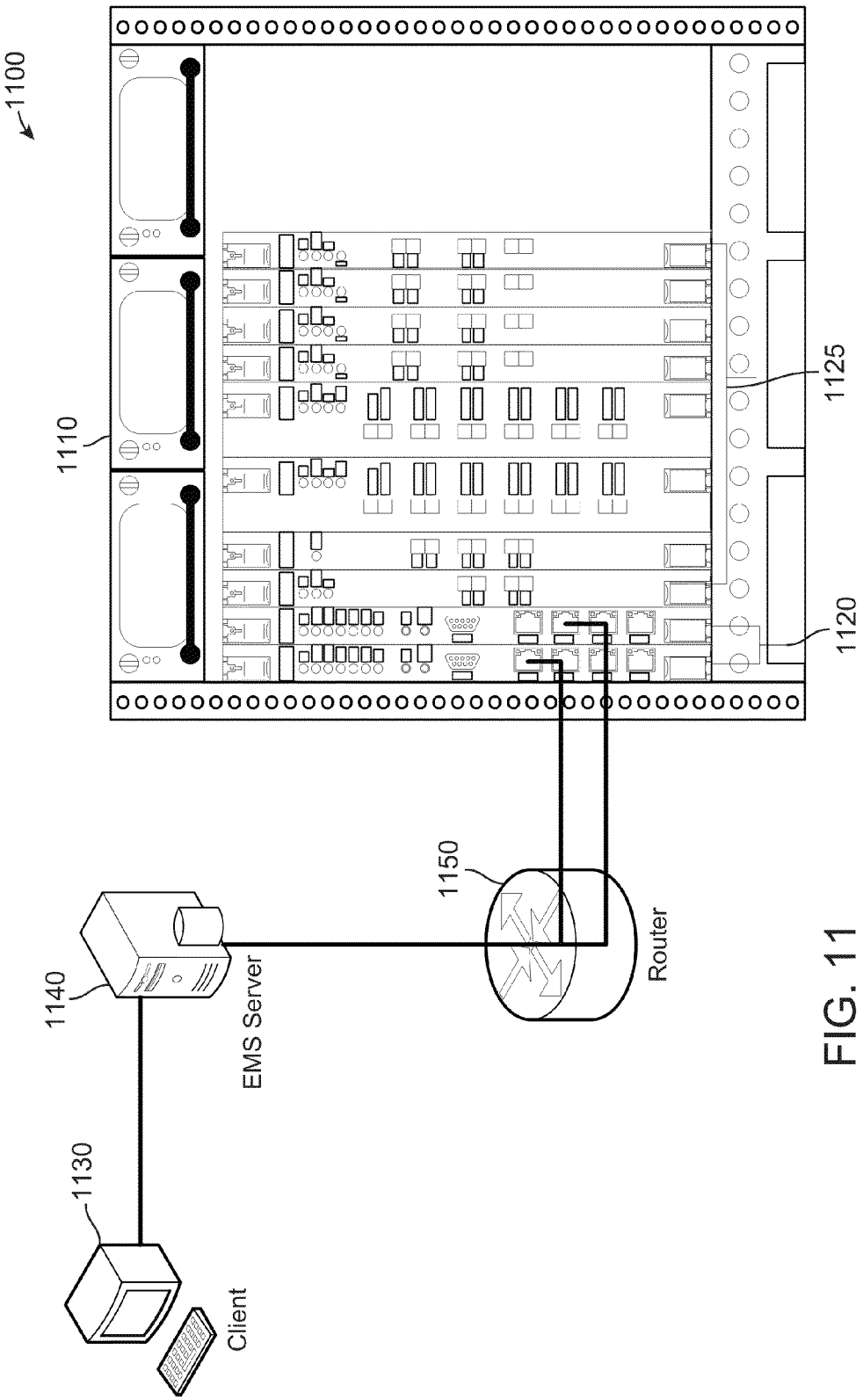
FIG. 11 is a block diagram illustrating how typical WDM equipment is installed and managed in a shelf with management cards and line cards.
Figure 12:
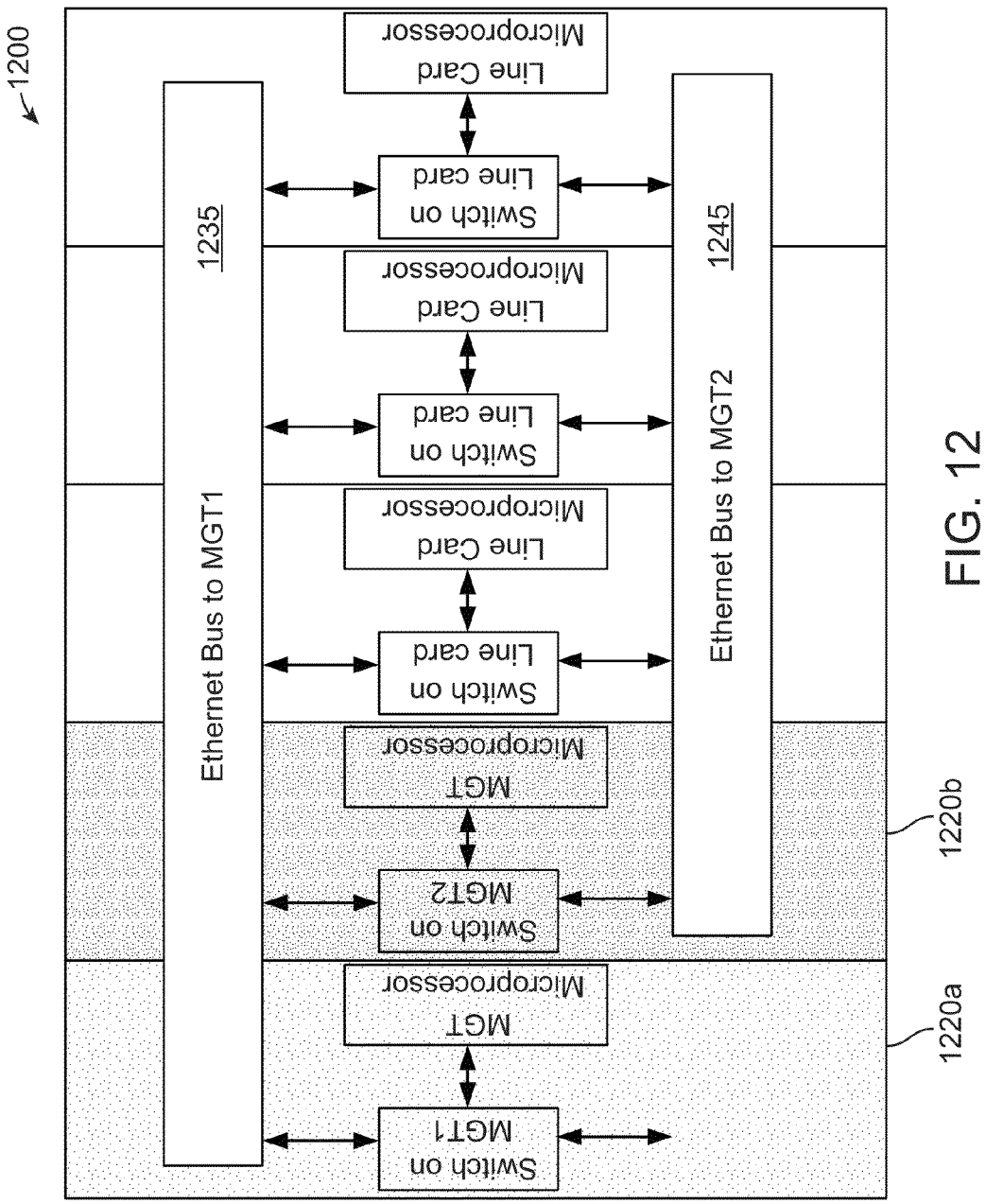
FIG. 12 is a block diagram illustrating a shelf configuration of WDM equipment designed for redundant management.
Figure 13:
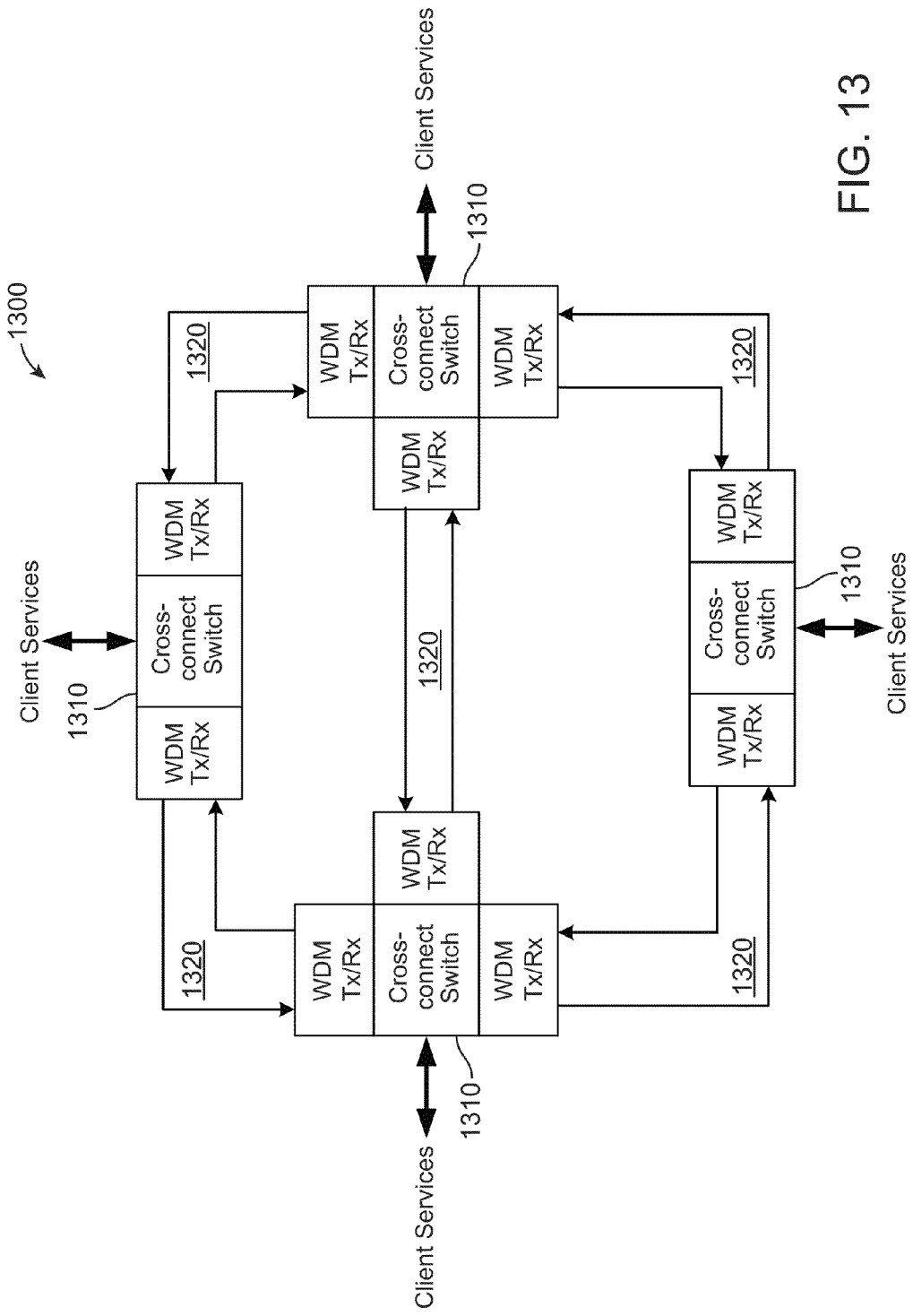
FIG. 13 is a block diagram illustrating a WDM Ring network employing large crossconnect switches at each node, interconnected via WDM links.
Figure 14:
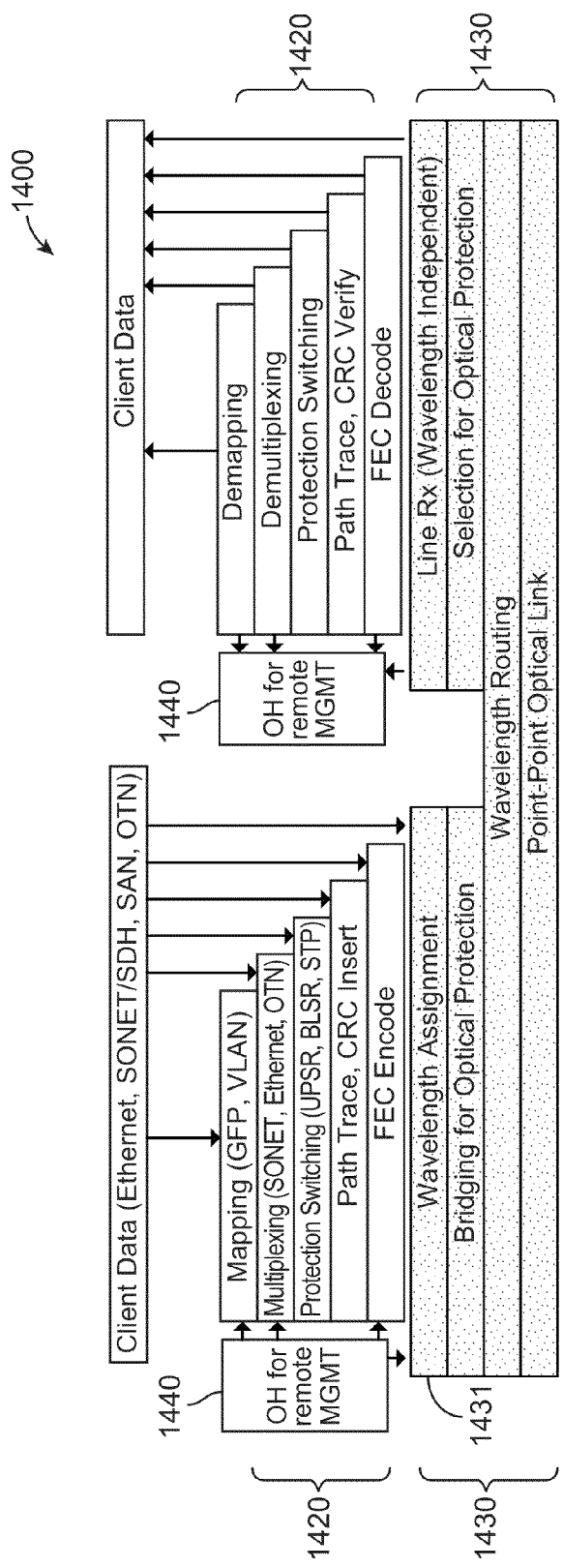
FIG. 14 is a block diagram illustrating electrical and optical sublayers of WDM equipment residing at the physical (lowest) layer of the 7-layer OSI model.

This architecture and routing method provides a means of interconnecting the rings and spurs shown in FIG. 10. For inter-ring traffic, a subset of the total number of ITU channels can be assigned to the inter-ring traffic and remaining ITU channels can be assigned to the intra-ring traffic. Fixed or reconfigurable filters can then be used to direct the inter-ring traffic and intra-ring traffic. The routing tables can be extended to cases where there are spur nodes, and interconnected rings.

The subchannel routing software provides multilayer routing where the first layer manages client services, the second layer manages subchannels, the third layer manages ITU channels, and the fourth layer manages fiber connections. Additional tables can indicate the status of these services and connections. The tables also provide route discovery for subchannels and services.

FIG. 72 shows an example of a status table 7200 that can be displayed by the network management software to the network operator. The techniques described above can be used to determine the optical data listed. The first table 7210 in FIG. 72 lists status of the subchannels transmitted from Node 1 in the example of FIG. 63. The columns list, in order from left to right, the local IP address of each line card, the transmitted subchannel, the service on each subchannel, a unique label used to identify the service, the destination node, the transmit port connecting the subchannel to the line fiber, identification of any subchannel that is protecting the traffic, the remote received power, OSNR, dispersion, PMD, and bit error rate. Similar entries are provided in the bottom table 7220 for the received subchannels.

In these tables, visual cues can be used to alert the operator about network problems. For examples, metrics that are failing a requirement can be colored red, and metrics that are close to failing can be colored yellow. Moreover, in another embodiment, such cues could trigger automated actions including notifications of a problem or predefined corrective measures such as provisioning or de-provisioning a circuit.

4. Directionless Subchannel Muxponder

There is a need in WDM optical networking for directionless transponders and muxponders. In this context, "directionless" means that the circuit provided by the transponder or muxponder can be remotely switched by software to be on either side of a ring, i.e. the transmitter can switch between transmitting in the clockwise direction or counter-clockwise direction; and the receiver can select a circuit from the clockwise direction or counter-clockwise direction.

FIG. 73 shows an example of a directionless subchannel muxponder implementation 7300. The switching is accomplished by placing a red/blue filter 7310 at the transmitter output and a red/blue filter 7320 at the receiver input. The red/blue filter splits the C-band ITU channel bandwidth into two halves, "red" channels are ITU channels 200-390 and "blue" channels are ITU channels 400-600. Note that this division is arbitrary and dependent on the quality of the red/blue filter. Current filters may not have adequate isolation at the splitting frequency, so that 1 or more channels at the middle, e.g. channels 390-410, may be unusable.

With the red/blue filters inserted as shown in FIG. 73, a subchannel muxponder can set a subchannel transmitter to a blue frequency to transmit to one direction or to a red frequency to transmit to the other direction. Similarly, red or blue channels can be selected from either direction to be received.

The configuration 7400 of FIG. 74 enables a subchannel muxponder to be deployed as a switchable subchannel crossponder. A "crossponder" in this context is a muxponder that can transmit and receive on two line ports. One advantage of a subchannel crossponder is that it can redirect traffic away from a span for node insertion as shown in FIG. 74. For example, traffic can transmit and receive on both fiber spans 7410 or be redirected to only one of the spans 7420, or a new node can be inserted, effectively replacing one of the fiber spans 7430. A subchannel crossponder can also be used to bridge traffic on two diverse spans for protection switching applications as described below. Subchannels can be selectively dropped or added using the crossconnect switch 4115 shown in FIG. 41.

5. Subchannel Optical Protection

The subchannel network design offers a flexible means of protecting services. Traffic that propagates in one direction in a subchannel can be protected by the same or a different subchannel propagating around the ring in the opposite direction. This architecture also supports shared optical protection. Regardless of the protection architecture deployed, a protected circuit requires two basic functions at the terminals—the bridge function and switch function. The signal to be protected has to be bridged onto two redundant paths at the transmit end, and one of the two signals from the redundant paths must be switched at the receive end to be selected as the working circuit.

In the example shown in FIG. 63, there are two duplex connections between every node—one in the clockwise direction, and one in the counter-clockwise direction. The two subchannels can be used for independent services or for protecting against fiber cuts.

An example of a simplified dedicated protection implementation 7500 is shown in FIG. 75 where the traffic between two nodes, Node 1 and Node 2, is protected with a working fiber pair 7510 and a protection fiber pair 7520. There are two protected circuits, one between Clients 1 (C1) and 3 (C3), and one between Clients 2 (C2) and 4 (C4). At the transmitter, the traffic from Clients 1 and 3 is bridged onto I-200, SC-1 and I-400, SC-3; and the traffic from Clients 2 and 4 is bridged onto I-200, SC-2 and I-400, SC-4. This traffic is transmitted onto both working fibers with the I-200/I-400 channel filters.

At each receiver, a 1×2 switch selects traffic from one of the designated subchannels. For example, the switch 7530 at Node 1 for Client 1 selects the I-200, SC-1 received signal in normal mode, and selects the I-400, SC-3 received signal when the working fiber pair is cut. The selection of subchannel can be done with the integrated crossconnect switch shown in FIG. 17, or with the use of external optical or electrical switches.

Although the crossconnect shown in FIG. 17 provides more connectivity, it also adds to the cost of the terminal equipment. If the transceiver module does not have a crossconnect, there are other means for performing the bridge and switch. For example, equipment 7600 in FIG. 76 includes two optical splitters on the client side. The top splitter 7610 is used to bridge the client data 7605 onto the first and third subchannels. At the receive side, the signals from the first and third subchannels are connected to a second optical splitter 7620. The software on the transport module selects which subchannel signal is sent back to the client 7605 by enabling one of the client transmit lasers. This function could also be accomplished with a 1×2 optical switch 7630 instead of the second optical splitter 7620. The first option may be preferred because (1) cost of an optical splitter is lower than that of an optical switch and (2) the software controlling the switch is self-contained on the transport module—the second option requires external software communication between the transport module and the switch, which makes the switch slower and less reliable.

Another embodiment for performing the bridge and switch is shown in FIG. 77. In this embodiment 7700, the bridge function is done with an optical loopback 7710 on the client side between CL-1 and CL-3.

The dedicated protection architecture shown in FIG. 75 can be deployed in much larger applications with many more nodes and many more subchannel circuits. In these cases it may be desirable to use shared protection to free up more subchannels for working traffic.

FIG. 78 shows an embodiment of a subchannel crossponder 7800 that can be used to support dedicated or shared protection. On the transmit side, the first two carriers 7810a and 7810b are transmitted to one line fiber 7825 and the other two carriers 7810c and 7810d are transmitted to the second line fiber 7835. The receive side has a coupler 7840 to receive subchannels from both line fibers 7825 and 7835. The integrated crossconnect switch 7850 can be used for dedicated protection (1) at the transmit side to bridge client traffic onto two subchannels, and (2) at the receive side to select traffic from one direction. The switch 7850 can also be used for a shared protection application to regenerate the protection subchannel. These cases are discussed below.

FIG. 79 shows an application 7900 that uses a subchannel crossponder at two distinct nodes connected by two fiber pairs. The top fiber pair 7910 is designated as the working pair and the bottom pair 7920 is designated as the protection pair. Subchannels SC1 and SC2 are transmitted in the clockwise direction and SC3 and SC4 are transmitted in the counter-clockwise direction. There are two working circuits on the top working fiber, (1) SC1 transmitting from Node 1 to Node 2 with SC4 transmitting from Node 2 to Node 1; and (2) SC2 transmitting from Node 1 to Node 2 with SC3 transmitting from Node 2 to Node 1.

The integrated crossconnects 7930*a* and 7930*b* perform the bridge and switch functions for Nodes 1 and 2, respectively. Traffic on the first client port at Node 1 is bridged to SC1 (transmitted over the working fiber) and SC3 (transmitted over the protection fiber). At the receive side the switch function in the crossconnect 7930*a* selects the traffic from SC1 or SC3 to be transmitted back to the first client port at Node 2. This design of the crossponder therefore provides dedicated protection of two working circuits with Subchannel 3 protecting the traffic in Subchannel 1 and Subchannel 4 protecting the traffic in Subchannel 2.

FIG. 80 shows an embodiment 8000 where the subchannel crossponder is used in a shared protection application. In this example, there is a single working circuit between each pair of neighboring nodes (N1 to N2, N1 to N3 and N2 to N3). The subchannels assigned for the working circuits are SC1 for the clockwise direction and SC3 for the counter-clockwise direction. SC4 is allocated as a shared protection subchannel for failures in SC1; and SC2 is allocated as a shared protection subchannel for failures in SC3. Therefore at each node where client traffic is being added, client traffic that is mapped to SC1 is also bridged to SC4, and client traffic that is mapped to SC3 is also bridged to SC2. At the drop side, the switch function in the crossconnect normally selects SC1 and SC3.

FIG. 81 shows how the network shown in FIG. 80 is protected by a fiber cut 8130. In this embodiment 8100, the fiber pair 8110 between Nodes 1 and 2 has been cut. After the control software determines that the fiber pair 8110 between Node 1 and Node 2 has been cut, e.g. by Loss of Signal alarms, it sends messages over the OSC (optical service channel) to each node in the ring. The nodes adjacent to the cut are instructed to switch to protection so that the first client circuit at Node 1 switches from selecting the traffic from SC3 to selecting the traffic from SC2 on the other side of the ring, and the first client circuit at Node 2 switches from selecting the traffic from SC1 to selecting the traffic from SC4 on the other side of the ring.

At the intermediate nodes (Node 3 in this example), the protection subchannels are switched to passthrough mode. In this example that means that SC4 is regenerated from Node 1, passing through Node 3, to Node 2, and SC2 is regenerated from Node 2, passing through Node 3, to Node 1.

The shared protection switching with subchannels requires real-time messaging software between the nodes over an overhead channel to coordinate the protection switching. It should be noted that, because one embodiment of the subchannel crossponder supports different protocols on each port, the protocol of the protection subchannel may have to be switched as well during the protection switch.

Also note that the protection bandwidth (SC2 and SC4 in this example) is normally unused so that it is available for low-priority traffic. For this example, a low-priority circuit could be established between the second client port at Node 1 and the second client port at Node 2 transmitting on SC2 from Node 1 to Node 2, and transmitting on SC4 from Node 2 to Node 1. Similar circuits could be established between Node 1 and Node 3, and between Node 3 and Node 2. Those circuits would be dropped in the event of a protection switch of high-priority traffic, since the protection switch then uses the protection bandwidth to maintain the high-priority circuit.

This type of shared protection falls under the category of OSPR (Optical Shared Protection Ring), that use a division between working and protection bandwidth similar to that used by a SONET Bidirectional Line Switched Ring (BLSR) defined in the Telcordia Standard GR-1230-CORE. [See also "Transparent Optical Protection Ring Architectures and Applications", by M. J. Li et al, IEEE Journal of Lightwave Technology, Vol 0.23, No. 10, p. 3388 (2005).]

In this protection architecture, when a failure occurs that causes a loss of signal on a span between two OADM nodes, a protection switch is initiated by the control software. Signaling messages from the nodes on either side of the failure are transmitted around the ring on the side away from the point of failure. Upon receiving the request to effect a protection switch, all the intermediate nodes discard the extra traffic, if used, to set up a protection link for the failed traffic.

It should be noted that the designs described above represent not only a novel device—i.e., the first subchannel crossponder—but a novel application of this device—i.e., the first application of a subchannel crossponder in a shared protection ring. This type of shared protection can also be applied to subrate overlay channels, such as the examples shown in FIG. 70.

Also note that the crossconnect switch 1750 in the subchannel muxponder 1700 (shown in FIG. 17) or crossponder 7800 (shown in FIG. 78) can be used to provide 1:N shared protection against laser failures. For example, 3 client services can be mapped to the first 3 subchannels, and if any of the hardware used by one of the first 3 subchannels fails, the affected traffic can be bridged and switched to the fourth subchannel.

6. Distributed WDM Switching Network

By mapping client data to N subchannels on M ITU channels with tunable lasers, this architecture can support ring and mesh topologies with up to up N×M strict-sense nonblocking connections with low-cost fixed optical filters. In the examples described above, M=4 for 4 subchannels at 10 Gb/s, while N=on the order of 40 for C-band ITU channels spaced at 100 GHz, and N=on the order of 80 for C-band ITU channels spaced at 50 GHz, and N=on the order of 160 for C and L band channels spaced at 50 GHz. With 4 subchannels per ITU channel, this embodiment can therefore support a 640× 640 full logical mesh of 10 Gb/s services, in a strict-sense nonblocking switching architecture.

Furthermore, if J subrate services are mapped to each subchannel, then J×M×N circuits can be supported by this network.

When 10 subchannels are mapped into an ITU channel, providing 100 Gb/s, the switching network size increases to a 1600×1600 full logical mesh of 10 Gb/s services.

FIG. 82 shows the case of a large distributed optical switching network 8200. It is on a physical ring, but provides a logical mesh connection between all circuits as shown in network 8300 in FIG. 83. A circuit can be established between a pair of any client ports at any nodes by tuning the subchannel lasers. Spurs or other rings can be connected as well with ITU channel filters used to direct the traffic across the ring. As discussed previously, the ITU channel filter function can done with fixed or reconfigurable filters in a broadcast and select configuration or configuration with selective add and drop filters.

The subchannel routing software described in this document can be used to determine which subchannels are available on each network segment, establish and monitor subchannel circuits, and reconfigure subchannels for network upgrades such as node insertions. The subchannel muxponder can be used to upgrade an existing ITU network to provide M times the capacity while providing the additional functionality of subchannel routing, reconfiguration and restoration, switching, and physical layer monitoring. The network can also be operated in a hybrid manner, where subchannels coexist with standard ITU channels as ITU subchannels are subdivided into subchannels as the network grows. This provides a "pay as you grow" cost advantage.

D. Shared Wavelocker for Controlling Subchannel Frequencies

The above descriptions of various subchannel-related embodiments assume tunable lasers of sufficient precision to reliably distinguish multiple subchannels (eg, subcarrier frequencies) within a single ITU channel. As noted above, tunable lasers for such subchannel-related applications require even greater accuracy than for ITU channel-based applications.

As is the case with all electronic and optical components, the performance characteristics of the lasers employed in DWDM systems change with temperature and with time. In particular, the frequency of emitted laser light changes due to ambient temperature variations (typically from −5 deg C. to 65 deg C.) and due to aging.

If the WDM system requirements call for better absolute laser frequency stability than that of the DWDM (Dense Wavelength-Division Multiplexing) laser itself, an external wavelocking scheme is preferred. In this scheme: (i) each laser has a set-point for its target frequency; (ii) the laser absolute frequency is measured by a measurement means that has the required absolute frequency accuracy; (iii) the control electronics and/or software calculate the offset between each laser's actual frequency and its target frequency, and communicates the error to each laser controller; and (iv) the laser set-point is adjusted appropriately to reduce the frequency error to a value within the system requirements. In this context, the terms "laser frequency" and "laser wavelength" may be used interchangeably.

U.S. Pat. No. 6,282,215 discloses a wavelocking scheme that employs one or more Fabry-Perot etalons placed inside each laser cavity. Yet, using at least one integrated etalon per laser adds cost to the system, and the locking error on each laser does not ensure that the lasers are all on the same frequency grid. Moreover, current integrated wavelocker designs offer absolute frequency accuracy on the order of +/−1 GHz or more. This level of absolute accuracy is adequate for WDM systems where channels are located on the ITU grid with spacing of 50 or 100 GHz, but this level of accuracy is not sufficient for DWDM systems such as those based on subchannels within an ITU with channel spacing on the order of 10 GHz.

Existing architectures partially address these drawbacks with designs that can lock multiple lasers to a grid using a shared external etalon. See, for example, U.S. Pat. No. 6,369,923, which uses an etalon with spacing between resonant frequencies equal to the channel spacing. It applies the same dither on each laser, with the dither being activated on one laser at a time while each laser is being monitored. U.S. Pat. No. 7,068,949 also uses an etalon with spacing between resonant frequencies equal to the channel spacing. It applies different pilot tones or low-amplitude frequency dithers (i.e. dithering) to each laser to be locked. The wavelocker detects the pilot tones with a Fast Fourier Transform (FFT) signal analysis.

However, these methods do not scale to very large channel counts because the signal-to-noise ratio (SNR) of the signal required for locking decreases as more channels are added. These methods lock the laser array to the frequency grid of the Fabry-Perot etalon with an error on the order of +/−1 GHz. These methods also require a dither or pilot tone to be applied to each transmitter. The dither can add a bit-error penalty, and it also requires specialized hardware to be added to each laser.

We therefore disclose a method that offers significant performance and cost advantages over state-of-the-art wavelocking designs. In particular, this disclosed solution:
1 does not require any modifications to the transmitters—specifically, it does not require dithering the lasers, which can add a bit-error penalty;
2 scales to a very large DWDM channel count without a decrease in Signal-to-Noise-Ratio (SNR) of the signal required to wavelock the lasers;
3 independently measures and locks the frequency of each DWDM laser;
4 references the frequencies of each DWDM laser directly to an absorption frequency given by the fundamental physical quantum properties of molecules in gaseous state. Thus, it is predominantly independent of engineering and design tolerances, inaccuracies, manufacturing defects, etc., that are inherent, for example, in Fabry-Perot based wavelockers;
5 provides absolute frequency accuracy of wavelocking or referencing DWDM laser frequencies at least 20 times better (e.g. +/−50 MHz) than that of existing solutions with minimal errors over time and temperature;
6 provides locking without requiring hardware calibration;
7 provides an absolute accuracy that is determined by a National Institute of Standards and Technology (NIST) certified reference that is directly linked to the fundamental frequency standards used by NIST; and
8 provides wavelength accuracy comparable to that obtained by a NIST reference, since the frequency reference is based on absorption lines that have been identified by NIST.

See the following references for background in this context: (i) W. C. Swann and S. L. Gilbert, "Line centers, pressure shift, and pressure broadening of 1530-1560 nm hydrogen cyanide wavelength calibration lines", J. Opt. Soc. Am. B, vol. 22, no. 8, pp. 1749-1759, August 2005; (ii) S. L. Gilbert, W. C. Swann and C-M Wang, "Hydrogen Cyanide $H^{13}C^{14}N$ absorption reference for 1530 nm to 1565 nm wavelength Calibration—SRM 2519a, Standard Reference Materials, National Institute of Standards and Technology Special Publication 260-137, 2005 Edition; (iii) W. C. Swann and S. L Gilbert, "Pressure-induced shift and broadening of 1510-1540 nm acetylene wavelength calibration lines", J. Opt. Soc. Am B 17, pp. 1263-1270 (2000); and (iv) S. L. Gilbert and W. C. Swann, "Carbon monoxide absorption references for 1560 nm to 1630 nm wavelength Calibration—SRM 2514 ($^{12}C^{16}O$) and SRM 2515 ($^{1}C^{16}O$), Standard Reference Materials, National Institute of Standards and Technology Special Publication 260-142, 2002 Edition.

In one embodiment, a measured DWDM signal laser is referenced to a tunable laser (oscillator) that has a well-known and stable absolute frequency by measuring the beat frequency between the two lasers. This gives a frequency error equal to the frequency accuracy of the reference laser. If improved accuracy is required, the accuracy of the reference laser is improved by calibrating it in real-time to the absorption lines of a gas cell.

To minimize the system cost, this embodiment employs means of locking multiple DWDM lasers with a shared measurement system. These same measurement techniques could, however, be used with a single laser.

The strength of the beat frequency signal between two lasers depends on the polarization alignment of the two lasers. Polarization alignment between fiber-pigtailed lasers can be maintained with polarization-maintaining fibers (PMF). However, most DWDM components have single-mode fiber (SMF), which does not preserve the polarization. Some embodiments described below use PMF to control the polarization. Other embodiments use a polarization scrambler for cases where PMF is not available.

Case A

Oscillator and Signal Lasers Linearly Polarized and all Polarizations Aligned

No Absorption Cell

Embodiment 1

Beating of Two Lasers, Both at Fixed Frequencies

The simplest example of a frequency beating phenomenon may be described as follows. Assume that two laser beams of equal optical power and aligned polarizations are launched into the Polarization Maintaining (PM) optical fiber. Assume that the first laser is tuned to an optical frequency $f_o$ (oscillator) and the second laser is tuned to an optical frequency $f_s$ (signal) so that the frequencies differ by:

$$f_{RF}=|f_s-f_o|, (\text{e.g. } f_{RF}=500 \text{ MHz});$$

Also assume that the linewidth of both lasers ($\Delta f_{o\text{-}FWHM}$ for the oscillator and $\Delta f_{s\text{-}FWHm}$ for the signal laser) are approximately the same and equal to:

$$\Delta f_{FWHM}=\Delta f_{o\text{-}FWHM}=\Delta f_{s\text{-}FWHM};$$

and substantially smaller than $f_{RF}$ (e.g. $\Delta f_{FWHM}$=1 MHz). N.B. sub-index "FWHM" stands for a "Full Width at Half Maximum" linewidth definition.

When the combined light of both lasers is detected by a photodetector with an electrical bandwidth larger than $f_{RF}$, but much smaller than the frequencies of optical light $f_s$ or $f_o$, the photocurrent of the photodetector would have a sinusoidal electrical signal oscillating at the beat frequency $f_{RF}$. This phenomenon is known as frequency beating, in this example between $f_s$ and $f_o$.

The photocurrent of the photodetector detecting the laser frequency beating can be amplified by a trans-impedance amplifier (TZ) and filtered by an electrical bandpass filter (BPF) centered at a fixed or tunable frequency $f_{RF}$ with a fixed or tunable electrical bandwidth $\Delta f_{RF\text{-}FWHM}$ ($\Delta f_{RF\text{-}FWHM}$ being smaller than $2^*f_{RF}$, but larger than $\Delta f_{FWHM}$). If required, the beat signal can be amplified at the input or output of the BPF. The BPF can act also as an amplifier. The beat signal can be detected as follows. The BPF output is rectified, for example, by using a zero offset rectifier (i.e. a rectifier without a typical 0.7V voltage drop (offset) of a simple semiconductor silicon diode rectification); averaged, e.g., by an operational-amplifier-based integrator; digitized by an analog to digital converter (ADC); and processed in the digital domain by, e.g., a digital signal processing (DSP) circuit. Note that the band pass filtering, rectification, amplification and any other signal processing required can be performed after direct ADC conversion of the TZ output in the digital domain, e.g. within a microprocessor or a DSP.

For the purpose of this description, we call the electronic detection and processing system that measures the beat frequency the "RF Detection of the Beat Signal" (RFDBS), and its Direct Current (DC) (and/or direct voltage) signal at the input of the ADC after analog processing described above as the "RFDBS Output."

Embodiment 2

Beating a DWDM Signal Laser at Fixed Frequency (with a Narrow Optical Carrier) with an Oscillator Laser with a Scanned Frequency We now expand the first example to a more practical beating system suitable for DWDM applications. We now assume that in addition to all the conditions described above, the frequency of the reference laser, $f_o$, is tuned from $f_s-f_{RF}-\epsilon$ to $f_s+f_{RF}+\epsilon$, where $\epsilon$ is much larger than $\Delta f_{FWHM}$. See graph 8400 in FIG. 84 which illustrates this case.

While scanning the oscillator laser within the said range, the amplitude of the RFDBS output would show two strong peaks (maxima substantially higher than zero) at frequencies of the oscillator laser approximately equal to $f_o=f_s-f_{RF}$ and $f_o=f_s+f_{RF}$, where the equal sign means an equality within $+/-\Delta f_{RF\text{-}FWHM}$ or a few times $+/-\Delta f_{RF\text{-}FWHM}$.

In this example the RFDBS output is maximized when the oscillator frequencies are set to $f_{o\text{-}left}$ and $f_{o\text{-}right}$.

By analyzing the frequency positions of two RFDBS output peaks one can determine that the frequency of the signal laser to measured is given by:

$$f_{o\text{-}set}=(f_{o\text{-}left}+f_{o\text{-}right})/2=f_s.$$

The described example is valid not only for DWDM signal lasers which are narrow in spectrum, as in FIG. 84, but also for modulated DWDM lasers at high bit rates (e.g. 10-40 Gb/s) with modulation formats such as Non-Return-to-Zero (NRZ) or Carrier-Suppressed-Return-to-Zero (CS-RZ) that have significant spectral energy at the optical carrier. In the case of CS-RZ modulation format, the RFDBS output will have four distinct peaks and the formula to determine $f_{o\text{-}set}$ is slightly more complex than the prior formula given above for the NRZ modulation format.

Embodiment 3

Beating a DWDM Signal Laser at a Fixed Frequency (with a Broad Spectrum) with a Scanned in Frequency Oscillator Laser For DWDM modulation formats such as duo-binary (DB), Quadrature-Phase-Shifted-Keying (QPSK) or Differential-Quadrature-Phase-Shifted-Keying (DQPSK), the optical carrier is substantially or totally suppressed and the signal laser spectrum is broad (e.g. several or several tens of GHz) as shown in graph 8500 in FIG. 85.

In this case, the RFDBS Output signal would in general show two broad spectral lines or more. They can be distinct and separated in spectrum as in FIG. 85 or overlap to some or large extent depending on the choice of detection parameters such as $f_{RF}$, $\Delta f_{RF\text{-}FWHM}$, $\Delta f_{O\text{-}FWHM}$, bandwidth of the photodetector, gain and integration constant of the processing circuit, intensity of both signal and oscillator lasers and other design parameters for a particular implementation.

In one embodiment, the RFDBS signal spectrum, namely the RFDBS output versus the oscillator laser frequency, can be processed and analyzed, and the absolute frequency of the signal laser, $f_s$ (e.g. defined at the center of its broad spectrum) can be determined.

General Approach

In general, for each modulation format of DWDM signal lasers and specific DWDM system requirements, the optimum set of system parameters such as $f_{RF}$, $\Delta f_{RF-FWHM}$, $\Delta f_{o-FWHM}$, bandwidth of the photodetector, gain and integration constant of the processing circuit, intensity of both signal and oscillator lasers and so on, exist. Optimization of these parameters and the overall design is well known in the art of heterodyne radio receivers design.

Implementation Type 1

FIG. 86 illustrates one possible implementation 8600 of this approach. The linear polarization of the lasers is preserved in polarization maintaining fibers (PMF) 8610a and 8610b, and both lasers (Oscillator Laser 8615 and Signal Laser 8625) are combined in such a way that, at the output of PM Coupler 1 8630, their polarizations are aligned.

An algorithm implemented by the control unit 8650 in FIG. 86 includes the following steps:

1 Set the frequency of the signal laser 8625 to an initial setpoint value $f_{s-set-ini}$, which may or may not be equal (within required system tolerance) to the absolute frequency of the signal laser required, $f_{s-target}$;

2 Scan the frequency of the oscillator laser 8615 from $f_{s-target}-f_{RF}-\epsilon$ to $f_{s-target}+f_{RF}+\epsilon$, recording at each scanning step the frequency setpoint of the oscillator laser 8615. Make sure that $\epsilon$ is large enough, e.g. much larger than the anticipated signal laser absolute frequency error $f_{error}=f_{s-set-ini}-f_{s-target}$; and the bandwidth of the signal $\Delta f_{s-FWHM}$;

3 Record at each scanning point an amplitude of RFDBS output, thereby obtaining at the end of the scan a table of data with beat signal versus the oscillator laser frequency;

4 By processing and analyzing the RDFBS Output spectrum, determine the current absolute frequency of the signal laser, $f_{s-current}$; e.g. by using equation (1) for NRZ modulation format;

5 Calculate correction to the signal laser setpoint as $f_{s-set-corr}=f_{s-target}-f_{s-current}$;

6 Modify the signal laser frequency setpoint as $f_{s-set-final}=f_{s-set-ini}+f_{s-set-corr}$;

7 Set signal laser frequency to $f_{s-set-final}$ and call it from then on $f_{s-set-ini}$;

8 Repeat steps 1 to 7 as fast and as often as needed to keep the signal laser frequency within the accuracy required by the DWDM system.

With Absorption Cell

In DWDM systems which require higher or substantially higher absolute signal laser frequency stability and accuracy than that given by the oscillator laser, the oscillator laser can be calibrated during each scan by a more precise external frequency reference.

Description of a Gas Cell as Wavelength Reference

A very stable and accurate frequency reference is available in the form of absorption cells filled with specific molecules in a gaseous state. A gas chosen for this application has many narrow absorption lines within the spectral region of interest. For example, the following molecules can be employed in different spectral regions:

| | | | |
|---|---|---|---|
| 1255-1355 nm | HF | Hydrogen Fluoride | O-band |
| 1510-1540 nm | $^{12}C_2H_2$ | Acetylene | S-band |
| 1529-1564 nm | $H^{13}C^{14}N$ | Hydrogen Cyanide | C-band |
| 1560-1600 nm | $^{12}CO$ | Carbon Monoxide | L-band |
| 1590-1640 nm | $^{13}CO$ | Carbon Monoxide | L-band+ |

To assure absolute accuracy of the location of the absorption lines in the optical spectrum, the molecules in the gas cell must contain only particular atomic isotopes with well-defined reference frequencies.

A mixture of molecular gases can be used to cover a much wider spectrum range than listed above. For example, a mixture of Hydrogen Cyanide ($H^{13}C^{14}N$), Carbon Monoxide ($^{12}CO$) and Carbon Monoxide ($^{13}CO$) covers the spectral range 1520 nm to 1640 nm.

A typical absorption spectrum 8700 of Hydrogen Cyanide ($H^{13}C^{14}N$) is shown in graph 8700 in FIG. 87.

The spectral positions of all absorption lines change only very slightly with temperature. Since the temperature dependence of line positions is well known, this dependence can be calibrated out if the cell temperature is being measured and processed by the control unit (such as control unit 8650 in FIG. 86).

The spectral positions of all absorption lines are predominantly dependent on a gas pressure in a cell as illustrated in graph 8800 in FIG. 88, which does not change in time and is known and determined in the cell manufacturing process.

The linewidths of the absorption lines also change with gas pressure as illustrated in graph 8900 in FIG. 89. When lower pressure is chosen, the lines are narrower in spectrum and their positions can be measured more accurately. The gas pressure can be determined by measuring and analyzing the spectral widths of the absorption lines.

As mentioned above, several molecular gasses (including Hydrogen Cyanide ($H^{13}C^{14}N$)) have been fully characterized by NIST and provide excellent absolute frequency references.

Graph 9000 in FIG. 90 shows the absolute frequency accuracy of Hydrogen Cyanide ($H^{13}C^{14}N$) absorption line positions over a typical operating temperature range of −5° C. to +70° C. The vertical axis is given in ITU channel numbers where, for example, channel 20 corresponds to the optical frequency 192.0 THz and channel 60 corresponds to 196.0 THz.

Graph 9100 in FIG. 91 shows the FWHM linewidths of Hydrogen Cyanide ($H^{13}C^{14}N$) absorption lines. It is apparent that lower gas pressures offer narrower absorption peaks, which provides more measurement accuracy.

A summary of the absolute errors in absorption peak positions for Hydrogen Cyanide ($H^{13}C^{14}N$) at three different gas pressures is presented in Table 2 and Table 3 (assuming no corrections for temperature dependence).

TABLE 2

| Parameter | Units | MIN | MAX |
|---|---|---|---|
| Operating Temperature Range | deg C. | −5 | 70 |
| Gas Pressure Uncertainty | % | −25 | 25 |
| Fitting Error | MHz | | 2.5 |
| Line Spacing | GHz | 58 | 172 |

TABLE 3

| | | Cell Pressure (kPa) | | |
|---|---|---|---|---|
| | Units | 1.0 | 3.3 | 13.3 |
| Max. Frequency Error (2 * Sigma) | MHz | 11 | 32 | 57 |
| Max. Linewidth FWHM | GHz | 0.8 | 2.3 | 9.0 |

Table 3 shows that when a cell with 1.0 kPa gas pressure is used, the maximum (worst line) uncertainty of the absorption peak spectral position is +/−11 MHz (within 2 standard deviations). The average error among all lines under these conditions is +/−7.6 MHz. These uncertainties can be improved by 10-20% by calibrating out the temperature dependence.

Note that the absolute wavelength accuracy of the best commercially available laboratory wavemeters is +/−30 MHz. These instruments are very costly (tens of thousands of dollars), bulky, operate only at a laboratory temperature range, and are not suitable for DWDM system applications. Due to technical, physical, size and cost limitations, their absolute accuracy has not been improved at all over the last 15 years. At present, and at least the near future, only national standards laboratories are able to measure optical frequencies with better absolute accuracy than +/−30 MHz.

We describe herein methods to measure the absolute laser frequency with an accuracy of approximately +/−10 MHz in a cost effective way, and with a design that can easily be implemented in a DWDM system.

Calibration of the Oscillator Laser Frequency Setpoints by Reference Frequencies of the Absorption Cell.

This section describes how we can use the absorption cell described above as an ultra-stable optical frequency (wavelength) reference.

A part of the oscillator laser light is transmitted through the absorption cell and the resulting optical output from the cell is detected by a photodiode, followed by a TZ, a low-pass filter (LPF) (possibly with amplification) and converted to the digital domain by an ADC. We refer to the DC voltage at the input of the ADC as the "CELL Output". Again as before, amplification, LPF and other processing functions can be implemented in the digital domain, e.g. in a DSP, when the ADC is installed just after the TZ.

While the oscillator laser is being scanned in frequency, the CELL Output signal would stay mostly constant (corresponding to a fully transparent cell without any gas) except for the spectral regions which have gas absorption lines.

A typical spectral shape of an absorption line of a gas cell is presented in graph 9200 in FIG. 92. In this particular example, the absorption line P16 for Hydrogen Cyanide ($H^{13}C^{14}N$) is measured at a quite high pressure of 13 kPa (100 Torr). Consequently the line is quite broad, which reduces the accuracy with which the peak position can be determined.

The oscillator frequency in FIG. 92 was scanned in 0.1 pm steps (74 GHz).

After accumulating all the absorption line points during the scan (i.e. the CELL Output versus the oscillator set frequency), the collected data can be analyzed by variety of methods in order to find an absorption dip position $f_{CELL-i}$, where index "i" numbers consecutive dips in the whole absorption spectrum (e.g. 50 strong lines in Hydrogen Cyanide).

The simplest method and the least accurate method would be to select a sampling point of the scan with the lowest value. The most sophisticated and most accurate method would involve:
1 fitting a straight line or a parabola to the relatively flat background signal around the absorption line and subtracting this fit from the measured sampling points of the absorption line;
2 fitting to the full (and background free) absorption shape a theoretical Galatry function which offers a perfect fit to the shape of the line;
3 determining from the Galatry function an optical frequency of the dip position, $f_{CELL-i}$
4 finding the oscillator frequency setpoint, $f_{o-near-CELL-i}$, which is the closest to dip position;
5 fitting a straight line or a parabola to several oscillator optical frequency setpoints, $f_{o-set-j}$, (where index "j" numbers consecutive sampling setpoints) recorded during the scan for each sampling point and located approximately symmetrically around $f_{o-near-CELL-i}$
6 interpolating the function determined in point (v) to calculate the oscillator frequency setpoint, $f_{o-set-CELL-i}$, which corresponds to tuning the oscillator to the minimum of the absorption line with index "i", $f_{CELL-i}$.
7 assigning to the oscillator setpoint $f_{o-set-CELL-i}$ an optical frequency value determined by NIST for this absorption line, $f_{CELL-i}$.

Simpler methods can be applied such as:
1 fitting a Voigt or Lorentzian profile function instead of Galatry function;
2 not subtracting the background;
3 fitting a Gaussian function or a parabola only in the neighborhood of the absorption dip;

Regardless of the method used in determining the spectral dip position, the end result of this process is to find the setpoint of the oscillator, $f_{o-set-CELL-i}$, which would tune it as accurately as possible to the dip of the absorption line and to assign to this setpoint the NIST-determined optical frequency, $f_{CELL-i}$.

Embodiment 4

Beating of a DWDM Signal Laser at Fixed Frequency (with a Broad Spectrum) with an Oscillator Laser Scanned in Frequency and a Frequency Reference Cell Calibration of the oscillator frequency setpoints against the known positions of the cell absorption peaks can be used to significantly improve the absolute frequency accuracy of the oscillator and consequently the signal laser.

The oscillator frequency setpoints can be calibrated with a very high absolute accuracy only at the absorption peak frequencies, $f_{o-set-CELL-i}=f_{CELL-i}$.

Any other optical frequency of the oscillator setpoints needs to be calibrated by interpolation or extrapolation of two or more $f_{o-set-CELL-i}$ determined setpoints.

FIG. 93 shows an example of a calibration of the oscillator laser frequency setpoints by the reference frequencies of the absorption cell. In this example, the oscillator laser frequency is being scanned over a wider range of optical frequencies, such that during scanning at least two absorption lines are measured, resulting in calibration of at least two frequency points of the oscillator during the scan. Preferably, the absorption lines measured should be placed on both sides of the measured signal wavelength.

Implementation Type 2

A practical implementation 9400 of calibration of the oscillator setpoints and the measurement of beat frequency spectrum is shown on FIG. 94.

A temperature sensor 9410 measuring the temperature of the absorption cell 9420 is optional and required only if a slight temperature dependence of the absorption line positions needs to be calibrated out.

An algorithm implemented by the control unit 9450 in FIG. 94 includes the following steps:
1 Select a particular signal laser frequency to be measured and/or controlled $f_{s-target}$;
2 Set the frequency of the selected signal laser to an initial setpoint value $f_{s-set-ini}$, which would be close but may or may not be equal (within required system tolerance) to the absolute frequency of the signal laser 9425 required, $f_{s-target}$;

3 Find from a theoretical look-up table frequencies of (e.g. two) the closest cell absorption peaks, $f_{CELL-i1}$ and $f_{CELL-i2}$ to the left and right of $f_{s-target}$ respectively ($f_{CELL-i1} < f_{CELL-i2}$);
4 Scan the frequency of the oscillator laser 9415 from $f_{CELL-i1} - \epsilon$ to $f_{CELL-i2} + \epsilon$ recording at each scanning step the frequency setpoint of the oscillator laser 9415. Make sure that $\epsilon$ is large enough, e.g. large enough that both absorption peaks are fully measured including the flat spectral regions to the left of peak i1 and to the right of peak i2 for background subtraction, if required;
5 Record at each scanning step the amplitude of the CELL Output signal, which results in a record of the cell absorption spectrum versus the oscillator frequency (given by its setpoints at each scanning step);
6 Record at each scanning point the amplitude of the RFDBS Output signal, which results in a record of the RFDBS Output spectrum versus oscillator frequency;
7 In a processing unit (e.g. DSP), analyze all measured cell absorption lines and find the oscillator laser 9415 frequency setpoints corresponding to the minima of the absorption lines, $f_{o-set-CELL-i1}$ and $f_{o-set-CELLi2}$. By interpolation or extrapolation, calibrate the oscillator setpoints for all scanning steps and use the calibrated frequencies for each scanning step in the analysis of the RFDBS Output;
8 By processing and analyzing the RFDBS Output spectrum, determine the current absolute frequency of the signal laser 9425, $f_{s-current}$; e.g. by using equation (1) for NRZ modulation format and numerical techniques (similar to those described for finding the spectral position of the cell absorption dip) to find a center frequency of the signal laser 9425, $f_{s-current}$;
9 Calculate a correction to the signal laser 9425 setpoint as $f_{s-set-corr} = f_{s-target} - f_{s-current}$;
10 Modify the signal laser 9425 frequency setpoint as $f_{s-set-final} = f_{s-set-ini} + f_{s-set-corr}$;
11 Set signal laser 9425 frequency to $f_{s-set-final}$ and call it from now on $f_{s-set-ini}$;
12 Repeat steps 1 to 11 as fast and as often as needed at frequency $f_{s-target}$ as required by DWDM system accuracy.
13 Repeat steps 1 to 12 for another DWDM signal laser or lasers.
Implementation Type 3
The implementations described above assumed that the optical output power of the oscillator laser does not change during the frequency scan. Generally, this assumption may not be correct and power variability of the oscillator potentially distorts both the CELL Output and RFDBS spectra measurements.
FIG. 95 illustrates an implementation 9500 in which the variations of the oscillator optical output power are measured and used as a reference signal to correct (normalize) both CELL Output and RFDBS Output spectra.
Implementation Type 4
For some DWDM system applications, the implementations described above may not be accurate when the signal laser is being modulated. This occurs when the signal laser light is modulated by an RF signal, e.g. at 10 Gb/s, resulting in a signal optical bandwidth, $\Delta f_{s-FWHM}$, of several GHz, e.g. 16 GHz. Such a wide optical bandwidth would produce an approximately equally wide RFDBS Output spectrum, thereby reducing the accuracy of the measurement by an equivalent amount.
FIG. 96 illustrates an implementation 9600 in which this problem is avoided. In this embodiment, the signal laser 9625 light is split (tapped at 9660) before the RF modulation is applied (by data modulator 9670) and the frequency of the tapped light is determined by one of the methods described above.

Case B

Oscillator Laser Output is Linearly Polarized but the Signal Lasers Polarization Randomly Changes in Time In the above embodiments, both signal and oscillator lasers light are polarized linearly and both polarizations are aligned on the photodetector. In some applications, the implementation of these designs would be too costly or not practical.
The strength of the beat frequency (RFDBS Output) depends on the polarization alignment between the two lasers. When the lasers are polarized orthogonally to each other the beat frequency would not be generated at all. This issue is addressed below in a practical design for random polarizations.
Implementation Type 5
FIG. 97 illustrates an implementation 9700 in which there are no restrictions for the state of polarization of the signal laser.
In this implementation, the oscillator laser 9715 light is transmitted through a polarization scrambler 9720 with preferably high scrambling speed (e.g. over 1 kHz). At the output of the polarization scrambler 9720, the polarization of the oscillator changes rapidly, and after some time reaches all or almost all polarization states possible.
The scrambled oscillator light 9730 will beat with the randomly polarized and time-dependent signal light for half of the time on average, providing that:
1 the integration time constant of the integrator placed before the ADC converter which provides RFDBS Output is substantially longer than the scrambling speed; and
2 the scanning speed of the oscillator laser is slow enough that, at each sampling point, both RFDSB and CELL Outputs would reach a steady state.
The implementation 9700 illustrated in FIG. 97 works equally well as all the previously described implementations in which both lasers polarizations were preserved and aligned. The polarization scrambler 9720 can be introduced to any of the four implementations described above, and PM fibers in these implementations can be replaced by non-PM fibers, e.g. SMF-28.
Thus, this novel approach applies to both types of fiber systems: (i) based on polarization maintaining fiber; and (ii) standard non-polarization maintaining fiber such as SMF-28; or hybrid. In both systems, the absolute accuracy of stabilizing a DWDM signal laser or lasers remains the same.
Stabilization of Multiple Signal Lasers in DWDM System
This approach of stabilizing DWDM signal laser wavelength can be applied in many different architectures to stabilize multiple signal lasers.
Implementation Type 6
FIG. 98 and FIG. 99 show possible architectures which share the frequency stabilization hardware and control circuits among many signal lasers (with signals propagating along multiple fibers in embodiment 9800 or a single fiber in embodiment 9900.
This approach can also be used as a very accurate, high resolution optical spectrum analyzer or fiber monitor. FIG. 100 shows a typical DWDM network node 10000 where all incoming and outgoing optical spectra in all fibers are monitored.
FIG. 101 shows an electro-optic circuit 10100 that can be used to measure the beat frequency for the case where there are polarization-maintaining fibers connecting the signal lasers 10125 and the reference laser 10115. Note that the detection circuits in FIGS. 101 to 103 can be implemented with the same blocks in a different order, for example the AC RF bandpass filter with gain 10110 can be placed before the Zero offset rectifier 10120.

The absorption frequencies are characterized, and do not vary significantly with temperature. Measuring the absorption of the gas cell 10150 versus the frequency of the reference tunable laser 10115 enables the software to apply a calibration factor to the reference laser 10115 to increase its accuracy to the order of ±0.1 GHz or better.

A microprocessor algorithm for the circuit shown in FIG. 101 includes the following steps:

1 Tune the reference laser 10151 to an absorption band;
2 Measure the offset between the laser set point and expected frequency of the absorption band (see 10152). Record the difference, $f_C$, and apply the offset of the following measurements;
3 Tune the reference laser 10151 to the frequency of the signal laser 10125 to be measured and scan the reference laser 10151 across the signal bandwidth while measuring the strength of the beat signal (see 10153). Fit a curve to the measured beat signal and interpolate to get the value of the reference laser 10151 frequency $f_R$ that maximizes the beat signal $f_D$. Calculate the frequency of the signal laser 10125 as $fs=f_R+f_D+f_C$; and
4 Calculate the error in the signal laser 10125 and send a message to the laser source to correct its setpoint (see 10154). Raise an alarm if the laser 10125 is not responding to the tuning messages. Repeat until the error is within an acceptable bound and then repeat for the next laser 10125.

This method can also be used to measure the spectrum of signals in a transmission fiber to provide a monitoring and alarm function.

There are often cases in an optical network where it is difficult to maintain the polarization between the reference laser and the signal lasers. In such cases, the beat signal can be measured by using a polarization controller 10250 (as shown in embodiment 10200 in FIG. 102) to align the reference laser 10215 with the signal to be measured. As each signal laser 10225 is scanned, the polarization controller 10250 is adjusted to maximize the beat signal.

An alternative embodiment 10300 is shown in FIG. 103 where a polarization scrambler 10320 is used instead of a polarization controller.

Another embodiment of a subchannel muxponder 10400 is shown in FIG. 104. In this embodiment, integrated transceivers 10410, such as DWDDM XFPs, are tuned to the correct subchannel frequency. The shared wavelength locker 10413 can be used at the transmitter to improve the nominal channel spacing of the integrated optical devices.

For example, 50 GHz XFPs can be locked to a 25 GHz or 12.5 GHz grid with the improved frequency accuracy given by the locker 10413.

The invention claimed is:

1. An improved method for monitoring the performance of optical networking equipment used to transmit signals among a plurality of nodes interconnected by one or more fiber optic cables to form an optical network, the method comprising:
   (a) selecting one or more performance metrics to monitor with respect to signals transmitted over the network from an optical transmitter at a first node to an optical receiver at a second node;
   (b) selecting an unused communications channel as a monitor channel to measure the selected performance metrics against a predefined acceptable level of tolerance;
   (c) selecting an available signal channel to transmit signals from the transmitter at the first node to the receiver at the second node;
   (d) tuning the transmitter initially to the selected monitor channel to measure the selected performance metrics for signals transmitted from the transmitter at the first node to the receiver at the second node; and
   (e) switching the transmitter from the selected monitor channel to the selected signal channel upon determining that the measured performance metrics are within the predefined acceptable level of tolerance;
   (f) further including the step of measuring the polarization mode dispersion of an optical path in the optical network via the following steps:
   (g) measuring a first phase difference between a first signal and a second signal transmitted along the optical path, where the frequency spacing between the first and second signals is known, and the polarizations of the first and second signals are aligned along a first polarization axis at the transmitter end of the optical path;
   (h) measuring a second phase difference between a third signal and a fourth signal transmitted along the optical path, where the frequency spacing between the third and fourth signals is known, and the polarizations of the third and fourth signals are aligned along a second polarization axis at the transmitter end of the optical path; and
   (i) calculating the difference between the first and second phase differences.

2. The method of claim 1, wherein OSC management communications include the results of measuring the selected performance metrics via the monitor channel, and wherein the OSC management communications are routed among nodes of the optical network, based on current network conditions, by utilizing (i) a dedicated out-of-band channel, (ii) the overhead portion of an existing in-band communications channel, or (iii) the unused payload portion of an existing in-band communications channel.

3. The method of claim 1, further including the step of measuring the chromatic dispersion of an optical path in the optical network by measuring the received phase difference between two transmitters with a known optical frequency spacing transmitted over the optical path.

4. The method of claim 1, further including the step of measuring the optical signal to noise ratio of an optical path in a fiber network by measuring the difference in received power levels, at the output of a narrow-band receiver filter, from (a) a first laser tuned to the center of the receiver filter and (b) a second laser tuned away from the passband of the receive filter.

5. The method of claim 1, further including the following steps to add signals to the optical network without disrupting live traffic:
   (a) monitoring a first set of performance metrics with respect to a first signal on the network;
   (b) adding a second signal to the network, during the monitoring of the first set of performance metrics, by gradually increasing the output power of a transmitter used to transmit the second signal onto the network;
   (c) terminating the increasing of the output power of the transmitter when the first set of performance metrics reaches a predefined performance target value; and
   (d) generating an alarm if a predefined alarm threshold value is exceeded.

6. The method of claim 5, further including the step of equalizing the optical signal to noise ratio (OSNR) across the network by determining, as each new signal is provisioned, a current OSNR value as a function of the OSNR of existing signals, and increasing the power output of the new signal until its OSNR reaches the current OSNR value.

7. The method of claim 5 wherein the first set of performance metrics includes a bit error rate.

8. The method of claim 1, further including the step of automatically providing diagnostic data to a user of networking equipment containing a plurality of digital registers by:
   (a) receiving a predefined expected value with respect to each of a first subset of the plurality of digital registers;
   (b) automatically retrieving the actual value stored in each of the first subset of digital registers;
   (c) comparing the retrieved actual values with their predefined expected values; and
   (d) reporting the differences between the actual values and the expected values to the user.

9. The method of claim 1, further including the step of optimizing the power level of an optical receiver via a power control circuit that comprises (i) an optical doped-fiber preamplifier; and (ii) a variable optical attenuator (VOA) having two inputs, wherein the output of the optical doped-fiber preamplifier is connected to the first input, and an attenuation signal is connected to the second input to automatically attenuate the output of the preamplifier so as to maintain the power level of the optical receiver at a predefined optimum power level.

10. The method of claim 1, further including the following steps to determine a path of a signal transmitted from the first node to the second node:
   (a) connecting an output filter having a plurality of output ports to the output of an optical transmitter that transmits the signal; and
   (b) tuning a transmit laser within the transmitter to a predefined frequency to select the output port of the output filter through which the signal will be transmitted onto the network;
   (c) whereby the path of the signal through the network is effectively determined by the predefined frequency.

11. The method of claim 1, further including the following steps to maintain an optimum power level of the optical receiver:
   (a) defining an optimum power level with respect to the optical receiver;
   (b) connecting the output of an optical doped-fiber preamplifier to a first input of a variable optical attenuator (VOA); and
   (c) connecting an attenuation signal to a second input of the VOA to automatically attenuate the output of the preamplifier so as to maintain the power level of the optical receiver at the optimum power level.

* * * * *